US 6,691,296 B1

United States Patent
Nakayama et al.

(10) Patent No.: US 6,691,296 B1
(45) Date of Patent: Feb. 10, 2004

(54) CIRCUIT BOARD DESIGN AIDING

(75) Inventors: Takeshi Nakayama, Kadoma (JP); Yukihiro Fukumoto, Kyotanabe (JP); Yoshiyuki Saito, Hirakata (JP); Hirokazu Uemura, Yao (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/241,946

(22) Filed: Feb. 1, 1999

(30) Foreign Application Priority Data

Feb. 2, 1998 (JP) .......................... 10-021089
Dec. 22, 1998 (JP) .......................... 10-364143

(51) Int. Cl.$^7$ .............................................. G06F 17/50
(52) U.S. Cl. ............................. 716/15; 716/13; 716/14
(58) Field of Search .......................... 716/15, 13, 14

(56) References Cited

U.S. PATENT DOCUMENTS

| 5,258,920 A | * | 11/1993 | Haller et al. ................... 716/12 |
| 5,295,082 A | * | 3/1994 | Chang et al. .................. 716/12 |
| 5,502,644 A | * | 3/1996 | Hamilton et al. ............... 716/5 |
| 5,508,938 A | * | 4/1996 | Wheeler ....................... 716/19 |
| 5,657,242 A | * | 8/1997 | Sekiyama et al. ............. 716/15 |
| 5,745,371 A | * | 4/1998 | Shouen ........................ 716/15 |
| 5,787,012 A | * | 7/1998 | Levitt .......................... 716/1 |
| 5,822,214 A | * | 10/1998 | Rostoker et al. .............. 716/10 |
| 5,847,968 A | * | 12/1998 | Miura et al. .................. 716/8 |
| 6,058,256 A | * | 5/2000 | Mellen et al. ................. 716/12 |

FOREIGN PATENT DOCUMENTS

| EP | 74303 A | * | 3/1983 | ............ H05K/1/00 |
| EP | 506090 A2 | * | 1/1997 | ............ H01L/23/02 |
| GB | 2259189 A | * | 3/1993 | ............ H05K/1/00 |
| JP | 01264249 A | * | 10/1989 | ............ H01L/23/50 |
| JP | 02066434 A | * | 3/1990 | ............ G01N/21/88 |
| JP | 02224398 A | * | 9/1990 | ............ H05K/9/00 |
| JP | 05067884 A | * | 3/1993 | ............ H05K/3/46 |
| JP | 6203102 | | 7/1994 | ............ G06F/15/60 |
| JP | 07202359 A | * | 8/1995 | ............ H05K/1/02 |
| JP | 07335703 A | * | 12/1995 | ............ H01L/21/66 |
| JP | 08088472 A | * | 4/1996 | ............ H05K/3/46 |
| JP | 08241935 A | * | 9/1996 | ............ H01L/23/12 |
| JP | 926979 | | 1/1997 | ............ G06F/17/50 |
| JP | 09036504 A | * | 2/1997 | ............ H05K/1/02 |
| JP | 9186465 | | 7/1997 | ............ H05K/3/46 |
| JP | 09246681 A | * | 9/1997 | ............ H05K/1/02 |

OTHER PUBLICATIONS

Machine generated translation of Japanese Patent Publication No. 09–186,465, Japan Patent Office website, translation generated on Sep. 29, 2003, 7 pages.*

* cited by examiner

Primary Examiner—Matthew Smith
Assistant Examiner—Phallaka Kik

(57) ABSTRACT

A net detecting unit detects a set of component terminal interconnection information showing a critical net from a component terminal interconnection information list. A conductor detecting unit detects a conductor corresponding to the critical net. A component detecting unit detects two components from the set of component terminal interconnection information. A terminal detecting unit detects a power and/or ground terminal of each of the detected components. A power/ground layer detecting unit detects at least one layer, among power and ground layers, to which the detected power and/or ground terminals are connected. A layer detecting unit specifies a layer, among the detected layers, that is nearest to a signal layer on which the conductor is placed. A prohibition area generating unit generates a via prohibition area on the specified layer. As a result, vias are placed on the specified layer, avoiding the via prohibition area.

74 Claims, 110 Drawing Sheets

FIG. 3

COMPONENT TERMINAL INTERCONNECTION INFORMATION LIST 1201

COMPONENT TERMINAL INTERCONNECTION INFORMATION 1211

| CONNECTION NAME 1212 | CONNECTION INFORMATION 1213 | FREQUENCY [MHz] 1215 | PWR/GND 1218 | ELECTRIC POTENTIAL 1219 | CRITICAL NET 1220 |
|---|---|---|---|---|---|
| net1 | IC1−P1, IC4−P5 | − | − | − | − |
| net2 | IC1−P2, IC4−P10 | 33 | − | − | − |
| net3 | IC1−P3, IC2−P4, IC3−P2, IC4−P4, BC1-P1 | − | GND | 0V | − |
| net4 | IC1−P4, IC2−P5, IC3−P3, IC4−P6, BC1-P2 | − | PWR | 3V | − |
| ... | ... | ... | ... | ... | ... |

COMPONENT TERMINAL INTERCONNECTION INFORMATION LIST 1201

COMPONENT TERMINAL INTERCONNECTION INFORMATION 1211

| CONNECTION NAME 1212 | CONNECTION INFORMATION 1213 | FREQUENCY [MHz] 1215 | PWR/ GND 1218 | ELECTRIC POTENTIAL 1219 | CRITICAL NET 1220 |
|---|---|---|---|---|---|
| net1 | IC1−P1, IC4−P5 | — | — | — | — |
| net2 | IC1−P2, IC4−P10 | 33 | — | — | ○ |
| net3 | IC1−P3, IC2−P4, IC3−P2, IC4−P4, BC1−P1 | — | GND | 0V | — |
| net4 | IC1−P4, IC2−P5, IC3−P3, IC4−P6, BC1−P2 | — | PWR | 3V | — |
| ... | ... | ... | ... | ... | ... |

FIG. 6

1401 TERMINAL LIST

| TERMINAL NUMBER | TERMINAL INFORMATION | | | |
|---|---|---|---|---|
| | ATTRIBUTE | RISE TIME [ns] | FALL TIME [ns] | CRITICAL TERMINAL |
| IC1–P1 | IN | — | — | — |
| IC1–P4 | Vcc | — | — | — |
| IC2–P2 | OUT | 2 | 2 | — |
| IC3–P1 | Vcc | — | — | — |
| IC4–P3 | GND | — | — | — |
| IC4–P6 | Vcc | — | — | — |
| ... | ... | ... | ... | |

CONDUCTOR INFORMATION LIST
1601

| CONNECTION NAME | STARTPOINT COORDINATES | ENDPOINT COORDINATES | MIDPOINT COORDINATES | CONDUCTOR WIDTH [mm] | LAYER NUMBER |
|---|---|---|---|---|---|
| net1 | 10, 10 | 40, 10 | — | 1 | 1 |
| net2 | 10, 20 | 40, 20 | — | 1 | 1 |
| net4 | 10, 10 | 300, 400 | — | — | 3 |
| ... | ... | ... | ... | ... | ... |

FOIL INFORMATION

FIG. 8

BOARD CONSTITUENT LIST — 1701

| LAYER NUMBER | TYPE |
|---|---|
| 1 | Signal |
| 2 | GND |
| 3 | PWR |
| 4 | Signal |

1711 — LAYER NUMBER
1712 — TYPE
1731 — Signal
1732 — GND
1733 — PWR
1734 — Signal

FIG. 9

VIA PROHIBITION AREA INFORMATION LIST 1802

| VIA PROHIBITION AREA NAME 1821 | VIA PROHIBITION AREA INFORMATION 1811 | | | |
|---|---|---|---|---|
| | STARTPOINT COORDINATES 1822 | ENDPOINT COORDINATES 1823 | TYPE 1826 | PLACEMENT LAYER 1827 |
| PROHIBITION AREA 1 | 10, 20 | 40, 20 | VIA PROHIBITION | GND |
| PROHIBITION AREA 2 | 10, 10 | 40, 10 | VIA PROHIBITION | PWR |
| ... | ... | ... | ... | ... |

FIG. 21

2201 PLACEMENT INFORMATION LIST

| COMPONENT NUMBER | PLACEMENT INFORMATION | | | |
|---|---|---|---|---|
| | COORDINATES | ANGLE | SIDE | LAYER NUMBER |
| IC1 | 1, 1 | 0 | COMPONENT SIDE | 1 |
| IC2 | 2, 5 | 0 | SOLDERED SIDE | 1 |
| BC1 | 4, 8 | 0 | COMPONENT SIDE | 1 |
| ... | ... | ... | ... | ... |

| LAYER CONNECTING VIA | VIA INFORMATION | | CLEARANCE VALUE |
|---|---|---|---|
| | AREA | | |
| 1 - 2 | 2, 2 - 10, 8 | | 25 |
| | 2, 12 - 10, 18 | | |
| 1 - 3 | 12, 2 - 22, 8 | | 25 |
| ⋮ | ⋮ | | ⋮ |

FIG. 26
2501 COMPONENT NAME LIST
| COMPONENT NAME | NUMBER OF TERMINALS | SHAPE | LENGTH[mm] | WIDTH[mm] | TYPE |
|---|---|---|---|---|---|
| MN10 | 16 |  | 15.0 | 15.0 | IC |
| MN20 | 20 |  | 20.0 | 10.0 | IC |
| EC10 | 2 |  | 5.0 | 3.0 | CAPACITOR ELEMENT |
| ... | ... | ... | ... | ... | ... |

FIG. 27

2601 COMPONENT NUMBER LIST

| COMPONENT NUMBER | COMPONENT NAME |
|---|---|
| IC1 | MN10 |
| IC2 | MN20 |
| C1 | EC10 |
| ⋮ | ⋮ |

BOARD CONSTITUENT LIST  /⎯3201

| LAYER NUMBER | TYPE |
|---|---|
| 1 | Signal |
| 2 | Signal |
| 3 | GND |
| 4 | PWR |
| 5 | Signal |
| 6 | Signal |

3211 — LAYER NUMBER     TYPE — 3212

FIG. 36

INTER-LAYER INFORMATION LIST 3301

| INTER-LAYER NUMBER | INTER-LAYER DISTANCE [μm] |
|---|---|
| 1—2 | 300 |
| 2—3 | 300 |
| 3—4 | 1000 |
| 4—5 | 300 |
| 5—6 | 300 |

FIG. 37

3401 ROUTING PATH INFORMATION LIST

| ROUTING PATH NAME | STARTPOINT COORDINATES | ROUTING PATH INFORMATION | | |
|---|---|---|---|---|
| | | ENDPOINT COORDINATES | MIDPOINT COORDINATES | LAYER NUMBER |
| L1 | 2, 2 | 10, 2 | — | 1 |
| L2 | 2, 10 | 10, 10 | — | 1 |
| ... | ... | ... | ... | ... |

FIG. 45

CONDUCTOR INFORMATION LIST 1601

| CONNECTION NAME | STARTPOINT COORDINATES | ENDPOINT COORDINATES | MIDPOINT COORDINATES | CONDUCTOR WIDTH[mm] | LAYER NUMBER |
|---|---|---|---|---|---|
| net1 | 10, 10 | 40, 10 | — | 1 | 1 |
| net2 | 10, 20 | 40, 20 | — | 1 | 2 |
| ... | ... | ... | ... | ... | ... |

1611 — CONNECTION NAME
1612 — STARTPOINT COORDINATES
1613 — ENDPOINT COORDINATES
1621 — FOIL INFORMATION
1614 — MIDPOINT COORDINATES
1615 — CONDUCTOR WIDTH[mm]
1616 — LAYER NUMBER

FIG. 54

VIA COODINATE LIST
5201

| LAYER CONNECTING VIA 5211 | VIA COODINATES 5212 |
|---|---|
| 1-4 | 2,5 |
| ⋮ | ⋮ |

FIG. 72

NEAREST PLANE INFORMATION LIST 6201

| SIGNAL LAYER | NEAREST PLANE |
|---|---|
| 1 | 3 |
| 2 | 3 |
| 5 | 4 |
| 6 | 4 |

6211 — SIGNAL LAYER, 6212 — NEAREST PLANE

FIG. 73

GROUP INFORMATION LIST 6301

| GROUP NAME | SIGNAL LAYER |
|---|---|
| 3 | 1,2 |
| 4 | 5,6 |

6311 — GROUP NAME, 6312 — SIGNAL LAYER

FIG. 92

BOARD CONSTITUENT TABLE 510

| LAYER NUMBER 511 | LAYER TYPE 512 |
|---|---|
| 1 | SIGNAL |
| 2 | 5V |
| 3 | 0V |
| 4 | SIGNAL |

FIG. 93

COMPONENT LIST 520

| COMPO-NENT NUMBER 521 | COMPO-NENT NAME 522 | NUMBER OF TERMI-NALS 523 | SHAPE 524 | LENGTH [mm] 525 | WIDTH [mm] 526 |
|---|---|---|---|---|---|
| IC1 | MN10 | 16 | QFP | 15.0 | 15.0 |
| IC2 | MN11 | 20 | FP | 20.0 | 10.0 |
| ⋮ | ⋮ | ⋮ | ⋮ | ⋮ | ⋮ |

FIG. 94

TERMINAL LIST 530

| TERMINAL NUMBER 531 | ATTRIBUTE 532 | RISE TIME [ns] 533 | FALL TIME [ns] 534 |
|---|---|---|---|
| IC1-P1 | IN | · | · |
| IC1-P2 | OUT | 1 | 1 |
| IC1-P3 | OUT | 6 | 6 |
| IC1-P4 | IN | · | · |
| ⋮ | ⋮ | ⋮ | ⋮ |

FIG. 95

NET LIST 540

| CONNECTION NAME | TERMINAL NUMBER GROUP | FREQUENCY/ POTENTIAL |
|---|---|---|
| net1 | IC1-P1,IC4-P5,··· | |
| net2 | IC1-P2,IC4-P1,··· | 33MHz |
| ... | ... | ... |
| net100 | IC1-P7,IC2-P8,··· | 0V |
| net200 | IC1-P14,IC2-P16,··· | 5V |
| ... | ... | ... |
| ⋮ | ⋮ | ⋮ |

FIG. 96

BLOCK INFORMATION TABLE 550

| BLOCK NAME | COMPONENT NUMBER GROUP | FIRST COORDI-NATES | SECOND COORDI-NATES | DA TYPE |
|---|---|---|---|---|
| BLOCK 1 | IC1,IC4,IC5,IC9 | (1,1) | (60,40) | DIGITAL |
| BLOCK 2 | IC2,IC6,IC8,CN1 | (65,1) | (100,50) | ANALOG |
| ⋮ | ⋮ | ⋮ | ⋮ | ⋮ |

FIG. 97

PLACEMENT POSITION TABLE 560

| COMPONENT NUMBER | COORDI-NATES | ANGLE | SIDE |
|---|---|---|---|
| IC1 | 1,1 | 0 | A SIDE |
| IC2 | 2,5 | 0 | B SIDE |
| ⋮ | ⋮ | ⋮ | ⋮ |

FIG. 98

ROUTING PATH TABLE 570

| CONNECTION NAME | COORDINATE STRING DATA |
|---|---|
| net1 | (5,5), (5,10), (10,10) |
| net2 | ⋮ |
| ⋮ | ⋮ |
| net100 | ⋮ |
| net200 | ⋮ |
| ⋮ | ⋮ |

CIRCUIT BOARD DESIGN AIDING

This application is based on applications Nos. 10-021089 and 10-364143 filed in Japan, the contents of which are hereby incorporated by reference.

BACKGROUND OF THE INVENTION

1. Field of the Invention

The present invention relates to a design aiding apparatus for designing a circuit board with a low noise level, a design aiding method, and a storage medium storing a design aiding program.

2. Description of the Prior Art

With the development of multilayer printed circuit boards, circuit boards that include not only signal wiring surfaces but also solid conductor surfaces (planes), such as a 0-volt ground plane, a 5-volt power plane and a 12-volt power plane, have increasingly been used in recent years.

A CAD apparatus for such multilayer circuit boards is disclosed in Japanese Laid-Open Patent Application 9-26979. In this CAD apparatus, the geometry of each subplane of a power plane is generated based on data inputted by a designer for specifying a voltage level of each component and an approximate boundary line between each two component groups. More specifically, once the designer has inputted a voltage level of each component and roughly specified a boundary line between each two component groups which have different voltage levels, the CAD apparatus detects intersection points between the specified boundary lines and the peripheral lines of a board, forms areas (closed loops) which each enclose a component group, and calculates the geometry of a subplane (expressed by a coordinate string showing a continuous line created by inwardly offsetting a closed loop) for each closed loop. Thus, only by specifying voltage levels of components and rough boundary lines between component groups, the designer can design the geometry of each subplane which differs in voltage level. In addition, even when components are randomly placed irrespective of their voltage levels, the complex geometries of subplanes can be obtained by generating closed loops along boundary lines between component groups.

In a circuit board containing high-speed signal lines, a high-speed signal normally takes a feedback path of the lowest impedance. In the case of a multilayer circuit board, a signal of a high-speed signal line routed on a signal layer mostly takes a feedback path formed by projecting the signal line onto a plane nearest to the signal layer. This technique is described in detail in Mark I. Montrose (1996) *Printed Circuit Board Design Techniques for EMC Compliance*, IEEE No. PC5595, and Howard W. Johnson & Martin Graham (1993) *High-Speed Digital Design: A Handbook of Black Magic*, PTR Prentice-Hall.

For suppressing undesired electromagnetic waves in designing a high-speed signal rigid circuit board, a printed circuit board designing method is disclosed in Japanese Laid-Open Patent Application 6-203102, while a printed circuit board, a printed circuit board designing method and a wiring pattern generating apparatus for a printed circuit board are disclosed in Japanese Laid-Open Patent Application 9-186465.

In the printed circuit board designing method disclosed in Japanese Laid-Open Patent Application 6-203102, each component block is placed so that high-frequency digital signal lines can be linearly routed between each two component block either in the X or Y direction on a signal layer, and the appearance of cutlines orthogonal to the direction of the signal lines is prohibited in an area formed by projecting the signal lines onto a power/ground layer nearest to the signal layer. By doing so, radiated electromagnetic noise can be reduced.

In the printed circuit board designing method disclosed in Japanese Laid-Open Patent Application 9-186465, two signal patterns are grouped as one in a printed circuit board composed of a signal layer, a power layer and a ground layer. Vias on two signal patterns of the same group are placed closely so that the signal patterns are insulated from each other, while vias on two signal patterns of different groups are placed with a space larger than the sum of the clearance diameter and the signal pattern width. By setting a clearance around each via hole in the above arrangement, a feedback path of a signal pattern is routed in the vicinity of an area formed by projecting the signal pattern onto the power/ground layer, with it being possible to reduce radiated electromagnetic noise caused by the signal pattern and a largely detoured feedback path.

However, the multilayer circuit board CAD apparatus of Japanese Laid-Open Patent Application 9-26979 lacks efficiency on the ground that the designer has to manually input boundary lines between component groups of different voltage levels. Besides, to connect components of a high-speed circuit group to one subplane adversely affects other component groups.

Although the printed circuit board designing method of Japanese Laid-Open Patent Application 6-203102 is effective in suppressing radiated electromagnetic noise, it is necessary to place component blocks in consideration of routing directions of high-speed signal lines and to route feedback paths in areas parallel to signal lines in consideration of directions of the signal lines and positions of via holes. Thus, this method has difficulties in designing a circuit board under the above constraints.

Also, the printed circuit board designing method of Japanese Laid-Open Patent Application 9-186465 fails to sufficiently suppress electromagnetic noise, since a signal of a signal line still takes an alternative path to avoid nonconductor areas around via holes directly below the signal line.

SUMMARY OF THE INVENTION

In view of the above problems, the present invention aims to provide a design aiding apparatus, a design aiding method and a storage medium storing a design aiding program that enable efficient design of a circuit board while suppressing electromagnetic noise and adverse effect caused by high-speed circuit blocks on other circuit blocks, without concern for design restrictions, such as placement of component blocks in consideration of directions of high-speed signal lines and routing of feedback paths in consideration of directions of signal lines and positions of via holes.

To fulfill the above object, the present invention is a design aiding apparatus for aiding placement of any of components, conductors and vias in a multilayer circuit board which includes at least one signal layer and at least one layer that is one of a power layer and a ground layer, the design aiding apparatus including: a routing path area generating unit for generating a routing path area on at least one signal layer or at least one layer that is one of a power layer and a ground layer, the routing path area partly including one of a signal line routed on a signal layer and a feedback path of a current which flows over a signal line routed on a signal layer; and a position calculating unit for calculating, based on the generated routing path area, one of a position at which any of components, conductors and vias is to be placed and a position at which any of components, conductors and vias is prohibited to be placed, to minimize an area enclosed by a loop formed by a current which flows over a signal line and a feedback path corresponding to the signal line.

With this construction, an area enclosed by a loop formed by a current that flows over a signal line and a feedback path corresponding to the signal line can be minimized by determining where any of components, conductors and vias is to be placed or where any of components, conductors and vias is prohibited to be placed, based on a routing path area set on a signal, power, or ground layer. Accordingly, a circuit board that has a low noise level can be designed with efficiency.

The above object can also be fulfilled by a design aiding apparatus for aiding placement of vias in a multilayer circuit board which includes at least one layer that is one of a ground layer and a power layer and at least one signal layer on which at least one conductor that interconnects terminals of respective components is placed, the design aiding apparatus including: an interconnection storing unit for storing at least one interconnection identifier identifying an interconnection of terminals of respective components; a conductor storing unit for storing at least one combination of a conductor placement area and a layer identifier for each interconnection identifier identifying an interconnection of terminals of respective components, the conductor placement area showing an area occupied by a conductor which one of totally and partially interconnects the terminals of the respective components, and the layer identifier identifying a layer on which the conductor is placed; an interconnection identifier selecting unit for selecting an interconnection identifier; a conductor detecting unit for detecting at least one combination of a conductor placement area and a layer identifier corresponding to the selected interconnection identifier from the conductor storing unit, a layer identified by the detected layer identifier being set as a conductor placement layer; a power/ground layer detecting unit for detecting a layer, among power layers and ground layers included in the multilayer circuit board, that is nearest to the conductor placement layer; and a prohibition area generating unit for generating a placement prohibition area within which placement of vias is prohibited, on the detected layer, wherein the placement prohibition area is an area formed by projecting an area, which encloses the detected conductor placement area by a predetermined gap, onto the detected layer.

With this construction, placement of vias is prohibited in a placement prohibition area on a plane nearest to a signal layer on which a signal line of a detected net is routed, in order to prevent non-conductor areas around via holes from being created in a feedback path area for the signal line. Accordingly, a feedback path of a current that flows over the signal line can be secured, with it being possible to efficiently design a circuit board with a low noise level.

The above object can also be fulfilled by a design aiding apparatus for aiding placement of vias in a multilayer circuit board which includes at least one signal layer, at least one power layer and at least one ground layer, the design aiding apparatus including: a component storing unit for storing at least one component identifier identifying a component placed on a signal layer and storing at least one capacitor element identifier identifying a capacitor element placed on a signal layer; a component selecting unit for selecting a component identifier; and a capacitor element selecting unit for selecting a capacitor element identifier identifying a capacitor element that is connected to a pair of power and ground layers to which a component identified by the selected component identifier is connected, that has a predetermined capacitance, and that is placed nearest to the component on a signal layer on which the component is placed.

Here, the design aiding apparatus may further include a rectangle area setting unit for setting an area, formed by projecting a rectangle area whose diagonal vertices correspond to a placement position of the capacitor element and a placement position of the component on the signal layer onto a layer that is nearer to the signal layer among the pair of power and ground layers to which the component is connected, as a clearance radius change area.

Here, a plurality of layers may be connected by vias whose clearances each have a predetermined radius, each clearance being a circular area centering on a via, where placement of another via is prohibited, wherein the design aiding apparatus further includes a clearance radius changing unit for changing the predetermined radius of a clearance of each via which passes through the set clearance radius change area, to a different value.

With this construction, overlapping of non-conductor areas around adjacent via holes is avoided in a specific area on a plane nearest to a signal layer on which a signal line of a detected net is routed, so that a feedback path of a current that flows over the signal line can be secured. Accordingly, a circuit board with a low noise level can efficiently be designed.

The above object can also be fulfilled by a design aiding apparatus for aiding placement of conductors in a multilayer circuit board in which at least one signal layer and at least one layer that is one of a power layer and a ground layer are included in a predetermined order, the design aiding apparatus including: an interconnection storing unit for storing at least one interconnection identifier identifying an interconnection of terminals of respective components; a layer type storing unit for storing a combination of a layer identifier and a layer type for each layer in the multilayer circuit board in the predetermined order, the layer identifier identifying a layer, and the layer type showing whether the layer identified by the layer identifier is a signal layer, a power layer, or a ground layer; an interconnection identifier selecting unit for selecting an interconnection identifier identifying an interconnection of terminals of respective two components; a power/ground layer detecting unit for detecting at least one layer to which the two components are connected among power layers and ground layers included in the multilayer circuit board, and detecting a layer identifier that identifies the detected layer from the layer type storing unit; a signal layer detecting unit for detecting at least one signal layer on which the two components are placed and detecting a layer identifier identifying the detected signal layer; a priority determining unit for assigning priorities to the signal layers included in the multilayer circuit board, based on combinations of layer identifiers and layer types stored in the layer type storing unit in the predetermined order, the layer identifier detected by the power/ground layer detecting unit, and the layer identifier detected by the signal layer detecting unit; a routing layer determining unit for determining at least one signal layer on which a conductor will be placed to interconnect the terminals of the respective two components, based on the priorities assigned by the priority determining unit; and a routing unit for calculating a placement area of the conductor on the determined signal layer.

With this construction, a signal line of a detected net is routed on a signal layer nearest to a power/ground plane, so that an area enclosed by a loop of a current that flows over the signal line can be minimized. Thus, it is possible to efficiently design a circuit board with a low noise level.

The above object can also be fulfilled by a design aiding apparatus for aiding placement of conductors in a multilayer circuit board in which at least one signal layer and at least one layer that is one of a power layer and a ground layer are included in a predetermined order, the design aiding apparatus including: an interconnection storing unit for storing at least one interconnection identifier identifying an interconnection of terminals of respective components; a conductor storing unit for storing at least one layer identifier for each interconnection identifier identifying an interconnection of terminals of respective components, the layer identifier identifying a signal layer one which a conductor which one of totally and partially interconnects the terminals of the respective components is placed; an interconnection identifier selecting unit for selecting an interconnection identifier identifying an interconnection of terminals of respective two components; a conductor detecting unit for detecting at least one layer identifier corresponding to the selected interconnection identifier from the conductor storing unit, a signal layer identified by the detected layer identifier being set as a conductor placement layer; and a routing layer judging unit for judging whether the conductor placement layer is a predetermined signal layer.

Here, the routing layer judging unit may include: a layer type storing unit for storing a combination of a layer identifier and a layer type for each layer in the multilayer circuit board according to the predetermined order, the layer identifier identifying a layer, and the layer type showing whether the layer identified by the layer identifier is a signal layer, a power layer, or a ground layer; a power/ground layer detecting unit for detecting at least one layer to which the two components are connected among the power layers and ground layers included in the multilayer circuit board and detecting a layer identifier that identifies the detected layer from the layer type storing unit; a signal layer detecting unit for detecting at least one signal layer on which the two components are placed and detecting a layer identifier identifying the detected signal layer from the layer type storing unit; a priority determining unit for assigning priorities to the signal layers included in the multilayer circuit board, based on the combination of the layer identifier and the layer type for each layer in the layer type storing unit, the layer identifier detected by the power/ground layer detecting unit, and the layer identifier detected by the signal layer detecting unit; and a priority judging unit for judging whether there is a signal layer whose priority is higher than a priority assigned to the conductor placement layer, based on the priorities assigned by the priority determining unit.

Here, the conductor storing unit may further store, for each interconnection identifier identifying an interconnection of terminals of respective components, at least one conductor placement area showing an area occupied by a conductor which one of totally and partially interconnects the terminals of the respective components, wherein the design aiding apparatus further includes a conductor moving unit for deleting, when the priority judging unit judges that there is the signal layer of a higher priority than the conductor placement layer, the layer identifier and a conductor placement area corresponding to the selected interconnection identifier from the conductor storing unit, calculating a new conductor placement area on the signal layer of the higher priority to place a conductor which interconnects the terminals of the respective two components, and writing a combination of the new conductor placement area and a layer identifier identifying the signal layer of the higher priority into the conductor storing unit.

With this construction, a signal line of a detected net is checked whether it has been routed on a signal layer nearest to a power/ground plane, with it being possible to design a circuit board that has a low noise level.

The above object can also be fulfilled by a design aiding apparatus for aiding placement of any of conductors and vias in a multilayer circuit board which includes at least one signal layer, at least one power layer and at least one ground layer, the design aiding apparatus including: an interconnection storing unit for storing at least one interconnection identifier identifying an interconnection of terminals of respective components; a component storing unit for storing a combination of a component identifier, a layer identifier, a component placement position and a component type for each component placed in the multilayer circuit board, the component identifier identifying a component, the layer identifier identifying a signal layer on which the component is placed, the component placement position showing a placement position of the component on the signal layer, and the component type showing a type of the component; an interconnection identifier selecting unit for selecting an interconnection identifier which identifies an interconnection between a terminal of a first component and a terminal of a second component; a component detecting unit for detecting a component identifier identifying the first component and a component identifier identifying the second component from the component storing unit; a component placement layer judging unit for retrieving a layer identifier corresponding to the component identifier of the first component and a layer identifier corresponding to the component identifier of the second component from the component storing unit, setting a signal layer identified by the layer identifier retrieved for the first component as a first signal layer and a signal layer identified by the layer identifier retrieved for the second component as a second signal layer, and judging whether the first signal layer and the second signal layer are same; a rectangle area generating unit for generating a rectangle area on the first signal layer when the component placement layer judging unit judges that the first signal layer and the second signal layer are different, wherein diagonal vertices of the rectangle area correspond to a placement position of the terminal of the first component and a point formed by projecting a placement position of the terminal of the second component onto the first signal layer; a capacitor element judging unit for searching the component storing unit for a component identifier identifying a component that is connected to a pair of power and ground layers to which the first component and the second component are connected, that is a capacitor element, and that is placed within the generated rectangle area; a via placing unit for calculating a predetermined position on the first signal layer as a via placement position when the component identifier is found by the capacitor element judging unit; and a routing unit for calculating a conductor placement area on the first signal layer to place a conductor which connects the terminal of the first component and the calculated via placement position, and calculating a conductor placement area on the second signal layer to place a conductor which connects the terminal of the second component and a point formed by projecting the calculated via placement position onto the second signal layer.

With this construction, when a via that connects two conductors placed for a detected net passes through power and ground planes, the via is placed near a capacitor element which forms a part of a feedback path of a current that flows over the detected net. Accordingly, an area enclosed by a loop of the current can be minimized, with it being possible to design a circuit board while reducing noise.

The above object can also be fulfilled by a design aiding apparatus for aiding placement of any of components, conductors and vias in a multilayer circuit board which includes at least one signal layer, at least one power layer and at least one ground layer in a predetermined order, the design aiding apparatus including: an interconnection storing unit for storing at least one interconnection identifier identifying an interconnection of terminals of respective components; a capacitor element storing unit for storing a placement position of each capacitor element, among capacitor elements placed on any of the signal layers, that is connected to a pair of power and ground layers; a layer type storing unit for storing a combination of a layer identifier and a layer type for each layer in the multilayer circuit board according to the predetermined order, the layer identifier identifying a layer, and the layer type showing whether the layer identified by the layer identifier is a signal layer, a power layer, or a ground layer; a conductor storing unit for storing at least one combination of a conductor placement area and a layer identifier for each interconnection identifier identifying an interconnection of terminals of respective components, the conductor placement area showing an area occupied by a conductor that one of totally and partially interconnects the terminals of the respective components, and the layer identifier identifying a signal layer on which the conductor is placed; a via storing unit for storing a via placement position of each via that connects a plurality of layers; an interconnection identifier selecting unit for selecting an interconnection identifier identifying an interconnection between a terminal of a first component and a terminal of a second component; a conductor detecting unit for detecting at least one combination of a conductor placement area and a layer identifier corresponding to the selected interconnection identifier from the conductor storing unit; a via judging unit for searching the via storing unit for a via whose via placement position is within any of the detected conductor placement areas; a nearest plane judging unit for judging, when the via judging unit finds the via and when the conductor detecting unit detects two layer identifiers which respectively identify a first signal layer on which a first conductor is placed and a second signal layer on which a second conductor is placed, whether among the power layers and the ground layers included in the multilayer circuit board, a first layer that is nearest to the first signal layer is different from a second layer that is nearest to the second signal layer, based on combinations of layer identifiers and layer types stored in the layer type storing unit in the predetermined order; and a capacitor placement judging unit for searching, when the nearest plane judging unit judges that the first layer and the second layer are different, the capacitor element storing unit for a capacitor element that is connected to the first layer and the second layer and that is placed within a predetermined distance from the via placement position of the via found by the via judging unit.

Here, the via judging unit may include: a grouping unit for grouping signal layers to which a same layer, among the power layers and the ground layers included in the multilayer circuit board, is nearest, based on the combinations of the layer identifiers and the layer types stored in the layer type storing unit in the predetermined order; and a sub via judging unit for reading a via placement position of each via that connects two signal layers belonging to different groups, and judging whether the read via placement position is within any of the detected conductor placement areas.

Here, the design aiding apparatus may further include: a rectangle area generating unit for generating a rectangle area on the first signal layer when no capacitor element is found by the capacitor placement judging unit, wherein diagonal vertices of the rectangle area correspond to a placement position of the terminal of the first component and a point formed by projecting a placement position of the terminal of the second component onto the first signal layer; and a rectangle area capacitor placement judging unit for searching the capacitor element storing unit for a capacitor element that is connected to the first layer and the second layer and that is placed within the generated rectangle area.

With this construction, when a via that connects two conductors placed for a detected net passes through power and ground planes, it is checked whether a capacitor element that can be a part of a feedback path of a current flowing over the detected net exists in a rectangle area whose diagonal vertices correspond to a position of a component terminal at one end of the net and a point formed by projecting a position of a component terminal at the other end of the net onto a signal layer. By doing so, a circuit board with a low noise level can be designed with efficiency.

The above object can also be fulfilled by a design aiding apparatus for aiding placement of conductors in a multilayer circuit board which includes at least one signal layer, at least one power layer and at least one ground layer, the design aiding apparatus including: a component detecting unit for detecting components which are to be interconnected by a predetermined signal line on a signal layer; a plane detecting unit for detecting a position of each layer, among the power layers and the ground layers, to which the components are connected and detecting a shape of a conductor area of each layer to which the components are connected; a routing area setting unit for setting an area formed by projecting an area defined by the detected position and the detected shape onto the signal layer, as a routing area for the predetermined signal line; and a routing unit for calculating a conductor placement area within the routing area to place each conductor to interconnect the components.

With this construction, a feedback path of a high frequency signal that flows over a predetermined signal line is secured on a power/ground plane, so that a circuit board with a low noise level can be efficiently designed.

The above object can also be fulfilled by a design aiding apparatus for aiding division of each plane into subplanes in a multilayer circuit board which includes at least one plane that is one of a power plane and a ground plane and at least one signal layer on which a plurality of circuit blocks are placed, the design aiding apparatus including: a circuit block judging unit for classifying each of the plurality of circuit blocks under a first type of a circuit block that contains a predetermined signal line over which a specific signal flows and a second type of a circuit block aside from the first type, the specific signal being a signal whose amount of change in a fixed period of time is no less than a predetermined value; and a slit forming unit for dividing each plane into at least two subplanes and calculating coordinates of a slit that is a non-conductor area present between each adjacent two of the subplanes, wherein each of the subplanes corresponds to one of an integrated placement area of circuit blocks of the first type and an integrated placement area of circuit blocks of the second type.

With this construction, slits which correspond to boundary lines between high-speed circuit blocks and other circuit blocks on a signal layer are formed on each plane, so that leakage of common-mode currents from the high-speed circuit blocks to the other circuit blocks will be prevented. Accordingly, a circuit board of a low noise level can efficiently be designed.

The above object can also be fulfilled by a design aiding apparatus for aiding division of each plane into subplanes in a multilayer circuit board which includes at least one plane that is one of a power plane and a ground plane and at least one signal layer on which a plurality of circuit blocks are placed, the design aiding apparatus including: a circuit block judging unit for classifying each of the plurality of circuit blocks under a first type of a circuit block that contains a predetermined signal line over which a specific signal flows and a second type of a circuit block aside from the first type, the specific signal being a signal whose amount of change in a fixed period of time is no less than a predetermined value; a circuit block combining unit for combining placement areas of circuit blocks of a same type into one integrated placement area and as a result generating at least one integrated placement area on the signal layer; and a subplane generating unit for dividing each plane into at least two subplanes and calculating coordinates of a slit that is a non-conductor area present between each adjacent two of the subplanes, wherein each of the subplanes corresponds to one of the integrated placement areas generated by the circuit block combining unit.

With this construction, each plane is divided into subplanes which correspond to an integrated placement area of the high-speed circuit blocks and an integrated placement area of the other circuit blocks after components of each circuit block is placed on a signal layer, so that leakage of common-mode currents from the high-speed circuit blocks to the other circuit blocks will be prevented. Accordingly, a circuit board with a low noise level can efficiently be designed.

The above object can also be fulfilled by a design aiding apparatus for aiding division of each plane into subplanes in a multilayer circuit board which includes at least one plane that is one of a power plane and a ground plane and at least one signal layer on which a plurality of circuit blocks are placed, wherein at least one conductor is placed as a signal line in each of the plurality of circuit blocks, the design aiding apparatus including: a storing unit for storing, for each signal line, at least one of a frequency and a transition time of a signal that flows over the signal line; a circuit block judging unit for reading, for each of the plurality of circuit blocks, at least one of a frequency and a transition time of a signal that flows over a signal line contained in the circuit block from the storing unit, and judging whether the circuit block is a circuit block of a first type which contains a predetermined signal line over which a specific signal flows or a circuit block of a second type aside from the first type, the specific signal being a signal that has any of a frequency no less than a predetermined frequency and a transition time no more than a predetermined transition time; a circuit block combining unit for combining placement areas of circuit blocks of a same type into one integrated placement area and as a result generating at least one integrated placement area on the signal layer; a subplane generating unit for dividing each plane into at least two subplanes that correspond to the integrated placement areas generated by the circuit block combining unit, and calculating coordinates of a slit that is a non-conductor area present between each adjacent two of the subplanes; an intersection judging unit for judging whether an area, formed by projecting a conductor placement area of a conductor of each predetermined signal line onto each plane, intersects a slit present on each plane; a plane judging unit for judging, when the intersection judging unit judges that the area intersects the slit, whether two subplanes which sandwich the slit have been generated from a same plane; and a conductor adding unit for calculating a conductor placement area in the area to place a conductor which connects the two subplanes when the plane judging unit judges that the two subplanes have been generated from the same plane.

With this construction, a feedback path of a current that flows over a predetermined signal line such as a high-speed signal line is secured in a slit between two subplanes generated from the same plane, so that a circuit board with a low noise level can be designed. Also, since a conductor is used to connect the two subplanes, the two subplanes can be treated as a single net.

The above object can also be fulfilled by a design aiding apparatus for aiding division of each plane into subplanes in a multilayer circuit board which includes at least one plane that is one of a power plane and a ground plane and at least one signal layer on which a plurality of circuit blocks are placed, wherein at least one conductor is placed as a signal line in each of the plurality of circuit blocks, the design aiding apparatus including: a storing unit for storing, for each signal line, at least one of a frequency and a transition time of a signal that flows over the signal line; a circuit block judging unit for reading, for each of the plurality of circuit blocks, at least one of a frequency and a transition time of a signal that flows over a signal line contained in the circuit block from the storing unit, and judging whether the circuit block is a circuit block of a first type which contains a predetermined signal line over which a specific signal flows or a circuit block of a second type aside from the first type, the specific signal being a signal that has any of a frequency no less than a predetermined frequency and a transition time no more than a predetermined transition time; a circuit block combining unit for combining placement areas of circuit blocks of a same type into one integrated placement area and as a result generating at least one integrated placement area on the signal layer; a subplane generating unit for dividing each plane into at least two subplanes that correspond to the integrated placement areas generated by the circuit block combining unit, and calculating coordinates of a slit that is a non-conductor area present between each adjacent two of the subplanes; an intersection judging unit for judging whether an area, formed by projecting a conductor placement area of a conductor of each predetermined signal line onto each plane, intersects a slit present on each plane; a plane judging unit for judging, when the intersection judging unit judges that the area intersects the slit, whether two subplanes which sandwich the slit have been generated from a same plane; a potential judging unit for judging, when the plane judging unit judges that the two subplanes have been generated from different planes, whether the two subplanes have a same potential; and a jumper adding unit for calculating a placement position in the area for a jumper which connects the two subplanes, when the potential judging unit judges that the two subplanes have the same potential.

With this construction, a feedback path of a current that flows over a predetermined signal line such as a high-speed signal line is secured in a slit between two subplanes which have been generated from different planes but which have the same potential. Accordingly, a circuit board with a low noise level can be designed with efficiency. Also, since a jumper is used to connect the two subplanes that belong to different nets, it is possible to prevent shorts in the nets.

The above object can also be fulfilled by a design aiding apparatus for aiding division of each plane into subplanes in a multilayer circuit board which includes at least one plane that is one of a power plane and a ground plane and at least one signal layer on which a plurality of circuit blocks are placed, wherein at least one conductor is placed as a signal line in each of the plurality of circuit blocks, the design aiding apparatus including: a storing unit for storing, for each signal line, at least one of a frequency and a transition time of a signal that flows over the signal line; a circuit block judging unit for reading, for each of the plurality of circuit blocks, at least one of a frequency and a transition time of a signal that flows over a signal line contained in the circuit block from the storing unit, and judging whether the circuit block is a circuit block of a first type that contains a predetermined signal line over which a specific signal flows or a circuit block of a second type aside from the first type, the specific signal being a signal that has any of a frequency no less than a predetermined frequency and a transition time no more than a predetermined transition time; a circuit block combining unit for combining placement areas of circuit blocks of a same type into one integrated placement area and as a result generating at least one integrated placement area on the signal layer; a subplane generating unit for dividing each plane into at least two subplanes that correspond to the integrated placement areas generated by the circuit block combining unit, and calculating coordinates of a slit that is a non-conductor area present between each adjacent two of the subplanes; an intersection judging unit for judging whether an area, formed by projecting a conductor placement area of a conductor of each predetermined signal line onto each plane, intersects a slit present on each plane; a plane judging unit for judging, when the intersection judging unit judges that the area intersects the slit, whether two subplanes which sandwich the slit have been generated from a same plane; a potential judging unit for judging, when the plane judging unit judges that the two subplanes have been generated from different planes, whether the two subplanes have a same potential; and a capacitor element adding unit for calculating a placement position in the area for a capacitor element which connects the two subplanes, when the potential judging unit judges that the two subplanes have different potentials.

With this construction, only by adding a capacitor element in a slit between two subplanes of different potentials, a feedback path of a current that flows over a predetermined signal line can be secured, with it being possible to reduce noise in designing a circuit board.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3 shows an example of a component terminal interconnection information list 1201 stored in a design information storing unit 1111 of the CAD apparatus 1000;

FIG. 5 shows another example of the component terminal interconnection information list 1201;

FIG. 6 shows a terminal list 1401 stored in the design information storing unit 1111;

FIG. 7 shows a conductor information list 1601 stored in the design information storing unit 1111;

FIG. 8 shows a board constituent list 1701 stored in the design information storing unit 1111;

FIG. 9 shows a via prohibition area information list 1802 stored in the design information storing unit 1111;

FIG. 21 shows a placement information list 2201 stored in a design information storing unit 2111 of the CAD apparatus 2000;

FIG. 23 shows a via information list 2401 stored in the design information storing unit 2111;

FIG. 26 shows a component name list 2501 stored in the design information storing unit 2111;

FIG. 27 shows a component number list 2601 stored in the design information storing unit 2111;

FIG. 35 shows a board constituent list 3201 stored in a design information storing unit 3111 of the CAD apparatus 3000;

FIG. 36 shows an inter-layer information list 3301 stored in the design information storing unit 3111;

FIG. 37 shows a routing path information list 3401 stored in the design information storing unit 3111;

FIG. 45 shows a conductor information list 1601 stored in a design information storing unit 4111 of the CAD apparatus 4000;

FIG. 54 shows a via coordinate list 5201 stored in a design information storing unit 5111 of the CAD apparatus 5000;

FIG. 72 shows a nearest plane information list 6201 stored in a design information storing unit 6111 of the CAD apparatus 6000;

FIG. 73 shows a group information list 6301 stored in the design information storing unit 6111;

FIG. 92 shows a board constituent table 510 stored in a design information storing unit 104 of the CAD apparatus 100;

FIG. 93 shows a component list 520 stored in the design information storing unit 104;

FIG. 94 shows a terminal list 530 stored in the design information storing unit 104;

FIG. 95 shows a net list 540 stored in the design information storing unit 104;

FIG. 96 shows a block information table 550 stored in the design information storing unit 104;

FIG. 97 shows a placement position table 560 stored in the design information storing unit 104;

FIG. 98 shows a routing path table 570 stored in the design information storing unit 104;

FIG. 117 is a block diagram showing the construction of a CAD apparatus 300 of the ninth embodiment;

Figure 118:
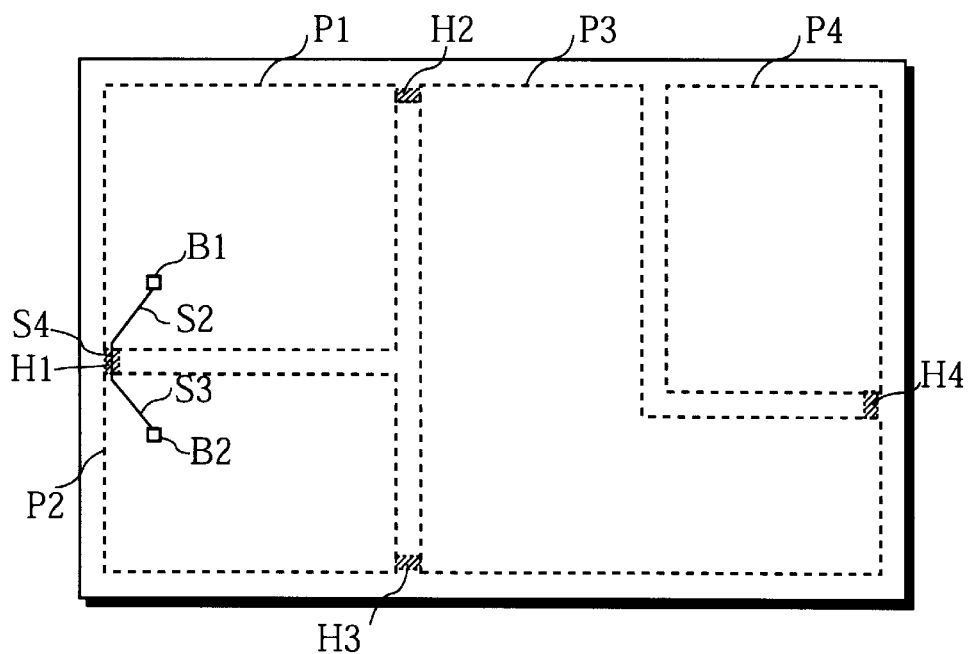
Figure 119:
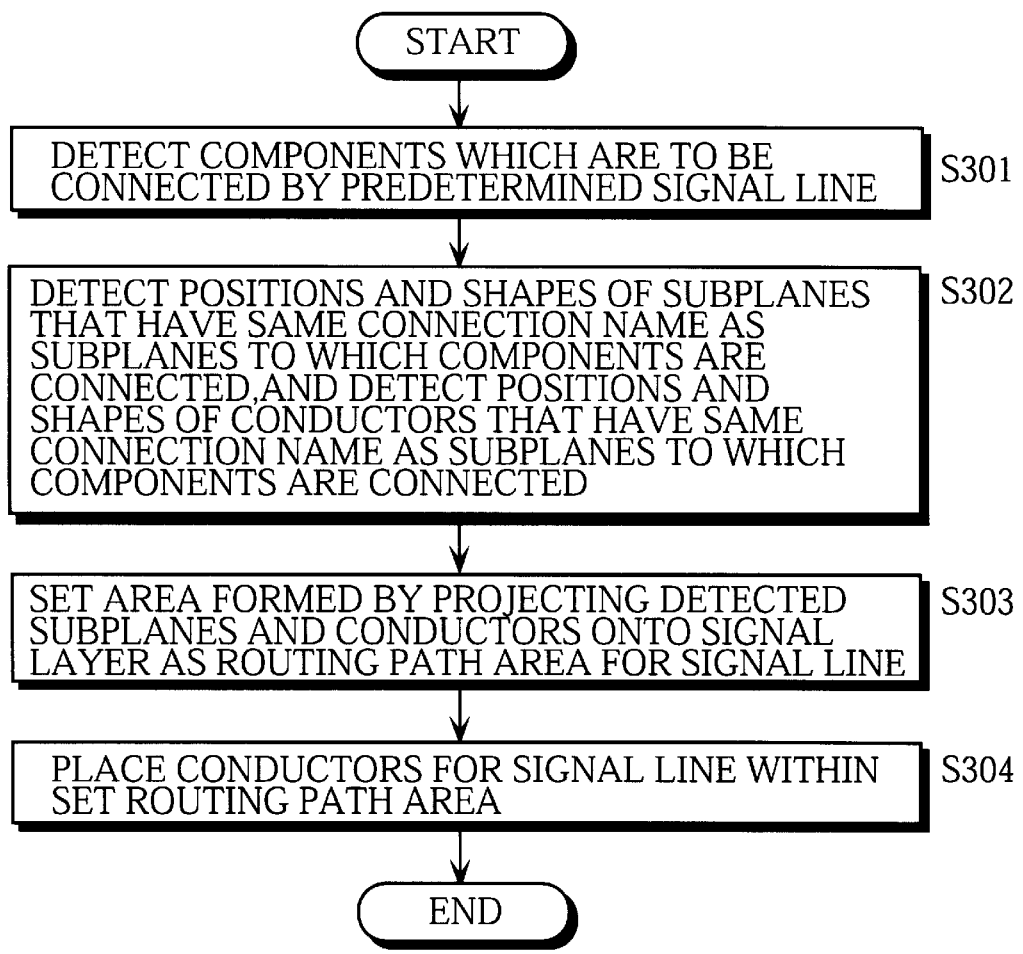

FIG. 118 shows signal line conductors placed within a routing path area set by a routing path area setting unit 310; and FIG. 119 is a flowchart showing the operation of the routing path area setting unit 310 and the routing unit 311 for each predetermined signal line.

DESCRIPTION OF THE PREFERRED EMBODIMENTS

1. First Embodiment

The following is a description of a CAD apparatus 1000 for aiding circuit board design as the first embodiment of the present invention with reference to figures.

(1.1) Construction of CAD Apparatus 1000

Figure 1:
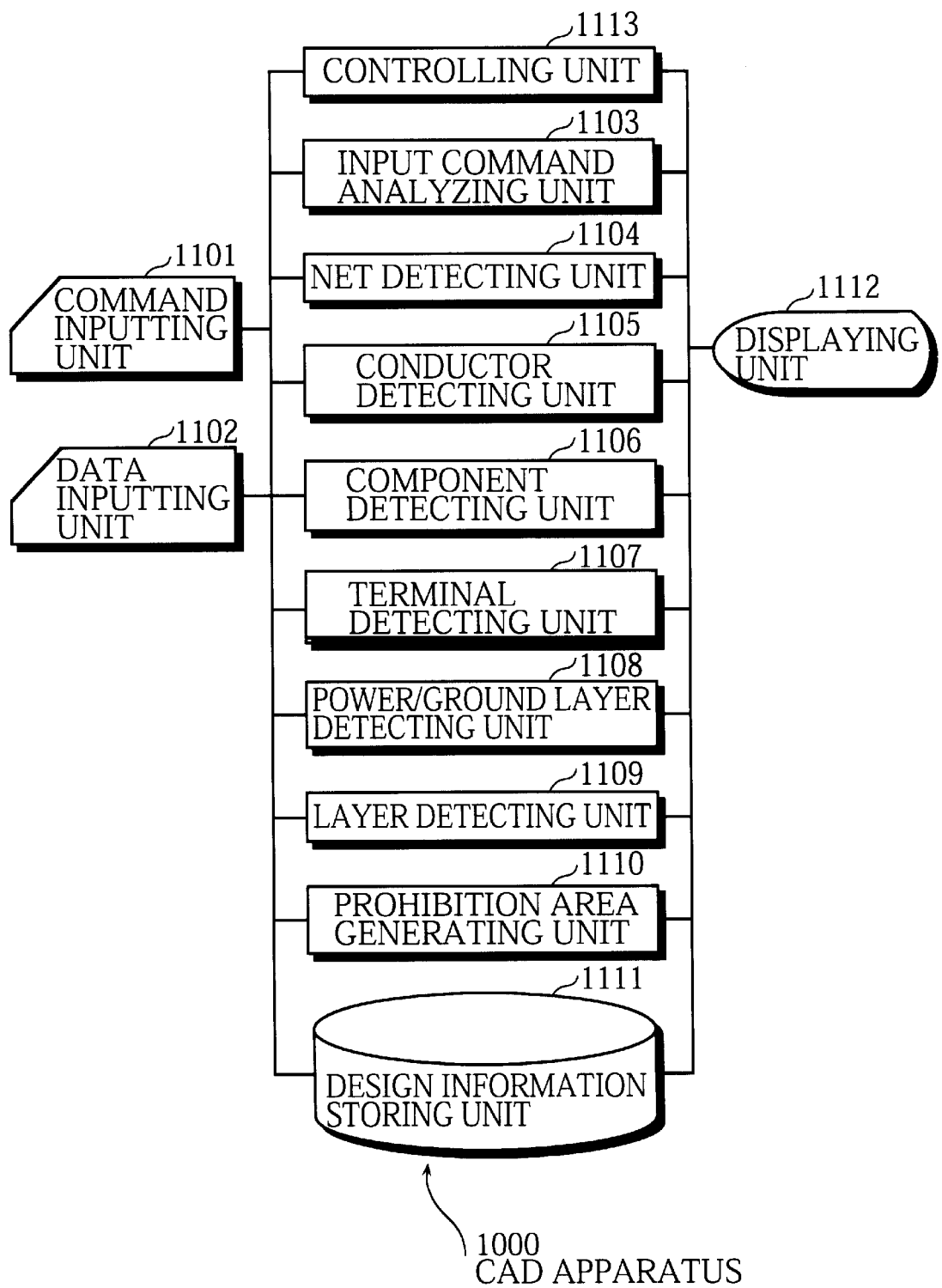
FIG. 1 is a block diagram showing the construction of a CAD apparatus 1000 of the first embodiment of the present invention.

FIG. 1 is a block diagram showing the construction of the CAD apparatus 1000. As shown in the figure, the CAD apparatus 1000 includes a command inputting unit 1101, a data inputting unit 1102, an input command analyzing unit 1103, a net detecting unit 1104, a conductor detecting unit 1105, a component detecting unit 1106, a terminal detecting unit 1107, a power/ground layer detecting unit 1108, a layer detecting unit 1109, a prohibition area generating unit 1110, a design information storing unit 1111, a displaying unit 1112 and a controlling unit 1113.

Figure 2:
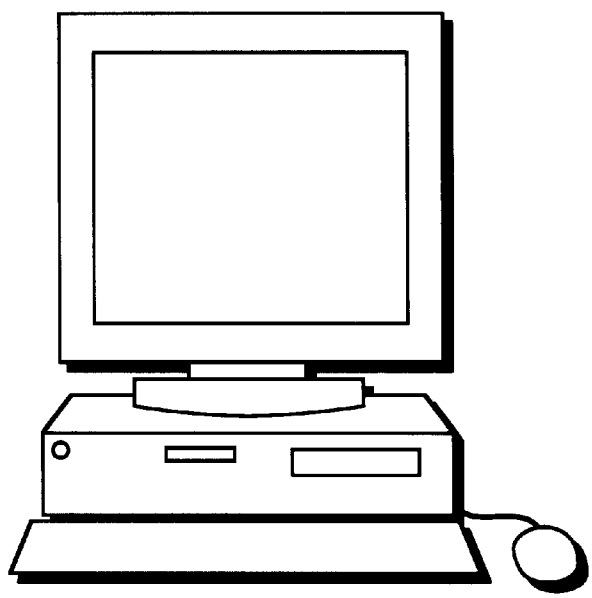
FIG. 2 shows the appearance of the CAD apparatus 1000.

The CAD apparatus 1000 can be realized by executing software that implements the features shown in FIG. 1 on hardware of a computer, such as a workstation shown in FIG. 2. This computer hardware includes a microprocessor, a RAM, a ROM, a hard disk device, a displaying device, a keyboard and a mouse.

(1.1.1) Command Inputting Unit 1101

The command inputting unit 1101 is mainly composed of the keyboard and the mouse and receives input of various design commands from the user.

(1.1.2) Data Inputting Unit 1102

The data inputting unit 1102 receives input of information such as circuit diagram information generated by a circuit diagram generating CAD apparatus.

(1.1.3) Displaying Unit 1112

The displaying unit 1112 displays a circuit board during design processes.

(1.1.4) Input Command Analyzing Unit 1103

A via prohibition area setting command is included in design commands.

The input command analyzing unit 1103 analyzes a design command received by the command inputting unit 1101 to judge the type of the command. The input command analyzing unit 1103 then issues instructions to the construction elements of the CAD apparatus 1000 according to the type of the command.

When the input design command is a via prohibition area setting command, the input command analyzing unit 1103 outputs the command to the controlling unit 1113.

(1.1.5) Design Information Storing Unit 1111

The design information storing unit 1111 stores a component terminal interconnection information list 1201, a terminal list 1401, a conductor information list 1601 and a board constituent list 1701 in advance.

The design information storing unit 1111 also stores a via prohibition area information list 1802 generated during design processes.

<Component Terminal Interconnection Information List 1201>

Figure 4:
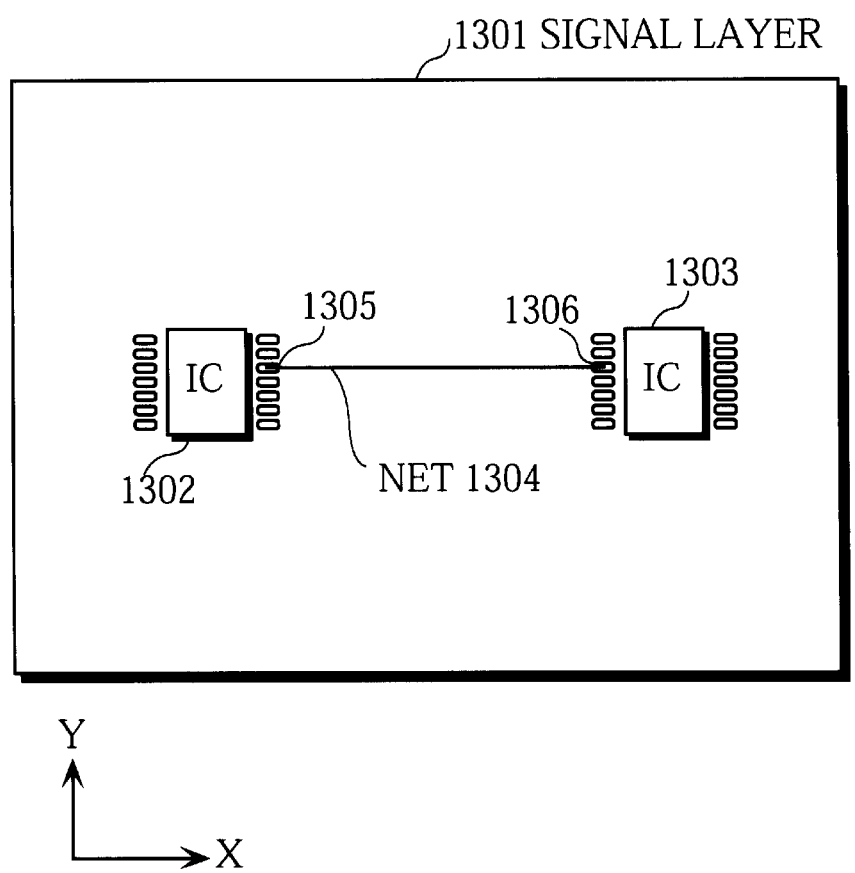
FIG. 4 is a conceptual diagram showing signal layer 1301 on which components 1302 and 1303 are placed.

As shown in FIG. 3, the component terminal interconnection information list 1201 includes sets of component terminal interconnection information 1211. Some sets of component terminal interconnection information 1211 each show a connection between a terminal of a component and another terminal of the component or a terminal of another component. This connection between component terminals is referred to as "net". For instance, terminal 1305 of component 1302 and terminal 1306 of component 1303 are connected by net 1304 on signal layer 1301 in FIG. 4. The other sets of component terminal interconnection information 1211 each show a connection between a power/ground layer and component terminals.

Each set of component terminal interconnection information 1211 includes a connection name 1212, connection information 1213, a frequency 1214, PWR/GND 1218, an electric potential 1219 and a critical net 1220.

The connection name 1212 identifies a connection.

The connection information 1213 shows component terminals connected by the connection identified by the connection name 1212. Here, each component terminal is expressed as "(component number identifying a component)-(terminal name identifying a terminal of the component)", while the legend "," is inserted between two connected component terminals. When two component terminals are connected by a net, the connection information 1213 is written as "(first component number identifying first component)-(first terminal name identifying first terminal of first component), (second component number identifying second component)-(second terminal name identifying second terminal of second component)". For example, connection information 1215 in FIG. 3 shows that terminal P1 of component IC1 is connected with terminal P5 of component IC4. Note here that "terminal name" is used to identify one of terminals included in a component, while "terminal number" is used to identify one of component terminals and expressed as "(component number)-(terminal name)".

The connection information 1213 also shows one or more component terminals which are connected to a power or ground layer. For example, connection information 1222 in FIG. 3 shows that terminal P3 of component IC1, terminal P4 of component IC2, terminal P2 of component IC3, terminal P4 of component IC4, and terminal P1 of component BC1 are connected to a ground layer.

The frequency 1214 shows a frequency, expressed in MHZ, of a signal that runs between component terminals shown in the connection information 1213. Note here that a signal frequency is not necessarily written for every connection. In FIG. 3, a frequency 1216 does not show a frequency, while a frequency 1217 shows that a frequency of a signal that runs through net2 is 33 (MHZ).

The PWR/GND 1218 shows a layer (power or ground layer) to which one or more component terminals shown in the connection information 1213 are connected. Here, "PWR" represents a power layer, while "GND" represents a ground layer. When the PWR/GND 1218 shows the legend "-", it is indicated that the connection information 1213 relates to a net between component terminals and not to a connection between component terminals and power/ground layer.

The electric potential 1219 shows an electric potential of the power or ground layer.

The critical net 1220 relates to a net whose signal has a high frequency, a short rise time, or a short fall time. If any of the above conditions is met, the critical net 1220 shows the legend "○" as shown in FIG. 5.

<Terminal List 1401>

The terminal list 1401 is made up of sets of terminal information 1411 as shown in FIG. 6. Each set of terminal information 1411 relates to a component terminal.

Each set of terminal information 1411 includes a terminal number 1412, an attribute 1413, a rise time 1414, a fall time 1415 and a critical terminal 1416.

The terminal number 1412 identifies a component terminal and is expressed as "(component number identifying a component)-(terminal name identifying a terminal of the component)".

The attribute 1413 shows an attribute of the component terminal. Attributes used in FIG. 6 are "IN" showing that a signal is inputted in the component terminal, "OUT" showing that a signal is outputted from the component terminal, "Vcc" showing that the component terminal is connected to a power layer, and "GND" showing that the component terminal is connected to a ground layer.

The rise time 1414 shows a rise time, measured in nanoseconds (ns), of a signal which is outputted from a component terminal whose attribute 1413 is "OUT". Note that a rise time is not necessarily written in the rise time 1414. In FIG. 6, a rise time 1421 does not show a rise time, while a rise time 1422 shows that a rise time of a signal outputted from component terminal IC2-P2 is 2 (ns).

The fall time 1415 shows a fall time, measured in ns, of a signal which is outputted from a component terminal whose attribute 1413 is "OUT". Note that a fall time is not necessarily written in the fall time 1415. In FIG. 6, a fall time 1431 does not show a fall time, while a fall time 1432 shows that a fall time of the signal outputted from component terminal IC2-P2 is 2 (ns).

The critical terminal 1416 shows the legend "○" when a rise or fall time shown in the rise time 1414 or the fall time 1415 for a component terminal identified by the terminal number 1412 is equal to or less than a predetermined value.

<Conductor Information List 1601>

The conductor information list 1601 is made up of sets of conductor information 1621 as shown in FIG. 7.

The sets of conductor information 1621 correspond to component terminal interconnections shown in the component terminal interconnection information list 1201. One or more sets of conductor information 1621 correspond to a set of component terminal interconnection information 1211.

Each set of conductor information 1621 includes a connection name 1611, startpoint coordinates 1612, endpoint coordinates 1613, midpoint coordinates 1614, a conductor width 1615 and a layer number 1616.

The connection name 1611 identifies a net between component terminals and corresponds to a connection name 1212 shown in a set of component terminal interconnection information 1211.

The startpoint coordinates 1612 show XY coordinates of a startpoint of a conductor included in the net.

The endpoint coordinates 1613 show XY coordinates of an endpoint of the conductor. Here, one side of the circuit board is set as the X axis and an adjacent side of the circuit board is set as the Y axis in the XY coordinate system.

The midpoint coordinates 1614 show XY coordinates of a midpoint of the conductor when the conductor is routed from its startpoint to its endpoint by way of a midpoint, that is, when the conductor is formed by a combination of a plurality of line segments. When there is no midpoint in the conductor, the midpoint coordinates 1614 show the legend "-", while when there is one or more midpoints in the conductor, the midpoint coordinates 1614 show XY coordinates of each midpoint.

The conductor width 1615 shows a width of the conductor measured in mm.

The layer number 1616 shows a layer on which the conductor is placed.

<Board Constituent List 1701>

The board constituent list 1701 is made up of combinations of layer numbers 1711 and types 1712 for a plurality of layers that compose a board. The first to fourth layers shown in the figure compose the board from top to bottom in the listed order.

The layer number 1711 identifies a layer.

The type 1712 shows a type of the layer. Layer types used here are "Signal" indicating a layer on which signal lines are routed, "GND" indicating a ground layer, and "PWR" indicating a power layer.

While the board constituent list 1701 in FIG. 8 relates to a circuit board composed of 4 layers of a signal layer, a ground layer, a power layer and a signal layer arranged from top to bottom, the configuration of a circuit board described in this specification is not limited to such. For example, the circuit board may be composed of 6 layers or 10 layers.

Also, the number of signal layers, the number of ground layers, and the number of power layers can be arbitrarily set.

For example, a signal layer, a ground layer, a ground layer and a signal layer may be arranged from top to bottom in a 4-layer circuit board, with a power conductor being routed on each signal layer. Also, a signal layer, a signal layer, a ground layer, a power layer, a signal layer and a signal layer may be arranged from top to bottom in a 6-layer circuit board.

<Via Prohibition Area Information List 1802>

The via prohibition area information list 1802 includes sets of via prohibition area information 1811 as shown in FIG. 9.

Each set of via prohibition area information 1811 includes a via prohibition area name 1821, startpoint coordinates 1822, endpoint coordinates 1823, a type 1826 and a placement layer 1827.

The via prohibition area name 1821 identifies a via prohibition area.

The startpoint coordinates 1822 show XY coordinates of the lower left point of the via prohibition area.

The endpoint coordinates 1823 show XY coordinates of the upper right point of the via prohibition area.

The type 1826 shows a type of the via prohibition area. In FIG. 9, "via prohibition" is written as an example of such a type.

The placement layer 1827 shows a layer on which the via prohibition area is present.

While the above via prohibition area formed by the startpoint coordinates 1822 and the endpoint coordinates 1823 is a rectangle, a set of via prohibition area information 1811 may instead include a plurality of combinations of startpoint coordinates and endpoint coordinates. In such a case, a via prohibition made up of a plurality of rectangles can be established.

(1.1.6) Net Detecting Unit 1104

The net detecting unit 1104 reads all sets of component terminal interconnection information 1211 one at a time from the component terminal interconnection information list 1201 stored in the design information storing unit 1111.

The net detecting unit 1104 stores the value 10 (MHZ) as a frequency threshold value and the value 5 (ns) as a rise/fall time threshold value beforehand.

When a frequency 1214 in a read set of component terminal interconnection information 1211 shows a value equal to or larger than the frequency threshold value, the net detecting unit 1104 writes the legend "○" in a critical net 1220 in the read set of component terminal interconnection information 1211 and stores the renewed set of component terminal interconnection information 1211 in the component terminal interconnection information list 1201.

The net detecting unit 1104 also extracts, from the terminal list 1401, each set of terminal information 1411 whose terminal number 1412 corresponds to one of component terminals shown in the connection information 1213 of the read set of component terminal interconnection information 1211. When any of rise and fall times shown in a rise time 1414 and fall time 1415 of the extracted set of terminal information 1411 is equal to or smaller than the rise/fall time threshold value, the net detecting unit 1104 writes the legend "○" in the critical net 1220 of the read set of component terminal interconnection information 1211 and stores the renewed set of component terminal interconnection information 1211 in the component terminal interconnection information list 1201.

Here, if the frequency 1214 in the read set of component terminal interconnection information 1211 shows a value equal to or greater than 10 (MHZ) and the legend "○" has already been written in the critical net 1220, the net detecting unit 1104 does not write "○" again but just stores the set of component terminal interconnection information 1211 in the component terminal interconnection information list 1201.

Neither does the net detecting unit 1104 write the legend "○" in the critical net 1220 if the terminal list 1401 does not include a set of terminal information 1411 whose terminal number 1412 corresponds to any of the component terminals shown in the connection information 1213 of the read set of component terminal interconnection information 1211.

Thus, the net detecting unit 1104 detects a net in which the amount of change in signal level within a predetermined period of time is equal to or larger than a predetermined amount.

While the net detecting unit 1104 stores the value 10 (MHZ) in advance as a frequency threshold value, a frequency threshold value may instead be inputted in the data inputting unit 1102 by the designer and then outputted to and stored in the net detecting unit 1104.

Equally, while the net detecting unit 1104 stores the value 5 (ns) in advance as a rise/fall time threshold value, a rise/fall time threshold value may instead be inputted in the data inputting unit 1102 by the designer and then outputted to and stored in the net detecting unit 1104.

(1.1.7) Conductor Detecting Unit 1105

The conductor detecting unit 1105 reads, from the conductor information list 1601, at least one set of conductor information 1621 whose connection name 1611 is the same as a connection name 1212 of a set of component terminal interconnection information 1211 whose critical net 1220 shows "○", the set of component terminal interconnection information 1211 having been extracted by the controlling unit 1113.

For instance, in the component terminal interconnection information list 1201 in FIG. 5, a set of component terminal interconnection information 1211 whose critical net 1241 is "○" shows a connection name "net2", so that the conductor detecting unit 1105 extracts a set of conductor information 1621 whose connection name 1611 is "net2".

If the conductor information list 1601 does not include any corresponding sets of conductor information 1621, it means that information in either the component terminal interconnection information list 1201 or the conductor information list 1601 is erroneous. In such a case, the conductor detecting unit 1105 outputs an error message to the displaying unit 1112.

(1.1.8) Component Detecting Unit 1106

The component detecting unit 1106 reads the first and second component numbers from connection information 1213 of the set of component terminal interconnection information 1211 whose critical net 1220 shows "○" and which has been extracted by the controlling unit 1113.

For instance, in the component terminal interconnection information list 1201 in FIG. 5, connection information 1213 of the set of component terminal interconnection information 1211 whose critical net 1220 shows "○" is "IC1-P2, IC4-P10", so that the component detecting unit 1106 extracts the component numbers "IC1" and "IC4".

(1.1.9) Terminal Detecting Unit 1107

The terminal detecting unit 1107 extracts, from the terminal list 1401, a terminal number 1412 which includes the first component number detected by the component detecting unit 1106 and which corresponds to an attribute 1413 "Vcc", and designates the extracted terminal number 1412 as the first Vcc terminal.

The terminal detecting unit 1107 equally extracts, from the terminal list 1401, a terminal number 1412 which includes the first component number and which corresponds to an attribute 1413 "GND", and designates the extracted terminal number 1412 as the first GND terminal.

The terminal detecting unit 1107 also extracts, from the terminal list 1401, a terminal number 1412 which includes the second component number detected by the component detecting unit 1106 and which corresponds to an attribute 1413 "Vcc", and designates the extracted terminal number 1412 as the second Vcc terminal.

The terminal detecting unit 1107 equally extracts, from the terminal list 1401, a terminal number 1412 which includes the second component number and which corresponds to an attribute 1413 "GND", and designates the extracted terminal number 1412 as the second GND terminal.

In FIG. 6, for example, a terminal number "IC1-P4" which includes the first component number "IC1" and which corresponds to the attribute "Vcc" is detected as the first Vcc terminal, a terminal number "IC4-P3" which includes the second component number "IC4" and which corresponds to the attribute "GND" is detected as the second GND terminal, and a terminal number "IC4-P6" which includes the second component number "IC4" and which corresponds to the attribute "Vcc" is detected as the second Vcc terminal.

(1.1.10) Power/Ground Layer Detecting Unit 1108

The power/ground layer detecting unit 1108 extracts, from the component terminal interconnection information list 1201, every connection name 1212 of connection information 1213 that includes any of the terminal numbers detected by the terminal detecting unit 1107.

In FIG. 5, for instance, the power/ground layer detecting unit 1108 extracts a connection name "net4" of connection information 1213 that includes the first Vcc terminal "IC1-P4". The power/ground layer detecting unit 1108 also extracts a connection name "net4" of connection information 1213 that includes the second Vcc terminal "IC4-P6".

Next, the power/ground layer detecting unit 1108 judges whether all extracted connection names are the same. If so, the power/ground layer detecting unit 1108 extracts, from the conductor information list 1601, a layer number 1616 of a connection name 1611 which matches the connection name judged to be the same. If the extracted connection names are different, the power/ground layer detecting unit 1108 extracts both layer numbers 1616 (the power and ground layers). Alternatively, the power/ground layer detecting unit 1108 may not extract any layer numbers if the extracted connection names are different.

In the above example, the extracted connection names are both "net4", so that the power/ground layer detecting unit 1108 extracts a layer number 1632 "3" corresponding to a connection name 1631 "net4" from the conductor information list 1601.

The layer number(s) (power and/or ground layer) extracted as such shows layer(s) to which components connected by a critical net are connected.

(1.1.11) Layer Detecting Unit 1109

The layer detecting unit 1109 reads, from the conductor information list 1601, at least one set of conductor information 1621 whose connection name 1611 is the same as the connection name 1212 of the set of component terminal interconnection information 1211 extracted by the controlling unit 1113. The layer detecting unit 1109 then extracts, from the board constituent list 1701, a layer number 1711, among one or more layer numbers detected by the power/ground layer detecting unit 1108, which is nearest to a layer of a layer number 1616 shown in the read set of conductor information 1621.

(1.1.12) Prohibition Area Generating Unit 1110

The prohibition area generating unit 1110 defines a via prohibition area name 1821 for a set of via prohibition area information 1811.

The prohibition area generating unit 1110 then calculates startpoint coordinates 1822 and endpoint coordinates 1823 of a via prohibition area identified by the defined via prohibition area name 1821, using startpoint coordinates 1612, endpoint coordinates 1613, midpoint coordinates 1614 and conductor width 1615 of the set of conductor information 1621 read by the conductor detecting unit 1105.

This via prohibition area encloses a conductor placement area shown in the read set of conductor information 1621 by a predetermined gap. In the present embodiment, the via prohibition area is set to enclose the conductor placement area so that there is a gap equal to the conductor width between the perimeter of the conductor placement area and the perimeter of the via prohibition area.

Next, the prohibition area generating unit 1110 sets "via prohibition" as a type 1826, and sets the layer (power or ground layer) detected by the layer detecting unit 1109 as a placement layer 1827.

The prohibition area generating unit 1110 then writes the generated set of via prohibition area information 1811 in the via prohibition area information list 1802.

Note here that the via prohibition area generated as such is also referred to as "routing path area".

As a result of the above processing, vias are placed in an area other than the via prohibition area (routing path area).

Figure 10:
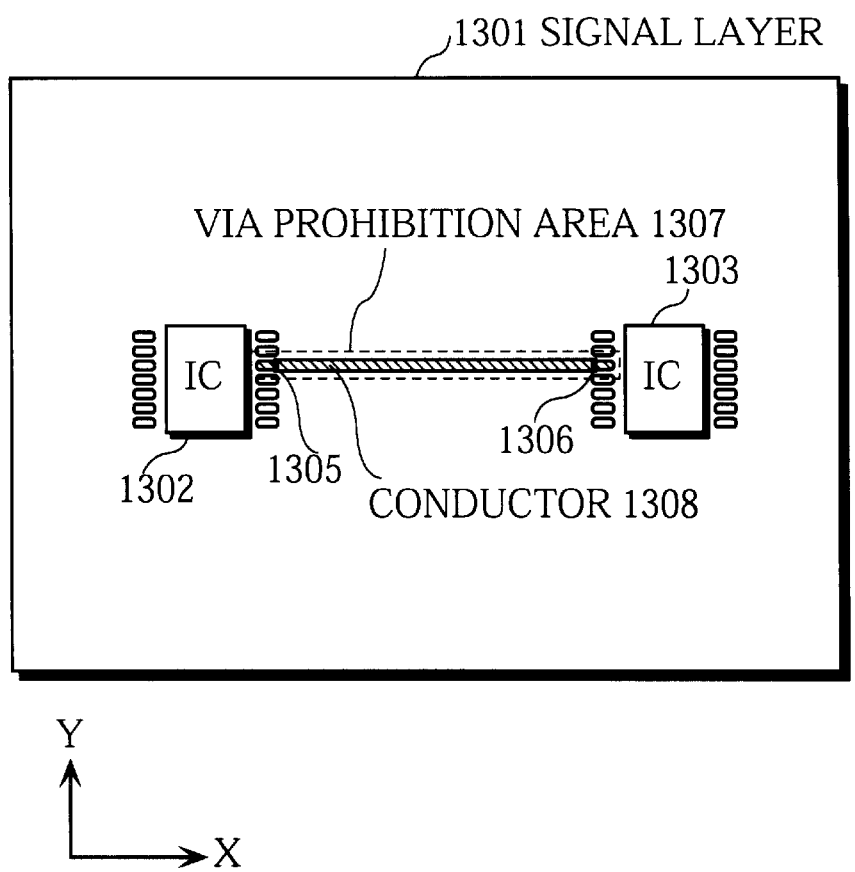
FIG. 10 is a conceptual diagram showing signal layer 1301 on which components 1302 and 1303 and conductor 1308 are placed.
Figure 11:
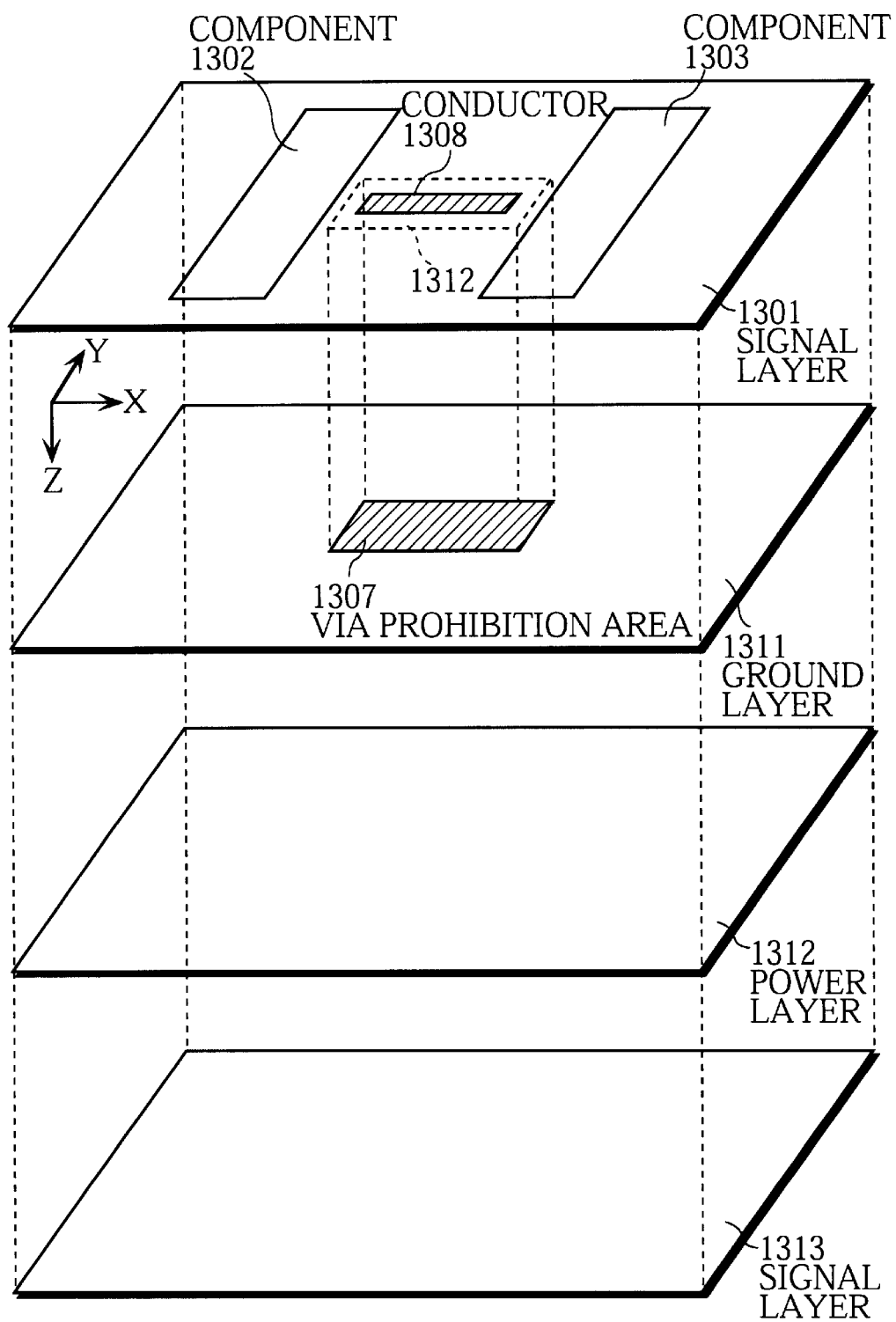
FIG. 11 is a conceptual diagram for a circuit board that is made up of: signal layer 1301 on which components 1302 and 1303 and conductor 1308 are placed; ground layer 1311 on which via prohibition area 1307 is placed; power layer 1312; and signal layer 1313.

FIGS. 10 and 11 show a circuit board in which terminal 1305 of component 1302 and terminal 1306 of component 1303 are connected by conductor 1308 on signal layer 1301 and via prohibition area 1307 is generated on ground layer 1311. As shown in these figures, via prohibition area 1307 on ground layer 1311 is formed by projecting area 1312 that encloses conductor 1308 by a fixed gap (a gap equal to the width of conductor 1308 in the present embodiment) onto ground layer 1311.

A current that flows through conductor 1308 will take a feedback path in via prohibition area 1307. If vias were placed in via prohibition area 1307, the current would take an alternative path to detour those placed vias and as a result an area enclosed by a current loop would become larger, causing electromagnetic noise. To avoid this, vias are placed in an area other than via prohibition area 1307, so that an area enclosed by the current loop can be reduced and electromagnetic noise can be suppressed.

(1.1.13) Controlling Unit 1113

The controlling unit 1113 receives a via prohibition area setting command from the input command analyzing unit 1103.

The controlling unit 1113 controls the command inputting unit 1101, the data inputting unit 1102, the input command analyzing unit 1103, the net detecting unit 1104, the conductor detecting unit 1105, the component detecting unit 1106, the terminal detecting unit 1107, the power/ground layer detecting unit 1108, the layer detecting unit 1109, the prohibition area generating unit 1110 and the displaying unit 1112 in the CAD apparatus 1000.

The controlling unit 1113 activates the net detecting unit 1104 on receiving a via prohibition area setting command.

The controlling unit 1113 also reads a set of component terminal interconnection information 1211 from the component terminal interconnection information list 1201 stored in the design information storing unit 1111. If a critical net 1220 of the read set of component terminal interconnection information 1211 shows "○", the controlling unit 1113 extracts the set of component terminal interconnection information 1211 and activates the conductor detecting unit 1105, the component detecting unit 1106, the terminal detecting unit 1107, the power/ground layer detecting unit 1108, the layer detecting unit 1109 and the prohibition area generating unit 1110 in succession. The controlling unit 1113 repeats reading of a set of component terminal interconnection information 1211, judgement of the status of a critical net 1220, and activation of the above units until every set of component terminal interconnection information 1211 is read from the component terminal interconnection information list 1201.

(1.2) Operation of CAD Apparatus 1000

The following is a description of the operation of the CAD apparatus 1000.

(1.2.1) Overall Operation of CAD Apparatus 1000

The overall operation of the CAD apparatus 1000 is explained below with reference to FIG. 12.

On receiving a via prohibition area setting command from the input command analyzing unit 1103, the controlling unit 1113 activates the net detecting unit 1104 (S1001). The controlling unit 1113 then reads a set of component terminal interconnection information 1211 from the component terminal interconnection information list 1201 (S1002). If every set of component terminal interconnection information 1211 has already been read (S1003), the operation is complete. The controlling unit 1113 judges whether a critical net 1220 in the read set of component terminal interconnection information 1211 shows "○" (S1010). If the critical net 1220 shows "○", the controlling unit 1113 extracts the set of component terminal interconnection information 1211 and activates the conductor detecting unit 1105, the component detecting unit 1106, the terminal detecting unit 1107, the power/ground layer detecting unit 1108, the layer detecting unit 1109 and the prohibition area generating unit 1110 in succession (S1004–S1009). The controlling unit 1113 repeats reading of a set of component terminal interconnection information 1211, judgement of the status of a critical net 1220, and activation of the above units until every set of component terminal interconnection information 1211 is read from the component terminal interconnection information list 1201.

(1.2.2) Operation of Net Detecting Unit 1104

Figure 13:
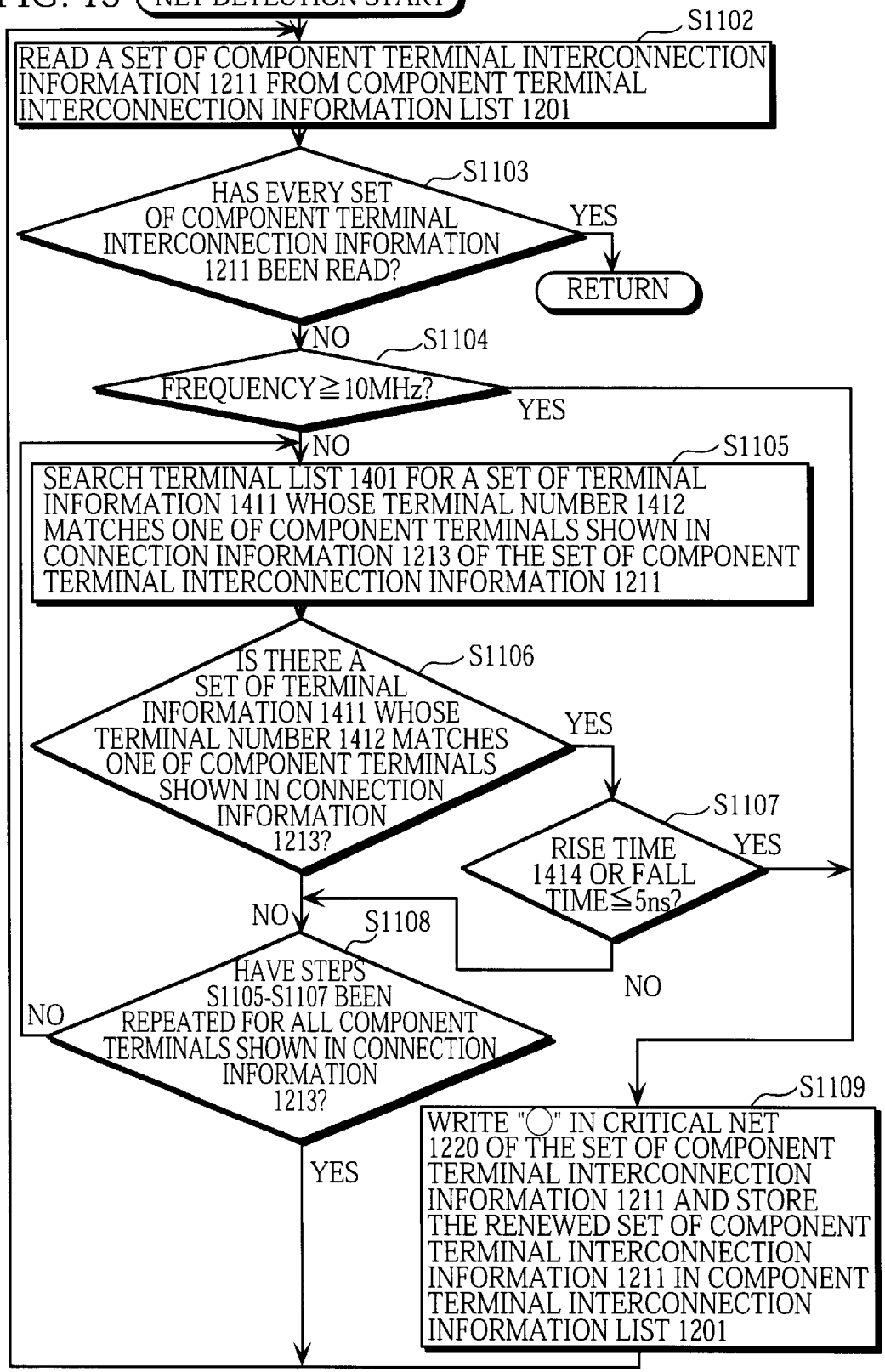
FIG. 13 is a flowchart showing the operation of a net detecting unit 1104 of the CAD apparatus 1000.

The operation of the net detecting unit 1104 is explained below with reference to FIG. 13.

The net detecting unit 1104 reads a set of component terminal interconnection information 1211 from the component terminal interconnection information list 1201 stored in the design information storing unit 1111 (S1102). If every set of component terminal interconnection information 1211 has already been read (S1103), the net detecting unit 1104 completes its operation.

The net detecting unit 1104 judges whether a frequency 1214 in the read set of component terminal interconnection information 1211 is equal to/greater than the frequency threshold value (S1104). If the frequency 1214 is equal to or greater than the frequency threshold value, the net detecting unit 1104 writes the legend "○" in a critical net 1220 of the set of component terminal interconnection information 1211 and stores the renewed set of component terminal interconnection information 1211 in the component terminal interconnection information list 1201 (S1109).

When the frequency 1214 is smaller than the frequency threshold value in step S1104, the net detecting unit 1104 searches the terminal list 1401 for a set of terminal information 1411 whose terminal number 1412 matches a component terminal shown by connection information 1213 of the read set of component terminal interconnection information 1211 (S1105). If there is such a set of terminal information 1411 in the terminal list 1401 (S1106), the net detecting unit 1104 judges whether any of a rise time 1414 and a fall time 1415 of the set of terminal information 1411 is equal to or less than the rise/fall time threshold value (S1107). If the condition is met, the operation proceeds to step S1109.

When there is no set of terminal information 1411 whose terminal number 1412 corresponds to one of component terminals shown in the set of component terminal interconnection information 1211 in step S1106, or when both of the rise time 1414 and the fall time 1415 are greater than the rise/fall time threshold value in step S1107, the net detecting unit 1104 does not write "○" in the critical net 1220 of the set of component terminal interconnection information 1211. The net detecting unit 1104 repeats steps S1105–S1107 for every component terminal shown by the connection information 1213 of the set of component terminal interconnection information 1211 (S1108), and returns to step S1102.

(1.2.3) Operation of Conductor Detecting Unit 1105

Figure 14:
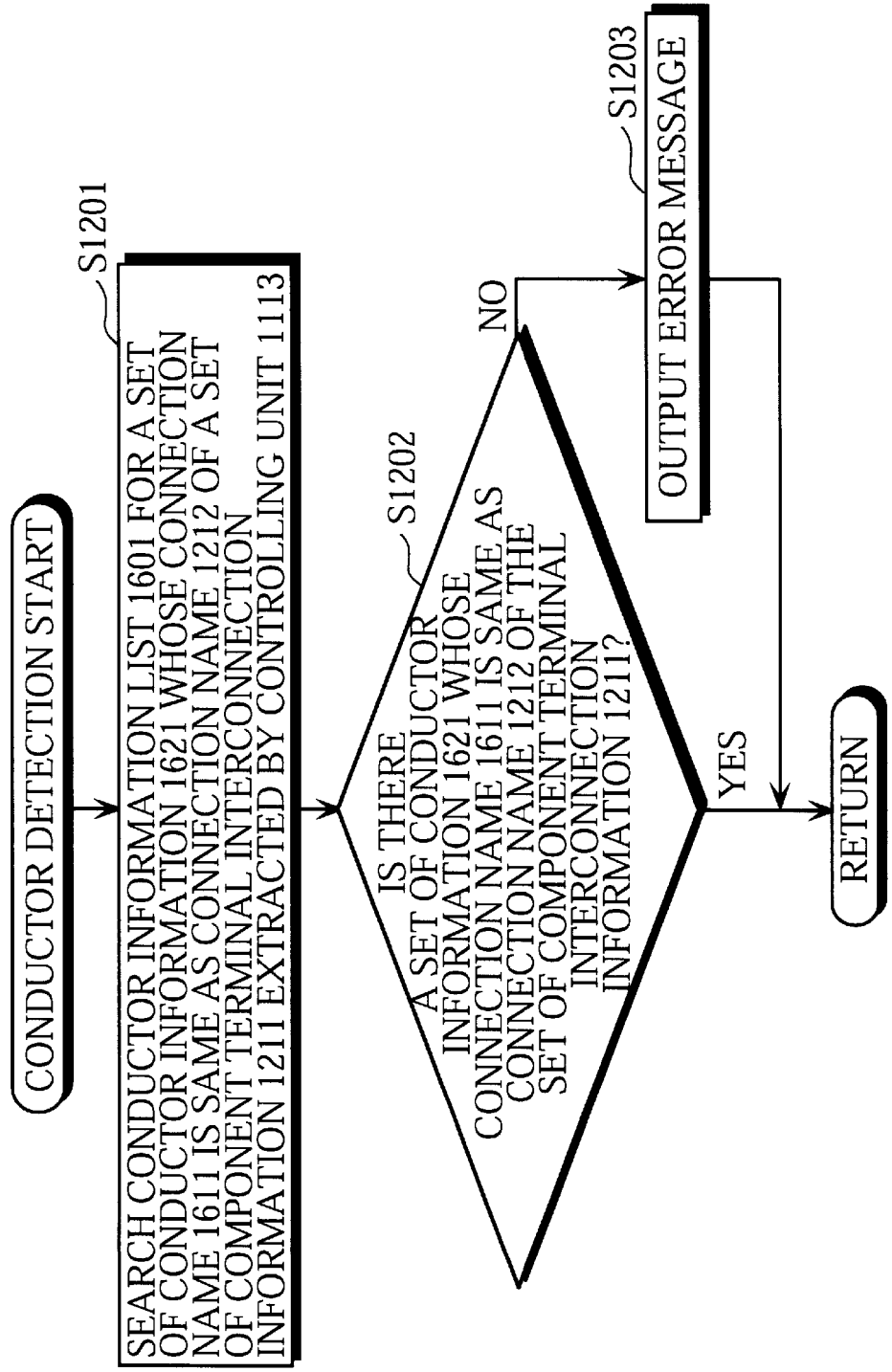
FIG. 14 is a flowchart showing the operation of a conductor detecting unit 1105 of the CAD apparatus 1000.

The operation of the conductor detecting unit 1105 is explained below with reference to FIG. 14.

The conductor detecting unit 1105 searches the conductor information list 1601 for a set of conductor information 1621 whose connection name 1611 is the same as a connection name 1212 of a set of component terminal interconnection information 1211, extracted by the controlling unit 1113, whose critical net 1220 shows "◯" (S1201)

When the conductor information list 1601 does not include such a set of conductor information 1621 (S1202), the conductor detecting unit 1105 outputs an error message to the displaying unit 1112, informing that information included in either the component terminal interconnection information list 1201 or the conductor information list 1601 is erroneous (S1203).

(1.2.4) Operation of Component Detecting Unit 1106

Figure 15:
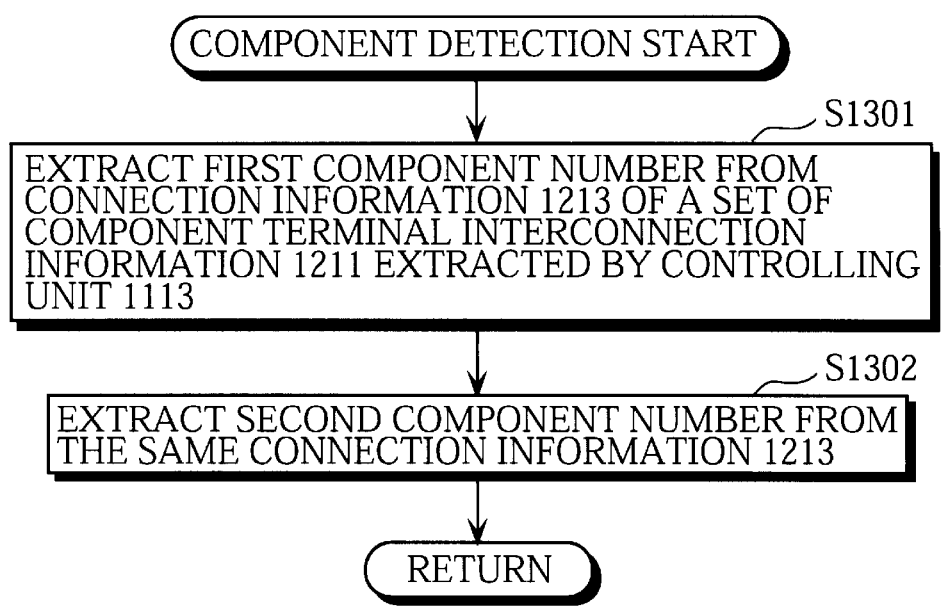
FIG. 15 is a flowchart showing the operation of a component detecting unit 1106 of the CAD apparatus 1000.

The operation of the component detecting unit 1106 is explained below with reference to FIG. 15.

The component detecting unit 1106 extracts the first component number from connection information 1213 of the set of component terminal interconnection information 1211 whose critical net 1220 shows "◯", the set of component terminal interconnection information 1211 having been extracted by the controlling unit 1113 (S1301). The component detecting unit 1106 similarly extracts the second component number from the connection information 1213 (S1302).

(1.2.5) Operation of Terminal Detecting Unit 1107

Figure 16:
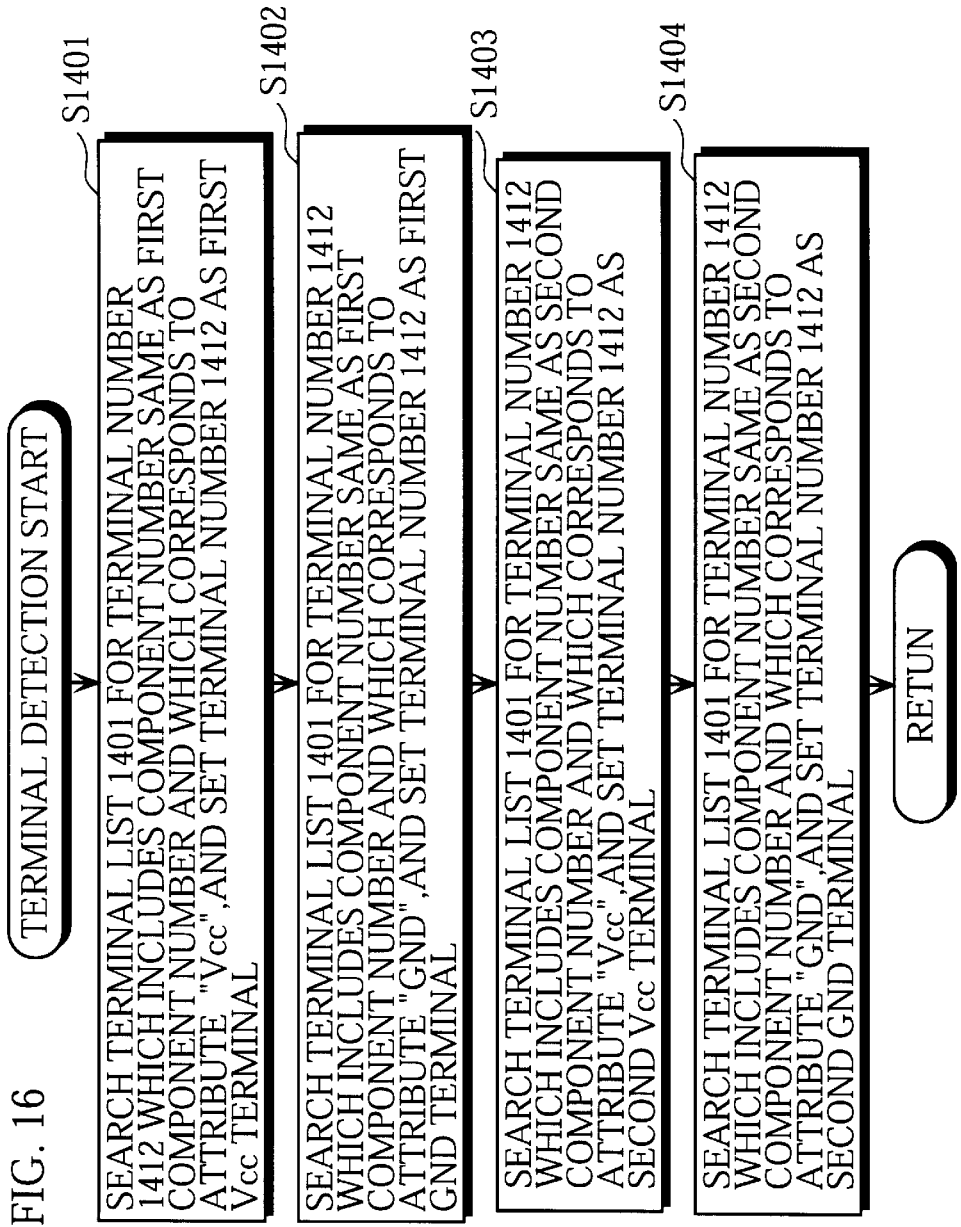
FIG. 16 is a flowchart showing the operation of a terminal detecting unit 1107 of the CAD apparatus 1000.

The operation of the terminal detecting unit 1107 is explained below with reference to FIG. 16.

The terminal detecting unit 1107 searches the terminal list 1401 for a terminal number 1412 which includes a component number same as the first component number detected by the component detecting unit 1106 and which corresponds to the attribute "Vcc", and designates such a terminal number 1412 as the first Vcc terminal (S1401). The terminal detecting unit 1107 equally searches the terminal list 1401 for a terminal number 1412 which includes a component number same as the first component number and which corresponds to the attribute "GND", and designates such a terminal number 1412 as the first GND terminal (S1402). The terminal detecting unit 1107 also searches the terminal list 1401 for a terminal number 1412 which includes a component number same as the second component number detected by the component detecting unit 1106 and which corresponds to the attribute "Vcc", and designates such a terminal number 1412 as the second Vcc terminal (S1403). The terminal detecting unit 1107 further searches the terminal list 1401 for a terminal number 1412 which includes a component number same as the second component number and which corresponds to the attribute "GND", and designates such a terminal number 1412 as the second GND terminal (S1404).

(1.2.6) Operation of Power/Ground Layer Detecting Unit 1108

Figure 17:
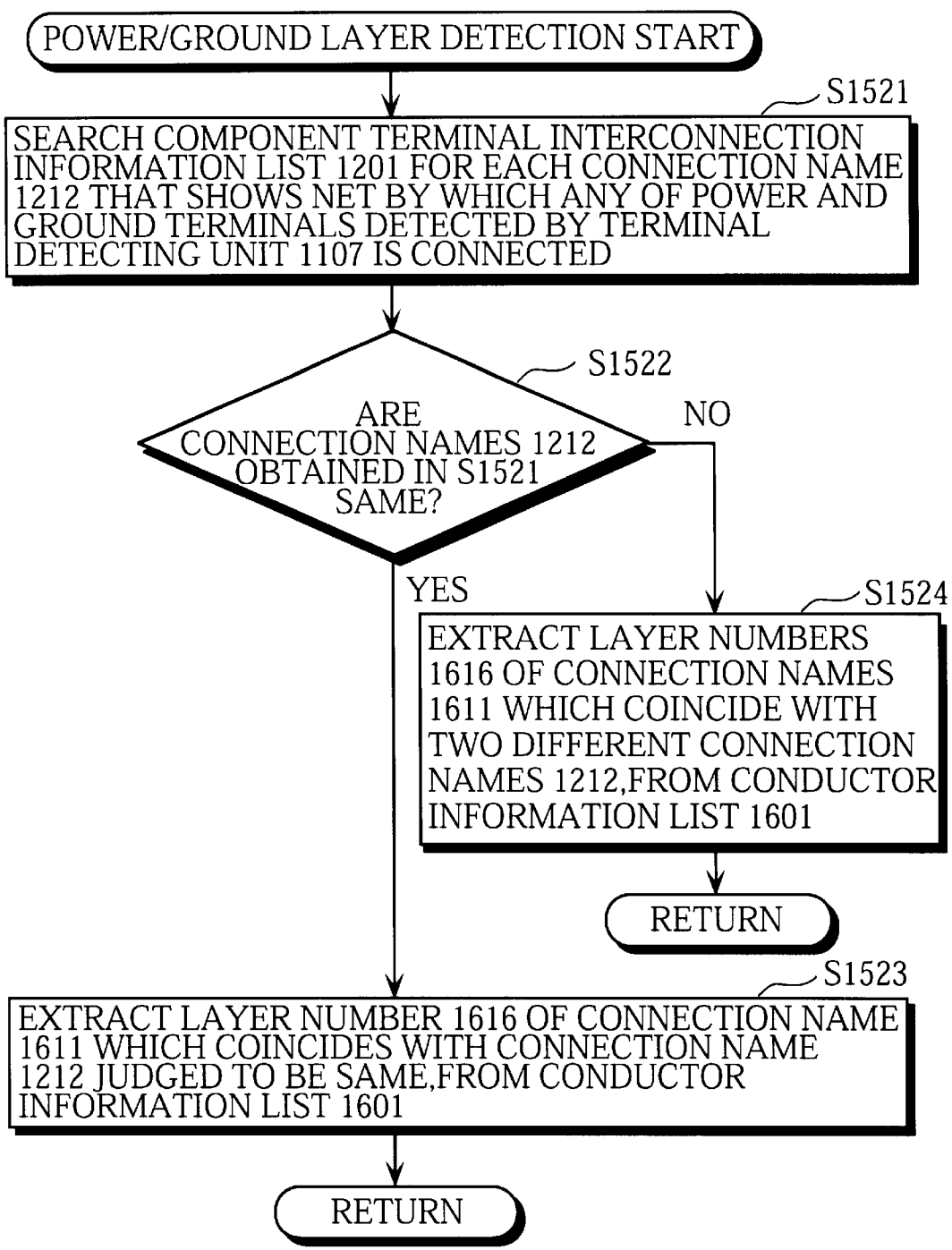
FIG. 17 is a flowchart showing the operation of a power/ground layer detecting unit 1108 of the CAD apparatus 1000.

The operation of the power/ground layer detecting unit 1108 is explained below with reference to FIG. 17.

The power/ground layer detecting unit 1108 searches the component terminal interconnection information list 1201 for every connection name 1212 that corresponds to connection information 1213 which includes any of the terminal numbers detected by the terminal detecting unit 1107 (S1521). The power/ground layer detecting unit 1108 then judges whether the detected connection names 1212 are the same (S1522). If they are the same, the power/ground layer detecting unit 1108 extracts, from the conductor information list 1601, a layer number 1616 corresponding to a connection name 1611 that matches the connection name judged to be the same (S1523). If the connection names are not the same, the power/ground layer detecting unit 1108 extracts, from the conductor information list 1601, layer numbers 1616 corresponding to connection names 1611 that match the two different connection names (S1524).

(1.2.7) Operation of Layer Detecting Unit 1109

Figure 18:
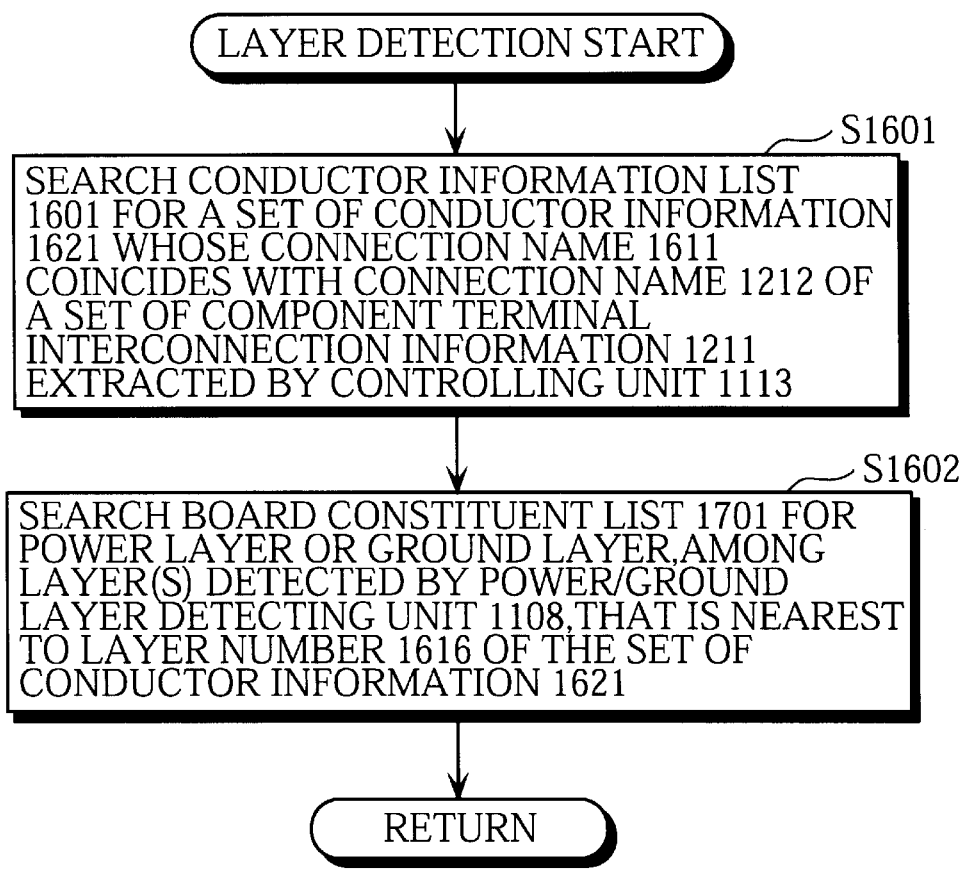
FIG. 18 is a flowchart showing the operation of a layer detecting unit 1109 of the CAD apparatus 1000.

The operation of the layer detecting unit 1109 is explained below with reference to FIG. 18.

The layer detecting unit 1109 extracts, from the conductor information list 1601, a set of conductor information 1621 whose connection name 1611 is the same as a connection name 1212 of the set of component terminal interconnection information 1211 extracted by the controlling unit 1113 (S1601). The layer detecting unit 1109 then extracts a layer, among layer number(s) (power/ground layer) detected by the power/ground layer detecting unit 1108, that is nearest to a layer shown by a layer number 1616 of the extracted set of conductor information 1621, from the board constituent list 1701 (S1602).

(1.2.8) Operation of Prohibition Area Generating Unit 1110

Figure 19:
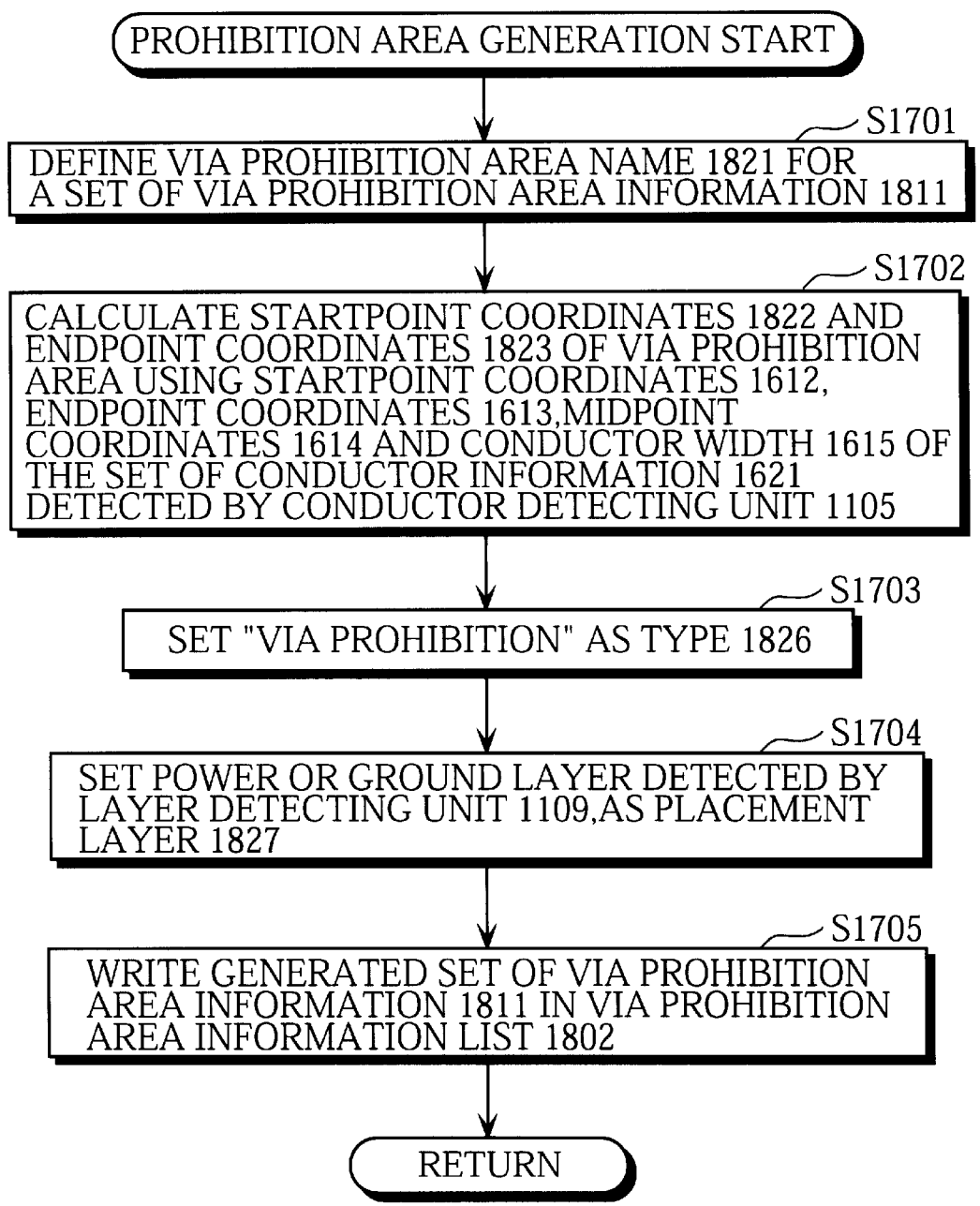
FIG. 19 is a flowchart showing the operation of a prohibition area generating unit 1110 of the CAD apparatus 1000.

The operation of the prohibition area generating unit 1110 is explained below with reference to FIG. 19.

The prohibition area generating unit 1110 defines a via prohibition area name 1821 for a set of via prohibition area information 1811 (S1701). The prohibition area generating unit 1110 then calculates startpoint coordinates 1822 and endpoint coordinates 1823 of a via prohibition area identified by the via prohibition area name 1821, using startpoint coordinates 1612, endpoint coordinates 1613, midpoint coordinates 1614 and conductor width 1615 of the set of conductor information 1621 detected by the conductor detecting unit 1105 (S1702). The prohibition area generating unit 1110 then sets "via prohibition" as a type 1826 of the set of via prohibition area information 1811 (S1703) and sets the layer (power or ground layer) detected by the layer detecting unit 1109 as a placement layer 1827 (S1704). The prohibition area generating unit 1110 writes the above generated set of via prohibition area information 1811 in the via prohibition area information list 1802 (S1705).

(1.3) Modifications

In the first embodiment, once a net that meets predetermined conditions has been selected, a conductor is placed and a via prohibition area is generated for the net. Alternatively, the designer may indicate a net for which a conductor and a via prohibition area is to be set.

2. Second Embodiment

The following is a description of a CAD apparatus 2000 for aiding circuit board design as the second embodiment of the present invention, with reference to figures. This description will focus on the differences with the CAD apparatus 1000 of the first embodiment.

(2.1) Construction of CAD Apparatus 2000

Figure 20:
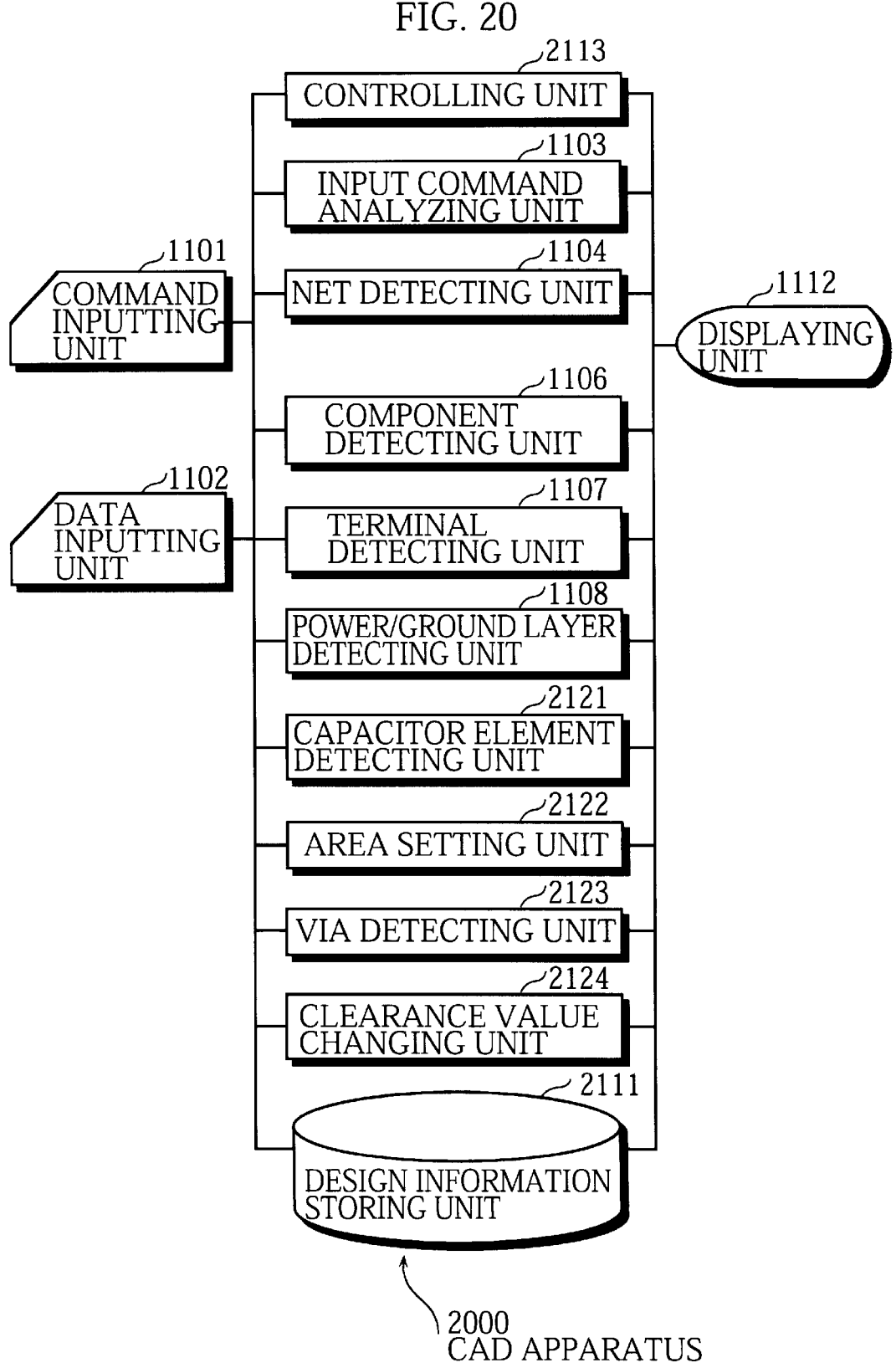
FIG. 20 is a block diagram showing the construction of a CAD apparatus 2000 of the second embodiment of the present invention.

As shown in FIG. 20, the CAD apparatus 2000 includes the command inputting unit 1101, the data inputting unit 1102, the input command analyzing unit 1103, the net detecting unit 1104, the component detecting unit 1106, the terminal detecting unit 1107, the power/ground layer detecting unit 1108, a capacitor element detecting unit 2121, an area setting unit 2122, a via detecting unit 2123, a clearance value changing unit 2124, a design information storing unit 2111, the displaying unit 1112 and a controlling unit 2113.

This CAD apparatus 2000 can be realized in the same way as the CAD apparatus 1000 by executing software that implements the features shown in FIG. 20 on hardware of a computer, such as a workstation shown in FIG. 2.

Note here that construction elements which are the same as those in the CAD apparatus 1000 have been given the same reference numerals. Construction elements of the CAD apparatus 2000 which have configurations and functions different from those in the CAD apparatus 1000 will be explained below.

(2.1.1) Input Command Analyzing Unit 1103

A clearance value change area setting command is included in design commands.

The input command analyzing unit 1103 analyzes an input design command. When the input design command is a clearance value change area setting command, the input command analyzing unit 1103 outputs the command to the controlling unit 2113.

(2.1.2) Design Information Storing Unit 2111

The design information storing unit 2111 stores the component terminal interconnection information list 1201, the terminal list 1401, the board constituent list 1701, a placement information list 2201, a via connection list 2301, a component name list 2501 and a component number list 2601 in advance.

Note here that the CAD apparatus 2000 will be described on the assumption that components have already been placed and design information necessary for circuit board design has already been stored in the design information storing unit 2111.

The design information storing unit 2111 also stores a via information list 2401 generated during design processes.

The component terminal interconnection information list 1201, the terminal list 1401 and the board constituent list 1701 are the same as those shown in the first embodiment and their explanation has been omitted. The placement information list 2201, the via connection list 2301, the component name list 2501, the component number list 2601 and the via information list 2401 are explained below.

<Placement Information List 2201>

The placement information list 2201 is made up of sets of placement information 2210 for component placement positions, as shown in FIG. 21.

Each set of placement information 2210 includes a component number 2211, coordinates 2212, an angle 2213, a side 2214 and a layer number 2215.

The component number 2211 identifies a component placed in a circuit board.

The coordinates 2212 are XY coordinates showing a position on a layer at which a predetermined part of the component is placed.

The angle 2213 shows an angle which a predetermined side of the component forms with the X axis.

The side 2214 shows a placement side of the circuit board for the component.

The layer number 2215 shows a layer on which the component is placed.

<Via Connection List 2301>

Figure 22:
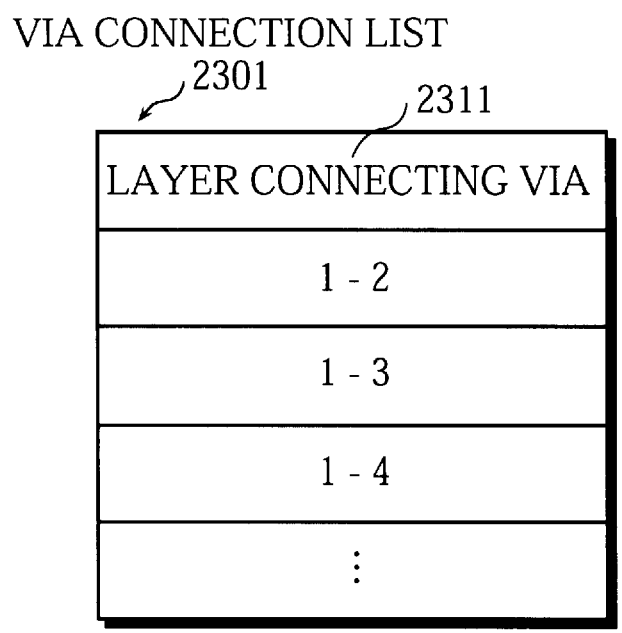
FIG. 22 shows a via connection list 2301 stored in the design information storing unit 2111.

The via connection list 2301 shows layer connecting vias 2311, as shown in FIG. 22.

A layer connecting via 2311 is written as "(layer number identifying a layer)-(layer number identifying a layer)" and shows a group of vias that connect the two layers.

<Via Information List 2401>

The via information list 2401 is made up of sets of via information 2410 that each show a via for which a clearance value change area has been set, as shown in FIG. 23.

Each set of via information 2410 includes a layer connecting via 2411, an area 2412 and a clearance value 2413.

The layer connecting via 2411 shows a via which connects two layers, and is written as "(layer number identifying a layer)-(layer number identifying a layer)" same as layer connecting vias 2311 in the via connection list 2301.

Figure 24:
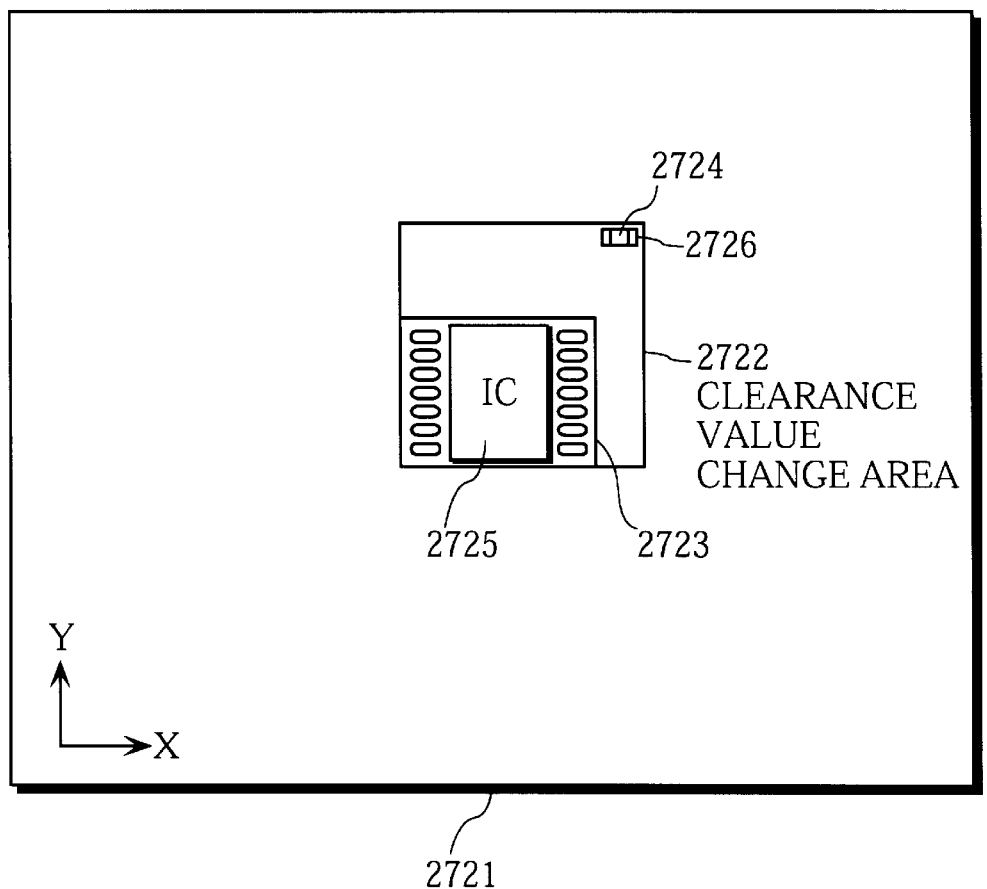
FIG. 24 is a conceptual diagram showing signal layer 2721 on which components 2724 and 2725 are placed.

The area 2412 shows an area specified as a clearance value change area and is expressed as "(XY coordinates of a first vertex of a rectangle area)-(XY coordinates of a second vertex of the rectangle area that is diagonal to the first vertex)". An example of clearance value change areas is shown in FIG. 24. In the figure, rectangle area 2722 in which placement area 2723 of component 2725 is diagonal to placement area 2726 of bypass capacitor 2724 on layer 2721 is set as a clearance value change area. A radius of a clearance of each via placed within rectangle area 2722 will be changed to a predetermined value in the present embodiment.

Figure 25:
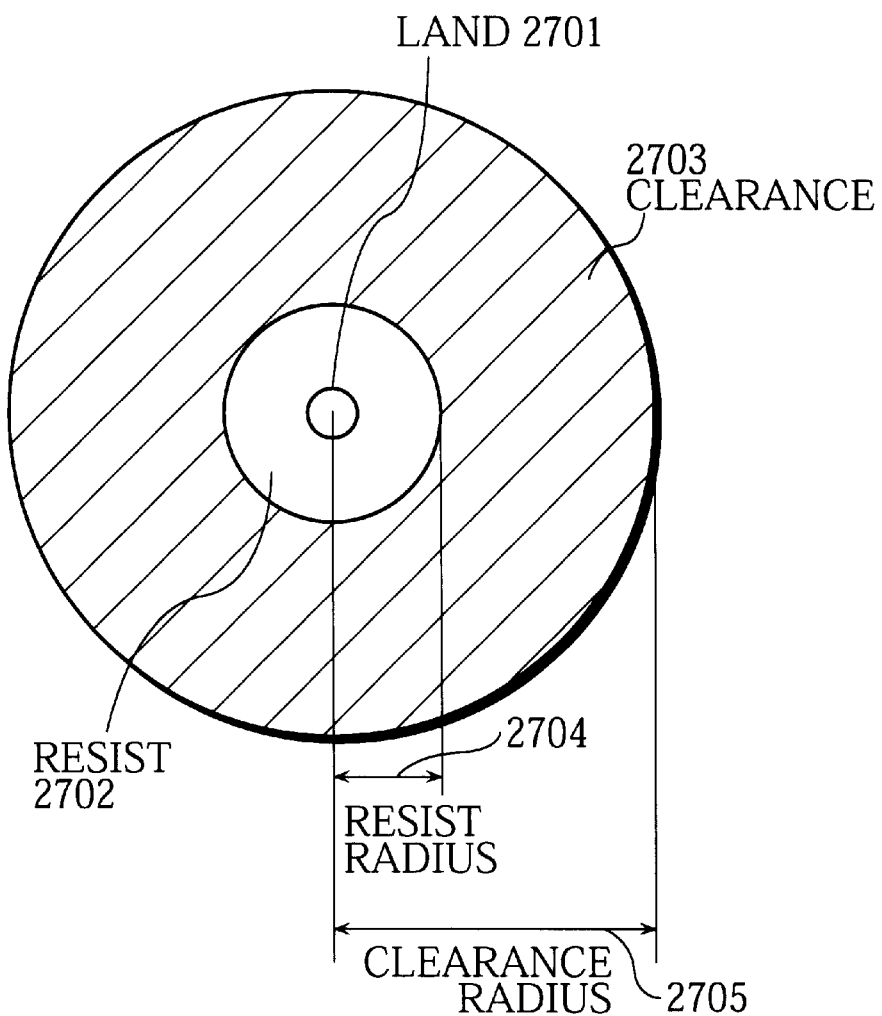
FIG. 25 shows a via clearance.

The clearance value 2413 shows a clearance radius of a via. An example of via clearance radiuses is shown in FIG. 25 by clearance radius 2705. In the figure, clearance 2703 is an area that prohibits placement of other vias and is generated around a via hole in the power or ground layer. Land 2701 is a conductor area, while resist 2702 is a non-conductor area. Note that a connector between two layers is referred to as "via", while a hole drilled through the circuit board to connect two layers by the via is referred to as "via hole".

<Component Name List 2501>

The component name list 2501 includes information on various kinds of components, as shown in FIG. 26.

The component name list 2501 shows a component name 2511, a number of terminals 2512, a shape 2513, a length 2514, a width 2515 and a type 2516.

The component name 2511 identifies components of the same kind. Components of the same kind are given the same component name.

The number of terminals 2512 shows the number of terminals possessed by a component of the kind specified by the component name 2511.

The shape 2513 shows a shape of the component.

The length 2514 shows a length of a predetermined side of the component.

The width 2515 shows the length of a side adjacent to the predetermined side of the component.

The type 2516 shows a type of the component.

<Component Number List 2601>

The component number list 2601 is made up of combinations of component numbers 2611 and component names 2612, as shown in FIG. 27.

A component number 2611 identifies one of components placed on the circuit board. When a plurality of components of the same kind are placed on the circuit board, each of the plurality of components is given a different component number. A component name 2612 identifies components of the same kind, as the component name 2511.

(2.1.3) Capacitor Element Detecting Unit 2121

The capacitor element detecting unit 2121 detects a capacitor element which meets the conditions given below, for each of two component numbers (first and second component numbers) detected by the component detecting unit 1106.

The capacitor element detecting unit 2121 reads, from the placement information list 2201, a set of placement information 2210 whose component number 2211 is the same as the first component number detected by the component detecting unit 1106, and stores the read set of placement information 2210 as placement information 2210a which is made up of a component number 2211a, coordinates 2212a, an angle 2213a, a side 2214a and a layer number 2215a.

The capacitor element detecting unit 2121 also reads all sets of placement information 2210 from the placement information list 2201 one at a time. The capacitor element detecting unit 2121 then searches the component number list 2601 for a component number 2611 same as a component number 2211 of a read set of placement information 2210 and extracts a component name 2612 corresponding to the retrieved component number 2611. Next, the capacitor element detecting unit 2121 searches the component name list 2501 for a component name 2511 same as the extracted component name 2612 and retrieves a type 2516 corresponding to the component name 2511.

When the retrieved type 2516 is not "capacitor element", the capacitor element detecting unit 2121 reads the next set of placement information 2210 from the placement information list 2201.

When, on the other hand, the retrieved type 2516 is "capacitor element", the capacitor element detecting unit 2121 detects which layer(s) (power and/or ground layer(s)) the capacitor element is connected to by following the same procedure as the power/ground layer detecting unit 1108. When two layer numbers are detected by the capacitor element detecting unit 2121 and when two layer numbers have been detected by the power/ground layer detecting unit 1108, the capacitor element detecting unit 2121 checks whether the detected layer numbers match the layer numbers detected by the power/ground layer detecting unit 1108, which is to say, whether the capacitor element and the first component are connected to the same power and ground layers. If they do not match or if at least one of the capacitor element detecting unit 2121 and the power/ground layer detecting unit 1108 does not detect two layer numbers, the capacitor element detecting unit 2121 reads the next set of placement information 2210 from the placement information list 2201.

If, on the other hand, they match, the capacitor element detecting unit 2121 calculates distance D between the first component and the capacitor element using the coordinates 2212a of the stored placement information 2210a and coordinates 2212 of the read set of placement information 2210 according to Formula 1.

$$D = SQRT((Xa-Xb)^2 + (Ya-Yb)^2) \quad \text{(Formula 1):}$$

Here, "Xa" is the X coordinate of the coordinates 2212a showing a placement position of the first component, "Ya" is the Y coordinate of the coordinates 2212a, "Xb" is the X coordinate of the coordinates 2212 showing a placement position of the capacitor element, and "Yb" is the Y coordinate of the coordinates 2212. "SQRT( )" represents a square root calculation, while "^" represents a repeated multiplication. For example, "A^2" represents the second power of A.

By repeating the above check and calculation for all sets of placement information 2210, the capacitor element detecting unit 2121 detects, from the placement information list 2201, a component number of a capacitor element whose distance D from the first component is shortest.

The capacitor element detecting unit 2121 also detects a component number of a capacitor element for the second component in the same way as the first component.

(2.1.4) Area Setting Unit 2122

The area setting unit 2122 determines a clearance value change area for each of the first and second component numbers detected by the component detecting unit 1106 according to the following procedure. This clearance value change area is also referred to as "routing path area".

The area setting unit 2122 reads the coordinates 2212 (Xb, Yb) of the capacitor element detected by the capacitor element detecting unit 2121 for the first component and the coordinates 2212a (Xa, Ya) of the first component, from the placement information list 2201.

The area setting unit 2122 also reads a length 2514 and width 2515 of the capacitor element from the component name list 2501, by first referring to the component number list 2601 to retrieve a component name 2612 corresponding to the component number of the capacitor element and then searching the component name list 2501 for the length 2514 and width 2515 of the retrieved component name. The area setting unit 2122 similarly reads a length 2514 and width 2515 of the first component from the component name list 2501.

The area setting unit 2122 uses the above obtained coordinates, length and width of the capacitor element and coordinates, length and width of the first component to calculate coordinates of two diagonal vertices of a clearance value change area for the first component. This clearance value change area is set so that the capacitor element and the first component are placed at diagonal ends of the area.

The coordinates of the two diagonal vertices of the clearance value change area are calculated as follows.

Supposing the first component and the capacitor element are placed respectively at the lower left end and upper right end of the clearance value change area. Coordinates at the lower left end of the clearance value change area will be the same as the coordinates of the first component. X coordinate of the upper right end of the clearance value change area will be the sum of the X coordinate of the capacitor element and the width of the capacitor element. Y coordinate of the upper right end of the clearance value change area will be the sum of the Y coordinate of the capacitor element and the length of the capacitor element.

Even when the first component and the capacitor element are placed at the diagonal ends of the clearance value change area in a way different from the above described positioning, coordinates of the clearance value change area can be calculated from the coordinates, lengths and widths of the first component and capacitor element.

The area setting unit 2122 sets a clearance value change area for the second component in the same way as the first component.

(2.1.5) Via Detecting Unit 2123

The via detecting unit 2123 reads, from the via connection list 2301, each layer connecting via 2311 that includes the same layer number as the layer number 2215a stored by the capacitor element detecting unit 2121, and judges whether the read layer connecting via 2311 is connected to or passes through one of the layers (power/ground layers) detected by the power/ground layer detecting unit 1108. When the condition is met, the via detecting unit 2123 writes the read layer connecting via 2311 in a set of via information 2410 of the via information list 2401 as a layer connecting via 2411. At this point, an area 2412 and a clearance value 2413 of the set of via information 2410 have not been filled in.

(2.1.6) Clearance Value Changing Unit 2124

The clearance value changing unit 2124 reads, from the via information list 2401, the set of via information 2410 in which the layer connecting via 2411 alone has been written by the via detecting unit 2123. The clearance value changing unit 2124 then writes the coordinates of the two vertices of the clearance value change area for the first component and the coordinates of the two vertices of the clearance value change area for the second component in the set of via information 2410 as an area 2412, these coordinates having been calculated by the area setting unit 2122.

The clearance value changing unit 2124 then calculates a clearance value 2413 using Formula 2 and writes the calculation result in the set of via information 2410.

$$\text{Clearance Value 2413} = (\text{Resist Radius}) + (\text{Conductor Width}) \times 2 \quad \text{(Formula 2)}$$

The clearance value changing unit 2124 then writes the set of via information 2410 back into the via information list 2401.

Figure 28:
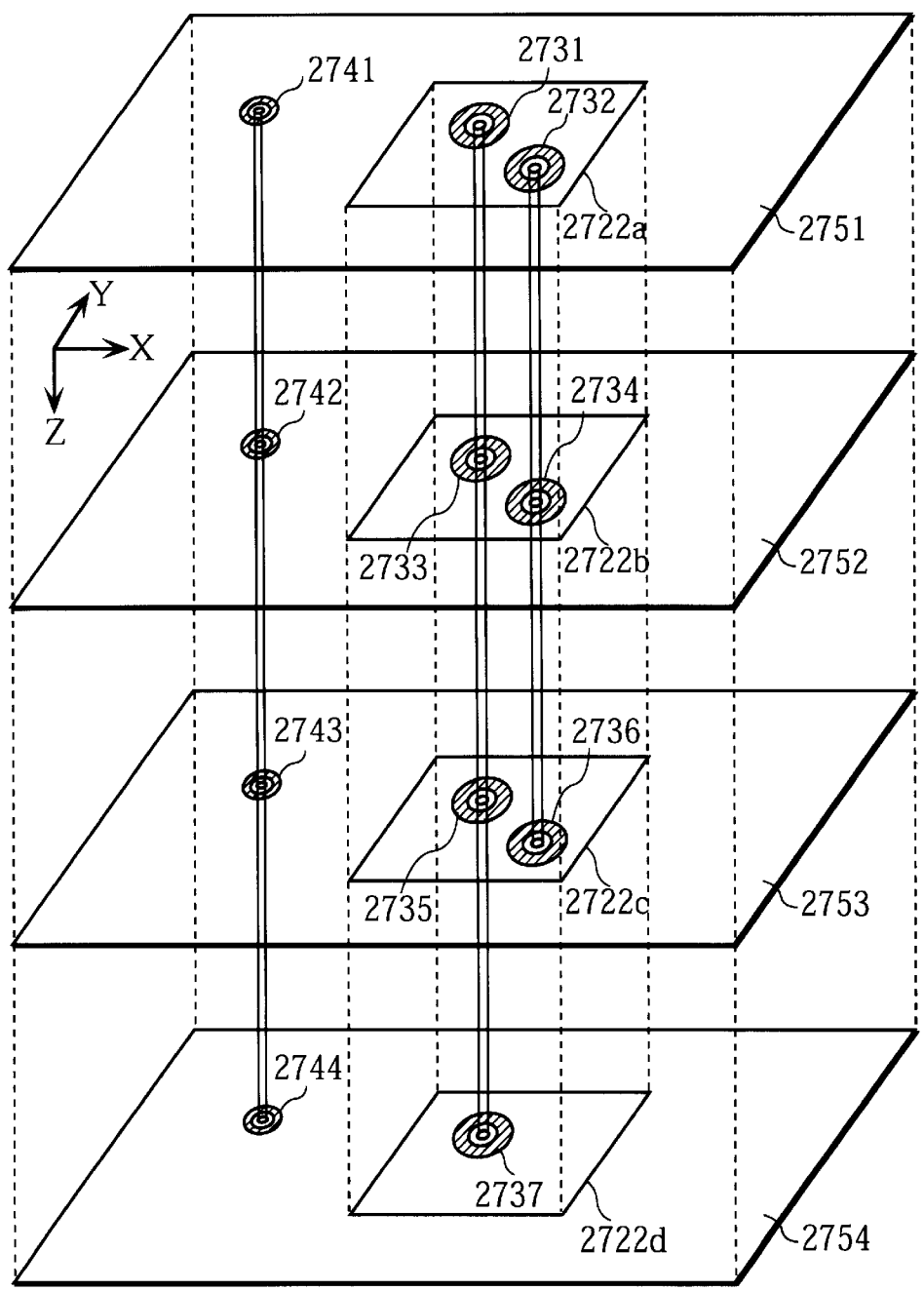
FIG. 28 shows an example of via clearances on signal layer 2751, ground layer 2752, power layer 2753 and signal layer 2754.

FIG. 28 shows clearance value change areas 2722a, 2722b, 2722c and 2722d set respectively on layers 2751–2754. Via clearances 2731 and 2732 present within clearance value change area 2722a on layer 2751 each have a radius calculated according to Formula 2, while via clearance 2741 outside clearance value change area 2722a has a predetermined radius. The same applies to via clearances present on the other layers.

While a clearance value change area has been set on each layer that is drilled through by a via in the present embodiment, the clearance value changing unit 2124 may set a clearance value change area only on a layer, among power/ground layers to which a component is connected, that is nearest to a signal layer on which the component is placed. In such a case, in FIG. 28 via clearances 2733 and 2734 present within clearance value change area 2722b on layer 2752 will have the radius calculated according to Formula 2, while via clearance 2742 outside clearance value change area 2722b on layer 2752 and via clearances on the other layers 2751, 2753 and 2754 will have the predetermined radius.

Also, when a power or ground layer to which a component is not connected exists between a signal layer on which the component is placed and power/ground layers to which the component is connected, the clearance value changing unit 2124 may set clearance value change areas only on the power or ground layer to which the component is not connected and on a layer, among the power/ground layers to which the component is connected, that is nearest to the signal layer. Supposing layers 2751 and 2754 are signal layers and layers 2752 and 2753 are ground layers in FIG. 28. When a component placed on signal layer 2751 is not connected to ground layer 2752 but to ground layer 2753 and a via connects signal layer 2751 and ground layer 2753 through ground layer 2752, clearance value change areas are set on ground layers 2752 and 2753.

As a result of the processing described above, clearances of vias placed in a clearance value change area in a signal layer are set to be larger than via clearances in other areas. By doing so, two vias in the clearance value change area are spaced larger than two vias in the other areas. A current that flows from/into a component or capacitor element placed in a clearance value change area in a signal layer will take a feedback path in a clearance value change area in a ground or power layer. Since vias are sufficiently spaced in the clearance value change area in the ground/power layer, it is highly possible for the current to take a feedback path between these vias without taking an alternative path to avoid the vias. Accordingly, an area enclosed by a loop formed by the path of the current can be reduced, so that electromagnetic noise will not occur.

(2.1.7) Controlling Unit 2113

The controlling unit 2113 receives a clearance value change area setting command from the input command analyzing unit 1103.

The controlling unit 2113 controls the command inputting unit 1101, the data inputting unit 1102, the input command analyzing unit 1103, the net detecting unit 1104, the component detecting unit 1106, the terminal detecting unit 1107, the power/ground layer detecting unit 1108, the capacitor element detecting unit 2121, the area setting unit 2122, the via detecting unit 2123, the clearance value changing unit 2124 and the displaying unit 1112 in the CAD apparatus 2000.

The controlling unit 2113 activates the net detecting unit 1104 on receiving a clearance value change area setting command.

The controlling unit 2113 also reads a set of component terminal interconnection information 1211 from the component terminal interconnection information list 1201 stored in the design information storing unit 2111. If a critical net 1220 of the read set of component terminal interconnection information 1211 shows "○", the controlling unit 2113 activates the component detecting unit 1106, the terminal detecting unit 1107, the power/ground layer detecting unit 1108, the capacitor element detecting unit 2121, the area setting unit 2122, the via detecting unit 2123 and the clearance area changing unit 2124 in succession. The controlling unit 1113 repeats reading of a set of component terminal interconnection information 1211, judgement of the status of a critical net 1220, and activation of the above units until every set of component terminal interconnection information 1211 is read from the component terminal interconnection information list 1201.

(2.2) Operation of CAD Apparatus 2000

The following is a description of the operation of the CAD apparatus 2000.

(2.2.1) Overall Operation of CAD Apparatus 2000

The overall operation of the CAD apparatus 2000 is described below with reference to FIG. 29.

On receiving a clearance value change area setting command from the input command analyzing unit 1103, the controlling unit 2113 activates the net detecting unit 1104 (S1001). The controlling unit 2113 then reads a set of component terminal interconnection information 1211 from the component terminal interconnection information list 1201 (S1002). If every set of component terminal interconnection information 1211 has already been read (S1003), the operation is complete. The controlling unit 2113 checks whether a critical net 1220 of the read set of component terminal interconnection information 1211 shows "○" (S1010). It so, the controlling unit 2113 extracts the set of component terminal interconnection information 1211 and activates the component detecting unit 1106, the terminal detecting unit 1107, the power/ground layer detecting unit 1108, the capacitor element detecting unit 2121, the area setting unit 2122, the via detecting unit 2123 and the clearance value changing unit 2124 in succession (S1005–S1007 and S2001–S2004). The controlling unit 2113 repeats reading of a set of component terminal interconnection information 1211, judgement of the status of a critical net 1220, and activation of the above units until all of the sets of component terminal interconnection information 1211 are read from the component terminal interconnection information list 1201.

Figure 29:
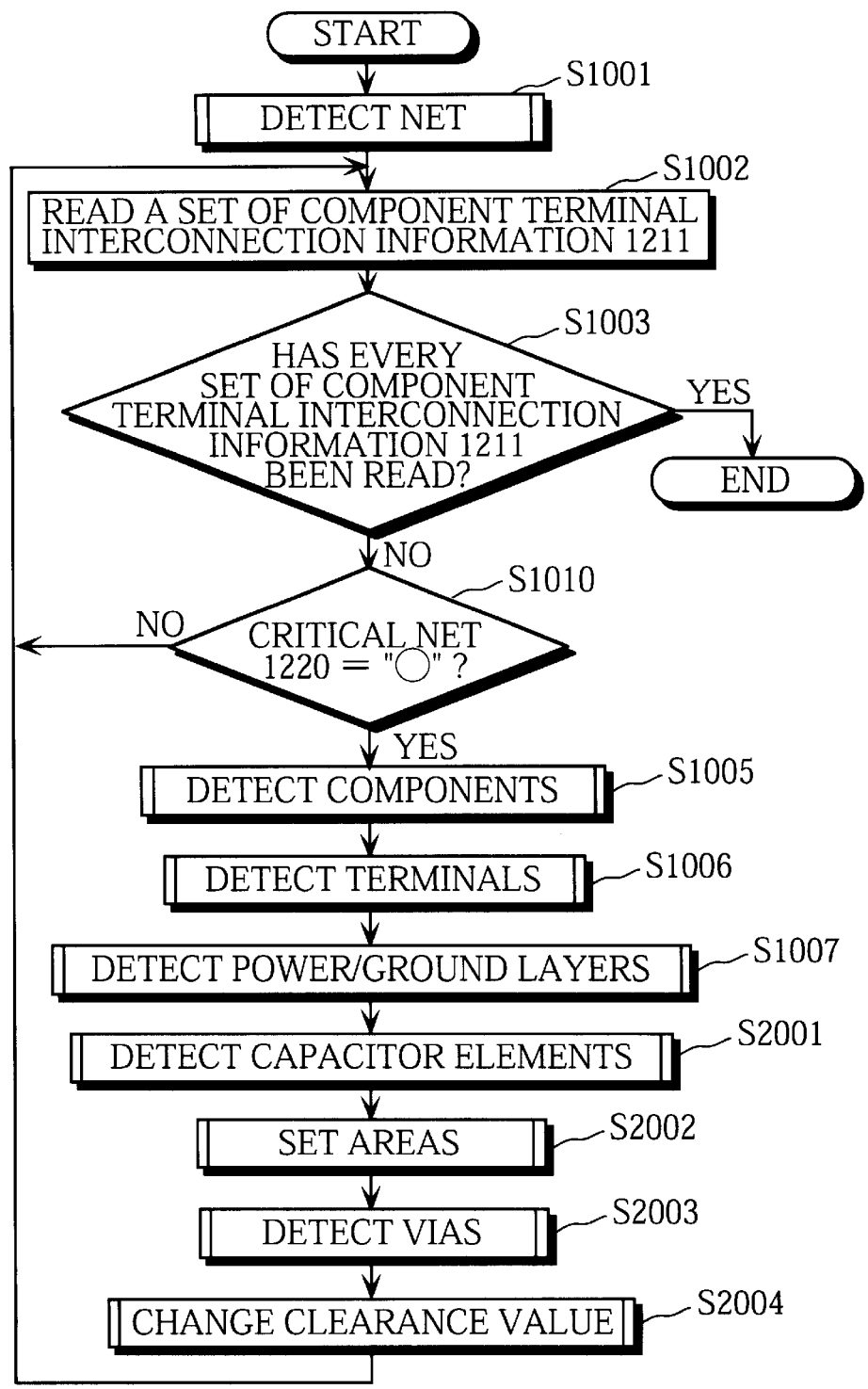
FIG. 29 is a flowchart showing the overall operation of the CAD apparatus 2000.

In FIG. 29, steps which are the same as those in FIG. 12 have been given the same reference numerals and their explanation has been omitted, so that steps S2001–S2004 will be explained in detail below.

(2.2.2) Operation of Capacitor Element Detecting Unit 2121

Figure 30:
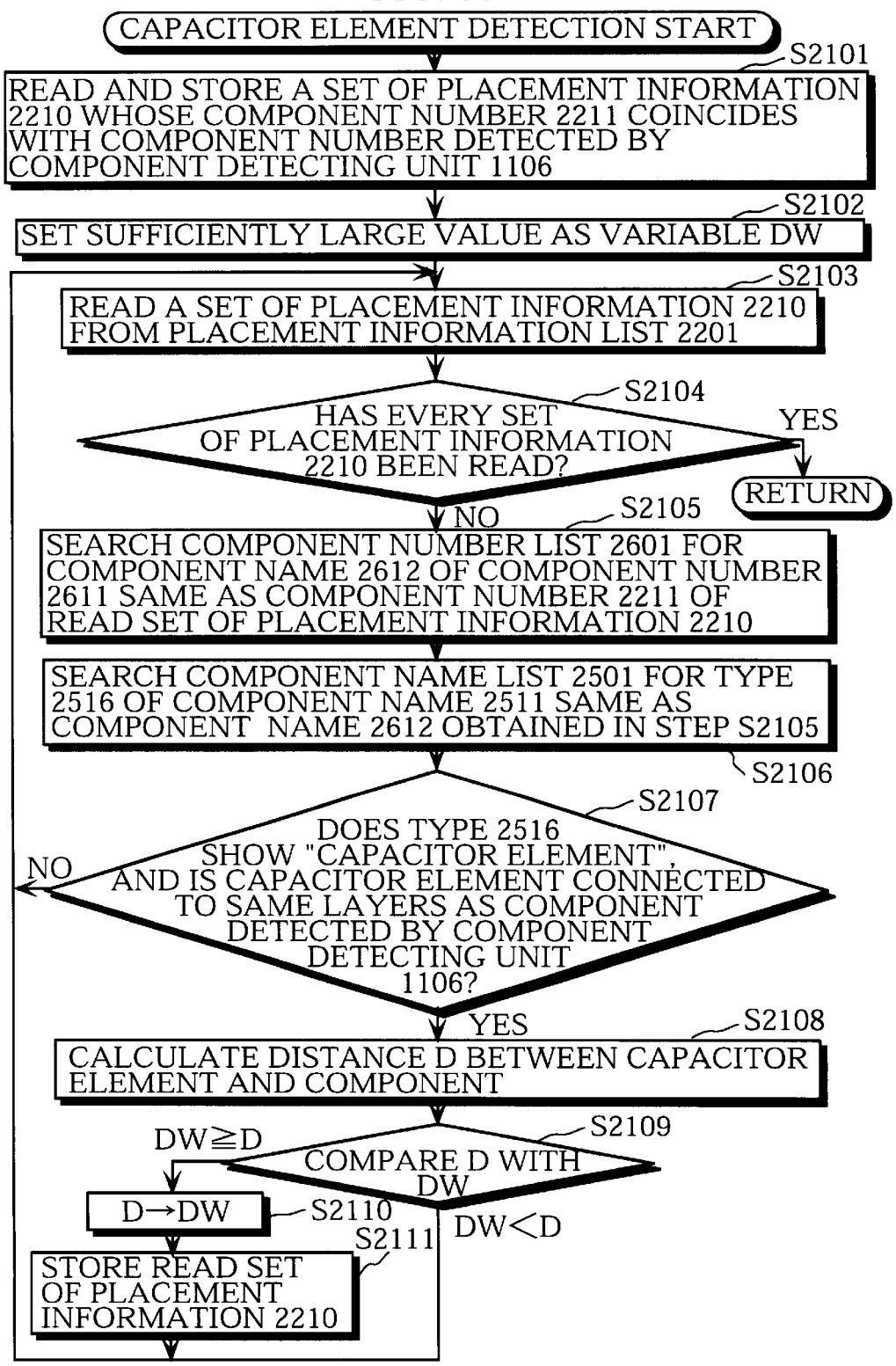
FIG. 30 is a flowchart showing the operation of a capacitor element detecting unit 2121 of the CAD apparatus 2000.

The operation of the capacitor element detecting unit 2121 is described below with reference to FIG. 30.

The capacitor element detecting unit 2121 reads, from the placement information list 2201, a set of placement information 2210 whose component number 2211 is the same as the first component number detected by the component detecting unit 1106, and stores the set of placement information 2210 as placement information 2210a (S2101). The capacitor element detecting unit 2121 then sets a sufficiently large value as variable DW (S2102).

Here, a length of a predetermined side of a layer in the circuit board is set as variable DW.

Next, the capacitor element detecting unit 2121 reads a set of placement information 2210 from the placement information list 2201 (S2103). If all sets of placement information 2210 have already been read (S2104), the capacitor element detecting unit 2121 completes the capacitor element detection processing for the first component. The capacitor element detecting unit 2121 searches the component number list 2601 for a component number 2611 same as a component number 2211 of the read set of placement information 2210 and extracts a component name 2612 corresponding to the component number 2611 (S2105). The capacitor element detecting unit 2121 then searches the component name list 2501 for a component name 2511 same as the extracted component name 2612 and retrieves a type 2516 of the component name 2511 (S2106).

If the retrieved type 2516 is not "capacitor element" (S2107), the capacitor element detecting unit 2121 returns to step S2103 and reads the next set of placement information 2210 from the placement information list 2201.

If the retrieved type 2516 is "capacitor element" (S2107), the capacitor element detecting unit 2121 detects layer number(s) (power/ground layer(s)) to which the capacitor element is connected according to the same procedure as the power/ground layer detecting unit 1108. When two layer numbers are detected by the capacitor element detecting unit 2121 and when two layer numbers have been detected by the power/ground layer detecting unit 1108, the capacitor element detecting unit 2121 judges whether the detected layer numbers match the layer numbers detected by the power/ground layer detecting unit 1108. If they do not match, the capacitor element detecting unit 2121 returns to step S2103 and reads the next set of placement information 2210. If, on the other hand, the layer numbers match in step S2107, the capacitor element detecting unit 2121 calculates distance D between the capacitor element and the first component according to Formula 1, through use of coordinates 2212a included in the stored placement information 2210a and coordinates 2212 included in the read set of placement information 2210 (S2108).

The capacitor element detecting unit 2121 compares calculated distance D with variable DW (S2109). When distance D is equal to or smaller than variable DW, the capacitor element detecting unit 2121 assigns distance D to variable DW (S2110) and stores the read set of placement information 2210 (S2111), before returning to step S2103. When distance D is greater than variable DW, the capacitor element detecting unit 2121 returns to step S2103.

The capacitor element detecting unit 2121 performs the same processing for the second component detected by the component detecting unit 1106, and as a result detects a capacitor element for each of the first and second components.

(2.2.3) Operation of Area Setting Unit 2122

Figure 31:
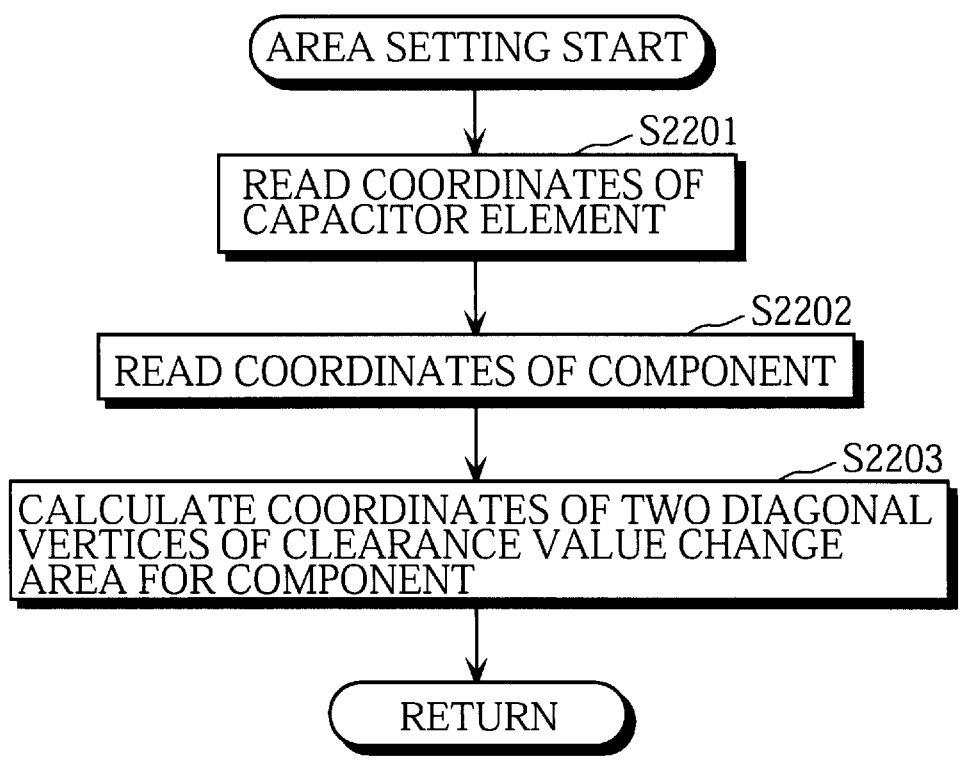
FIG. 31 is a flowchart showing the operation of an area setting unit 2122 of the CAD apparatus 2000.

The operation of the area setting unit 2122 is explained below with reference to FIG. 31.

The area setting unit 2122 reads, from the placement information list 2201, the coordinates 2212 of the capacitor element detected by the capacitor element detecting unit 2121 for the first component (S2201), and reads the coordinates 2212 of the first component from the placement information list 2201 (S2202). The area setting unit 2122 then calculates coordinates of two diagonal vertices of a clearance value change area for the first component (S2203).

The area setting unit 2122 repeats the above processing for the second component and accordingly sets a clearance value change area for each of the first and second components.

(2.2.4) Operation of Via Detecting Unit 2123

Figure 32:
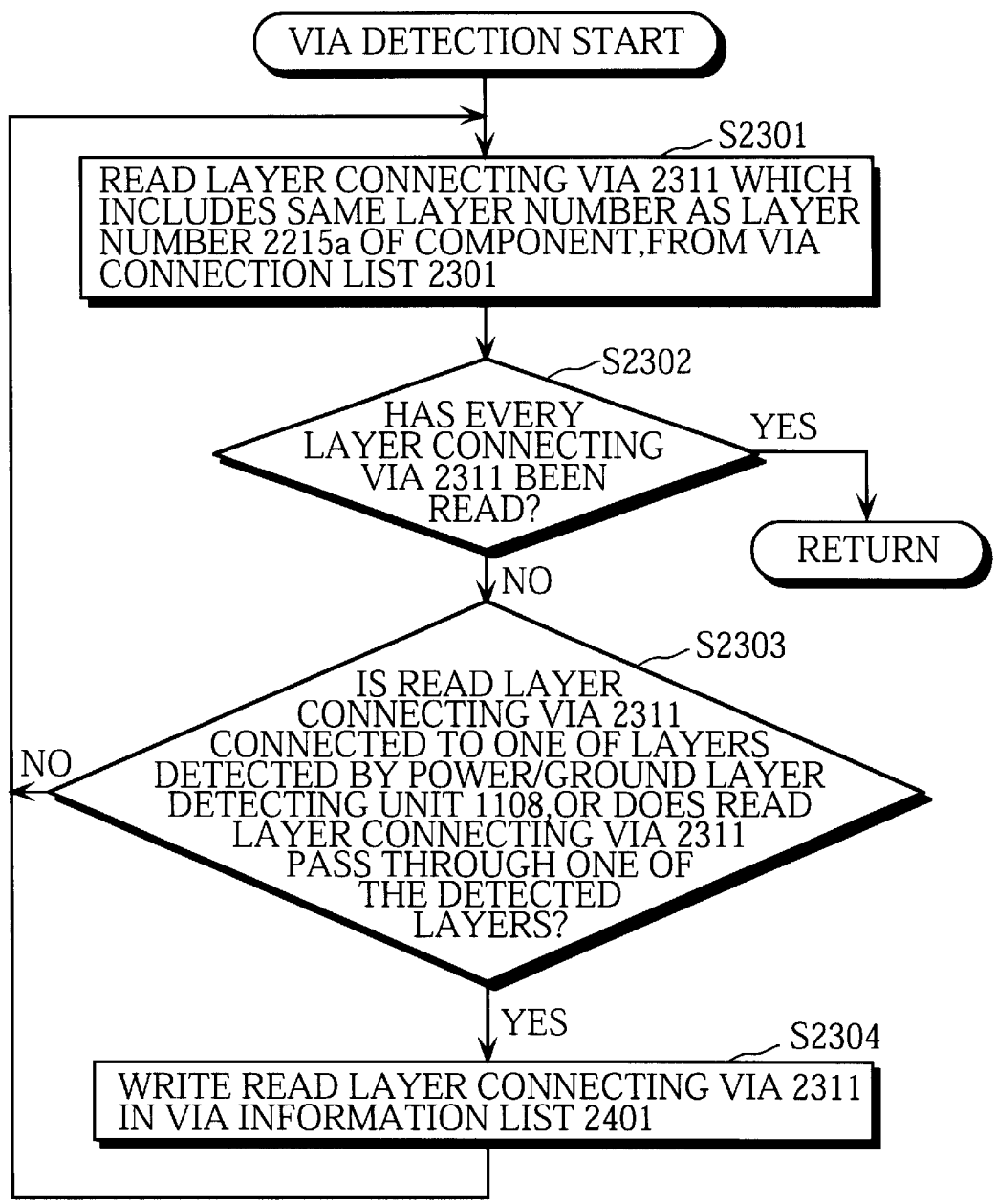
FIG. 32 is a flowchart showing the operation of a via detecting unit 2123 of the CAD apparatus 2000.

The operation of the via detecting unit 2123 is explained below with reference to FIG. 32.

The via detecting unit 2123 reads, from the via connection list 2301, a layer connecting via 2301 that includes the same layer number as the layer number 2215a stored by the capacitor element detecting unit 2121 (S2301). If all of such layer connecting vias 2311 have already been read (S2302), the via detecting unit 2123 completes the procedure. The via detecting unit 2123 judges whether the read layer connecting via 2311 is connected to or passes through one of the layers detected by the power/ground layer detecting unit 1108. If this is not the case, the via detecting unit 2123 returns to step S2301. If, on the other hand, the condition is met in step S2303, the via detecting unit 2123 writes the read layer connecting via 2311 in a set of via information 2410 of the via information list 2401 as a layer connecting via 2411, before returning to step S2301.

(2.2.5) Operation of Clearance Value Changing Unit 2124

Figure 33:
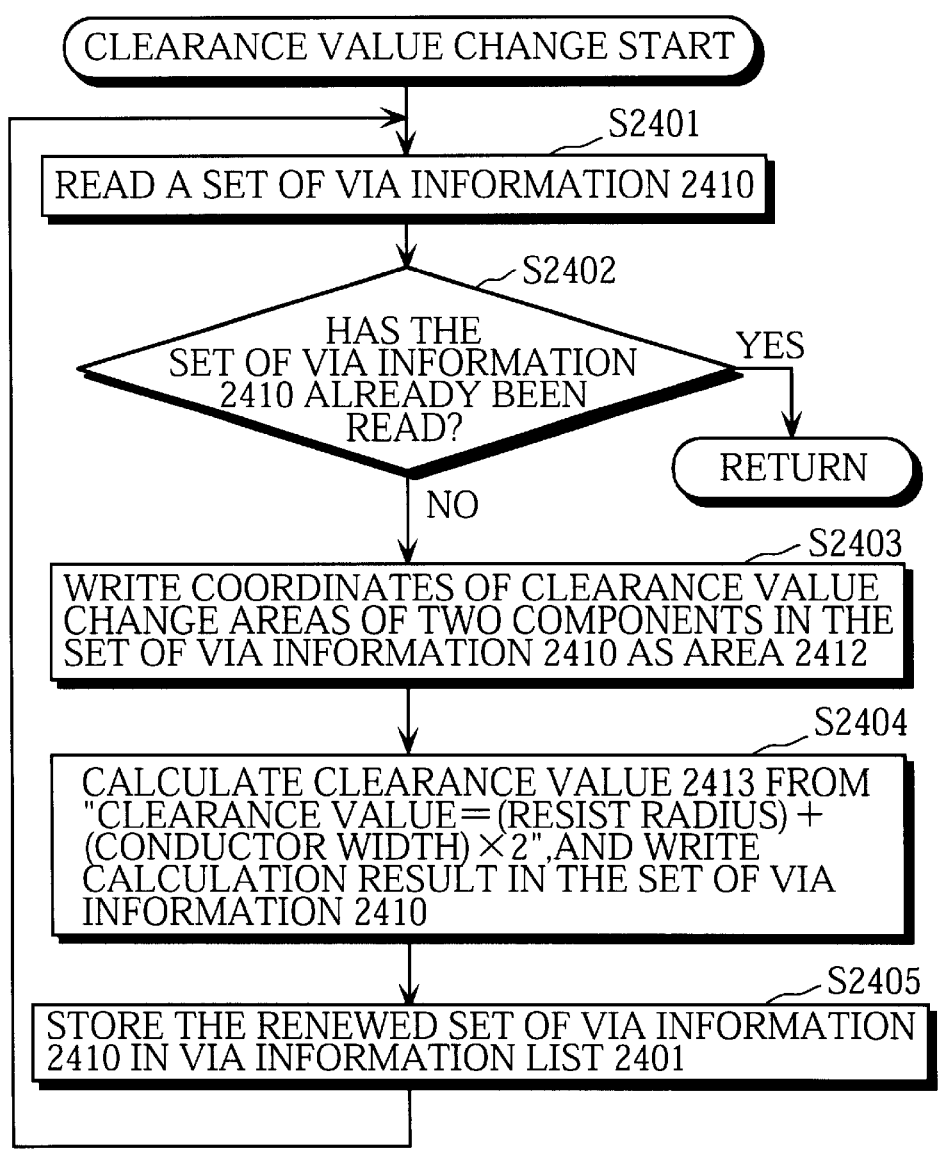
FIG. 33 is a flowchart showing the operation of a clearance value changing unit 2124 of the CAD apparatus 2000.

The operation of the clearance value changing unit 2124 is explained below with reference to FIG. 33.

The clearance value changing unit 2124 reads, from the via information list 2401, the set of via information 2410 which shows the layer connecting via 2411 alone (S2401). If the of via information 2410 has already been read (S2402), the clearance value changing unit 2124 completes the procedure.

The clearance value changing unit 2124 writes coordinates of two vertices of a clearance value change area calculated by the area setting unit 2122 for each of the first and second components, in the read set of via information 2410 as an area 2412 (S2403). The clearance value changing unit 2124 then calculates a clearance value 2413 according to Formula 2 and writes the calculation result in the set of via information 2410 (S2404). The clearance value changing unit 2124 stores the renewed set of via information 2410 back into the via information list 2401 (S2405), before returning to step S2401.

(2.3) Modifications

① While nets which meet the fixed conditions have been extracted by the controlling unit 2113 and a via clearance value has been changed for each extracted net in the second embodiment, a via clearance value may be changed each time a conductor is placed for an extracted net. Alternatively, the designer may specify a net for which a conductor is to be placed and a via clearance value is to be changed.

② While a capacitor element that is nearest to a component has been detected by the capacitor element detecting unit 2121 in the second embodiment, the designer may indicate a capacitor element for the component. In such a case, the data inputting unit 1102 receives an indication of the capacitor element for the component from the designer and outputs the indication to the capacitor element detecting unit 2121.

③ While Formula 2 has been used to calculate a clearance value in the second embodiment, the designer may instead specify a clearance value. In such a case, the data inputting unit 1102 receives the clearance value from the designer and outputs the value to the clearance value changing unit 2124.

④ A capacitance of each capacitor element may be included in the component name list 2501 in advance so that the capacitor element detecting unit 2121 can detect a capacitor element whose capacitance matches a predetermined capacitance stored in the capacitor element detecting unit 2121 beforehand.

Here, the data inputting unit 1102 may receive input of a predetermined capacitance from the designer and output the predetermined capacitance to the capacitor element detecting unit 2121 that accordingly stores the predetermined capacitance.

3. Third Embodiment

The following is a description of a CAD apparatus 3000 for aiding circuit board design as the third embodiment of the present invention, with reference to figures. This description will focus on the differences with the CAD apparatus 1000 of the first embodiment.

(3.1) Construction of CAD Apparatus 3000

Figure 34:
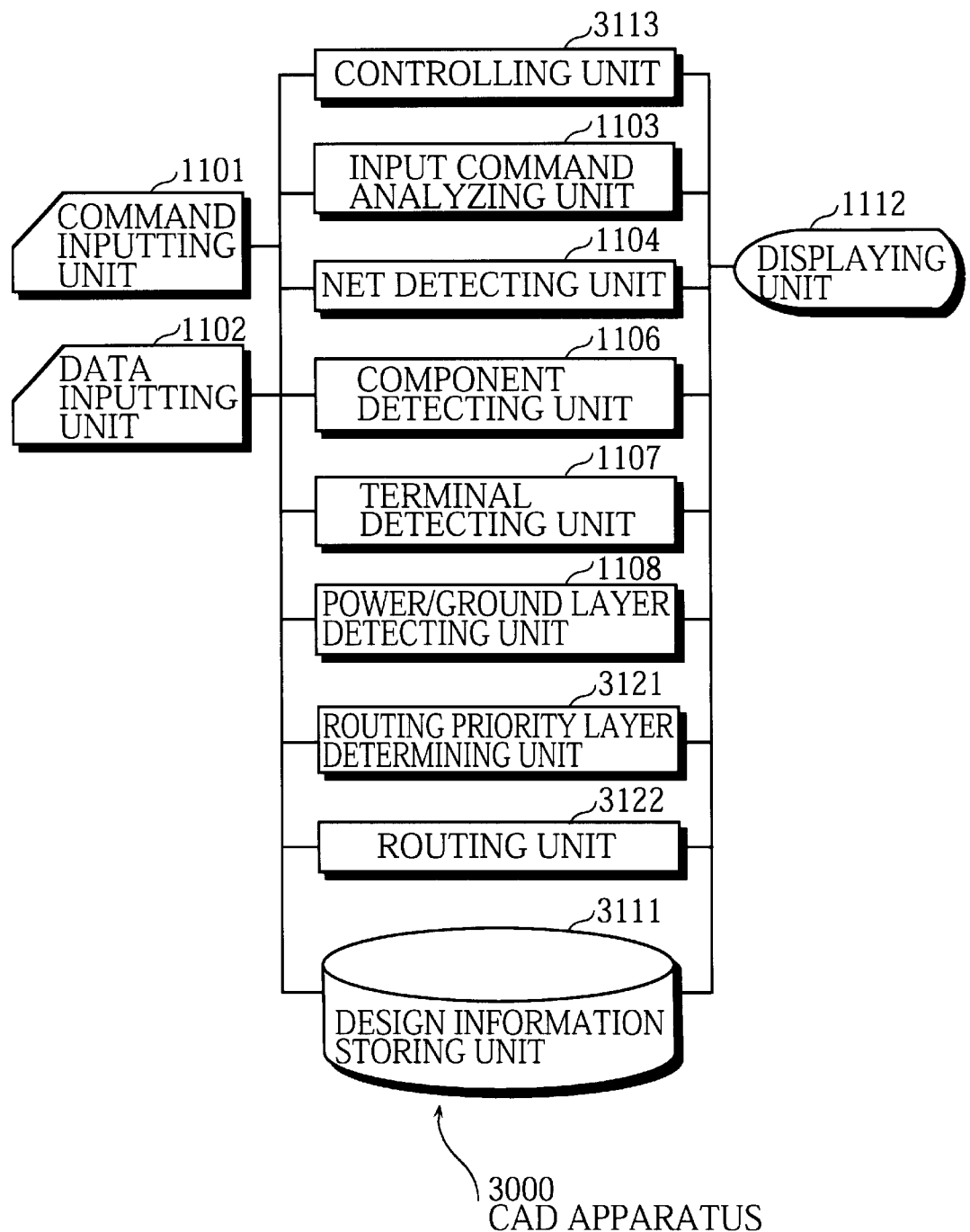
FIG. 34 is a block diagram showing the construction of a CAD apparatus 3000 of the third embodiment of the present invention.

As shown in FIG. 34, the CAD apparatus 3000 includes the command inputting unit 1101, the data inputting unit 1102, the input command analyzing unit 1103, the net detecting unit 1104, the component detecting unit 1106, the terminal detecting unit 1107, the power/ground layer detecting unit 1108, a routing priority layer determining unit 3121, a routing unit 3122, a design information storing unit 3111, the displaying unit 1112 and a controlling unit 3113.

The CAD apparatus 3000 can be realized in the same way as the CAD apparatus 1000 by executing software that implements the features shown in FIG. 34 on hardware of a computer, such as a workstation shown in FIG. 2.

Note here that construction elements which are same as those in the CAD apparatus 1000 have been given the same reference numerals. Construction elements of the CAD apparatus 3000 which have configurations and functions different from those in the CAD apparatus 1000 will be explained below.

(3.1.1) Input Command Analyzing Unit 1103

A routing priority layer determining command is included in design commands.

The input command analyzing unit 1103 analyzes an input design command. When the input design command is a routing priority layer determining command, the input command analyzing unit 1103 outputs the command to the controlling unit 3113.

(3.1.2) Design Information Storing Unit 3111

The design information storing unit 3111 stores the component terminal interconnection information list 1201, the terminal list 1401, a board constituent list 3201 and an inter-layer information list 3301 in advance.

The design information storing unit 3111 also stores a routing path information list 3401 generated during design processes.

The component terminal interconnection information list 1201 and the terminal list 1401 are the same as those described in the first embodiment and their explanation has been omitted here, so that the board constituent list 3201, the inter-layer information list 3301 and the routing path information list 3401 will be explained below.

<Board Constituent List 3201>

As shown in FIG. 35, the board constituent list 3201 shows combinations of layer numbers 3211 and types 3212 for layers which compose a circuit board, as the board constituent list 1701 in the first embodiment. In the present embodiment, the first to sixth layers shown in the board constituent list 3201 compose the circuit board from top to bottom in the listed order.

<Inter-layer Information List 3301>

The inter-layer information list 3301 shows a distance between each two adjacent layers and includes combinations of inter-layer numbers 3311 and inter-layer distances 3312, as shown in FIG. 36.

An inter-layer number 3311 identifies two adjacent layers, and an inter-layer distance 3312 shows a distance between the two adjacent layers.

For instance, the inter-layer number "1–2" in the figure identifies the first and second layers, and the corresponding inter-layer distance "300" shows that the distance between the first and second layers is 300 ($\mu$m).

<Routing Path Information List 3401>

The routing path information list 3401 is made up of sets of routing path information 3410 as shown in FIG. 37.

The sets of routing path information 3410 correspond to the sets of component terminal interconnection information 1211 included in the component terminal interconnection information list 1201.

Each set of routing path information 3410 includes a routing path name 3411, startpoint coordinates 3412, endpoint coordinates 3413, midpoint coordinates 3414 and a layer number 3415.

The routing path name 3411 identifies a routing path and corresponds to a connection name 1212 in the component terminal interconnection information list 1201.

The startpoint coordinates 3412 show XY coordinates of a startpoint of the routing path.

The endpoint coordinates 3413 show XY coordinates of an endpoint of the routing path.

The midpoint coordinates 3414 show XY coordinates of a midpoint of the routing path when the path is routed from its startpoint to its endpoint by way of at least one midpoint, that is, when the routing path is formed by a combination of a plurality of line segments. When there is no midpoint in the routing path, the midpoint coordinates 1614 show the legend "-", while when there is one or more midpoints in the routing path, the midpoint coordinates 1614 show XY coordinates of each midpoint.

The layer number 3415 shows a layer on which the routing path is present.

(3.1.3) Routing Priority Layer Determining Unit 3121

The routing priority layer determining unit 3121 reads all combinations of layer numbers 3211 and types 3212 from the board constituent list 3201 and reads all combinations of inter-layer numbers 3311 and inter-layer distances 3312 from the inter-layer information list 3301.

The routing priority layer determining unit 3121 assigns priorities to layer numbers, among all layer numbers 3211, whose type 3212 is "Signal". Here, the higher priorities are assigned to signal layers which are nearer to the ground/power layer.

Figure 38A:
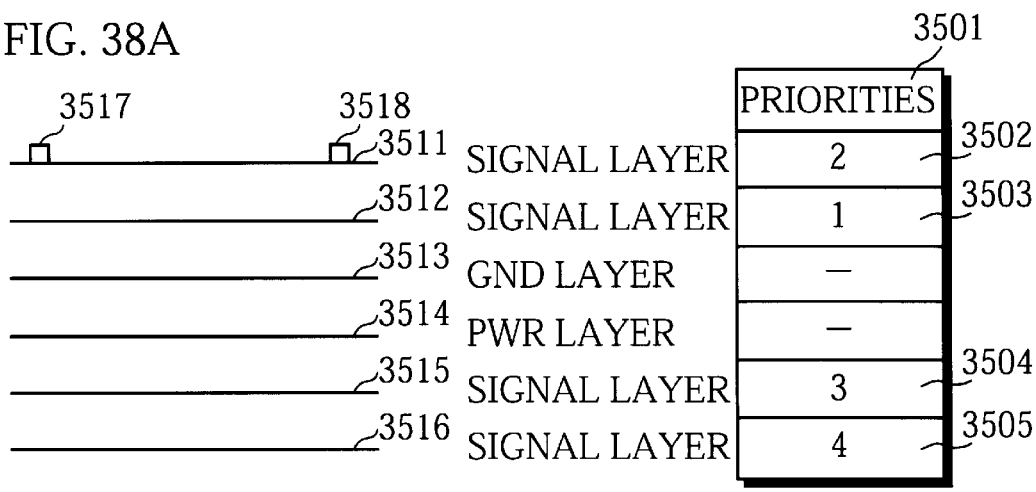
FIG. 38A shows routing priorities when two components are placed on the same signal layer.

FIG. 38A shows routing priorities 3501 when two components 3517 and 3518 placed on the same signal layer 3511 are connected. In the figure, the highest priority is given to signal layer 3512 that is nearest to ground layer 3513, while priorities descend for the rest of signal layers 3511, 3515 and 3516.

Figure 38B:
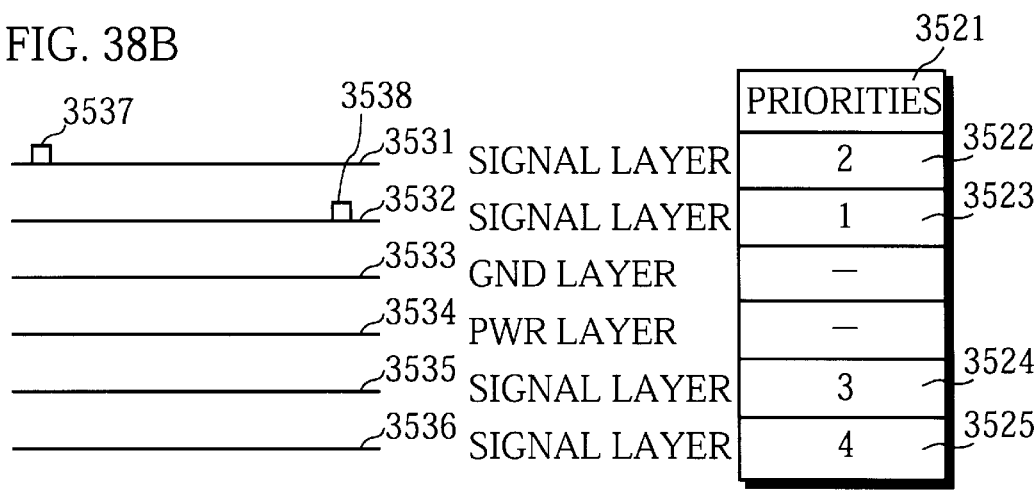
FIG. 38B shows routing priorities when two components are placed on different signal layers which are on the same side of a ground or power layer.

FIG. 38B shows routing priorities 3521 when two components 3537 and 3538 placed on different signal layers 3531 and 3532 are connected. Here, signal layers 3531 and 3532 are on the same side of ground layer 3533 or power layer 3534. In the figure, the highest priority is given to signal layer 3532 that is nearest to ground layer 3533, while priorities descend for the rest of signal layers 3531, 3535 and 3536.

Figure 38C:
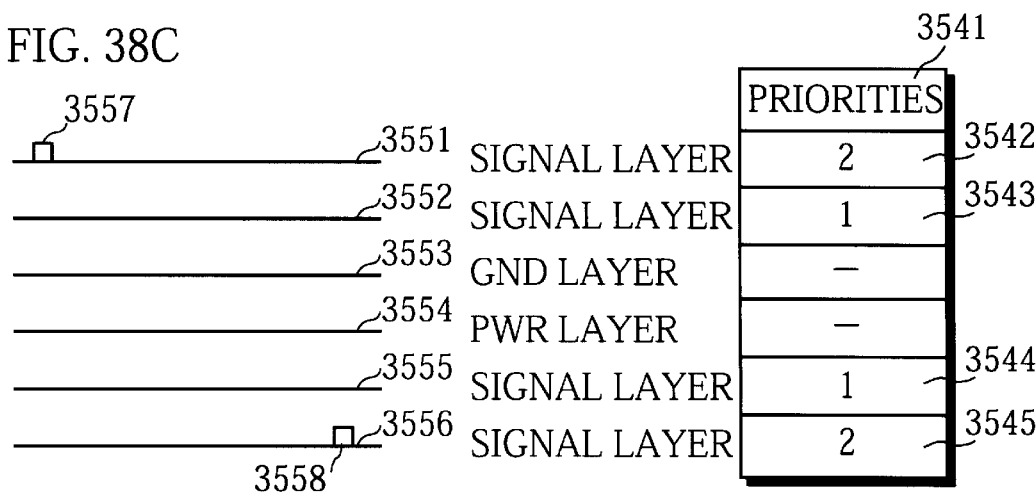
FIG. 38C shows routing priorities when two components are placed on different signal layers which are on the opposite sides of the ground or power layer.

FIG. 38C shows routing priorities 3541 when two components 3557 and 3558 placed on signal layers 3551 and 3556 that are on the opposite sides of ground layer 3553 or power layer 3554 are connected. In the figure, the highest priority is given to signal layer 3552 which is nearest to ground layer 3553 and signal layer 3555 which is nearest to power layer 3554, while the second highest priority is given to signal layers 3551 and 3556.

Thus, the routing priority layer determining unit 3121 determines the signal layer(s) of the highest priority for placing a conductor that connects the first and second components detected by the component detecting unit 1106.

A power/ground layer nearest to a signal layer that has been specified as the highest priority layer as described above is referred to as "routing path area".

(3.1.4) Routing Unit 3122

The routing unit 3122 decides, on the highest priority layer determined by the routing priority layer determining unit 3121, startpoint coordinates 3412, midpoint coordinates 3414 and endpoint coordinates 3413 of a routing path using a routing algorithm, as well as defining a routing path name 3411.

The routing unit 3122 then writes the defined routing path name 3411, startpoint coordinates 3412, midpoint coordinates 3414 and endpoint coordinates 3413 in the routing path information list 3401, and writes the highest priority layer number as a layer number 3415.

Figure 39:
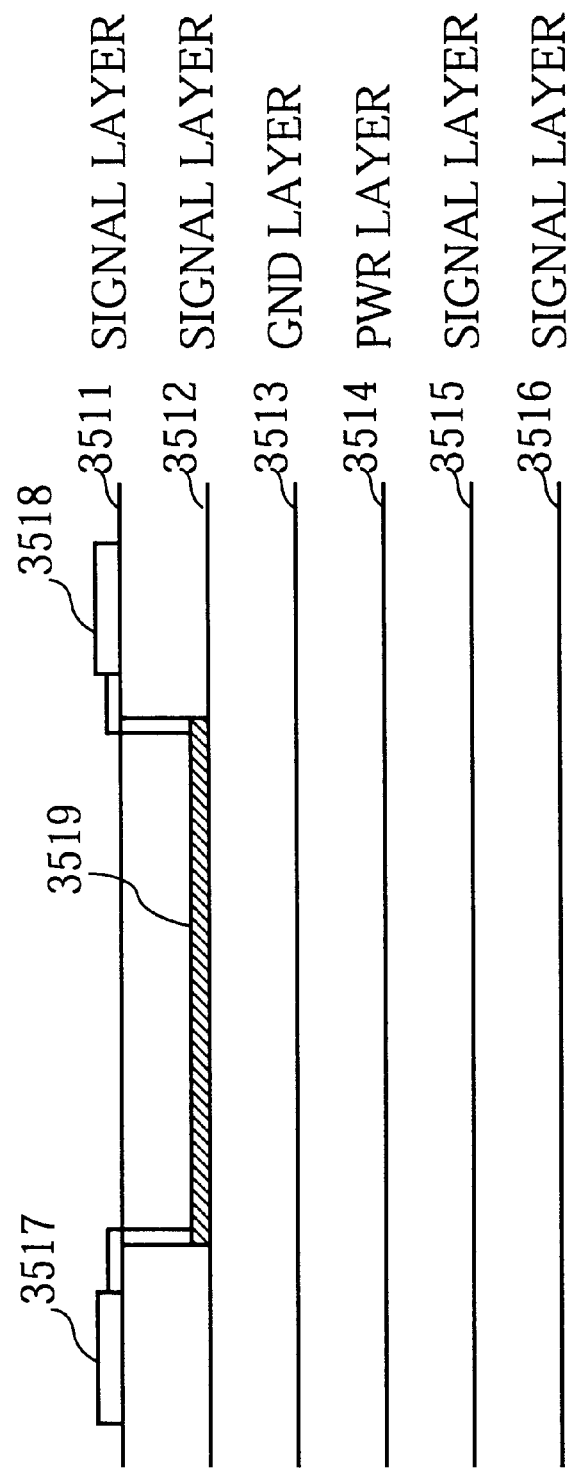
FIG. 39 shows a section view of a circuit board including signal layer 3511 on which components 3517 and 3518 are placed and signal layer 3512 on which conductor 3519 is routed.
Figure 40:
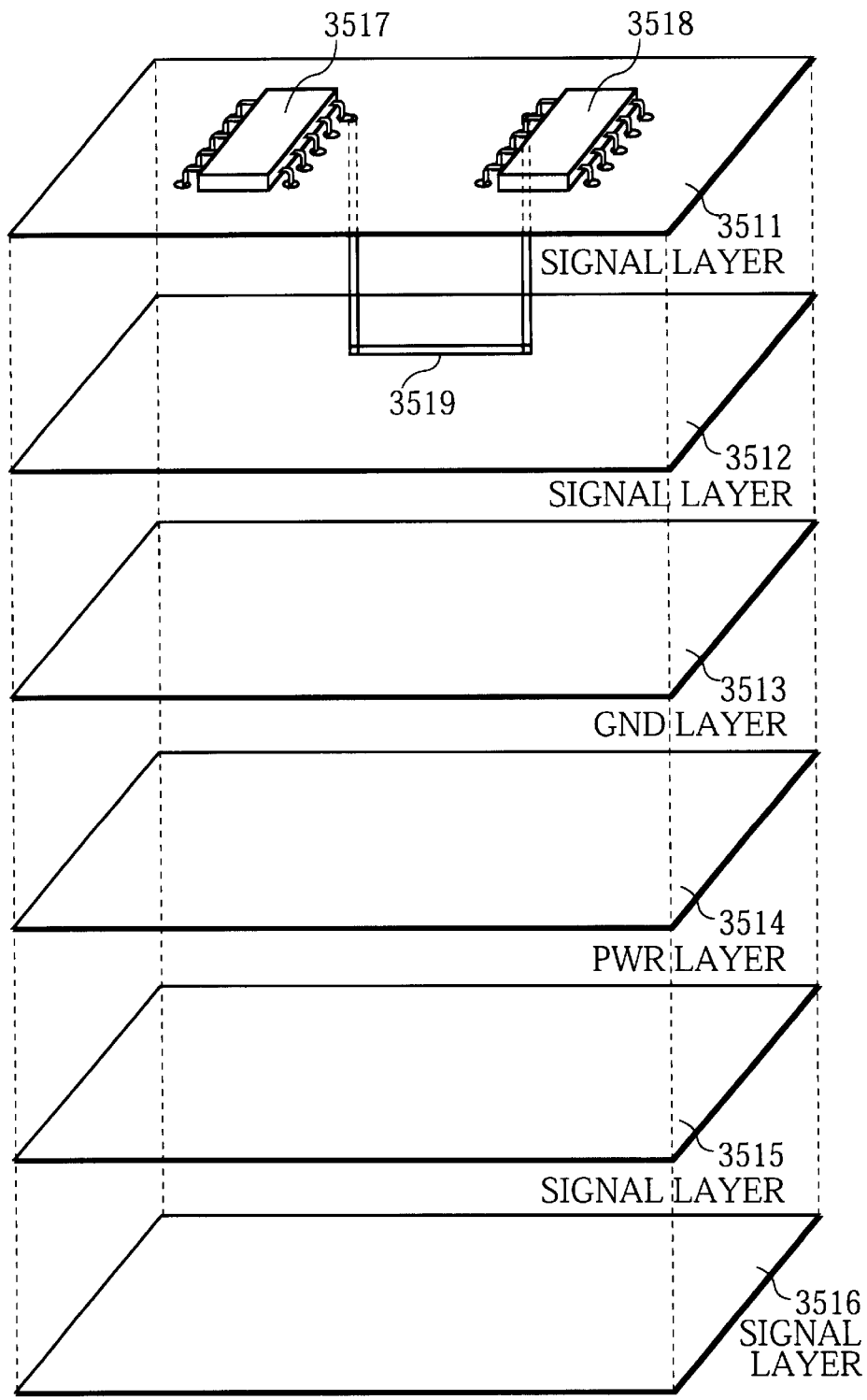
FIG. 40 is a conceptual diagram showing the circuit board including signal layer 3511 on which components 3517 and 3518 are placed and signal layer 3512 on which conductor 3519 is routed.

FIGS. 39 and 40 show a circuit board in which conductor 3519 that connects two components 3517 and 3518 placed on signal layer 3511 is placed on signal layer 3512.

Note that the routing algorithm is a known algorithm and is not explained here.

With the processing described above, a conductor over which a current flows is placed on a signal layer nearest to a power/ground layer on which the current takes a feedback path, so that an area enclosed by a loop formed by the path of the current can be reduced and electromagnetic noise can be suppressed.

(3.1.5) Controlling Unit 3113

The controlling unit 3113 receives a routing priority layer determining command from the input command analyzing unit 1103.

The controlling unit 3113 controls the command inputting unit 1101, the data inputting unit 1102, the input command analyzing unit 1103, the net detecting unit 1104, the component detecting unit 1106, the terminal detecting unit 1107, the power/ground layer detecting unit 1108, the routing priority layer determining unit 3121, the routing unit 3122 and the displaying unit 1112.

The controlling unit 3113 activates the net detecting unit 1104 on receiving a routing priority layer determining command from the input command analyzing unit 1103.

The controlling unit 3113 also reads a set of component terminal interconnection information 1211 from the component terminal interconnection information list 1201. If a critical net 1220 of the read set of component terminal interconnection information 1211 shows "○", the controlling unit 3113 activates the component detecting unit 1106, the terminal detecting unit 1107, the power/ground layer detecting unit 1108, the routing priority layer determining unit 3121 and the routing unit 3122 in succession. The controlling unit 3113 repeats reading of a set of component terminal interconnection information 1211, judgement of the status of a critical net 1220, and activation of the above units until every set of component terminal interconnection information 1211 is read from the component terminal interconnection information list 1201.

(3.2) Operation of CAD Apparatus 3000

The following is a description of the operation of the CAD apparatus 3000.

(3.2.1) Overall Operation of CAD Apparatus 3000

The overall operation of the CAD apparatus 3000 is described below with reference to FIG. 41.

On receiving a routing priority layer determining command from the input command analyzing unit 1103, the controlling unit 3113 activates the net detecting unit 1104 (S1001). The controlling unit 3113 then reads a set of component terminal interconnection information 1211 from the component terminal interconnection information list 1201 (S1002). If every set of component terminal interconnection information 1211 has already been read (S1003), the operation is complete. The controlling unit 3113 judges whether a critical net 1220 of the read set of component terminal interconnection information 1211 shows "○" (S1010). If the condition is met, the controlling unit 3113 extracts the set of component terminal interconnection information 1211 and activates the component detecting unit 1106, the terminal detecting unit 1107, the power/ground layer detecting unit 1108, the routing priority layer determining unit 3121 and the routing unit 3122 in succession (S1005–S1007 and S3001–S3002). The controlling unit 3113 repeats reading of a set of component terminal interconnection information 1211, judgement of the status of a critical net 1220, and activation of the above units until all sets of component terminal interconnection information 1211 are read from the component terminal interconnection information list 1201.

Figure 41:
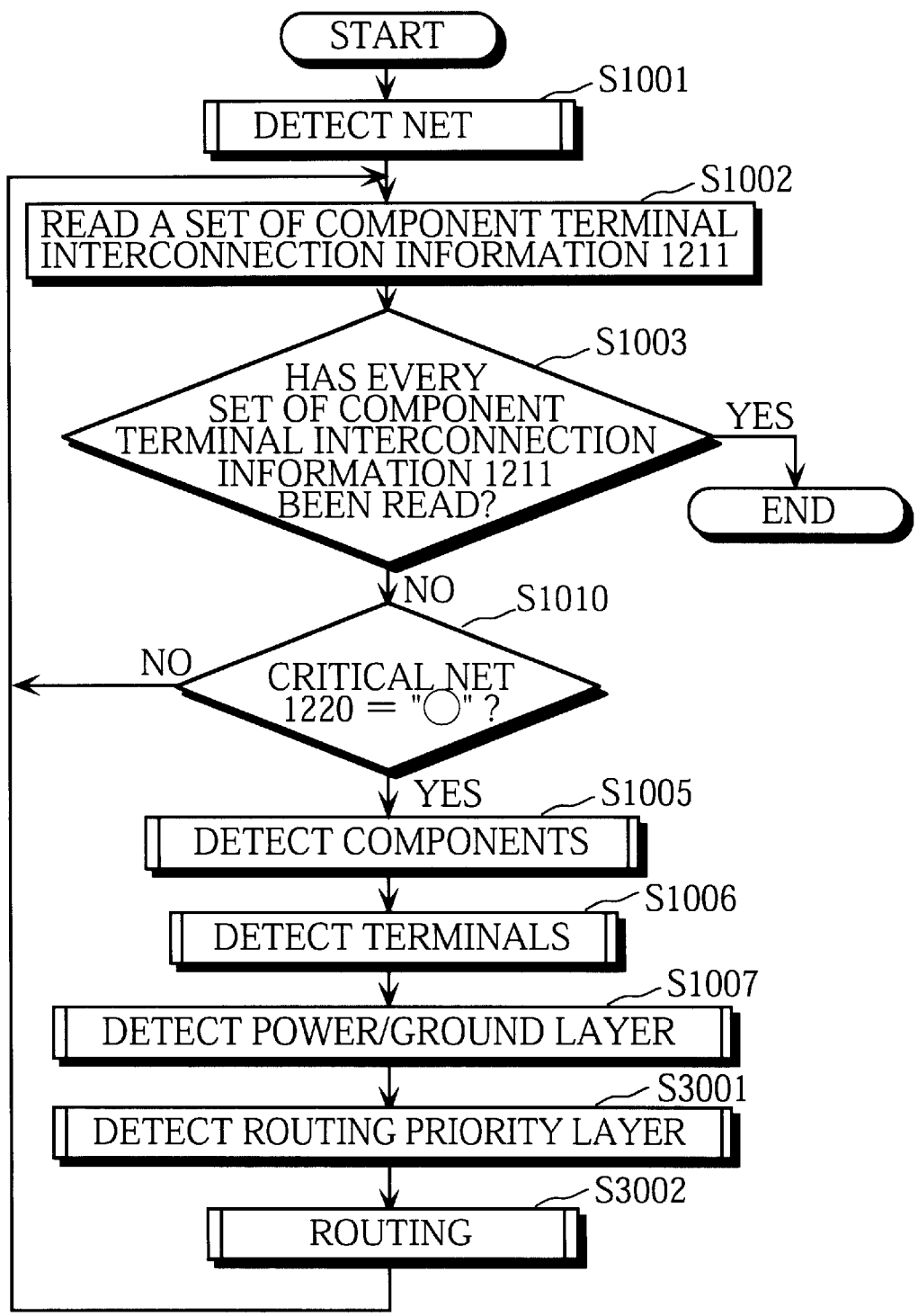
FIG. 41 is a flowchart showing the overall operation of the CAD apparatus 3000.

In FIG. 41, steps which are the same as those in FIG. 12 have been given the same reference numerals and their explanation has been omitted, so that steps S3001 and S3002 will be explained in detail below.

(3.2.2) Operation of Routing Priority Layer Determining Unit 3121

Figure 42:
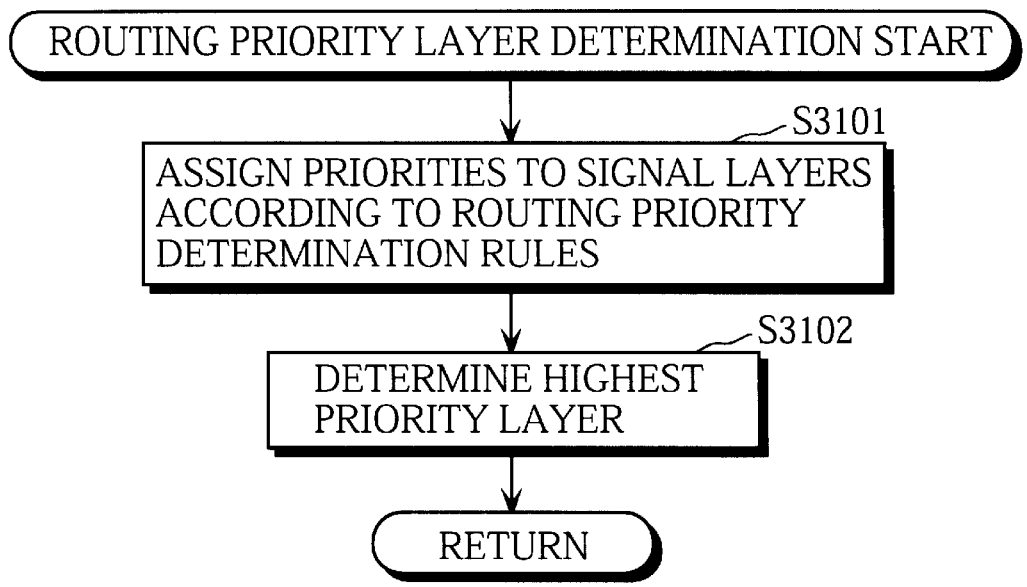
FIG. 42 is a flowchart showing the operation of a routing priority layer determining unit 3121 of the CAD apparatus 3000.

The operation of the routing priority layer determining unit 3121 is explained below with reference to FIG. 42.

The routing priority layer determining unit 3121 assigns priorities to signal layers, among all layers shown in the board constituent list 3201, according to routing priority determination rules (S3101). Thus, the routing priority layer determining unit 3121 determines the highest priority layer for connecting the first and second components detected by the component detecting unit 1106 (S3102).

(3.2.3) Operation of Routing Unit 3122

Figure 43:
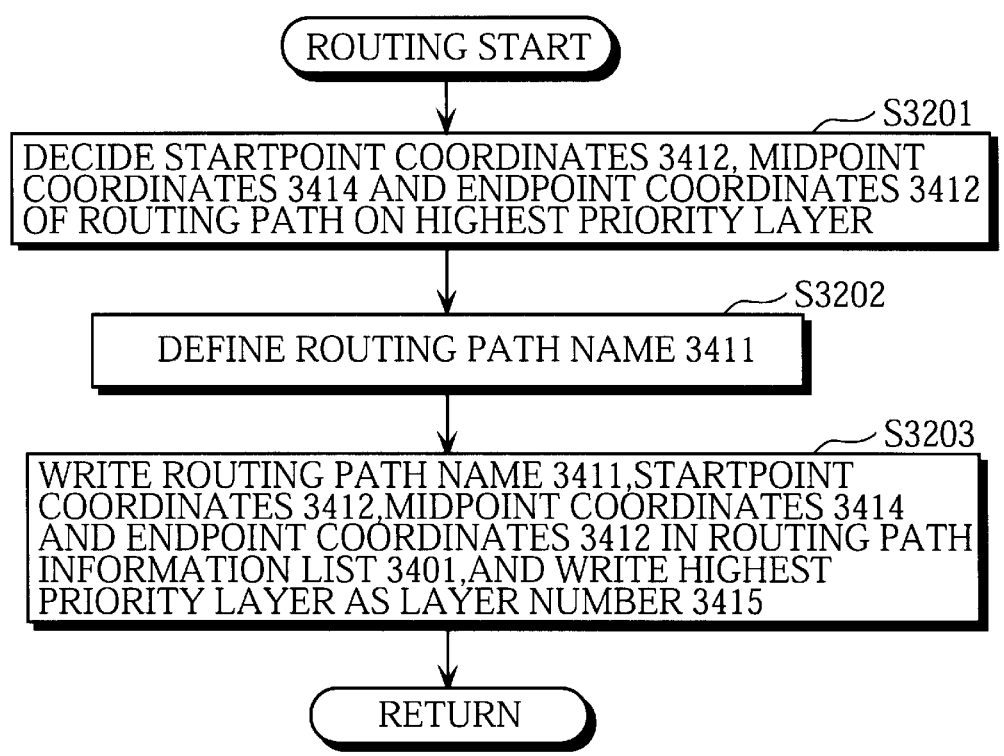
FIG. 43 is a flowchart showing the operation of a routing unit 3122 of the CAD apparatus 3000.

The operation of the routing unit 3122 is explained below with reference to FIG. 43.

The routing unit 3122 decides, on the highest priority layer determined by the routing priority layer determining unit 3121, startpoint coordinates 3412, midpoint coordinates 3414 and endpoint coordinates 3413 of a routing path for connecting the first and second components (S3201) and defines a routing path name 3411 (S3202). The routing unit 3122 then writes the routing path name 3411, the startpoint coordinates 3412, the midpoint coordinates 3414, and the endpoint coordinates 3413 in the routing path information list 3401, as well as writing the highest priority layer number as a layer number 3415 (S3203).

4. Fourth Embodiment

The following is a description of a CAD apparatus 4000 for aiding circuit board design as the fourth embodiment of the present invention, with reference to figures. This description will focus on the differences with the CAD apparatus 1000 of the first embodiment.

(4.1) Construction of CAD Apparatus 4000

Figure 44:
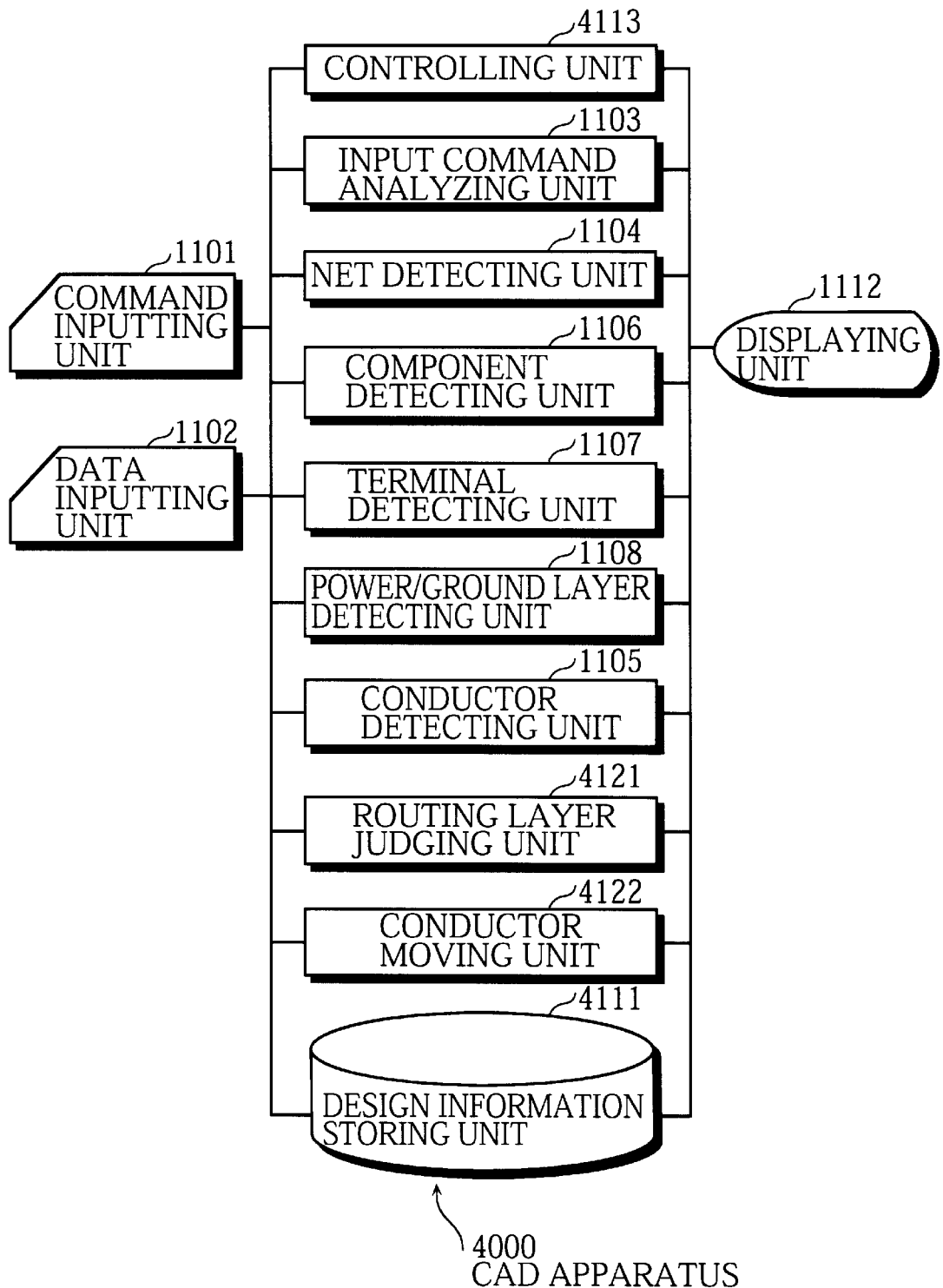
FIG. 44 is a block diagram showing the construction of a CAD apparatus 4000 of the fourth embodiment of the present invention.

As shown in FIG. 44, the CAD apparatus 4000 includes the command inputting unit 1101, the data inputting unit 1102, the input command analyzing unit 1103, the net detecting unit 1104, the component detecting unit 1106, the terminal detecting unit 1107, the power/ground layer detecting unit 1108, the conductor detecting unit 1105, a routing layer judging unit 4121, a conductor moving unit 4122, a design information storing unit 4111, the displaying unit 1112 and a controlling unit 4113.

The CAD apparatus 4000 can be realized in the same way as the CAD apparatus 1000 by executing software that implements the features shown in FIG. 44 on hardware of a computer, such as a workstation shown in FIG. 2.

Note here that construction elements which are same as those in the CAD apparatus 1000 have been given the same reference numerals. Construction elements of the CAD apparatus 4000 which have configurations and functions different from those in the CAD apparatus 1000 will be explained below.

(4.1.1) Input Command Analyzing Unit 1103

A conductor moving command is included in design commands.

The input command analyzing unit 1103 analyzes an input design command. When the input design command is a conductor moving command, the input command analyzing unit 1103 outputs the command to the controlling unit 4113.

(4.1.2) Design Information Storing Unit 4111

The design information storing unit 4111 stores the component terminal interconnection information list 1201, the terminal list 1401, the board constituent list 3201, the conductor information list 1601 and the inter-layer information list 3301 in advance.

The component terminal interconnection information list 1201, the terminal list 1401, the board constituent list 3201 and the inter-layer information list 3301 are the same as those described in the first and third embodiments and their explanation has been omitted here.

<Conductor Information List 1601>

The conductor information list 1601 is the same as that described in the first embodiment and thus is not explained here.

It should be noted that FIG. 45 shows an example of the conductor information list 1601 in which a layer number 1616 of a connection name "net2" has been changed from the first layer to the second layer by the conductor moving unit 4122. Such changes of the conductor information list 1601 will be explained in detail later.

(4.1.3) Routing Layer Judging Unit 4121

The routing layer judging unit 4121 assigns routing priorities to signal layers according to the routing priority determination rules in order to determine the highest priority layer for connecting the first and second components, in the same way as the routing priority layer determining unit 3121 of the third embodiment.

The routing layer judging unit 4121 also judges whether a layer number 1616 of a set of conductor information 1621 detected by the conductor detecting unit 1105 is the highest priority layer, and outputs the judgement result to the controlling unit 4113. If the layer number 1616 is not the highest priority layer and there is a signal layer whose routing priority is higher than the layer number 1616, the routing layer judging unit 4121 outputs the number of the highest priority signal layer to the conductor moving unit 4122.

Figure 46:
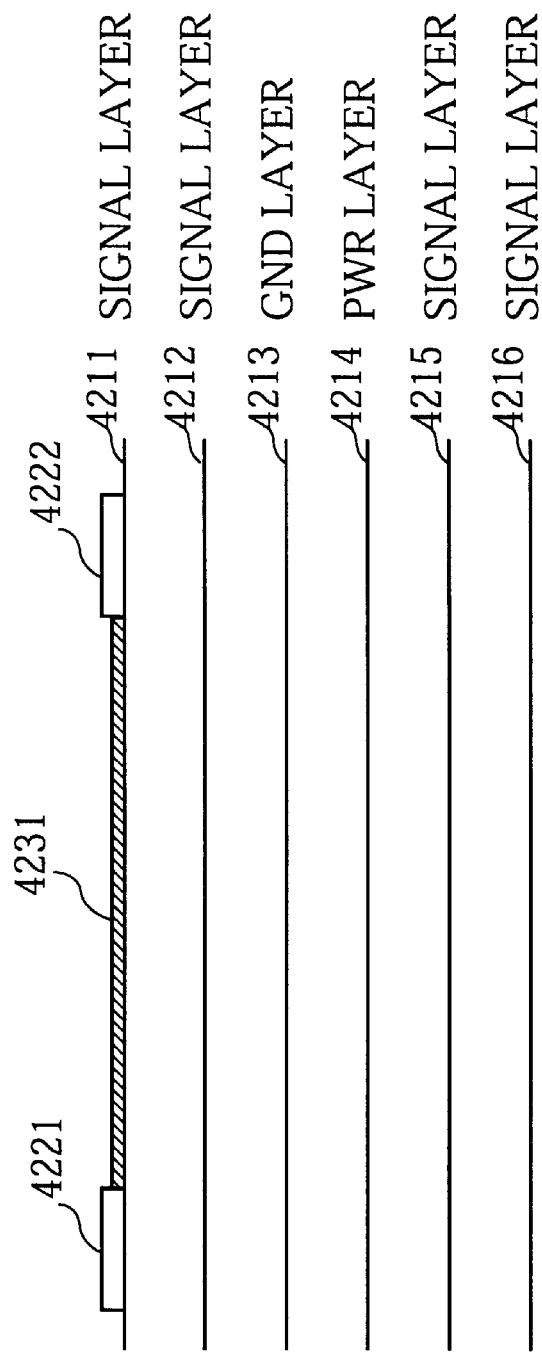
FIG. 46 shows a section view of a circuit board including signal layer 4211 on which components 4221 and 4222 and conductor 4231 are placed.
Figure 47:
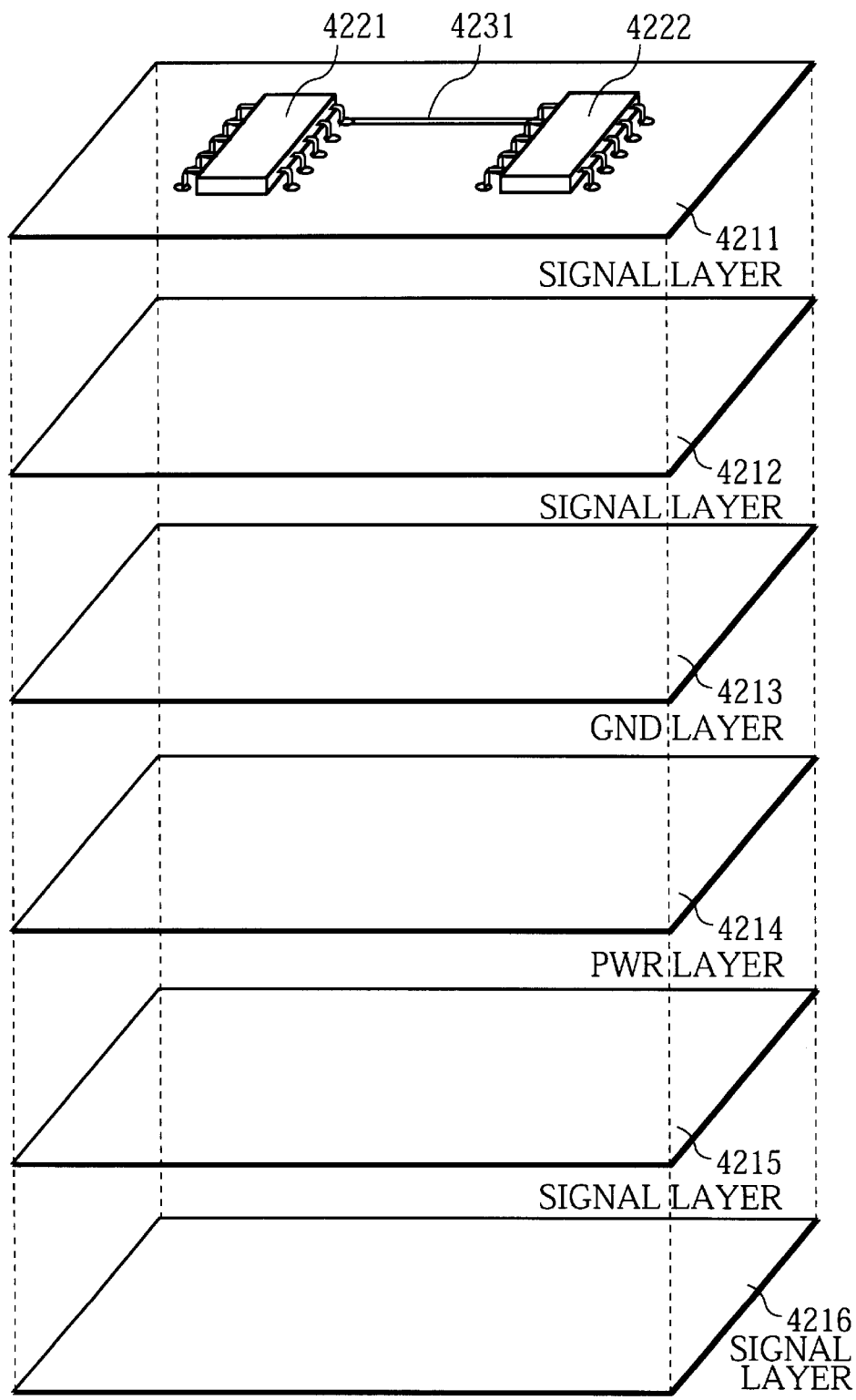
FIG. 47 is a conceptual diagram showing the circuit board including signal layer 4211 on which components 4221 and 4222 and conductor 4231 are placed.

The function of the routing layer judging unit 4121 are explained below with reference to FIGS. 46 and 47. FIG. 46 is a section view of a 6-layer circuit board, while FIG. 47 is a perspective view of the circuit board. In these figures, components 4221 and 4222 are connected by conductor 4231 on signal layer 4211 in the circuit board.

First, the routing layer judging unit 4121 assigns routing priorities to the signal layers according to the routing priority determination rules, same as the priorities shown in FIG. 38A which have been given by the routing priority layer determining unit 3121 of the third embodiment.

The routing layer judging unit 4121 then judges that signal layer 4212 has a higher priority than signal layer 4211 on which conductor 4231 is placed, and accordingly outputs the judgement result to the controlling unit 4113 and the layer number "2" of signal layer 4212 to the conductor moving unit 4122.

A ground or power layer nearest to a signal layer that has been specified as the highest priority layer as described above is referred to as "routing path area".

(4.1.4) Conductor Moving Unit 4122

The conductor moving unit 4122 receives the layer number of the highest priority from the routing layer judging unit 4121 and changes the layer number 1616 of the set of conductor information 1621 detected by the conductor detecting unit 1105 to the received highest priority layer number in the conductor information list 1601.

Figure 48:
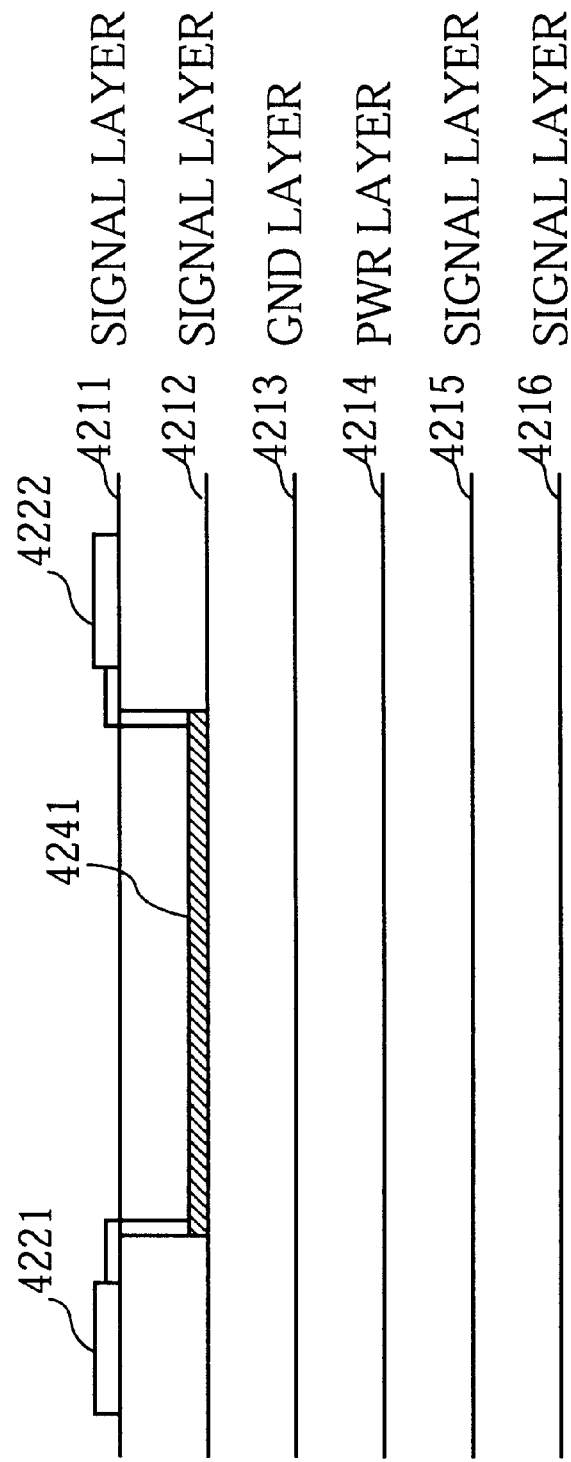
FIG. 48 shows a section view of the circuit board including signal layer 4211 on which components 4221 and 4222 are placed and signal layer 4212 on which conductor 4241 is routed.
Figure 49:
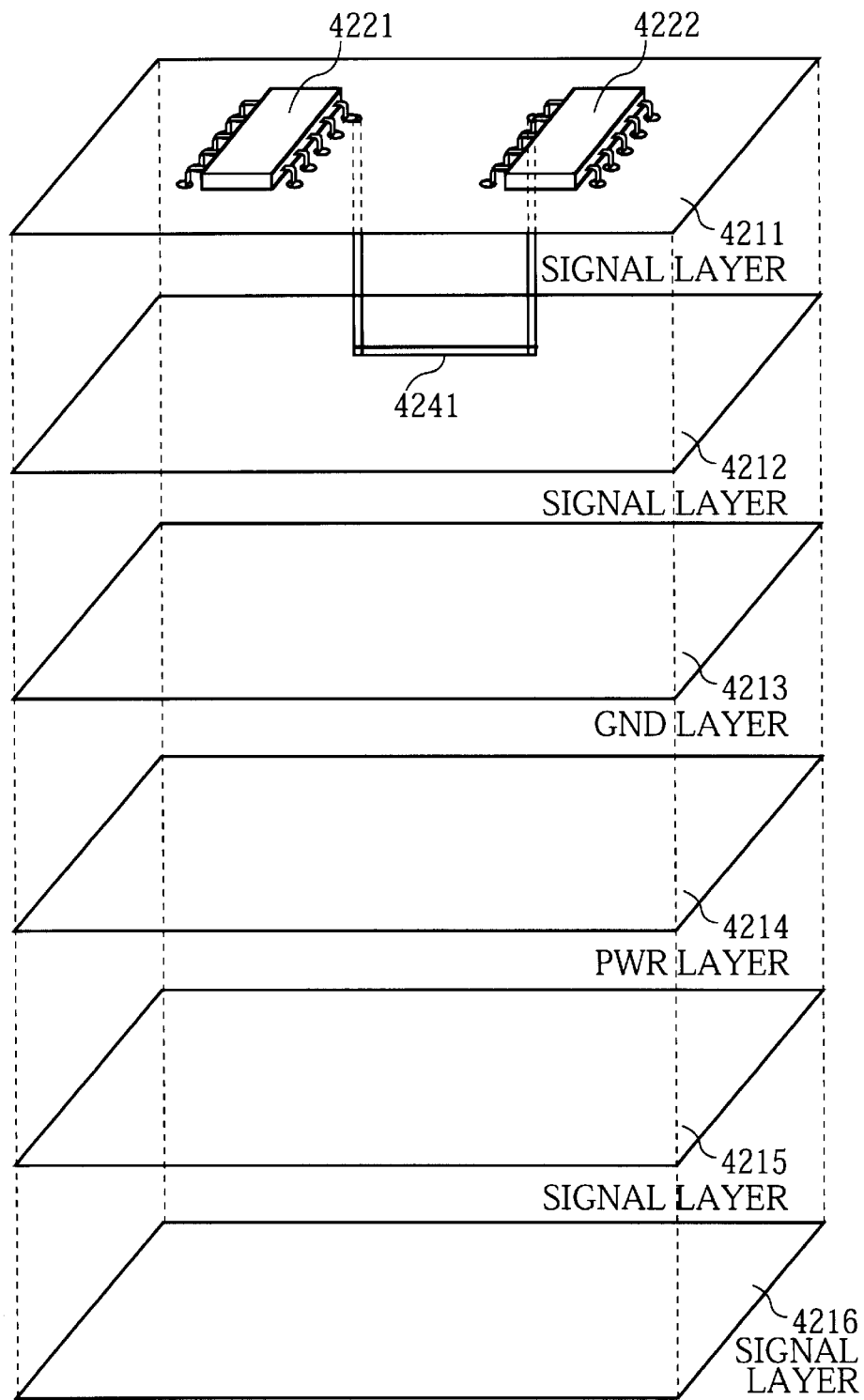
FIG. 49 is a conceptual diagram showing the circuit board including signal layer 4211 on which components 4221 and 4222 are placed and signal layer 4212 on which conductor 4241 is routed.

The function of the conductor moving unit 4122 is explained below with reference to FIG. 45. After a set of conductor information 1621 for the connection name "net2" was detected by the conductor detecting unit 1105, the conductor moving unit 4122 receives the layer number "2" of signal layer 4212 whose priority is higher than signal layer 4211 (layer number "1") from the routing layer judging unit 4121, and accordingly changes the layer number "1" to the layer number "2" in the set of conductor information 1621 and stores the renewed set of conductor information 1621 back into the conductor information list 1601. As a result of this renewal of the conductor information list 1601, the routing path between components 4221 and 4222 is changed so that the two components are connected by conductor 4241 on signal layer 4212, as shown in FIGS. 48 and 49. Here, conductor 4241 is a conductor identified by the connection name "net2" in the conductor information list 1601.

Note that it is preferable to minimize the distance between conductor 4241 and the two components, for instance by placing vias that connect signal layers 4211 and 4212 directly below terminal pads to which the net is to be connected. Also, it is preferable to minimize the length of the net.

With the processing described above, a conductor over which a current flows is placed on a signal layer nearest to a power/ground layer on which the current takes a feedback path, so that an area enclosed by a loop formed by the path of the current can be reduced and electromagnetic noise can be suppressed.

(4.1.5) Controlling Unit 4113

The controlling unit 4113 receives a conductor moving command from the input command analyzing unit 1103.

The controlling unit 4113 controls the command inputting unit 1101, the data inputting unit 1102, the input command analyzing unit 1103, the net detecting unit 1104, the component detecting unit 1106, the terminal detecting unit 1107, the power/ground layer detecting unit 1108, the conductor detecting unit 1105, the routing layer judging unit 4121, the conductor moving unit 4122 and the displaying unit 1112.

The controlling unit 4113 activates the net detecting unit 1104 on receiving a conductor moving command.

The controlling unit 4113 also reads a set of component terminal interconnection information 1211 from the component terminal interconnection information list 1201. If a critical net 1220 of the read set of component terminal interconnection information 1211 shows "◯", the controlling unit 4113 activates the component detecting unit 1106, the terminal detecting unit 1107, the power/ground layer detecting unit 1108, the conductor detecting unit 1105 and the routing layer judging unit 4121 in succession. The controlling unit 4113 repeats reading of a set of component terminal interconnection information 1211, judgement of the status of a critical net 1220, and activation of the above units until every set of component terminal interconnection information 1211 is read from the component terminal interconnection information list 1201.

The controlling unit 4113 also receives a judgement result from the routing layer judging unit 4121. If the judgement result shows that there is a signal layer whose priority is higher than a signal layer on which a conductor detected by the conductor detecting unit 1105 is placed, the controlling unit 4113 activates the conductor moving unit 4122 and subsequently reactivates the routing layer judging unit 4121.

(4.2) Operation of CAD Apparatus 4000

The following is a description of the operation of the CAD apparatus 4000.

(4.2.1) Overall Operation of CAD Apparatus 4000

The overall operation of the CAD apparatus 4000 is explained below with reference to FIG. 50.

On receiving a conductor moving command from the input command analyzing unit 1103, the controlling unit 4113 activates the net detecting unit 1104 (S1001). The controlling unit 4113 then reads a set of component terminal interconnection information 1211 from the component terminal interconnection information list 1201 (S1002). If every set of component terminal interconnection information 1211 has already been read (S1003), the operation is complete. The controlling unit 4113 judges whether a critical net 1220 of the read set of component terminal interconnection information 1211 shows "○" (S1010). If the condition is met, the controlling unit 4113 extracts the set of component terminal interconnection information 1211 and activates the component detecting unit 1106, the terminal detecting unit 1107, the power/ground layer detecting unit 1108, the conductor detecting unit 1105 and the routing layer judging unit 4121 in succession (S1005–S1007, S1004, S4001). When the judgement result of the routing layer judging unit 4121 shows that a layer on which the detected conductor is placed is not the highest priority layer (S4002), the controlling unit 4113 activates the conductor moving unit 4122 (S4003) and returns to step S4001. The controlling unit 4113 repeats reading of a set of component terminal interconnection information 1211, judgement of the status of a critical net 1220, and activation of the above units until all sets of component terminal interconnection information 1211 are read from the component terminal interconnection information list 1201.

Figure 50:
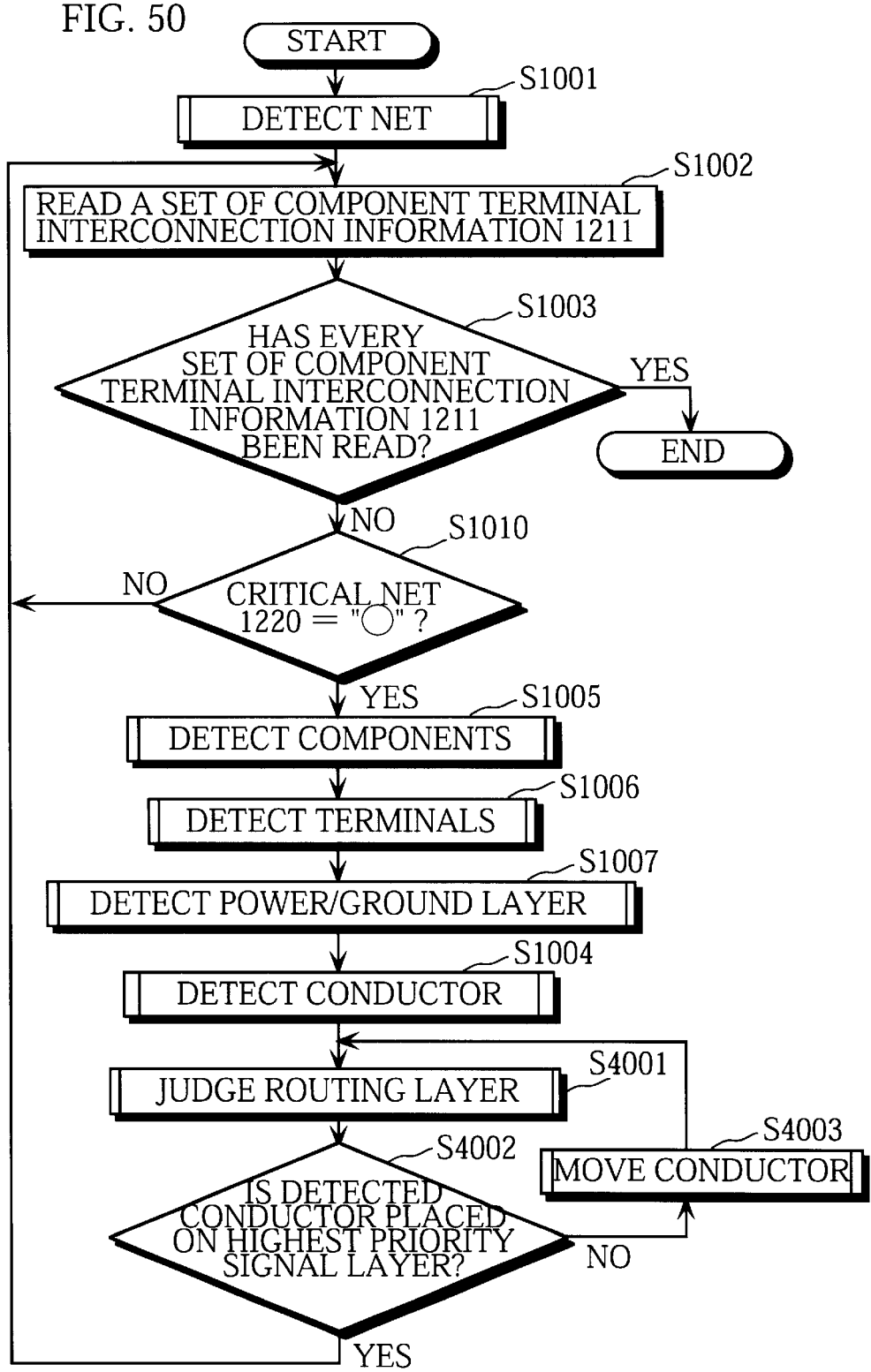
FIG. 50 is a flowchart showing the overall operation of the CAD apparatus 4000.

In FIG. 50, steps which are the same as those in FIG. 12 have been given the same reference numerals and their explanation has been omitted, so that steps S4001 and S4003 will be explained in detail below.

(4.2.2) Operation of Routing Layer Judging Unit 4121

Figure 51:
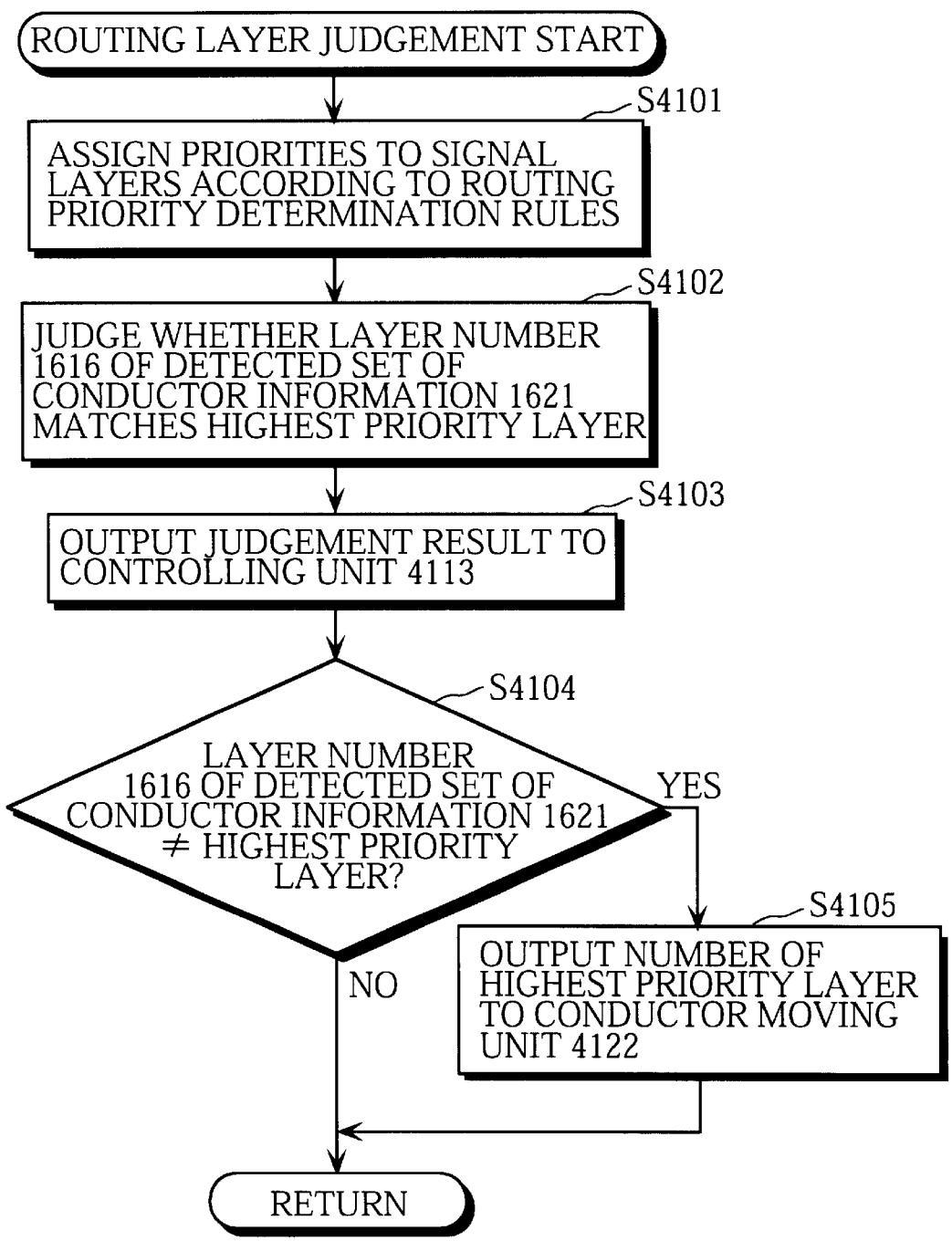
FIG. 51 is a flowchart showing the operation of a routing layer judging unit 4121 of the CAD apparatus 4000.

The operation of the routing layer judging unit 4121 is explained below with reference to FIG. 51.

The routing layer judging unit 4121 assigns priorities to signal layers according to the routing priority determination rules (S4101), judges whether a layer number 1616 of a set of conductor information 1621 detected by the conductor detecting unit 1105 matches the highest priority layer (S4102), and outputs the judgement result to the controlling unit 4113 (S4103). When the layer identified by the layer number 1616 of the detected set of conductor information 1621 is not the highest priority layer (S4104), the routing layer judging unit 4121 outputs the number of the highest priority layer to the conductor moving unit 4122 (S4105).

(4.2.3) Operation of Conductor Moving Unit 4122

Figure 52:
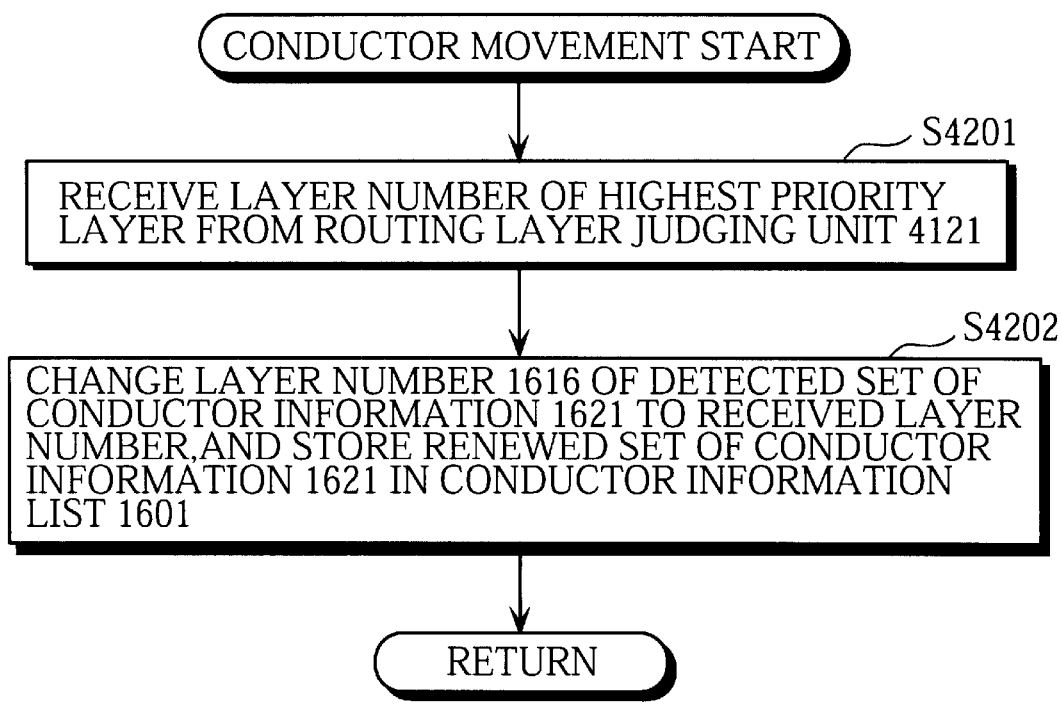
FIG. 52 is a flowchart showing the operation of a conductor moving unit 4122 of the CAD apparatus 4000.

The operation of the conductor moving unit 4122 is explained below with reference to FIG. 52.

The conductor moving unit 4122 receives the layer number of the highest priority layer from the routing layer judging unit 4121 (S4201), changes the content of the layer number 1616 of the detected set of conductor information 1621 to the received layer number, and stores the renewed set of conductor information 1621 in the conductor information list 1601 (S4202).

(4.3) Modifications

When the judgement result of the routing layer judging unit 4121 shows that the layer of the layer number 1616 of the detected set of conductor information 1621 is not the highest priority layer, the judgement result may be displayed so that the designer can decide whether to move the conductor.

5. Fifth Embodiment

The following is a description of a CAD apparatus 5000 for aiding circuit board design as the fifth embodiment of the present invention, with reference to figures. This description will focus on the differences with the CAD apparatus 1000 of the first embodiment.

(5.1) Construction of CAD Apparatus 5000

Figure 53:
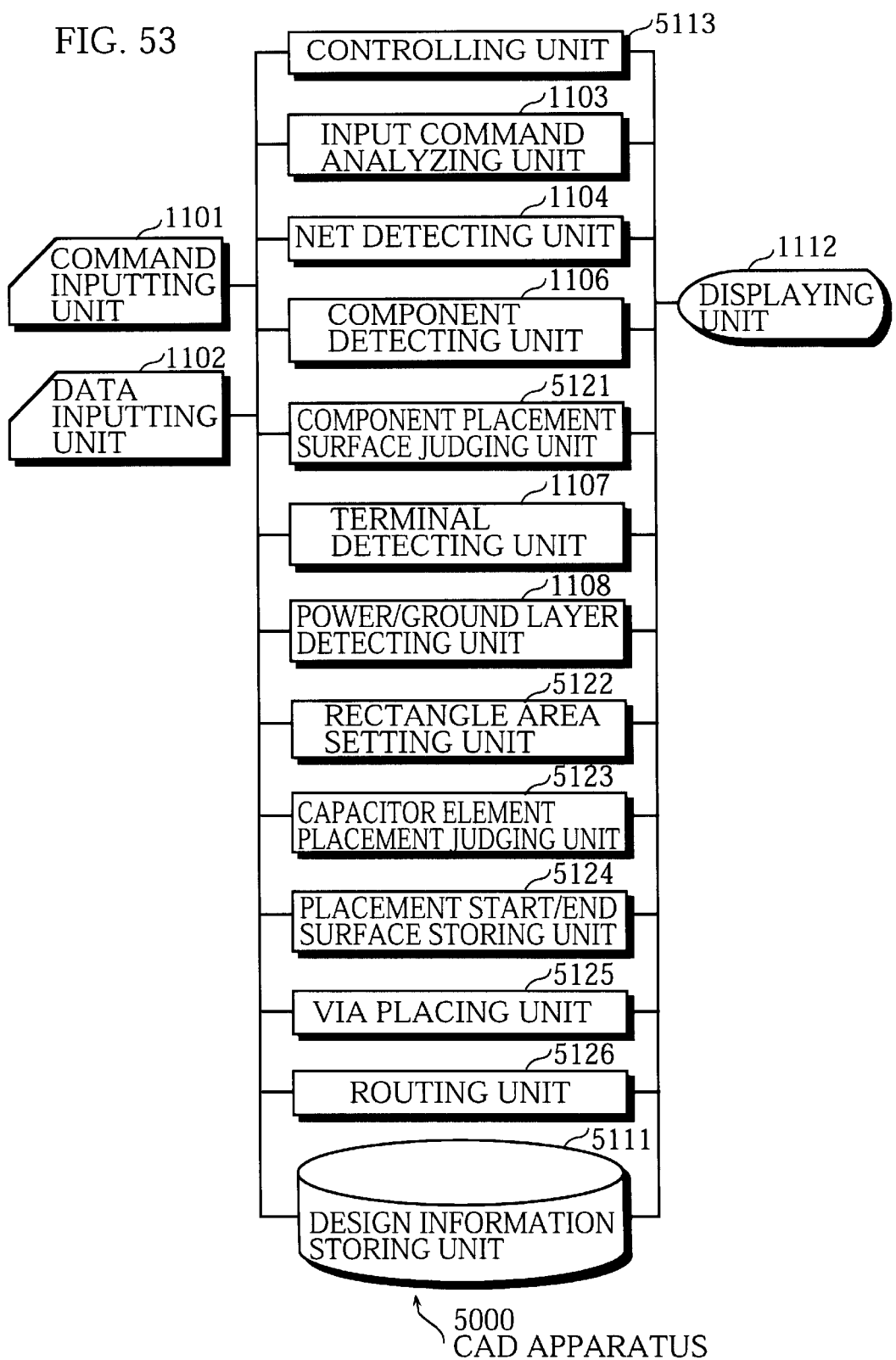
FIG. 53 is a block diagram showing the construction of a CAD apparatus 5000 of the fifth embodiment of the present invention.

As shown in FIG. 53, the CAD apparatus 5000 includes the command inputting unit 1101, the data inputting unit 1102, the input command analyzing unit 1103, the net detecting unit 1104, the component detecting unit 1106, a component placement surface judging unit 5121, the terminal detecting unit 1107, the power/ground layer detecting unit 1108, a rectangle area setting unit 5122, a capacitor element placement judging unit 5123, a placement start/end surface storing unit 5124, a via placing unit 5125, a routing unit 5126, a design information storing unit 5111, the displaying unit 1112 and a controlling unit 5113.

The CAD apparatus 5000 can be realized in the same way as the CAD apparatus 1000 by executing software that implements the features shown in FIG. 53 on hardware of a computer, such as a workstation shown in FIG. 2.

Note here that construction elements which are same as those in the CAD apparatus 1000 have been given the same reference numerals. Construction elements of the CAD apparatus 5000 which have configurations and functions different from those in the CAD apparatus 1000 will be explained below.

(5.1.1) Input Command Analyzing Unit 1103

A via placing command is included in design commands.

The input command analyzing unit 1103 analyzes an input design command. When the input design command is a via placing command, the input command analyzing unit 1103 outputs the command to the controlling unit 5113.

(5.1.2) Design Information Storing Unit 5111

The design information storing unit 5111 stores the component terminal interconnection information list 1201, the terminal list 1401, the conductor information list 1601, the board constituent list 1701, the placement information list 2201, the via connection list 2301, the component name list 2501 and the component number list 2601 in advance.

The design information storing unit 5111 also stores a via coordinate list 5201 generated during design processes.

The component terminal interconnection information list 1201, the terminal list 1401, the conductor information list 1601, the board constituent list 1701, the placement information list 2201, the via connection list 2301, the component name list 2501 and the component number list 2601 are same as those described in the first and second embodiments and their explanation has been omitted here.

<Via Coordinate List 5201>

The via coordinate list 5201 is made up of combinations of layer connecting vias 5211 and via coordinates 5212 as shown in FIG. 54.

A layer connecting via 5211 shows a via that connects two layers and is expressed as "(layer number identifying a layer)-(layer number identifying a layer)".

Via coordinates 5212 shows XY coordinates of a placement position of the via.

(5.1.3) Component Placement Surface Judging Unit 5121

The component placement surface judging unit 5121 retrieves a layer number 2215 that corresponds to a component number 2211 same as the first component number detected by the component detecting unit 1106, from the placement information list 2201 as the first surface. The component placement surface judging unit 5121 also retrieves a layer number 2215 that corresponds to a component number 2211 same as the second component number detected by the component detecting unit 1106, from the placement information list 2201 as the second surface.

The component placement surface judging unit 5121 compares the first surface and the second surface to judge whether they are the same surface, and outputs the judgement result to the controlling unit 5113.

(5.1.4) Rectangle Area Setting Unit 5122

The rectangle area setting unit 5122 retrieves coordinates 2212 and an angle 2213 that correspond to the component number 2211 same as the first component number from the placement information list 2201 as the first coordinates and the first angle.

The rectangle area setting unit 5122 also retrieves a component name 2612 that corresponds to a component number 2611 same as the first component number, from the component number list 2601 as the first component name.

The rectangle area setting unit 5122 further retrieves a number of terminals 2512, a shape 2513, a length 2514 and a width 2515 that correspond to a component name 2511 same as the retrieved first component name, from the component name list 2501 as the first number of terminals, the first shape, the first length and the first width.

The rectangle area setting unit 5122 retrieves the first terminal name of the first component number from connection information 1213 of the set of component terminal interconnection information 1211 extracted by the controlling unit 5113.

The rectangle area setting unit 5122 then calculates coordinates of a terminal identified by the first component number and first terminal name according to a predetermined method for calculating terminal coordinates, through use of the first coordinates, first angle, first number of terminals, first shape, first length, first width and first terminal name.

Figure 55:
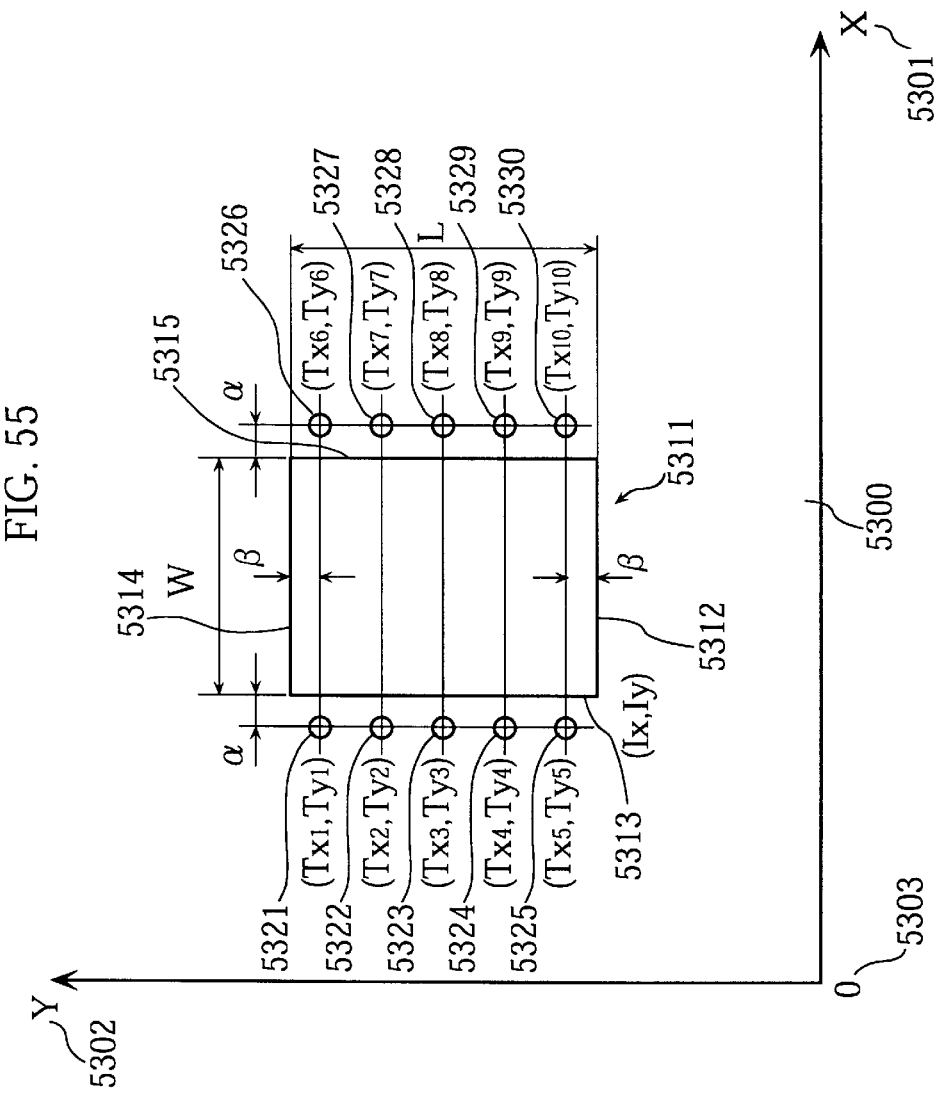
FIG. 55 shows coordinates of each terminal of component 5311 placed on signal layer 5300.

For example, coordinates of each terminal of component 5311 shown in FIG. 55 are calculated as follows.

In the figure, component 5311 is placed on layer 5300 presented in the XY coordinate system, with side 5312 of component 5311 being in parallel with X axis 5301. Terminals 5321–5325 exist on side 5313 of component 5311, while terminals 5326–5330 exist on opposite side 5315 of component 5311.

Coordinates of terminals 5321–5330 $(Tx_1,Ty_1)$–$(Tx_{10},Ty_{10})$ are calculated according to the formulas given below.

When $i=1\sim5$, $Tx_i=Ix-\alpha$ $Ty_i=Iy+L-\beta-(L-2\cdot\beta)\cdot(i-1)/4$

When $i=6\sim10$, $Tx_i=Ix+W+\alpha$ $Ty_i=Iy+L-\beta-(L-2\cdot\beta)\cdot(i-6)/4$ Here, "(Ix,Iy)" represents coordinates of a placement position of component 5311, "α" represents the distance between side 5313 (5315) and each of terminals 5321–5325 (5326–5330), and "β" represents the distance between side 5314 (5312) and a line connecting terminals 5321 and 5326 (5325 and 5330). "W" represents the width of component 5311, and "L" represents the length of component 5311.

While side 5312 of component 5311 is in parallel with X axis 5301 in this example, terminal coordinates can be calculated using a different calculation method when side 5312 forms a predetermined angle with X axis S5301 or when component 5311 has a different shape.

The rectangle area setting unit 5122 stores the obtained coordinates of the first terminal as coordinates of the first vertex of a rectangle area which will be present on both the first and second surfaces.

The rectangle area setting unit 5122 calculates coordinates of the second terminal of the second component detected by the component detecting unit 1106 in the same way as the first terminal of the first component and stores the obtained coordinates as coordinates of the second vertex of the rectangle area.

Figure 56:
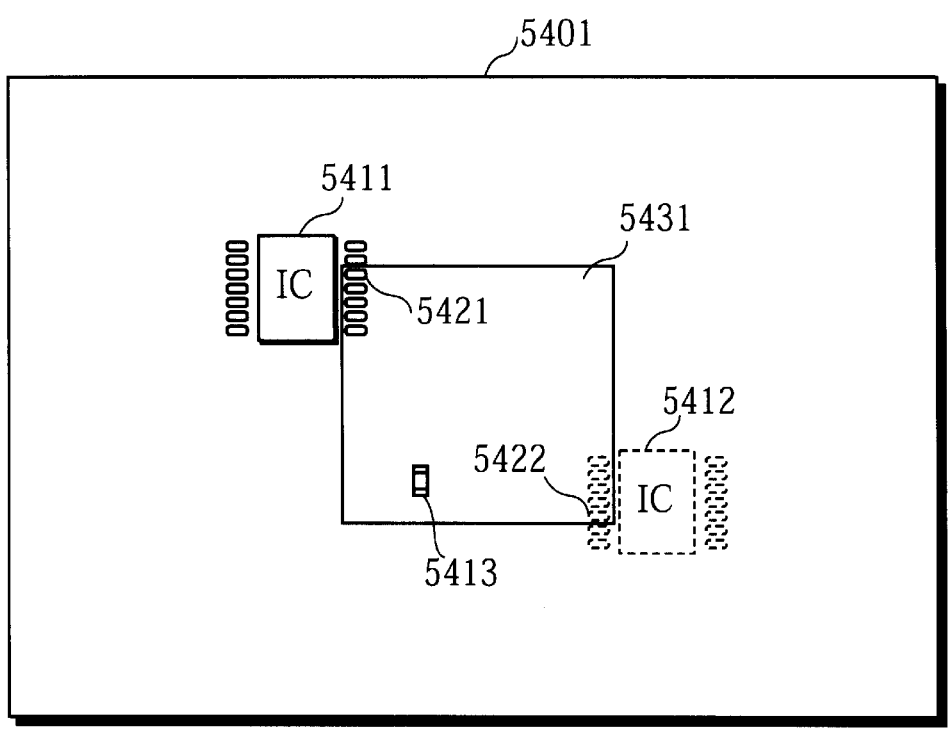
FIG. 56 is a conceptual diagram showing signal layer 5401 on which components 5411 and 5413 are placed.

FIG. 56 shows an example of a multilayer circuit board in which a via has not been placed yet. In this circuit board, signal layer 5401, ground layer 5402, power layer 5403 and signal layer 5404 (5402–5404 are not illustrated) are arranged from top to bottom. Component 5411 and capacitor element 5413 are placed on signal layer 5401, while component 5412 is placed on signal layer 5404. The rectangle area setting unit 5122 generates rectangle area 5431, whose diagonal vertices are coordinates of terminal 5421 of component 5411 and coordinates of terminal 5422 of component 5412, on signal layers 5401 and 5404.

The rectangle area set as such is also referred to as "routing path area".

(5.1.5) Capacitor Element Placement Judging Unit 5123

The capacitor element placement judging unit 5123 reads connection information 1213 from each set of component terminal interconnection information 1211 whose PWR/GND 1218 shows "GND" or "PWR", and reads component numbers one at a time from the read connection information 1213. The capacitor element placement judging unit 5123 retrieves a component name 2612 of a component number 2611 same as the read component number from the component number list 2601, retrieves a type 2516 of a component name 2511 same as the retrieved component name 2612 from the component name list 2501, and, if the retrieved type 2516 is "capacitor element" and the capacitor element is connected to the same power and ground layers as the first component, stores the component number. The capacitor element placement judging unit 5123 repeats the above processing until all component numbers are read from the connection information 1213.

The capacitor element placement judging unit 5123 then reads stored component numbers of capacitor elements one at a time. The capacitor element placement judging unit 5123 retrieves coordinates 2212 of a component number 2211 same as the read component number from the placement information list 2201 and, if the retrieved coordinates are within the rectangle area set by the rectangle area setting unit 5122, stores the component number. The capacitor element placement judging unit 5123 repeats the above processing until all of the stored component numbers of capacitor elements are read.

The capacitor element placement judging unit 5123 then notifies the controlling unit 5113 whether any capacitor elements are present within the rectangle area.

For instance, in the circuit board shown in FIG. 56, the capacitor element placement judging unit 5123 detects and stores capacitor element 5413 which is present in rectangle are 5431 on signal layer 5401.

(5.1.6) Placement Start/End Surface Storing Unit 5124

The placement start/end surface storing unit 5124 retrieves, from the board constituent list 1701, a layer number 1711 of the signal layer on which the first component is placed and which is nearest to the ground/power layer detected by the power/ground layer detecting unit 1108, and stores the retrieved layer number 1711 as the placement start surface.

The placement start/end surface storing unit 5124 similarly retrieves, from the board constituent list 1701, a layer number 1711 of the signal layer on which the second component is placed and which is nearest to the detected ground/power layer, and stores the retrieved layer number 1711 as the placement end surface.

(5.1.7) Via Placing Unit 5125

The via placing unit 5125 retrieves the placement start surface and placement end surface stored by the placement start/end surface storing unit 5124 and extracts, from the via connection list 2301, a layer connecting via 2311 which connects the placement start surface and end surface.

The via placing unit 5125 reads a component number of a capacitor element present on the rectangle area from the capacitor element placement judging unit 5123, retrieves coordinates 2212 of a component number 2211 same as the read component number from the placement information list 2201, and calculates XY coordinates of a via in a signal layer on which the capacitor element is placed, from the retrieved coordinates 2212 as follows.

$X$ coordinate of the via=($X$ coordinate of the coordinates 2212)+$Cx$ $Y$ coordinate of the via=($Y$ coordinate of the coordinates 2212)+$Cy$ Here, "Cx" and "Cy" are constants.

Next, the via placing unit 5125 writes the retrieved layer connecting via 2311 and the calculated via coordinates in the via coordinate list 5201 as a layer connecting via 5211 and via coordinates 5212.

Figure 57:
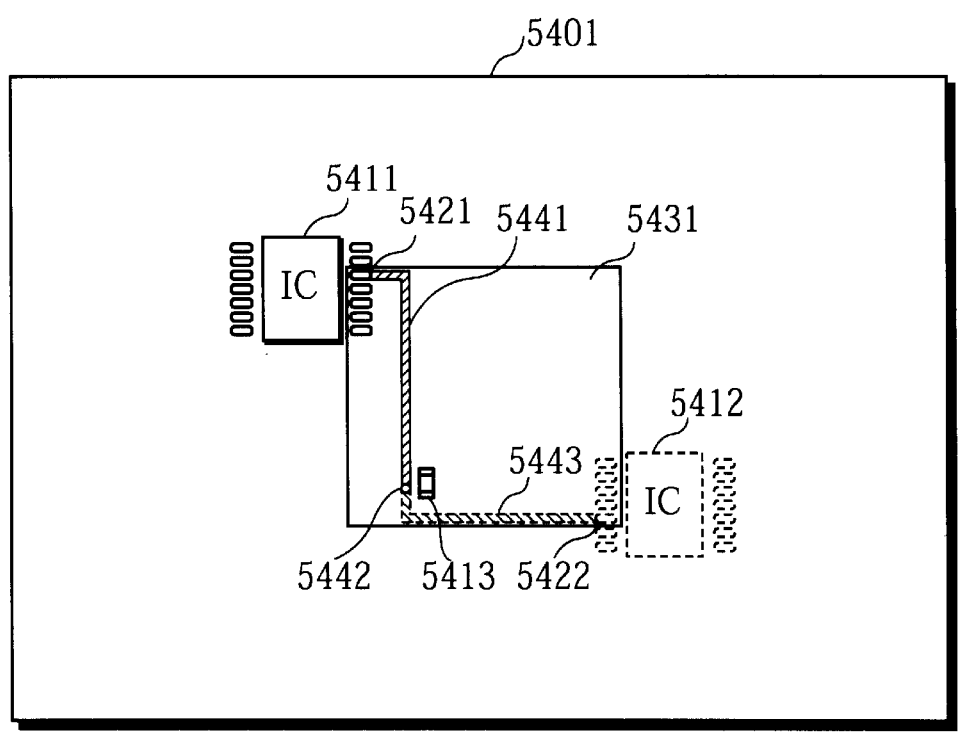
FIG. 57 is a conceptual diagram showing signal layer 5401 on which components 5411 and 5413 and conductor 5441 are placed.
Figure 58:
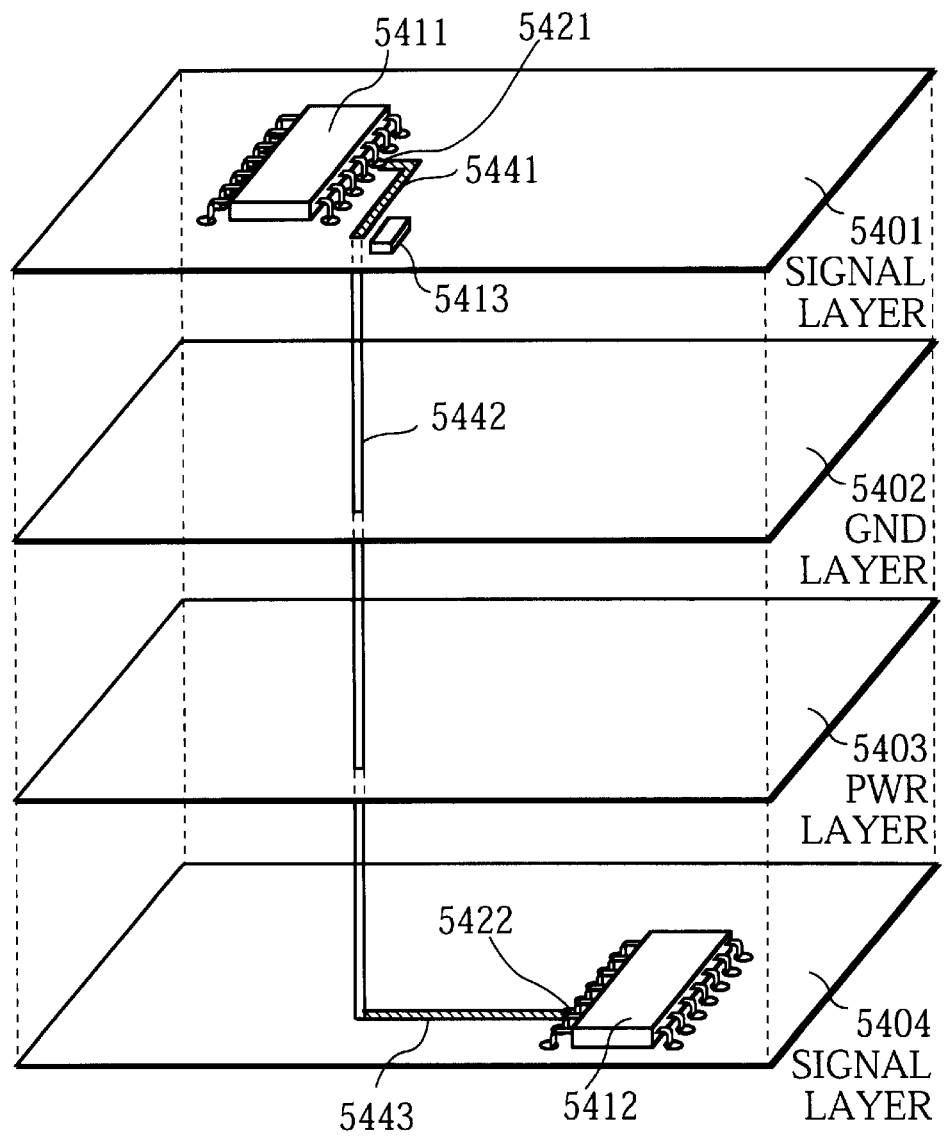
FIG. 58 is a conceptual diagram showing a circuit board including signal layer 5401 on which components 5411 and 5413 and conductor 5441 are placed and signal layer 5404 on which component 5412 and conductor 5443 are placed.

FIGS. 57 and 58 show the state where the via placing unit 5125 has placed via 5442 in the circuit board shown in FIG. 56.

As shown in the figures, via 5442 is placed in the vicinity of capacitor element 5413.

(5.1.8) Routing Unit 5126

The routing unit 5126 writes, in a set of conductor information 1621 in the conductor information list 1601, the coordinates of the first terminal of the first component and the obtained via coordinates respectively as startpoint coordinates 1612 and endpoint coordinates 1613 of a conductor, a predetermined value as a conductor width 1615, the placement start surface as a layer number 1616, and a connection name 1212 of the set of component terminal interconnection information 1211 extracted by the controlling unit 5113 as a connection name 1611.

Similarly, the routing unit 5126 writes, in a set of conductor information 1621 in the conductor information list 1601, the coordinates of the second terminal of the second component and the calculated via coordinates respectively as startpoint coordinates 1612 and endpoint coordinates 1613 of a conductor, the predetermined value as a conductor width 1615, the placement end surface as a layer number 1616, and the connection name 1212 of the extracted set of component terminal interconnection information 1211 as a connection name 1611.

As a result, in FIGS. 57 and 58, conductor 5441 that connects terminal 5421 and via 5442 is placed on signal layer 5401, while conductor 5443 that connects terminal 5422 and via 5442 is placed on signal layer 5404.

With the processing described above, a via is placed in the vicinity of a capacitor element, so that an area enclosed by a loop formed by a current that passes through the capacitor element and the via can be reduced and electromagnetic noise can be suppressed.

(5.1.9) Controlling Unit 5113

The controlling unit 5113 receives a via placing command from the input command analyzing unit 1103.

The controlling unit 5113 controls the command inputting unit 1101, the data inputting unit 1102, the input command analyzing unit 1103, the net detecting unit 1104, the component detecting unit 1106, the component placement surface judging unit 5121, the terminal detecting unit 1107, the power/ground layer detecting unit 1108, the rectangle area setting unit 5122, the capacitor element placement judging unit 5123, the placement start/end surface storing unit 5124, the via placing unit 5125, the routing unit 5126 and the displaying unit 1112.

The controlling unit 5113 activates the net detecting unit 1104 on receiving a via placing command.

The controlling unit 5113 also reads a set of component terminal interconnection information 1211 from the component terminal interconnection information list 1201. If a critical net 1220 of the read set of component terminal interconnection information 1211 shows "○", the controlling unit 5113 activates the component detecting unit 1106, the component placement surface judging unit 5121, the terminal detecting unit 1107, the power/ground layer detecting unit 1108, the rectangle area setting unit 5122, the capacitor element placement judging unit 5123, the placement start/end surface storing unit 5124, the via placing unit 5125 and the routing unit 5126 in succession. The controlling unit 5113 repeats reading of a set of component terminal interconnection information 1211, judgement of the status of a critical net 1220, and activation of the above units until every set of component terminal interconnection information 1211 is read from the component terminal interconnection information list 1201.

Here, if a judgement result received from the component placement surface judging unit 5121 shows that the first and second components are placed on the same signal layer, the controlling unit 5113 will not activate the terminal detecting unit 1107, the power/ground layer detecting unit 1108, the rectangle area setting unit 5122, the capacitor element placement judging unit 5123, the placement start/end surface storing unit 5124, the via placing unit 5125 and the routing unit 5126.

Also, if a notification received from the capacitor element placement judging unit 5123 shows that capacitor elements are not present on the rectangle area, the controlling unit 5113 will not activate the placement start/end surface storing unit 5124, the via placing unit 5125 and the routing unit 5126.

(5.2) Operation of CAD Apparatus 5000

The following is a description of the operation of the CAD apparatus 5000.

(5.2.1) Overall Operation of CAD Apparatus 5000

The overall operation of the CAD apparatus 5000 is explained below with reference to FIG. 59.

On receiving a via placing command from the input command analyzing unit 1103, the controlling unit 5113 activates the net detecting unit 1104 (S1001). The controlling unit 5113 then reads a set of component terminal interconnection information 1211 from the component terminal interconnection information list 1201 (S1002). If every set of component terminal interconnection information 1211 has already been read (S1003), the operation is complete. The controlling unit 5113 judges whether a critical net 1220 of the read set of component terminal interconnection information 1211 shows "○" (S1010) If the condition is met, the controlling unit 5113 extracts the set of component terminal interconnection information 1211 and activates the component detecting unit 1106, the component placement surface judging unit 5121, the terminal detecting unit 1107, the power/ground layer detecting unit 1108, the rectangle area setting unit 5122, the capacitor element placement judging unit 5123, the placement start/end surface storing unit 5124, the via placing unit 5125 and the routing unit 5126 in succession (S1005, S5001, S1006–S1007, S5002–S5006).

Here, when the judgement result sent from the component placement surface judging unit 5121 shows that the first and second components are placed on the same signal layer (S5011), the controlling unit 5113 returns to step S1002 without activating the terminal detecting unit 1107, the power/ground layer detecting unit 1108, the rectangle area setting unit 5122, the capacitor element placement judging unit 5123, the placement start/end surface storing unit 5124, the via placing unit 5125 and the routing unit 5126.

Also, when notified from the capacitor element placement judging unit 5123 that no capacitor element is present within the rectangle area (S5012), the controlling unit 5113 returns to step S1002 without activating the placement start/end surface storing unit 5124, the via placing unit 5125 and the routing unit 5126.

Figure 59:
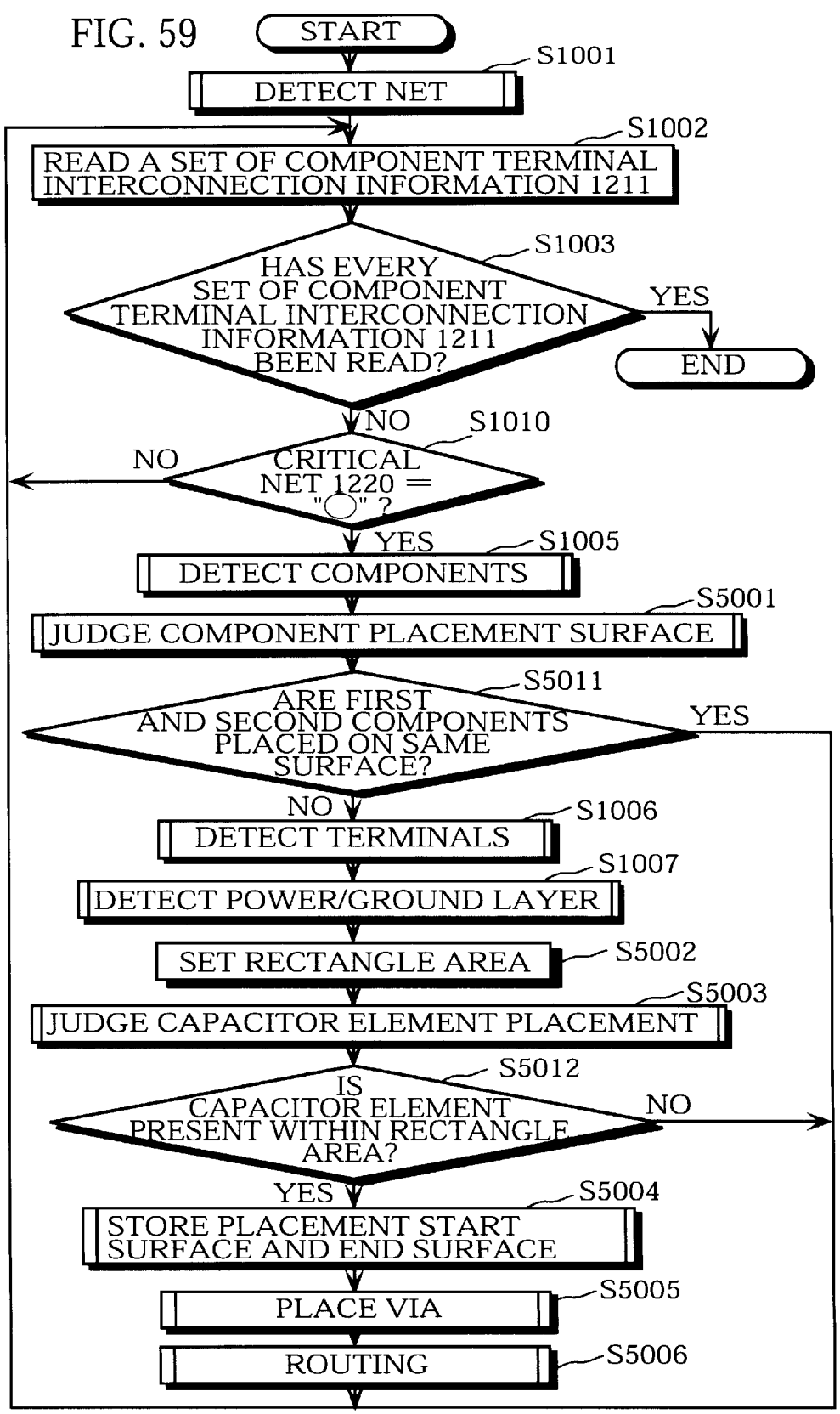
FIG. 59 is a flowchart showing the overall operation of the CAD apparatus 5000.

In FIG. 59, steps which are the same as those in FIG. 12 have been given the same reference numerals and their explanation has been omitted, so that steps S5001–S5006 will be explained in detail below.

(5.2.2) Operation of Component Placement Surface Judging Unit 5121

Figure 60:
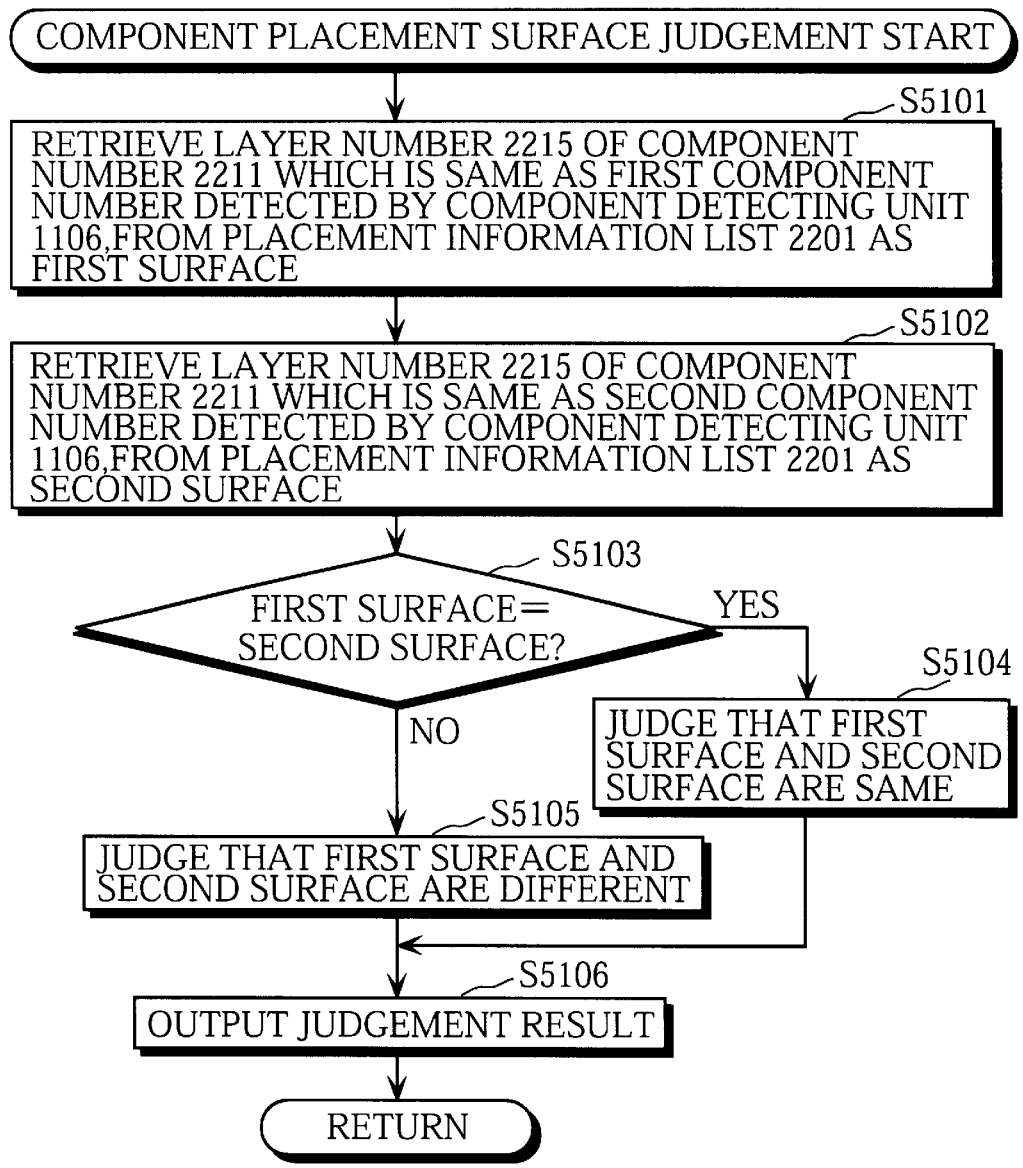
FIG. 60 is a flowchart showing the operation of a component placement surface judging unit 5121 of the CAD apparatus 5000.
Figure 61:
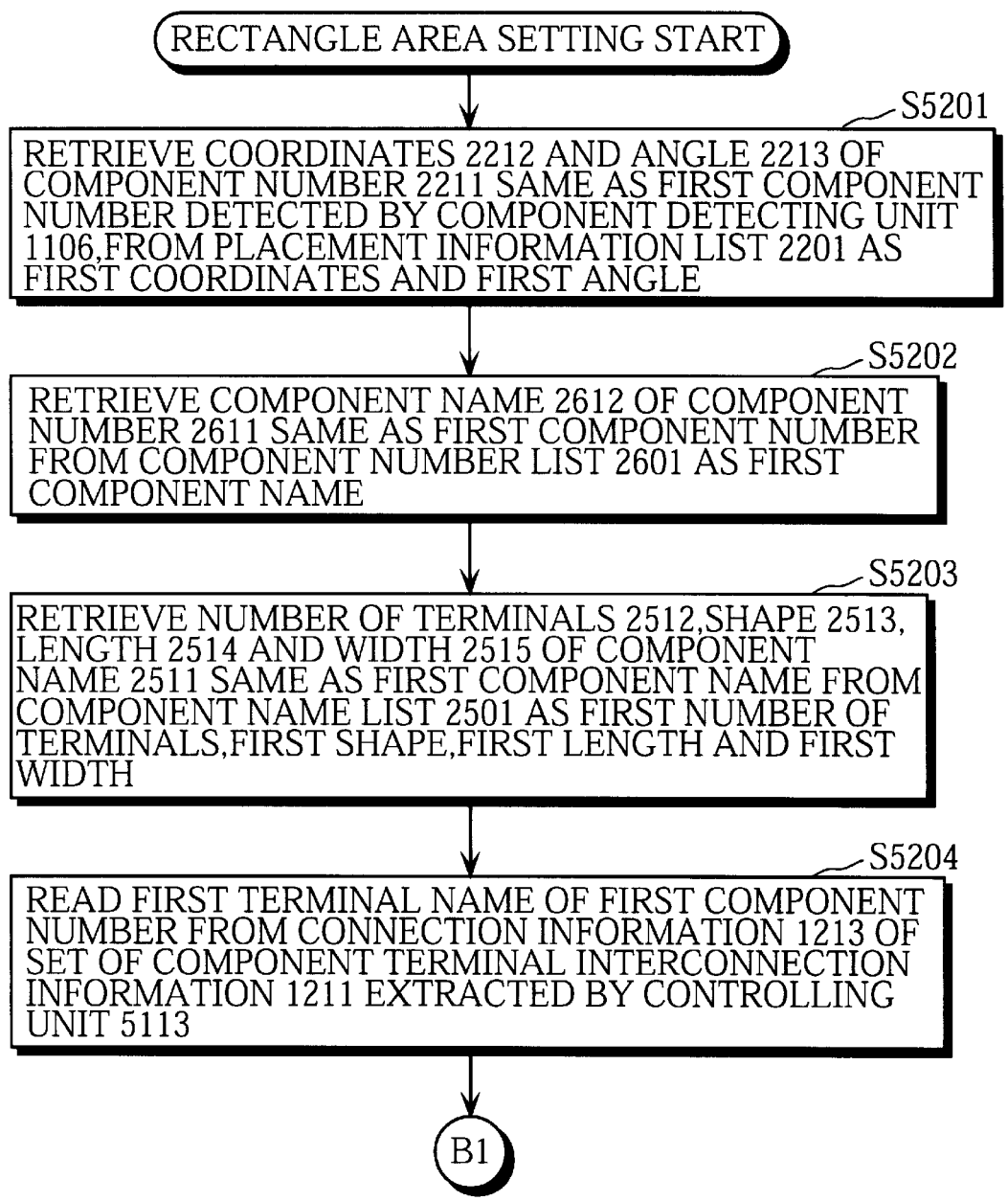
FIG. 61 is a partial flowchart showing the operation of a rectangle area setting unit 5122 of the CAD apparatus 5000.
Figure 62:
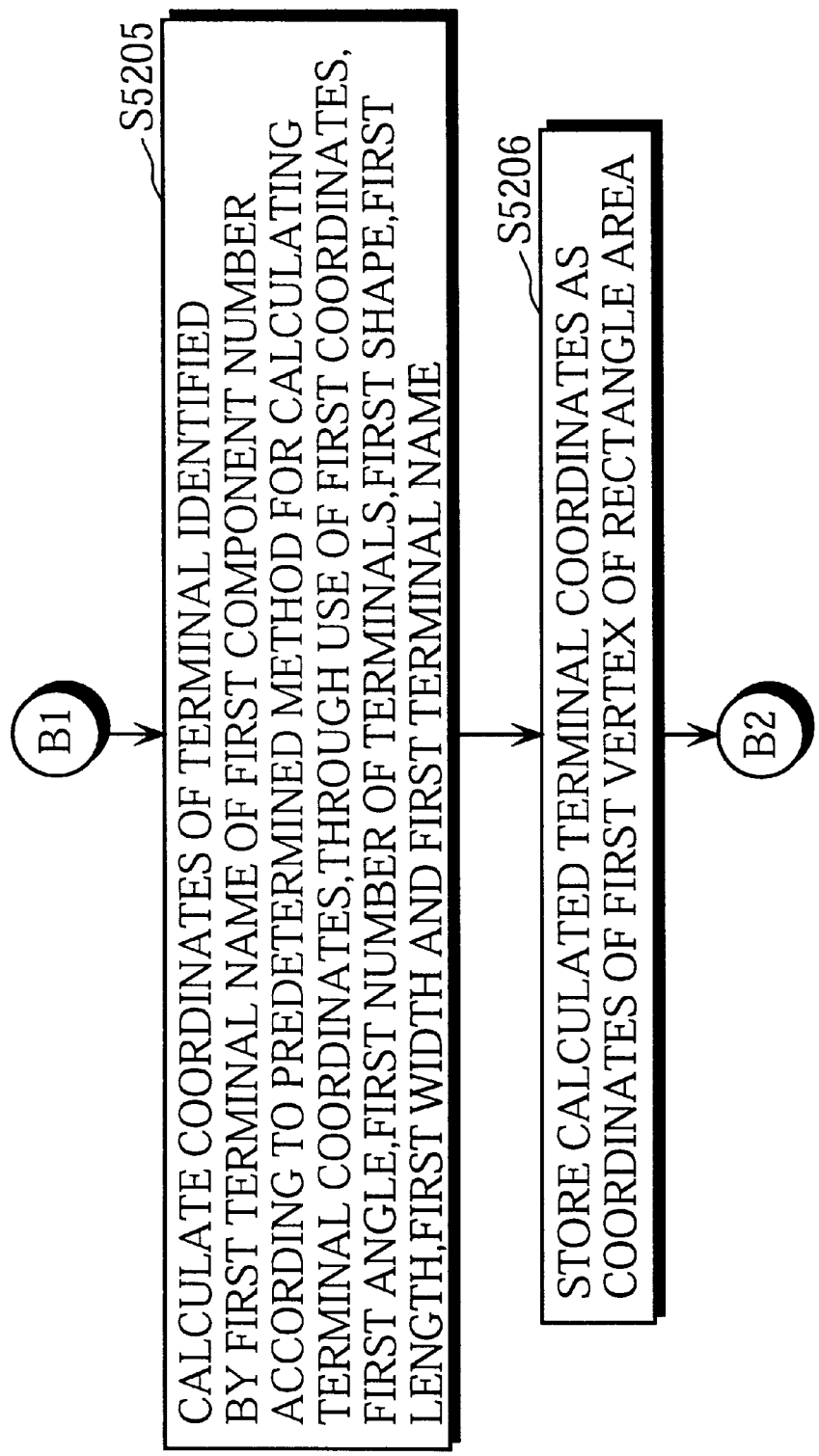
FIG. 62 is a partial flowchart showing the operation of the rectangle area setting unit 5122.
Figure 63:
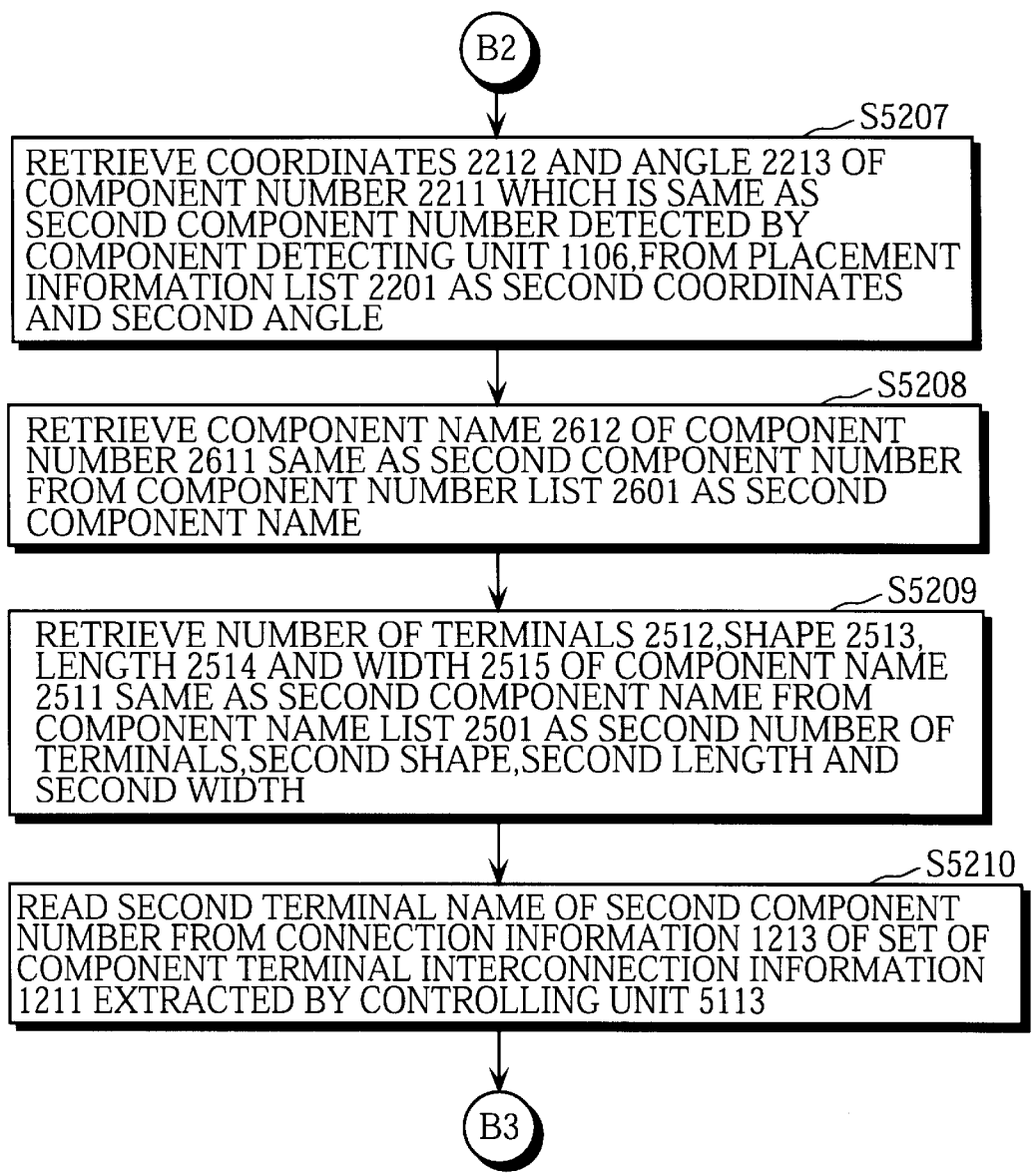
FIG. 63 is a partial flowchart showing the operation of the rectangle area setting unit 5122.
Figure 64:
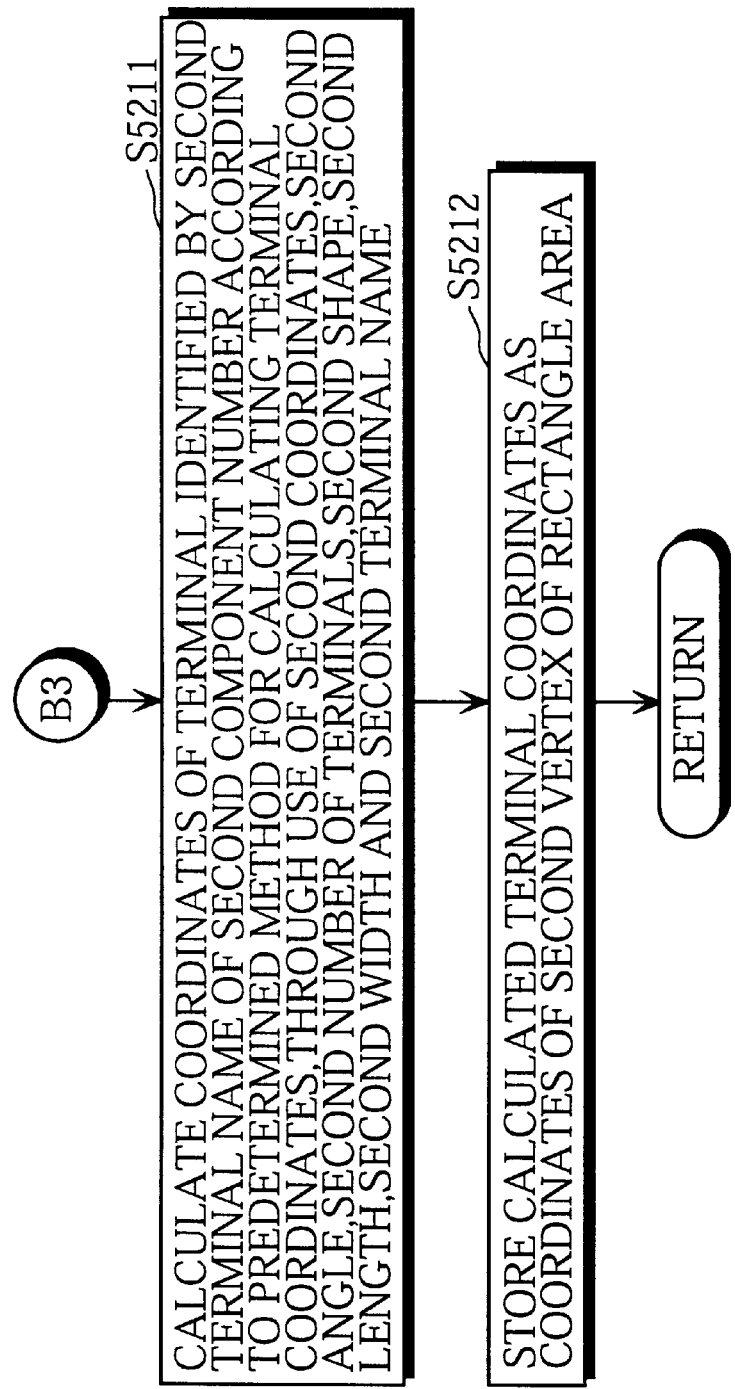
FIG. 64 is a partial flowchart showing the operation of the rectangle area setting unit 5122.

The operation of the component placement surface judging unit 5121 is explained below with reference to FIG. 60.

The component placement surface judging unit 5121 retrieves a layer number 2215 of a component number 2211 same as the first component number detected by the component detecting unit 1106, from the placement information list 2201 as the first surface (S5101). The component placement surface judging unit 5121 similarly retrieves a layer number 2215 of a component number 2211 same as the second component number detected by the component detecting unit 1106, from the placement information list 2201 as the second surface (S5102).

The component placement surface judging unit 5121 then compares the first surface and the second surface (S5103) to judge whether the first surface and the second surface are the same or not (S5104 or S5105), and outputs the judgement result to the controlling unit 5113 (S5106).

(5.2.3) Operation of Rectangle Area Setting Unit 5122

The operation of the rectangle area setting unit 5122 is explained below with reference to FIGS. 61–64.

The rectangle area setting unit 5122 retrieves coordinates 2212 and angle 2213 of a component number 2211 same as the first component number detected by the component detecting unit 1106, from the placement information list 2201 as the first coordinates and the first angle (S5201). The rectangle area setting unit 5122 also retrieves a component name 2612 of a component number 2611 same as the first component number from the component number list 2601 as the first component name (S5202). The rectangle area setting unit 5122 further retrieves a number of terminals 2512, shape 2513, length 2514 and width 2515 of a component name 2511 same as the first component name from the component name list 2501 as the first number of terminals, the first shape, the first length and the first width (S5203) The rectangle area setting unit 5122 then reads the first terminal name of the first component number from connection information 1213 of the set of component terminal interconnection information 1211 extracted by the controlling unit 5113 (S5204). The rectangle area setting unit 5122 calculates coordinates of a terminal identified by the first terminal name of the first component number according to a predetermined terminal coordinate calculation method, through use of the first coordinates, first angle, first number of terminals, first shape, first length, first width and first terminal name (S5205). The rectangle area setting unit 5122 stores such calculated terminal coordinates as coordinates of the first vertex of a rectangle area (S5206).

Next, the rectangle area setting unit 5122 retrieves coordinates 2212 and angle 2213 of a component number 2211 same as the second component number detected by the component detecting unit 1106, from the placement information list 2201 as the second coordinates and the second angle (S5207). The rectangle area setting unit 5122 also retrieves a component name 2612 of a component number 2611 same as the second component number from the component number list 2601 as the second component name (S5208). The rectangle area setting unit 5122 further retrieves a number of terminals 2512, shape 2513, length 2514 and width 2515 of a component name 2511 same as the second component name from the component name list 2501 as the second number of terminals, the second shape, the second length and the second width (S5209). The rectangle area setting unit 5122 then reads the second terminal name of the second component number from the connection information 1213 of the extracted set of component terminal interconnection information 1211 (S5210). The rectangle area setting unit 5122 calculates coordinates of a terminal identified by the second terminal name of the second component number according to the predetermined terminal coordinate calculation method, through use of the second coordinates, second angle, second number of terminals, second shape, second length, second width and second terminal name (S5211). The rectangle area setting unit 5122 stores such calculated terminal coordinates as coordinates of the second vertex of the rectangle area (S5212).

(5.2.4) Operation of Capacitor Element Placement Judging Unit 5123

Figure 65:
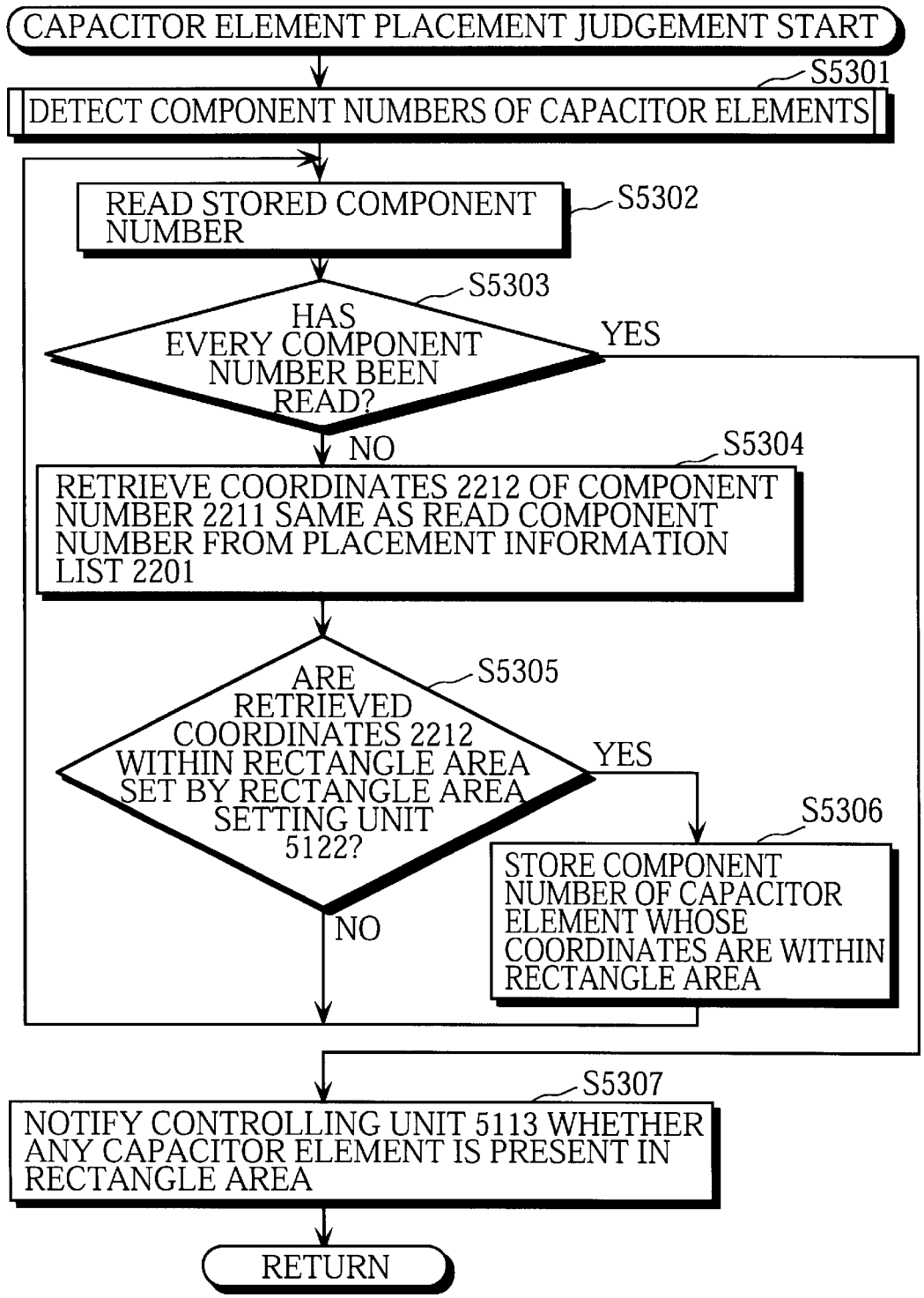
FIG. 65 is a flowchart showing the operation of a capacitor element placement judging unit 5123 of the CAD apparatus 5000.

The operation of the capacitor element placement judging unit 5123 is explained below with reference to FIG. 65.

The capacitor element placement judging unit 5123 detects and stores component numbers of capacitor elements (S5301). The capacitor element placement judging unit 5123 then reads one stored component number at a time (S5302). If every stored component number has already been read (S5303), the capacitor element placement judging unit 5123 proceeds to step S5307. The capacitor element placement judging unit 5123 retrieves coordinates 2212 of a component number 2211 same as the read component number from the placement information list 2201 (S5304). When the retrieved coordinates 2212 exist within the rectangle area set by the rectangle area setting unit 5122 (S5305), the capacitor element placement judging unit 5123 stores the read component number (S5306). On reading all of the stored component numbers, the capacitor element placement judging unit 5123 notifies the controlling unit 5113 whether a capacitor element is present within the rectangle area (S5307).

Figure 66:
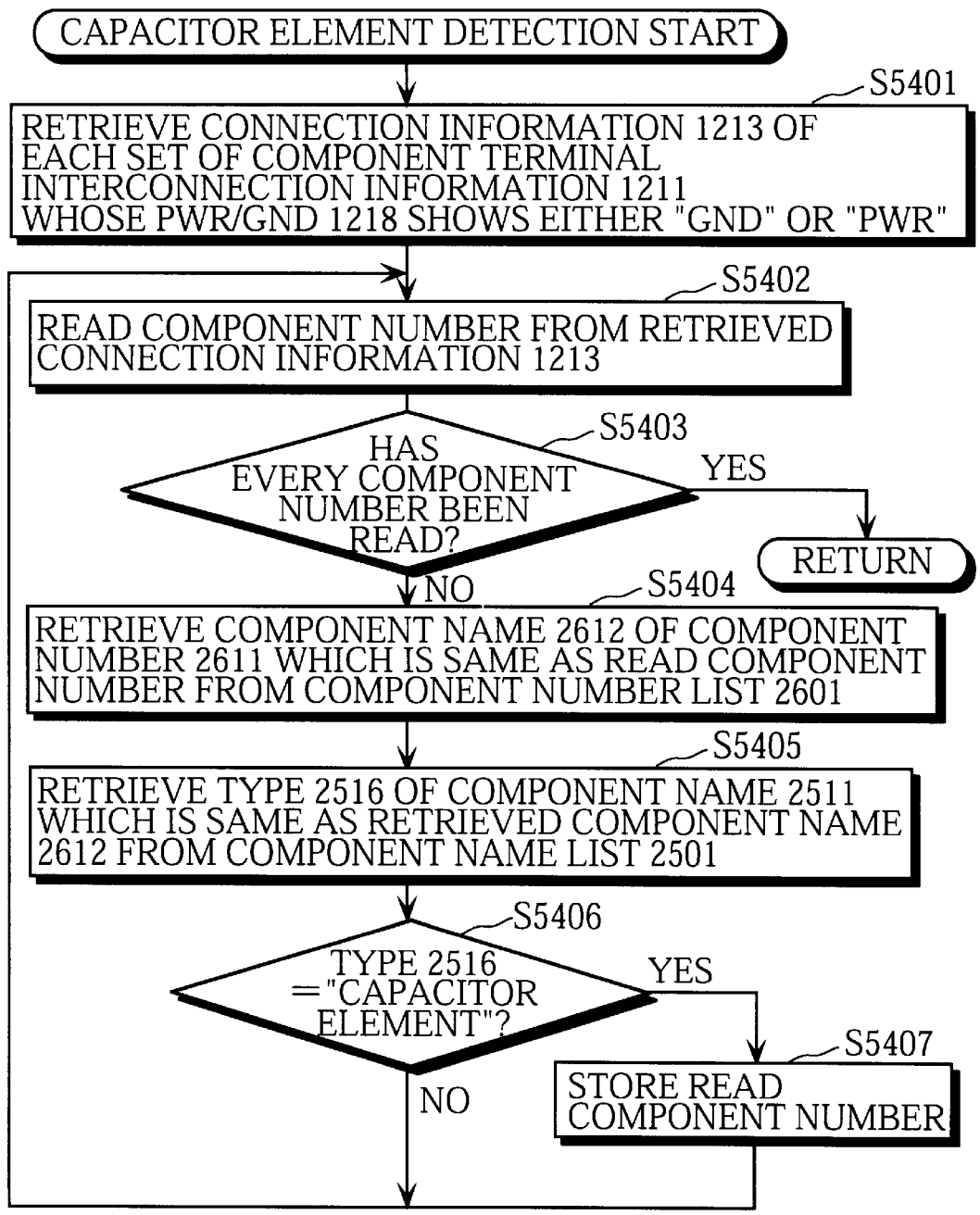
FIG. 66 is a flowchart showing the capacitor element extracting operation of the capacitor element placement judging unit 5123.

The operation for detecting component numbers of capacitor elements in step S5301 is explained in more detail below with reference to FIG. 66.

The capacitor element placement judging unit 5123 retrieves connection information 1213 of each set of component terminal interconnection information 1211 whose PWR/GND 1218 shows "GND" or "PWR" (S5401). The capacitor element placement judging unit 5123 then reads component numbers from the retrieved connection information 1213 one at a time (S5402). If every component number has already been read (S5403), the capacitor element detection is complete. The capacitor element placement judging unit 5123 retrieves a component name 2612 of a component number 2611 same as the read component number from the component number list 2601 (S5404) and retrieves a type 2516 of a component name 2511 same as the retrieved component name 2612 from the component name list 2501 (S5405). If the retrieved type 2516 shows "capacitor element" and the capacitor element is connected to the same power and ground layers as the first component identified by the first component number (S5406), the capacitor element placement judging unit 5123 stores the read component number (5407).

(5.2.5) Operation of Placement Start/End Surface Storing Unit 5124

Figure 67:
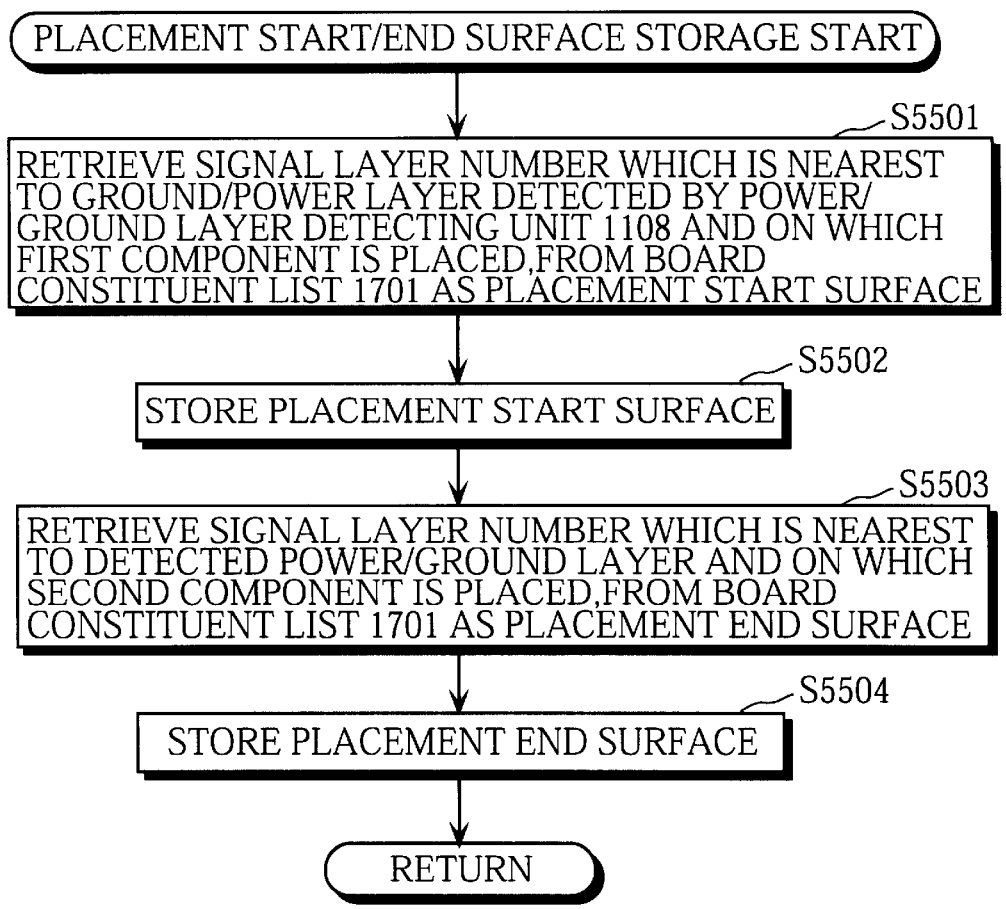
FIG. 67 is a flowchart showing the operation of a placement start/end surface storing unit 5124 of the CAD apparatus 5000.

The operation of the placement start/end surface storing unit 5124 is explained below with reference to FIG. 67.

The placement start/end surface storing unit 5124 retrieves, from the board constituent list 1701, a layer number 1711 of a signal layer on which the first component is placed and which is nearest to the ground/power layer detected by the power/ground layer detecting unit 1108, designates the retrieved layer number as the placement start surface (S5501), and stores the placement start surface (S5502). The placement start/end surface storing unit 5124 similarly retrieves, from the board constituent list 1701, a layer number 1711 of a signal layer on which the second component is placed and which is nearest to the detected power/ground layer, designates the retrieved layer number as the placement end surface (S5503), and stores the placement end surface (S5504).

(5.2.6) Operation of Via Placing Unit 5125

Figure 68:
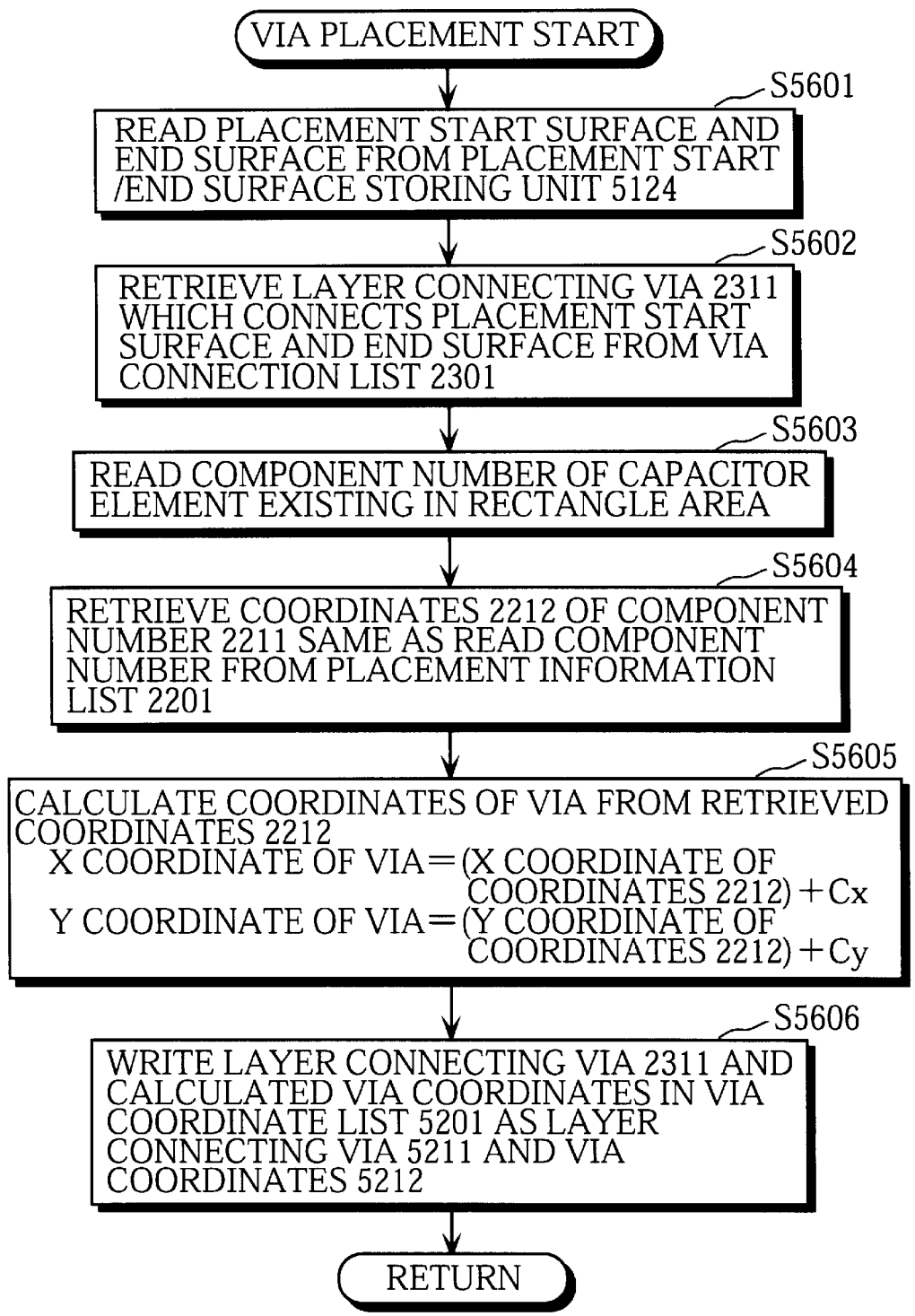
FIG. 68 is a flowchart showing the operation of a via placing unit 5125 of the CAD apparatus 5000.

The operation of the via placing unit 5125 is explained below with reference to FIG. 68.

The via placing unit 5125 reads the placement start surface and end surface stored in the placement start/end surface storing unit 5124 (S5601) and retrieves a layer connecting via 2311 which connects the placement start surface and end surface from the via connection list 2301 (S5602). The via placing unit 5125 then reads a component number of a capacitor element that exists within the rectangle area from the capacitor element placement judging unit 5123 (S5603) and retrieves coordinates 2212 of a component number 2211 same as the read component number from the placement information list 2201 (S5604). The via placing unit 5125 then calculates coordinates of the layer connecting via 2311 using the retrieved coordinates 2212 as follows (S5605).

($X$ coordinate of the via)=($X$ coordinate of the coordinates 2212)+ $Cx$ ($Y$ coordinate of the via)=($Y$ coordinate of the coordinates 2212)+ $Cy$ Here, "Cx" and "Cy" are constants.

Next, the via placing unit 5125 writes the layer connecting via 2311 and the above calculated via coordinates in the via coordinate list 5201 as a layer connecting via 5211 and via coordinates 5212 (S5606).

(5.2.7) Operation of Routing Unit 5126

Figure 69:
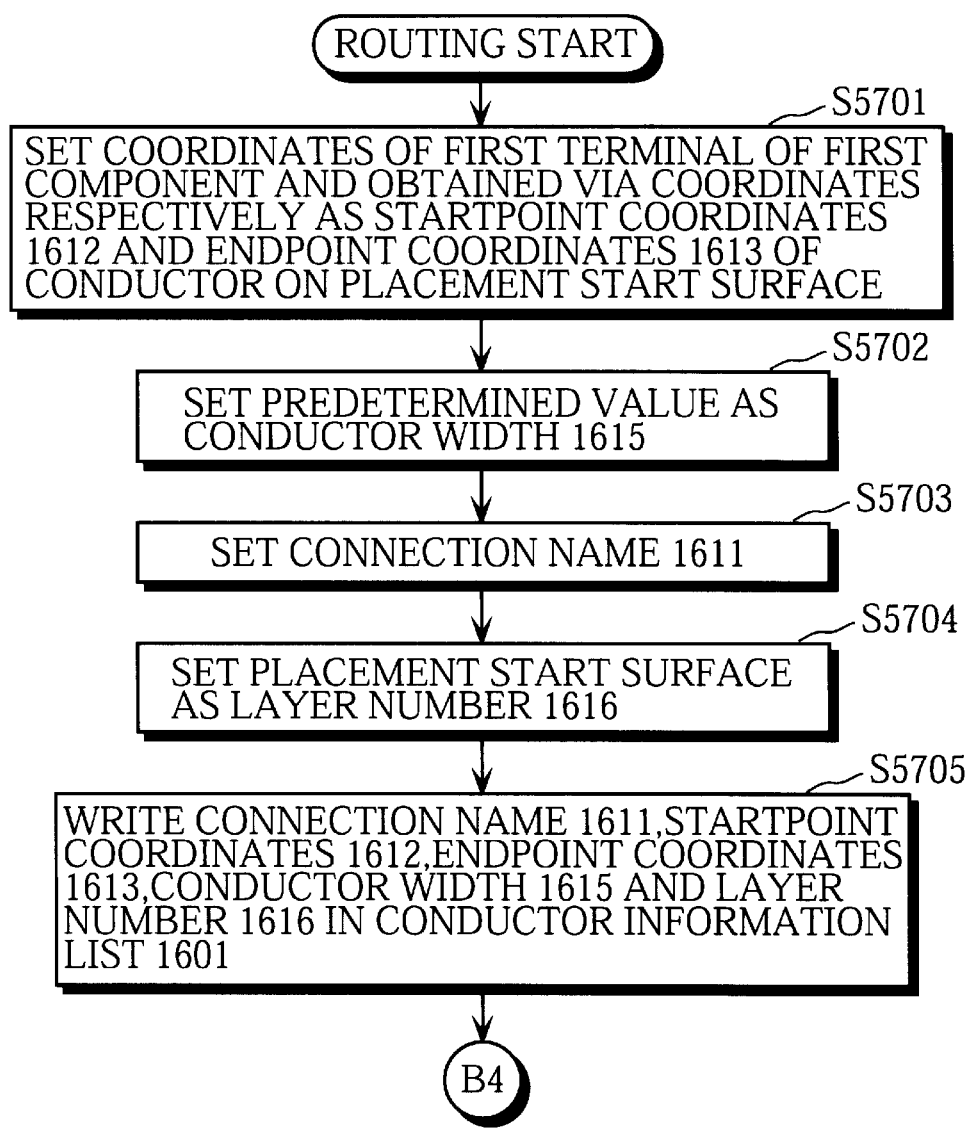
FIG. 69 is a partial flowchart showing the operation of a routing unit 5126 of the CAD apparatus 5000.
Figure 70:
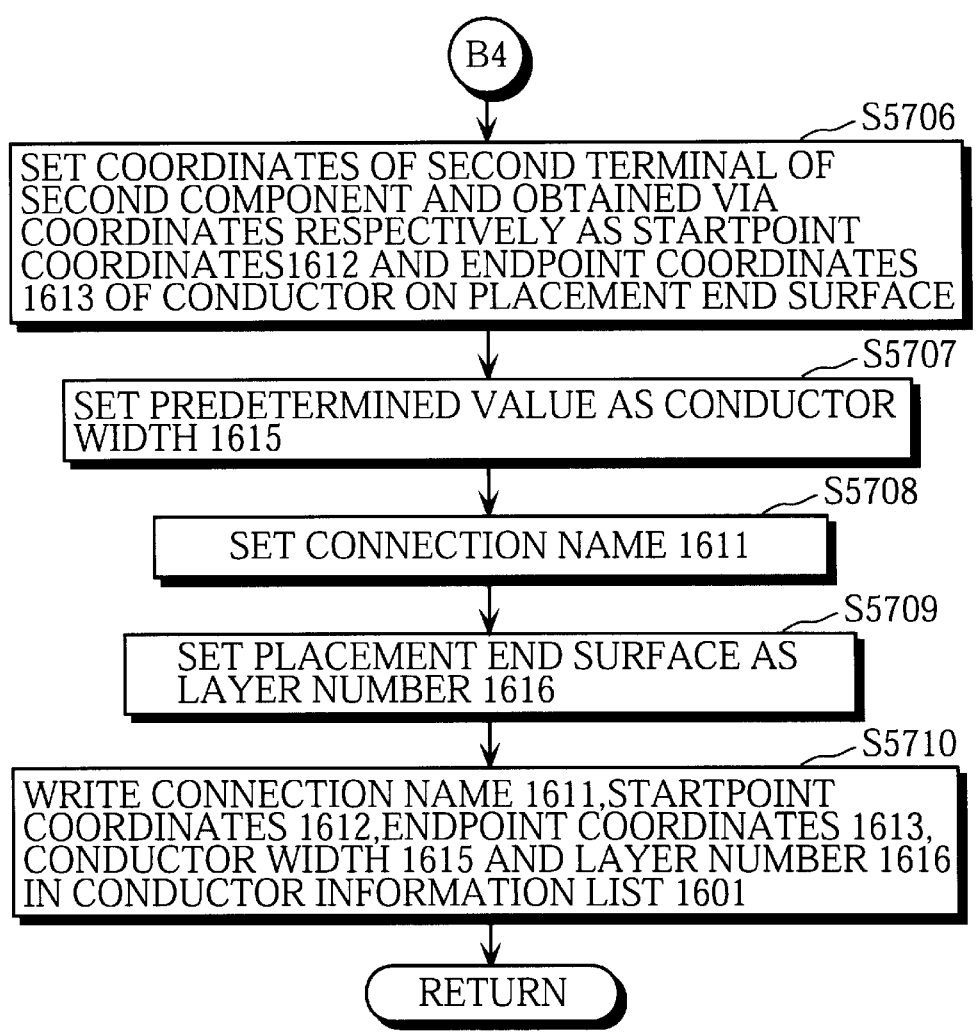
FIG. 70 is a partial flowchart showing the operation of the routing unit 5126.

The operation of the routing unit 5126 is explained below with reference to FIGS. 69 and 70.

The routing unit 5126 sets the coordinates of the first terminal of the first component and the calculated via coordinates respectively as startpoint coordinates 1612 and endpoint coordinates 1613 of a conductor on the placement start surface (S5701), sets a predetermined value as a conductor width 1615 (S5702), sets a connection name 1212 of the extracted set of component terminal interconnection information 1211 as a connection name 1611 (S5703), and sets the placement start surface as a layer number 1616 (S5704). The routing unit 5126 then writes the connection name 1611, the startpoint coordinates 1612, the endpoint coordinates 1613, the conductor width 1615 and the layer number 1616 in the conductor information list 1601 as a set of conductor information 1621 (S5705).

Similarly, the routing unit 5126 sets the coordinates of the second terminal of the second coordinates and the calculated via coordinates respectively as startpoint coordinates 1612 and endpoint coordinates 1613 of a conductor on the placement end surface (S5706), sets the predetermined value as a conductor width 1615 (S5707), sets the connection name 1212 of the extracted set of component terminal interconnection information 1211 as a connection name 1611 (S5708), and sets the placement end surface as a layer number 1616 (S5709). The routing unit 5126 then writes the connection name 1611, the startpoint coordinates 1612, the endpoint coordinates 1613, the conductor width 1615 and the layer number 1616 in the conductor information list 1601 as a set of conductor information 1621 (S5710).

(5.3) Modifications

In the fifth embodiment, the capacitor element placement judging unit 5123 has stored each component number whose type 2516 is "capacitor element". Alternatively, a capacitance of each capacitor element may be stored in the component name list 2501 in advance, so that the capacitor element placement judging unit 5123 can detect component number whose type 2516 is "capacitor element" and whose capacitance matches a predetermined capacitance. In such a case, the predetermined capacitance is stored in the capacitor element placement judging unit 5123 beforehand.

Here, the data inputting unit 1102 may also receive input of a predetermined capacitance from the designer and output the predetermined capacitance to the capacitor element placement judging unit 5123 that accordingly stores the predetermined capacitance.

6. Sixth Embodiment

The following is a description of a CAD apparatus 6000 for aiding circuit board design as the sixth embodiment of the present invention, with reference to figures. This description will focus on the differences with the CAD apparatus 1000 of the first embodiment.

(6.1) Construction of CAD Apparatus 6000

Figure 71:
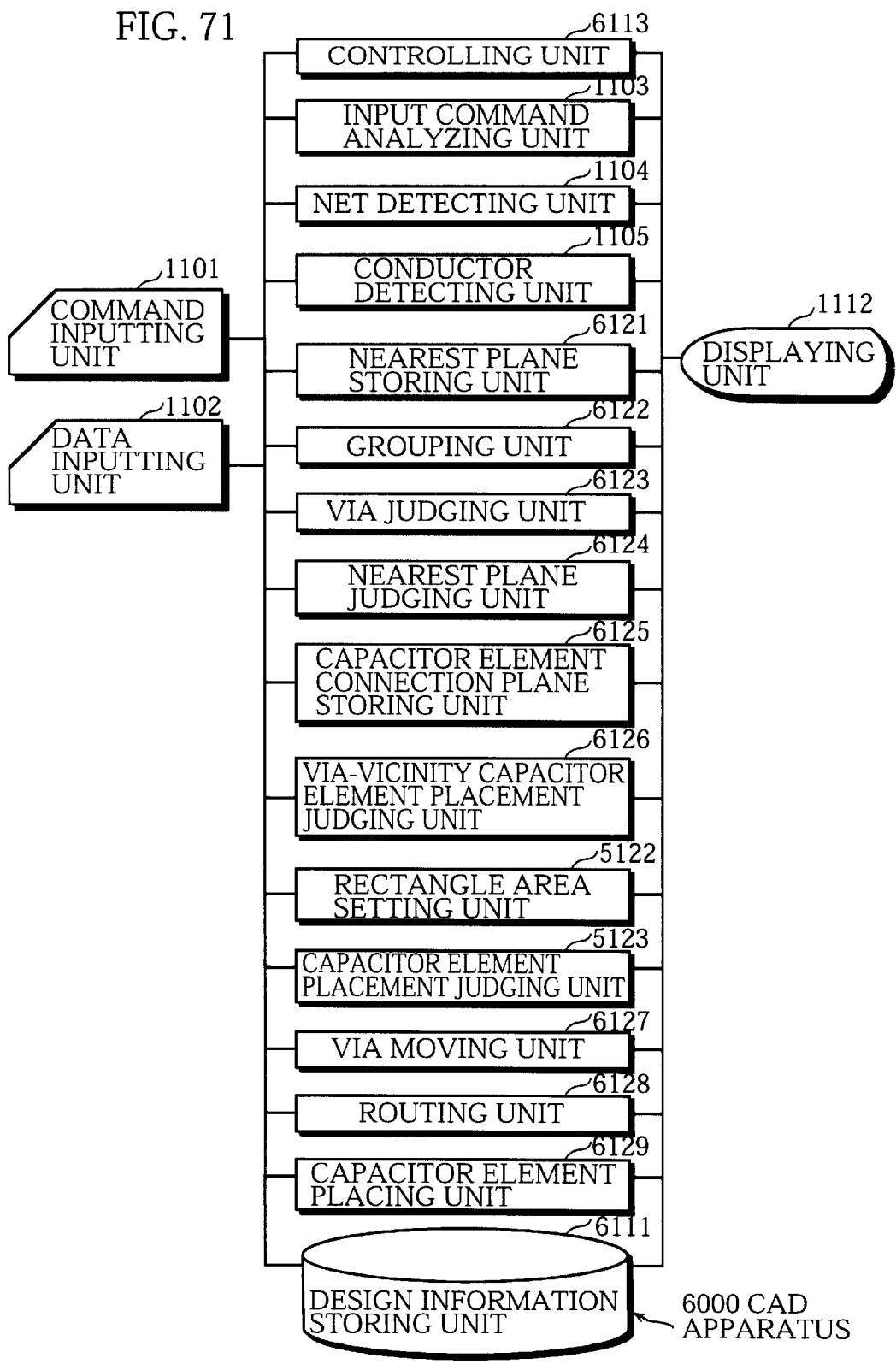
FIG. 71 is a block diagram showing the construction of a CAD apparatus 6000 of the sixth embodiment of the present invention.

As shown in FIG. 71, the CAD apparatus 6000 includes the command inputting unit 1101, the data inputting unit 1102, the input command analyzing unit 1103, the net detecting unit 1104, the conductor detecting unit 1105, a nearest plane storing unit 6121, a grouping unit 6122, a via judging unit 6123, a nearest plane judging unit 6124, a capacitor element connection plane storing unit 6125, a via-vicinity capacitor element placement judging unit 6126, the rectangle area setting unit 5122, the capacitor element placement judging unit 5123, a via moving unit 6127, a routing unit 6128, a capacitor element placing unit 6129, a design information storing unit 6111, the displaying unit 1112 and a controlling unit 6113.

The CAD apparatus 6000 can be realized in the same way as the CAD apparatus 1000 by executing software that implements the features shown in FIG. 71 on hardware of a computer, such as a workstation shown in FIG. 2.

Note here that construction elements which are same as those in the CAD apparatus 1000 or 5000 have been given the same reference numerals. Construction elements of the CAD apparatus 6000 which have configurations and functions different from those in the CAD apparatus 1000 or 5000 will be explained below.

(6.1.1) Input Command Analyzing Unit 1103

A capacitor element placing command is included in design commands.

The input command analyzing unit 1103 analyzes an input design command. When the input design command is a capacitor element placing command, the input command analyzing unit 1103 outputs the command to the controlling unit 6113.

(6.1.2) Design Information Storing Unit 6111

The design information storing unit 6111 stores the component terminal interconnection information list 1201, the terminal list 1401, the conductor information list 1601, the board constituent list 3201, the placement information list 2201, the component name list 2501, the component number list 2601 and the via coordinate list 5201 in advance.

The design information storing unit 6111 also stores a nearest plane information list 6201 and group information list 6301 generated during design processes.

The component terminal interconnection information list 1201, the terminal list 1401, the conductor information list 1601, the board constituent list 3201, the placement information list 2201, the component name list 2501, the component number list 2601 and the via coordinate list 5201 are same as those described in the first to fifth embodiments and thus their explanation has been omitted here.

The nearest plane information list 6201 and the group information list 6301 are explained below.

<Nearest Plane Information List 6201>

The nearest plane information list 6201 is made up of combinations of signal layers 6211 and nearest planes 6212, as shown in FIG. 72.

A signal layer 6211 shows a layer number of one of signal layers included in a circuit board.

A nearest plane 6212 shows a ground or power layer which is nearest to the signal layer 6211.

<Group Information List 6301>

It should be noted that in the present embodiment, the circuit board is made up of at least one signal layer, at least one ground layer and at least one power layer. Each signal layer is associated with a ground or power layer which is nearest to the signal layer, wherein signal layers which are associated with the same power or ground layer make up one group.

The group information list 6301 is composed of combinations of group names 6311 and signal layers 6312.

A group name 6311 identifies a group.

A signal layer 6312 shows one or more signal layers that belong to the group.

(6.1.3) Conductor Detecting Unit 1105

The conductor detecting unit 1105 reads, from the conductor information list 1601, each set of conductor information 1621 whose connection name 1611 is the same as a connection name 1212 included in a set of component terminal interconnection information 1211 extracted by the controlling unit 6113.

When a terminal of a component placed on a signal layer is connected with a terminal of a component placed on another signal layer, a net for connecting these component terminals is formed by a conductor placed on the signal layer, a via, and a conductor placed on the other signal layer. In such a case, two connection names 1611 which are the same as the connection name 1212 are stored in the conductor information list 1601, so that the conductor detecting unit 1105 retrieves two sets of conductor information 1621 that include the connection names 1611 same as the connection name 1212.

The present embodiment will be explained on the assumption that a net between two components placed on different signal layers is formed by two conductors and a via. The conductor detecting unit 1105 retrieves two sets of conductor information 1621 relating to such two conductors, and such two conductors are referred to as the first conductor and the second conductor in this description.

(6.1.4) Nearest Plane Storing Unit 6121

The nearest plane storing unit 6121 performs the following procedure for all combinations of layer numbers 3211 and type 3212 stored in the board constituent list 3201.

The nearest plane storing unit 6121 reads a combination of layer number 3211 and type 3212 from the board constituent list 3201.

The nearest plane storing unit 6121 judges whether the read type 3212 is "Signal". When the read type 3212 is "Signal", that is, when a layer identified by the read layer number 3211 is a signal layer, the nearest plane storing unit 6121 judges which of the ground and power layers is nearest to the signal layer and retrieves the number of such a ground or power layer from the board constituent list 3201 as a nearest plane.

The nearest plane storing unit 6121 then writes the read layer number 3211 and the number of the nearest plane in the nearest plane information list 6201 as a signal layer 6211 and a nearest plane 6212.

(6.1.5) Grouping Unit 6122

The grouping unit 6122 performs the following procedure for all combinations of signal layers 6211 and nearest planes 6212 stored in the nearest plane information list 6201.

The grouping unit 6122 reads a combination of signal layer 6211 and nearest plane 6212 from the nearest plane information list 6201.

The grouping unit 6122 searches the group information list 6301 for a group name 6311 that matches the read nearest plane 6212.

When such a group name 6311 is not found in the group information list 6301, the grouping unit 6122 writes the read nearest plane 6212 and signal layer 6211 in the group information list 6301 as a group name 6311 and a signal layer 6312.

When, on the other hand, the group name 6311 is found in the group information list 6301, the grouping unit 6122 adds the read signal layer 6211 to the content of a signal layer 6312 corresponding to the group name 6311.

(6.1.6) Via Judging Unit 6123

The via judging unit 6123 retrieves, from the conductor information list 1601, startpoint coordinates 1612, endpoint coordinates 1613, midpoint coordinates 1614, conductor width 1615 and layer number 1616 of the first conductor detected by the conductor detecting unit 1105.

The via judging unit 6123 also reads each combination of layer connecting via 5211 and via coordinates 5212 from the via coordinate list 5201.

The via judging unit 6123 then judges whether the read via coordinates 5212 of the layer connecting via 5211 lie within an area represented by the startpoint coordinates 1612, endpoint coordinates 1613, midpoint coordinates 1614 and conductor width 1615 of the first conductor.

When the via coordinates 5212 lie within the area of the first conductor, the via judging unit 6123 retrieves a signal layer 6312 that includes the retrieved layer number 1616 from the group information list 6301. The via judging unit 6123 then confirms that the read layer connecting via 5211 is connected to one of signal layers included in the retrieved signal layer 6312, and stores the via coordinates 5212 and the layer connecting via 5211.

Subsequently, the via judging unit 6123 outputs the judgement result on whether via coordinates 5212 lie within the placement area of the first conductor, to the controlling unit 6113.

(6.1.7) Nearest Plane Judging Unit 6124

The nearest plane judging unit 6124 retrieves the layer number 1616 of the first conductor from the conductor information list 1601. The nearest plane judging unit 6124 then retrieves, from the group information list 6301, a group name 6311 corresponding to a signal layer 6312 that includes the retrieved layer number 1616, and designates the retrieved group name 6311 as the first group name.

Similarly, the nearest plane judging unit 6124 retrieves a layer number 1616 of the second conductor from the conductor information list 1601. The nearest plane judging unit 6124 then retrieves, from the group information list 6301, a group name 6311 corresponding to a signal layer 6312 that includes the retrieved layer number 1616, and designates the retrieved group name 6311 as the second group name.

When the first group name and the second group name are the same, the nearest plane judging unit 6124 judges that the net includes only one nearest plane, while when the first group name and the second group name are different, the nearest plane judging unit 6124 judges that the net includes different nearest planes. The judgement result obtained as such is outputted to the controlling unit 6113.

(6.1.8) Capacitor Element Connection Plane Storing Unit 6125

The capacitor element connection plane storing unit 6125 stores a nearest plane identified by the first group name detected by the nearest plane judging unit 6124, as the first plane. The capacitor element connection plane storing unit 6125 also stores a nearest plane identified by the second group name detected by the nearest plane judging unit 6124, as the second plane.

(6.1.9) Via-vicinity Capacitor Element Placement Judging Unit 6126

The via-vicinity capacitor element placement judging unit 6126 reads the layer connecting via 5211 and via coordinates 5212 stored in the via judging unit 6123.

Next, the via-vicinity capacitor element placement judging unit 6126 reads all combinations of component numbers 2211, coordinates 2212 and layer numbers 2215 from the placement information list 2201 one at a time.

The via-vicinity capacitor element placement judging unit 6126 compares the read layer number 2215 with the layer number 1616 of the first or second conductor. If they match, the via-vicinity capacitor element placement judging unit 6126 retrieves a component name 2612 of a component number 2611 same as the read component number 2211 from the component number list 2601, and retrieves a type 2516 of a component name 2511 same as the retrieved component name 2612 from the component name list 2501.

The via-vicinity capacitor element placement judging unit 6126 also detects layer numbers of ground/power layers to which ground and power terminals of the component identified by the read component number 2211 are connected, by following the same procedures as the terminal detecting unit 1107 and the power/ground layer detecting unit 1108 of the first embodiment. The via-vicinity capacitor element placement judging unit 6126 then judges whether the detected layer numbers match the first and second planes stored in the capacitor element connection plane storing unit 6125.

When they match, the via-vicinity capacitor element placement judging unit 6126 checks whether the retrieved type 2516 is "capacitor element". If the type 2516 is "capacitor element", the via-vicinity capacitor element placement judging unit 6126 calculates the distance between the via coordinates 5212 and the coordinates 2212 of the capacitor element and compares the calculation result with a predetermined distance. When the calculation result is equal to or smaller than the predetermined distance, the via-vicinity capacitor element placement judging unit 6126 judges that the capacitor element is placed within the predetermined distance from the via coordinates and outputs the judgement result to the controlling unit 6113.

Here, the predetermined distance, such as 1 (cm), is stored in the via-vicinity capacitor element placement judging unit 6126 in advance.

Note that a predetermined distance may be inputted by the designer in the data inputting unit 1102 and then outputted to the via-vicinity capacitor element placement judging unit 6126 which accordingly stores the received value.

Figure 74:
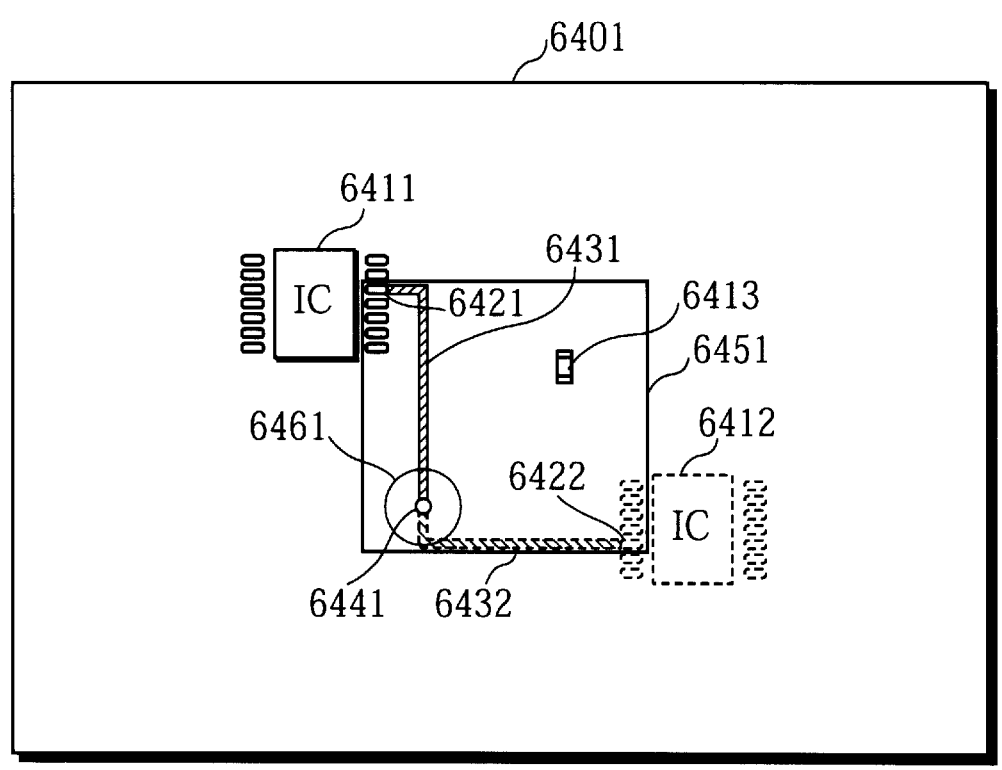
FIG. 74 is a conceptual diagram showing signal layer 6401 on which components 6411 and 6413 and conductor 6431 are placed.
Figure 75:
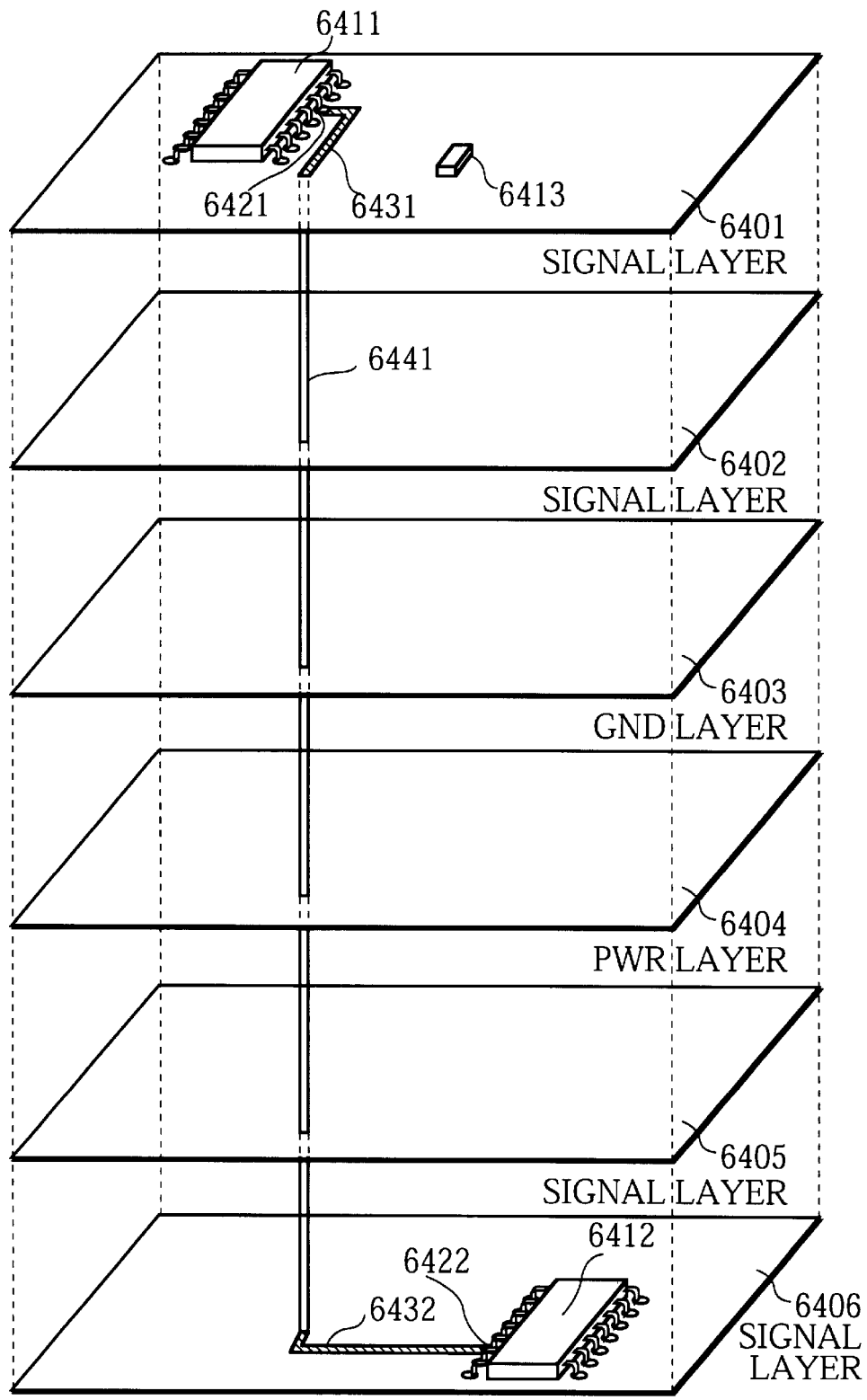
FIG. 75 is a conceptual diagram showing a circuit board including signal layer 6401 on which components 6411 and 6413 and conductor 6431 are placed and signal layer 6406 on which component 6412 and conductor 6432 are placed.

FIGS. 74 and 75 show a 6-layer circuit board in which a via and conductors have not yet been moved. In this circuit board, component 6411 and capacitor element 6413 are placed on signal layer 6401, component 6412 is placed on signal layer 6406, and terminal 6421 of component 6411 and terminal 6422 of component 6412 are connected through conductor 6431, via 6441 and conductor 6432. In these figures, a placement position of capacitor element 6413 on signal layer 6401 is not within range 6461 of the predetermined distance from via 6441.

(6.1.10) Via Moving Unit 6127

The via moving unit 6127 calculates coordinates which lie within the predetermined distance from coordinates of a capacitor element, detected by the capacitor element placement judging unit 5123, that exists within a rectangle area set by the rectangle area setting unit 5122. The via moving unit 6127 then changes the via coordinates 5212 stored by the via judging unit 6123 to the calculation result and writes the renewed combination of layer connecting via 5211 and via coordinates 5212 back into the via coordinate list 5201.

Figure 76:
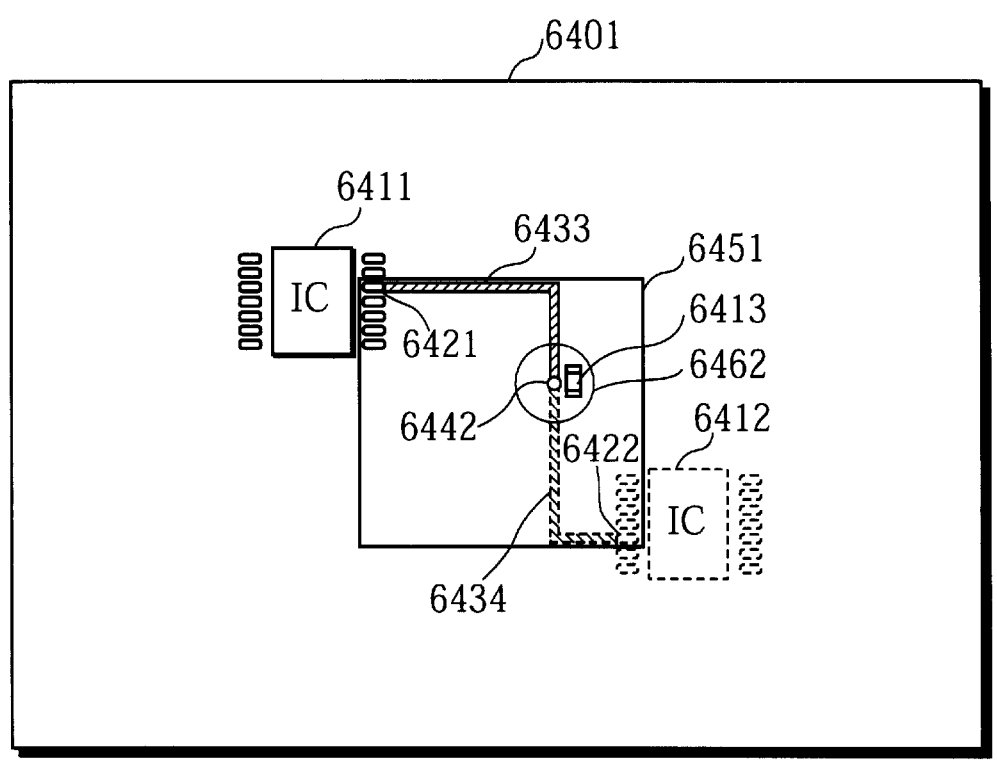
FIG. 76 is a conceptual diagram showing signal layer 6401 on which components 6411 and 6413 and conductor 6433 are placed.
Figure 77:
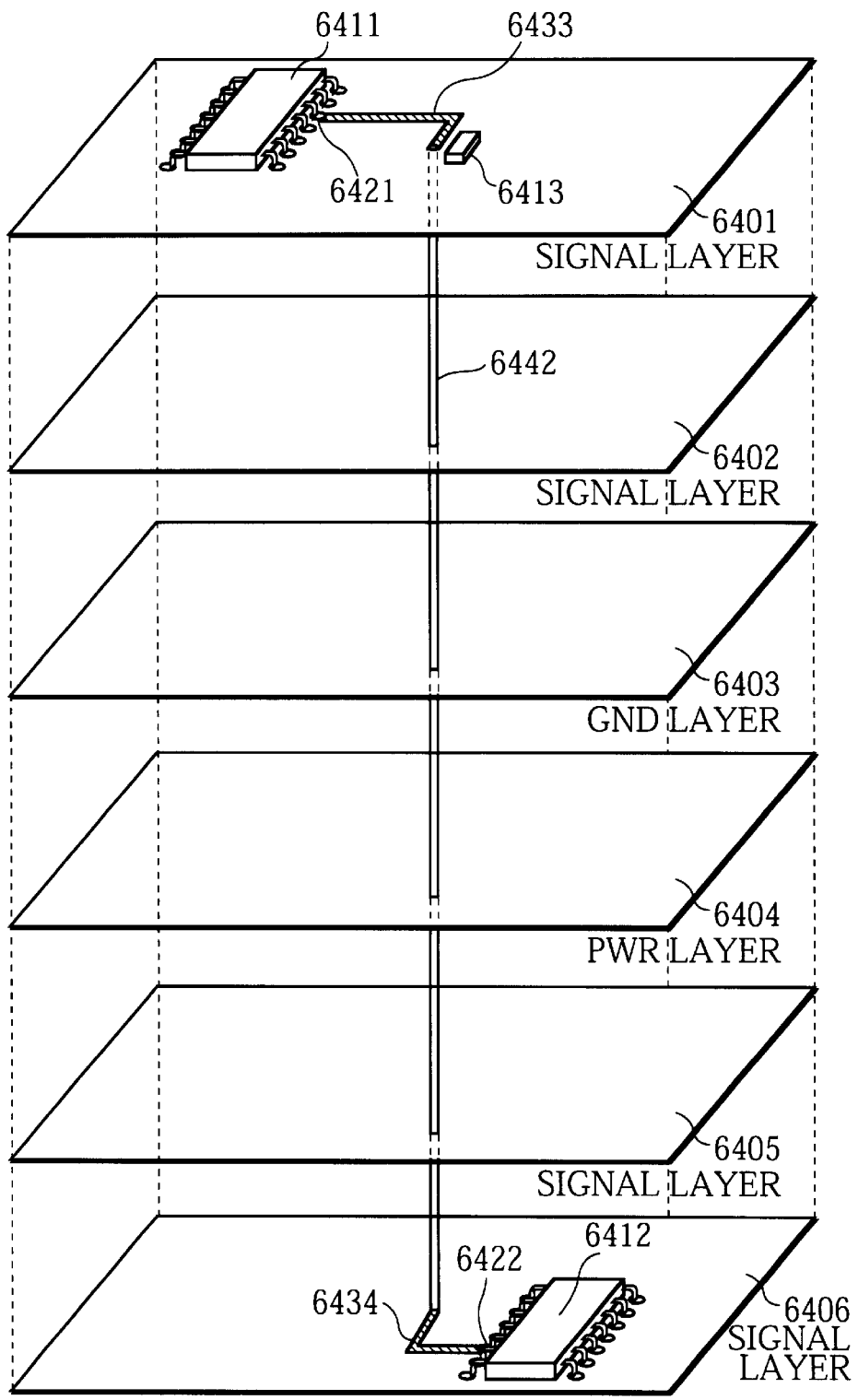
FIG. 77 is a conceptual diagram showing the circuit board including signal layer 6401 on which components 6411 and 6413 and conductor 6433 are placed and signal layer 6406 on which component 6412 and conductor 6434 are placed.

FIGS. 76 and 77 show the state where via 6441 has been moved to via 6442 and conductors 6431 and 6432 have been replaced with conductors 6433 and 6434 connected to via 6442 in the circuit board in FIGS. 74 and 75. In these figures, via 6442 has been moved into range 6462 of the predetermined distance from capacitor element 6413.

(6.1.11) Routing Unit 6128

The routing unit 6128 calculates new endpoint coordinates and new midpoint coordinates of the first conductor so as to have the first conductor reach the via coordinates, calculated by the via moving unit 6127, which lie within the predetermined distance from the capacitor element coordinates. The routing unit 6128 replaces the endpoint coordinates 1613 and midpoint coordinates 1614 of the set of conductor information 1621 for the first conductor with the calculated new endpoint coordinates and midpoint coordinates, and writes the renewed set of conductor information 1621 in the conductor information list 1601.

The routing unit 6128 similarly calculates new endpoint coordinates and new midpoint coordinates of the second conductor so as to have the second conductor reach the via coordinates calculated by the via moving unit 6127. The routing unit 6128 replaces the endpoint coordinates 1613 and midpoint coordinates 1614 of the set of conductor information 1621 for the second conductor with the calculated new endpoint coordinates and midpoint coordinates, and writes the renewed set of conductor information 1621 in the conductor information list 1601.

As a result, conductors 6433 and 6434 which are connected to via 6442 are newly placed as shown in FIGS. 76 and 77.

(6.1.12) Capacitor Element Placing Unit 6129

The capacitor element placing unit 6129 defines a component number 2211 of a new capacitor element, calculates coordinates 2212 which lies within the predetermined distance from the via coordinates 5212 stored by the via judging unit 6123, sets an angle 2213 and a side 2214, and designates the layer number of the first conductor as a layer number 2215. The capacitor element placing unit 6129 then writes the component number 2211, coordinates 2212, angle 2213, side 2214 and layer number 2215 in the placement information list 2201.

The capacitor element placing unit 6129 then extracts connection information 1213 corresponding to PWR/GND 1218 which shows "GND" from the component terminal interconnection information list 1201, adds "(newly defined component number 2211)-(ground terminal name)" to the content of the extracted connection information 1213, and writes the renewed connection information 1213 back into the component terminal interconnection information list 1201.

The capacitor element placing unit 6129 also extracts connection information 1213 corresponding to PWR/GND 1218 which shows "PWR" from the component terminal interconnection information list 1201, adds "(newly defined component number 2211)-(power terminal name)" to the content of the extracted connection information 1213, and writes the renewed connection information 1213 back into the component terminal interconnection information list 1201.

Figure 78:
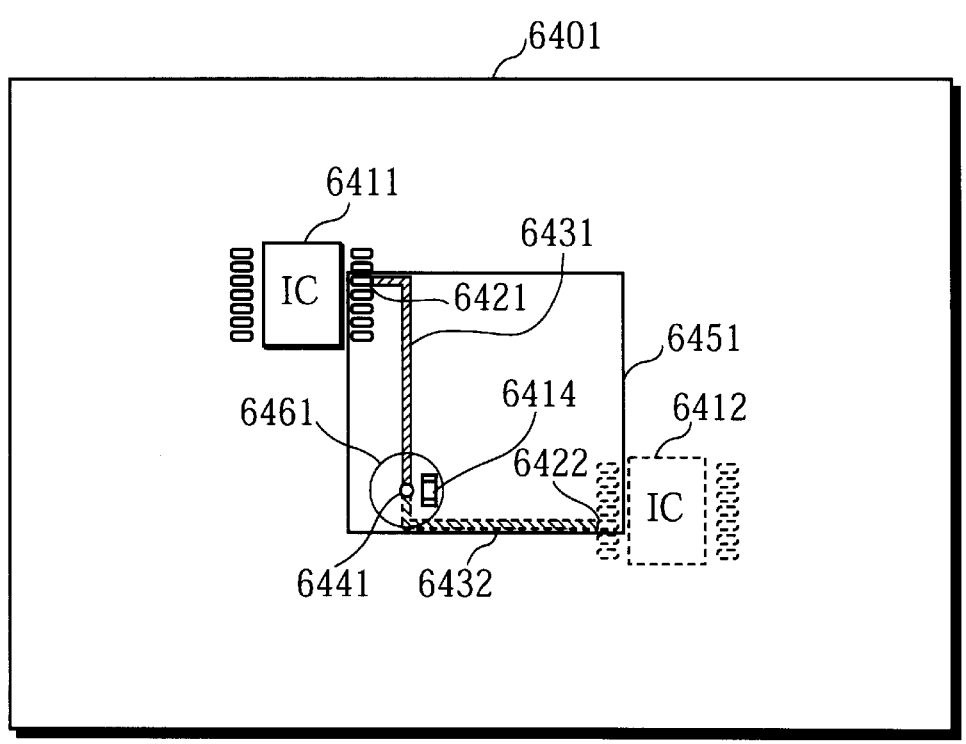
FIG. 78 is a conceptual diagram showing signal layer 6401 on which components 6411 and 6414 and conductor 6431 are placed.

While FIGS. 74 and 75 show the circuit board in which capacitor element 6413 has already been placed on signal layer 6401, FIG. 78 shows a circuit board in which new capacitor element 6414 is placed within the predetermined distance from via 6441.

As a result of the processing described above, a via is placed in the vicinity of a capacitor element, so that an area enclosed by a loop formed by a current that passes through the capacitor element and the via can be reduced and electromagnetic noise can be suppressed.

(6.1.13) Controlling Unit 6113

The controlling unit 6113 receives a capacitor element placing command from the input command analyzing unit 1103.

The controlling unit 6113 controls the command inputting unit 1101, the data inputting unit 1102, the input command analyzing unit 1103, the net detecting unit 1104, the conductor detecting unit 1105, the nearest plane storing unit 6121, the grouping unit 6122, the via judging unit 6123, the nearest plane judging unit 6124, the capacitor element connection plane storing unit 6125, the via-vicinity capacitor element placement judging unit 6126, the rectangle area setting unit 5122, the capacitor element placement judging unit 5123, the via moving unit 6127, the routing unit 6128, the capacitor element placing unit 6129 and the displaying unit 1112.

The controlling unit 6113 activates the net detecting unit 1104 on receiving a capacitor element placing command.

Also, the controlling unit 6113 reads a set of component terminal interconnection information 1211 from the component terminal interconnection information list 1201. If a critical net 1220 of the read set of component terminal interconnection information 1211 shows "○", the controlling unit 6113 activates the conductor detecting unit 1105, the nearest plane storing unit 6121, the grouping unit 6122, the via judging unit 6123, the nearest plane judging unit 6124, the capacitor element connection plane storing unit 6125, the via-vicinity capacitor element placement judging unit 6126, the rectangle area setting unit 5122, the capacitor element placement judging unit 5123, the via moving unit 6127 and the routing unit 6128 in succession. The controlling unit 6113 repeats reading of a set of component terminal interconnection information 1211, judgement of the status of a critical net 1220, and activation of the above units until all sets of component terminal interconnection information 1211 are read from the component terminal interconnection information list 1201.

Here, if the via judging unit 6123 judges that a via does not exist in the area occupied by the first conductor, the controlling unit 6113 will not activate the nearest plane judging unit 6124, the capacitor element connection plane storing unit 6125, the via-vicinity capacitor element placement judging unit 6126, the rectangle area setting unit 5122, the capacitor element placement judging unit 5123, the via moving unit 6127 and the routing unit 6128.

Also, if the nearest plane judging unit 6124 judges that the net does not include different nearest planes, the controlling unit 6113 will not activate the capacitor element connection plane storing unit 6125, the via-vicinity capacitor element placement judging unit 6126, the rectangle area setting unit 5122, the capacitor element placement judging unit 5123, the via moving unit 6127 and the routing unit 6128.

Also, if the via-vicinity capacitor element placement judging unit 6126 judges that a capacitor element exists within the predetermined distance from the via hole, the controlling unit 6113 will not activate the rectangle area setting unit 5122, the capacitor element placement judging unit 5123, the via moving unit 6127 and the routing unit 6128.

Furthermore, if the capacitor element placement judging unit 5123 judges that a capacitor element does not exist within a rectangle area set by the rectangle area setting unit 5122, the controlling unit 6113 will not activate the via moving unit 6127 and the routing unit 6128 but instead activates the capacitor element placing unit 6129.

(6.2) Operation of CAD Apparatus 6000

The following is a description of the operation of the CAD apparatus 6000.

(6.2.1) Overall Operation of CAD Apparatus 6000

The overall operation of the CAD apparatus 6000 is explained below with reference to FIG. 79.

On receiving a capacitor element placing command from the input command analyzing unit 1103, the controlling unit 6113 activates the net detecting unit 1104 (S1001) Next, the controlling unit 6113 reads a set of component terminal interconnection information 1211 from the component terminal interconnection information list 1201 (S1002). If every set of component terminal interconnection information 1211 has already been read (S1033), the operation is complete. The controlling unit 6113 judges whether a critical net 1220 of the read set of component terminal interconnection information 1211 shows "○" (S1010). If the condition is met, the controlling unit 6113 extracts the set of component terminal interconnection information 1211 and activates the conductor detecting unit 1105, the nearest plane storing unit 6121, the grouping unit 6122, the via judging unit 6123, the nearest plane judging unit 6124, the capacitor element connection plane storing unit 6125, the via-vicinity capacitor element placement judging unit 6126, the rectangle area setting unit 5122, the capacitor element placement judging unit 5123, the via moving unit 6127 and the routing unit 6128 in succession (S1004, S6001–S6003, S6005, S6007–S6008, S6010–S6011, S6013–S6014).

When the via judging unit 6123 judges that a via does not exist in an area occupied by the first conductor in step S6004, the controlling unit 6113 returns to step S1002 without activating the nearest plane judging unit 6124, the capacitor element connection plane storing unit 6125, the via-vicinity capacitor element placement judging unit 6126, the rectangle area setting unit 5122, the capacitor element placement judging unit 5123, the via moving unit 6127 and the routing unit 6128.

Also, when the nearest plane judging unit 6124 judges that the net does not include different nearest planes in step S6006, the controlling unit 6113 returns to step S1002 without activating the capacitor element connection plane storing unit 6125, the via-vicinity capacitor element placement judging unit 6126, the rectangle area setting unit 5122, the capacitor element placement judging unit 5123, the via moving unit 6127 and the routing unit 6128.

Also, when the via-vicinity capacitor element placement judging unit 6126 judges that a capacitor element exists within the predetermined distance from the via hole in step S6009, the controlling unit 6113 returns to step S1002 without activating the rectangle area setting unit 5122, the capacitor element placement judging unit 5123, the via moving unit 6127 and the routing unit 6128.

Also, when the capacitor element placement judging unit 5123 judges that a capacitor element does not exist within a rectangle area in step S6012, the controlling unit 6113 does not activate the via moving unit 6127 and the routing unit 6128 but instead activates the capacitor element placing unit 6129 (S6015).

Figure 12:
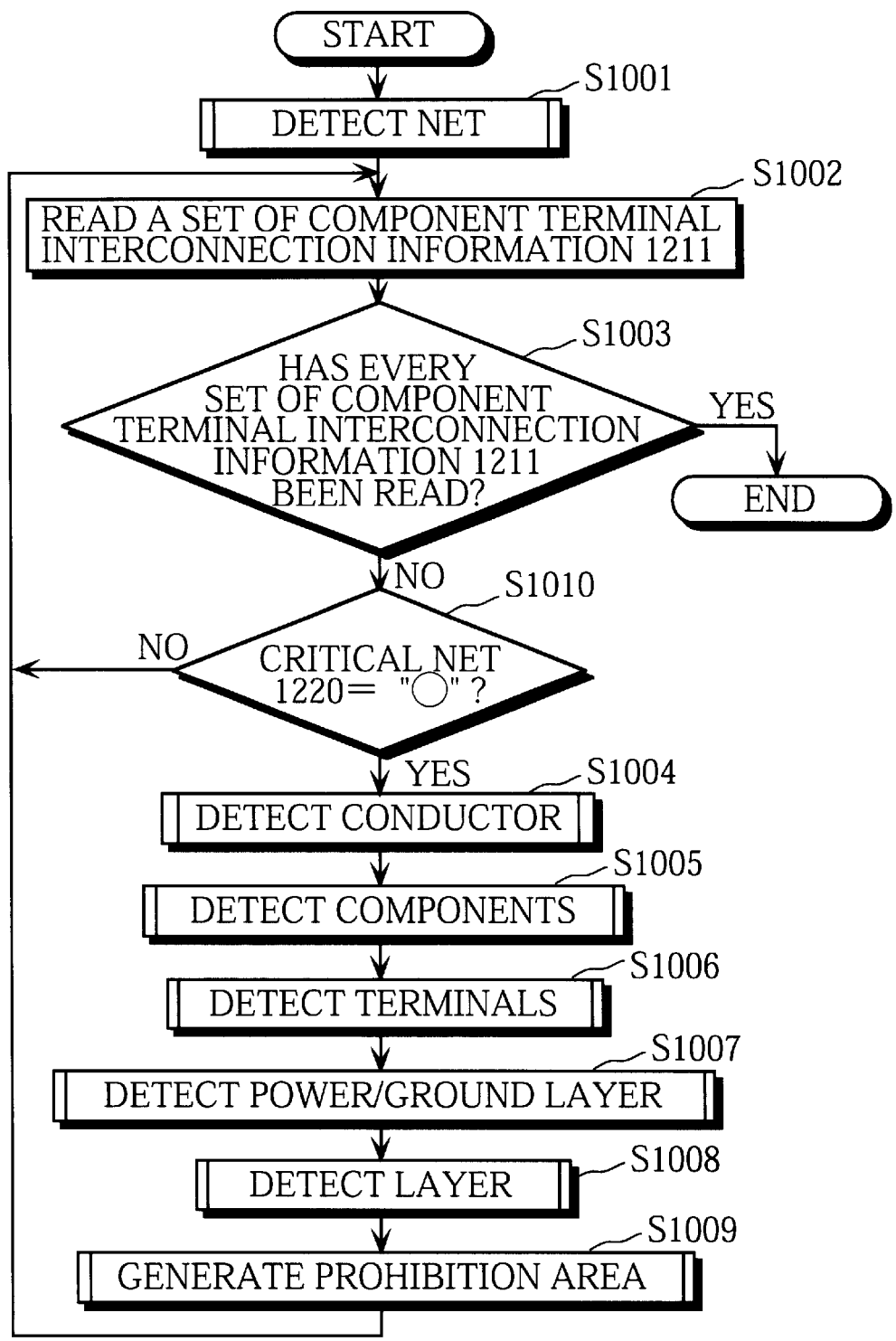
FIG. 12 is a flowchart showing the overall operation of the CAD apparatus 1000.
Figure 79:
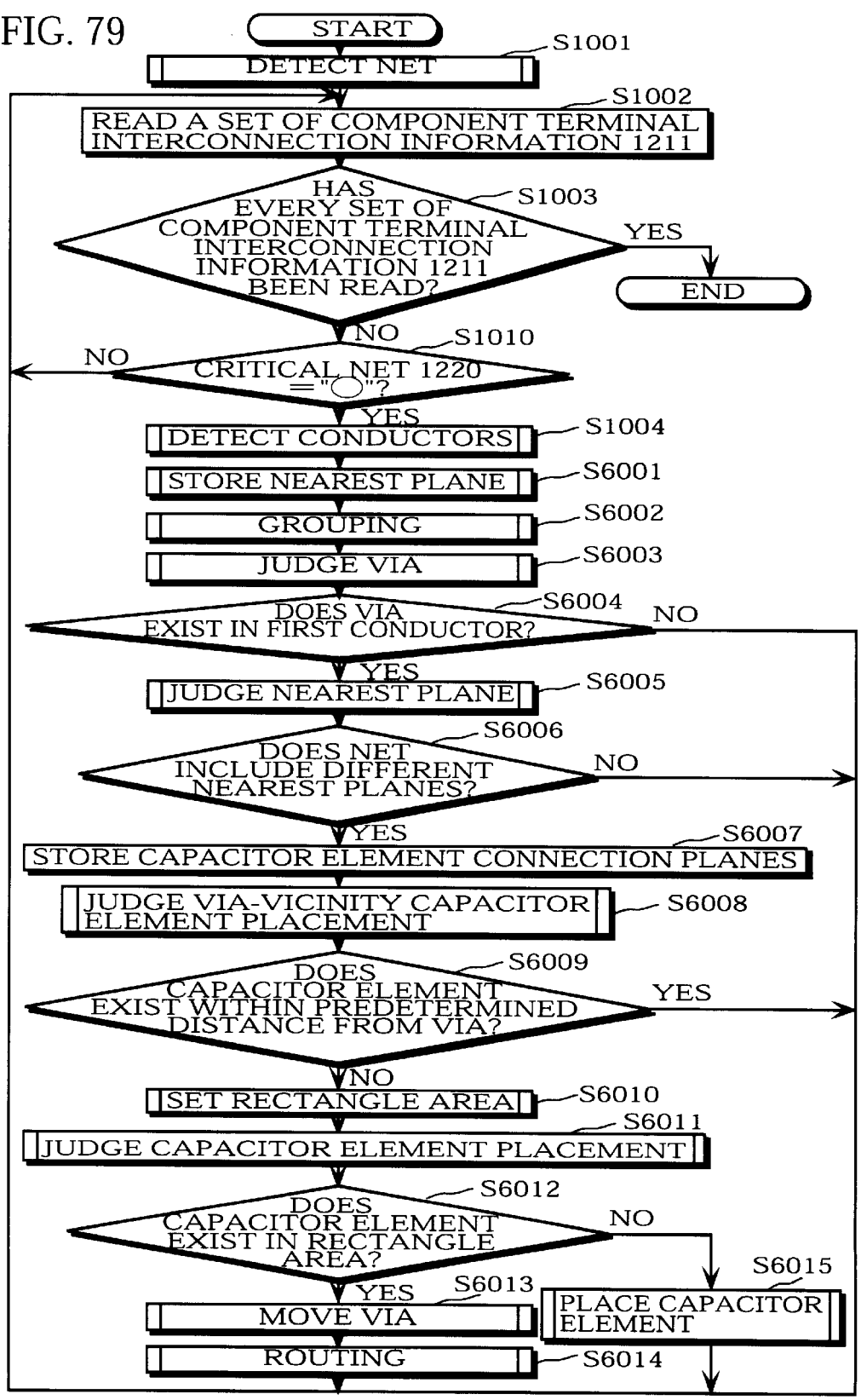
FIG. 79 is a flowchart showing the overall operation of the CAD apparatus 6000.

In FIG. 79, steps which are the same as those in FIG. 12 have been given the same reference numerals and their explanation has been omitted. Also, steps S6010 and S6011 are the same as steps S5002 and S5003 shown in FIG. 59 and their explanation has been omitted, so that steps S6001–S6009 and S6013–S6015 will be explained in detail below.

(6.2.2) Operation of Nearest Plane Storing Unit 6121

Figure 80:
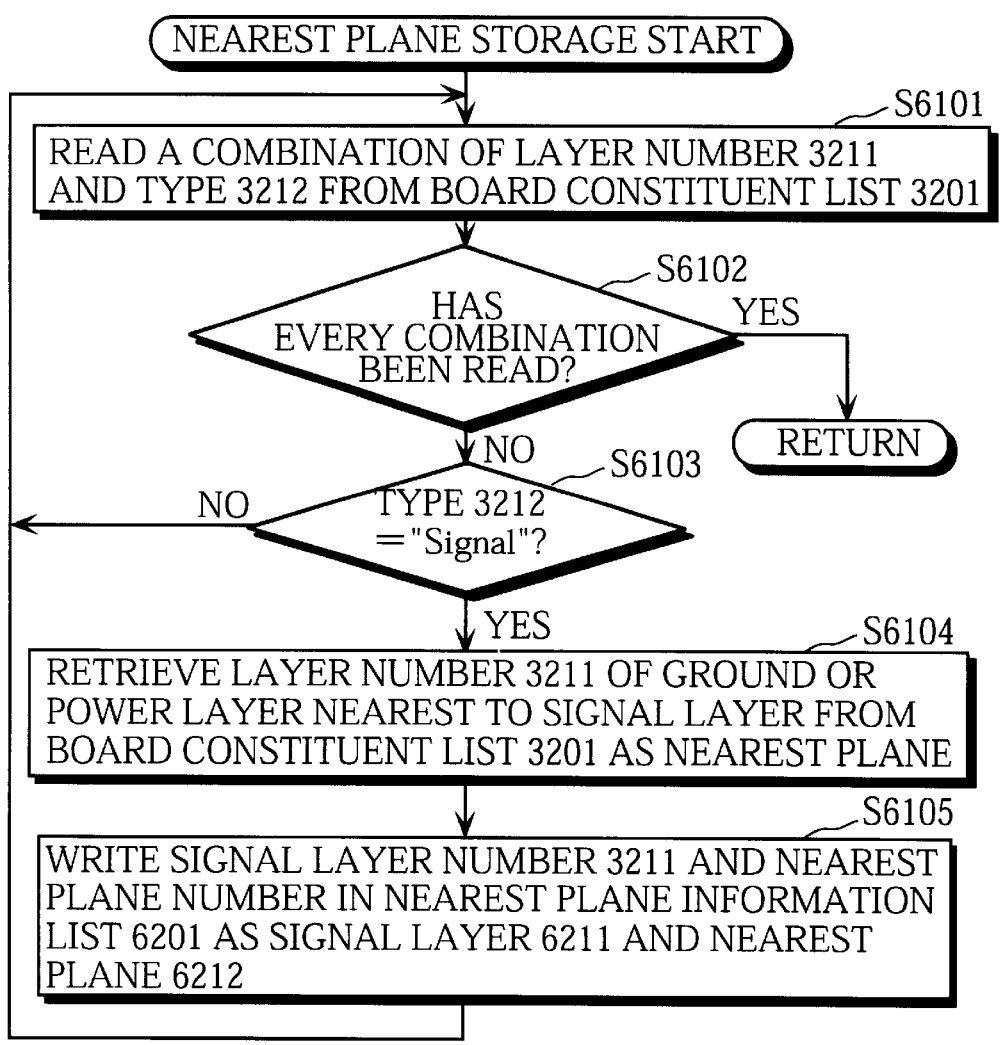
FIG. 80 is a flowchart showing the operation of a nearest plane storing unit 6121 of the CAD apparatus 6000.

The operation of the nearest plane storing unit 6121 is explained below with reference to FIG. 80.

The nearest plane storing unit 6121 reads a combination of layer number 3211 and type 3212 from the board constituent list 3201 (S6101).

When every combination of layer number 3211 and type 3212 has already been read (S6102), the nearest plane storing unit 6121 completes its operation. The nearest plane storing unit 6121 judges whether the read type 3212 is "Signal" (S6103). If the type 3212 is "Signal", that is, if the read layer number 3211 shows a signal layer, the nearest plane storing unit 6121 retrieves a layer number 3211 of one of the ground and power layers which is nearest to the signal layer from the board constituent list 3201 as a nearest plane (S6104). The nearest plane storing unit 6121 then writes the read layer number 3211 and the retrieved nearest plane number in the nearest plane information list 6201 as a signal layer 6211 and a nearest plane 6212, and returns to step S6101.

If the type 3212 is not "Signal" in step S6103, the nearest plane storing unit 6121 returns to step S6101.

(6.2.3) Operation of Grouping Unit 6122

Figure 81:
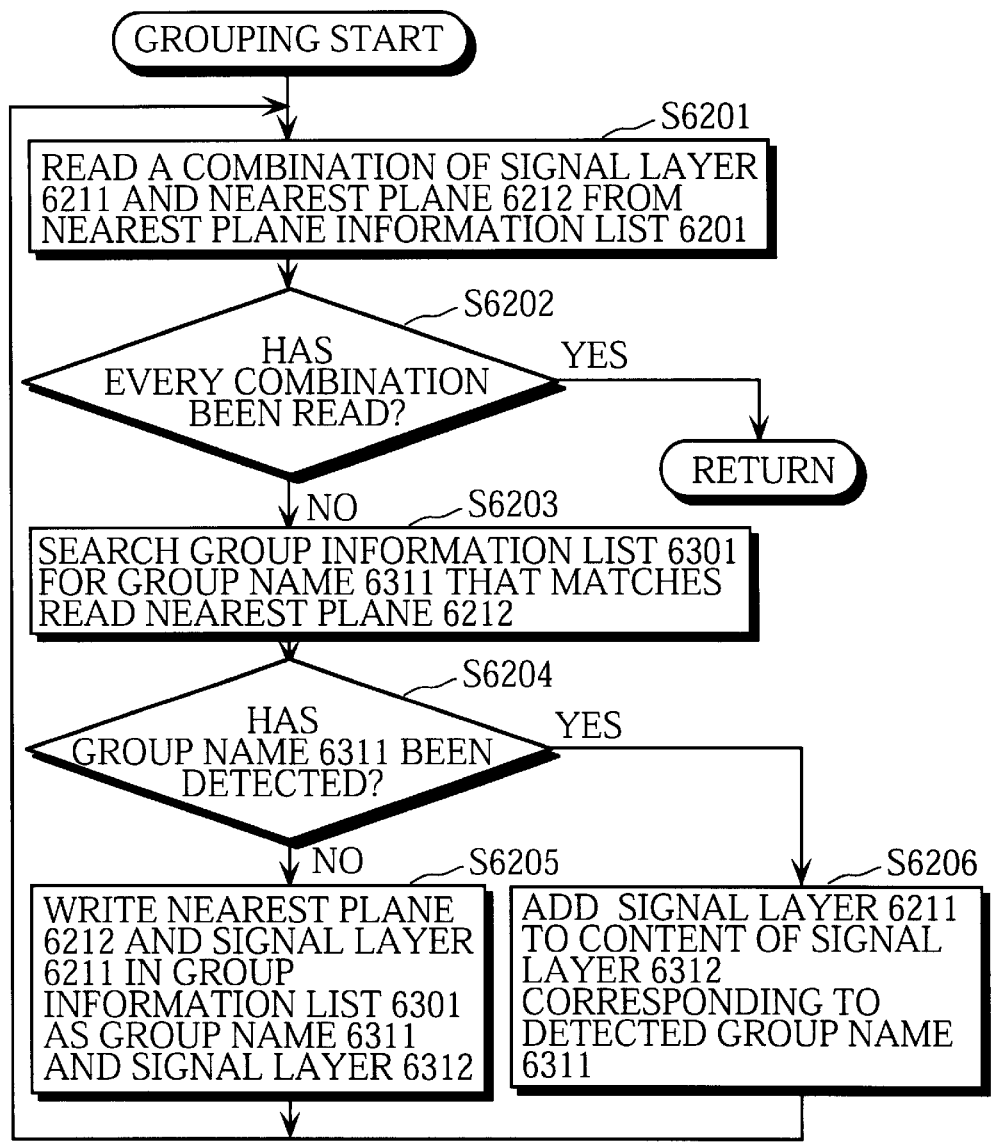
FIG. 81 is a flowchart showing the operation of a grouping unit 6122 of the CAD apparatus 6000.

The operation of the grouping unit 6122 is explained below with reference to FIG. 81.

The grouping unit 6122 reads a combination of signal layer 6211 and nearest plane 6212 from the nearest plane information list 6201 (S6201).

If every combination has already been read (S6202), the grouping unit 6122 completes its operation. The grouping unit 6122 searches the group information list 6301 for a group name 6311 that matches the read nearest plane 6212 (S6203).

When such a group name 6311 is not included in the group information list 6301 (S6204), the grouping unit 6122 writes the read nearest plane 6212 and signal layer 6211 in the group information list 6301 as a group name 6311 and a signal layer 6312 (S6205), before returning to step S6201.

When the group name 6311 is found in step S6204, the grouping unit 6122 adds the read signal layer 6211 to the content of a signal layer 6312 corresponding to the group name 6311 (S6206), and returns to step S6201.

(6.2.4) Operation of Via Judging Unit 6123

Figure 82:
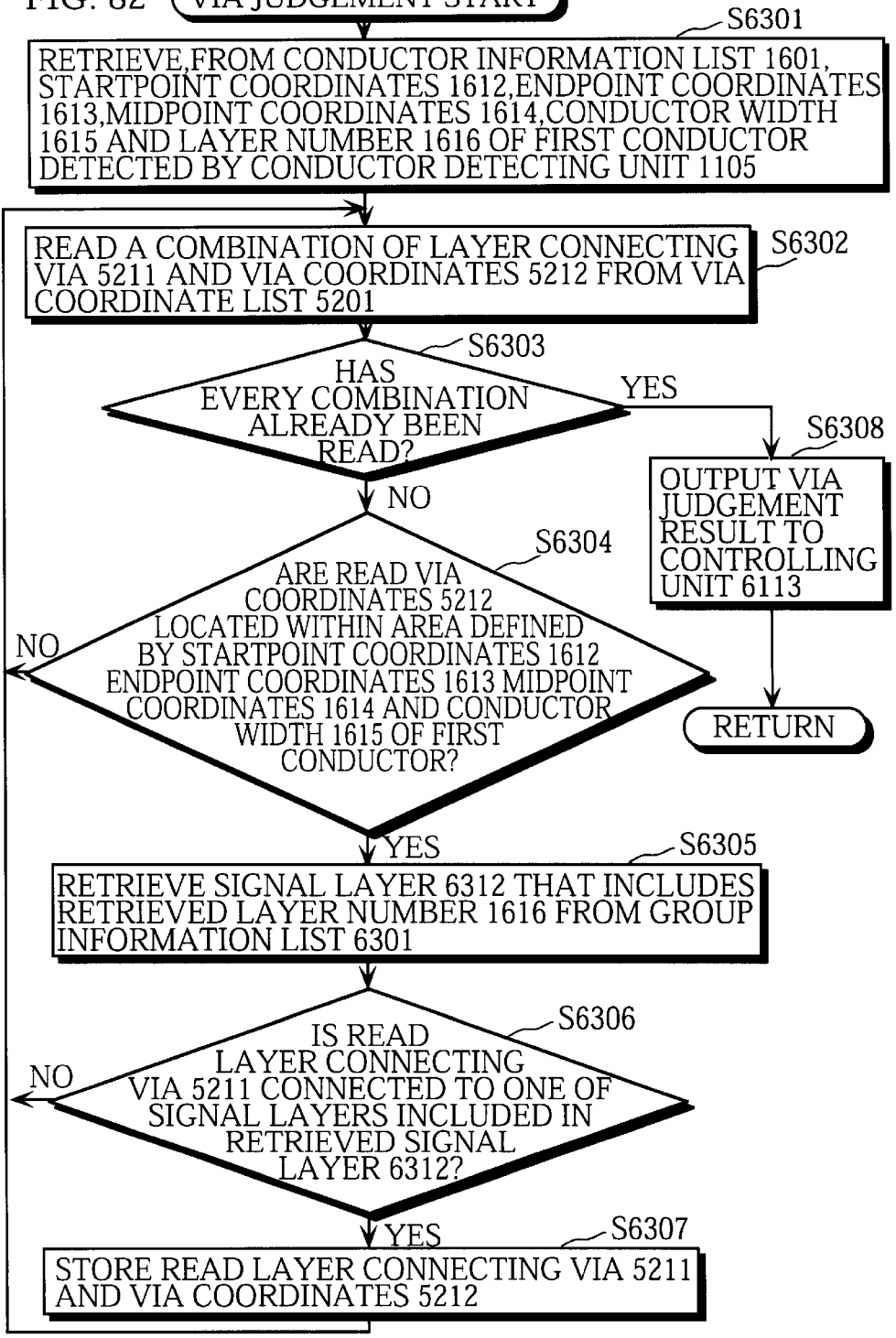
FIG. 82 is a flowchart showing the operation of a via judging unit 6123 of the CAD apparatus 6000.

The operation of the via judging unit 6123 is explained below with reference to FIG. 82.

The via judging unit 6123 reads, from the conductor information list 1601, startpoint coordinates 1612, endpoint coordinates 1613, midpoint coordinates 1614, conductor width 1615 and layer number 1616 of the first conductor detected by the conductor detecting unit 1105 (S6301). The via judging unit 6123 then reads a combination of layer connecting via 5211 and via coordinates 5212 from the via coordinate list 5201 (S6302).

If every combination of layer connecting via 5211 and via coordinates 5212 has already been read (S6303), the via judging unit 6123 proceeds to step S6308. After reading the combination of layer connecting via 5211 and via coordinates 5212, the via judging unit 6123 judges whether the read via coordinates 5212 are within an area represented by the startpoint coordinates 1612, endpoint coordinates 1613, midpoint coordinates 1614 and conductor width 1615 of the first conductor (S6304). If the via coordinates 5212 are not within the placement area of the first conductor, the via judging unit 6123 returns to step S6302. If, on the other hand, the via coordinates 5212 are located within the placement area of the first conductor, the via judging unit 6123 retrieves a signal layer 6312 that includes the read layer number 1616 from the group information list 6301 (S6305) and confirms whether the layer connecting via 5211 is connected to one of signal layers shown in the retrieved signal layer 6312 (S6306). When the condition is met, the via judging unit 6123 stores the via coordinates 5212 and layer connecting via 5211 (S6307) and returns to step S6302. When the condition is not met in step S6306, the via judging unit 6123 just returns to step S6302.

In step S6308, the via judging unit 6123 outputs the judgement result on whether via coordinates 5212 lie within the placement area of the first conductor to the controlling unit 6113.

(6.2.5) Operation of Nearest Plane Judging Unit 6124

Figure 83:
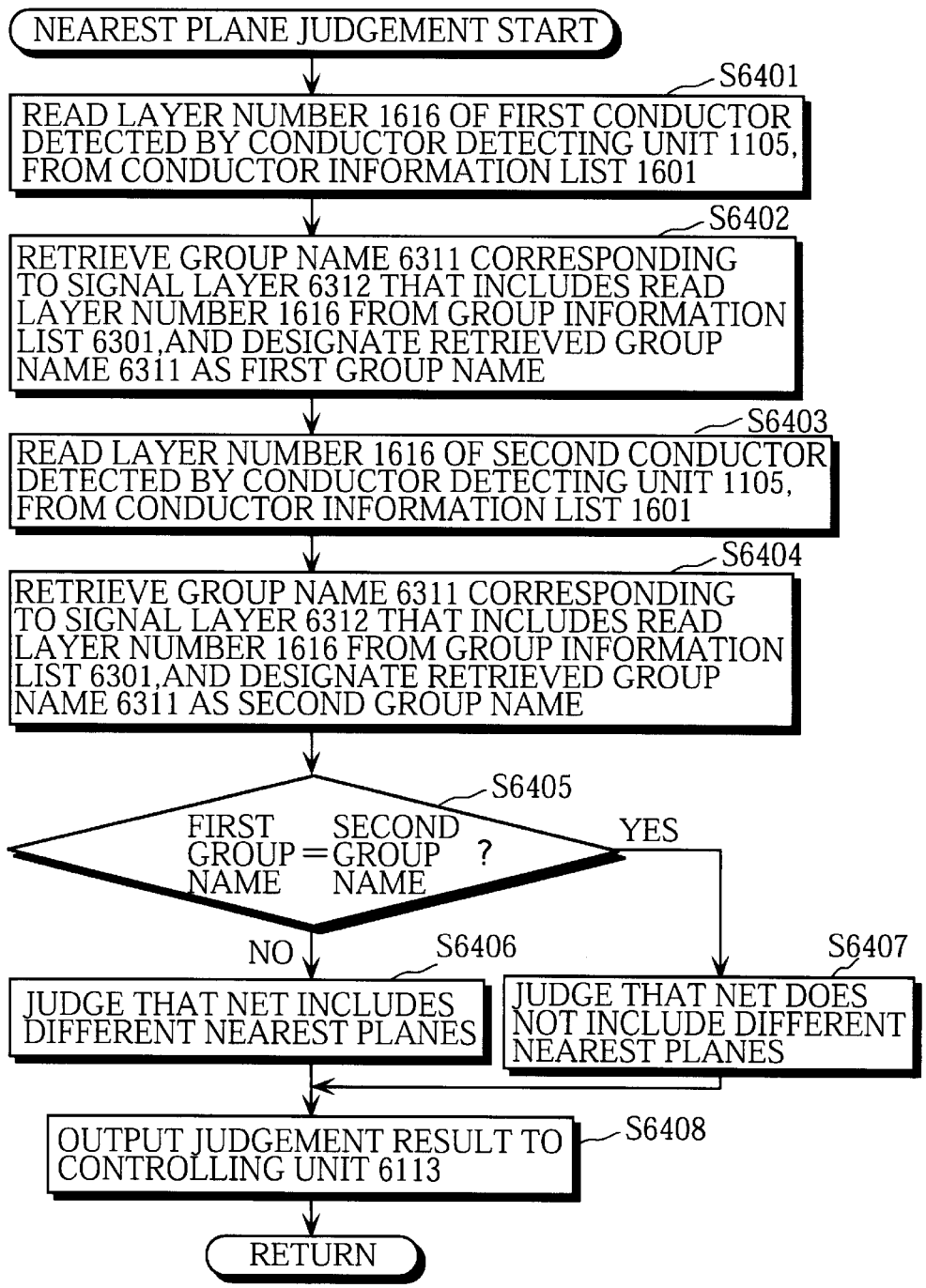
FIG. 83 is a flowchart showing the operation of a nearest plane judging unit 6124 of the CAD apparatus 6000.

The operation of the nearest plane judging unit 6124 is explained below with reference to FIG. 83.

The nearest plane judging unit 6124 reads the layer number 1616 of the first conductor from the conductor information list 1601 (S6401), retrieves a group name 6311 corresponding to a signal layer 6312 that includes the read layer number 1616 from the group information list 6301, and designates the retrieved group name 6311 as the first group name (S6402). Similarly, the nearest plane judging unit 6124 reads the layer number 1616 of the second conductor from the conductor information list 1601 (S6403), retrieves a group name 6311 corresponding to a signal layer 6312 that includes the read layer number 1616 from the group information list 6301, and designates the retrieved group name 6311 as the second group name (S6404).

The nearest plane judging unit 6124 compares the first and second group names (S6405). If they match, the nearest plane judging unit 6124 judges that the net includes only one nearest plane (S6407). If they do not match, the nearest plane judging unit 6124 judges that the net includes different nearest planes (S6406). The nearest plane judging unit 6124 outputs the judgement result to the controlling unit 6113 (S6408).

(6.2.6) Operation of Capacitor Element Connection Plane Storing Unit 6125

Figure 84:
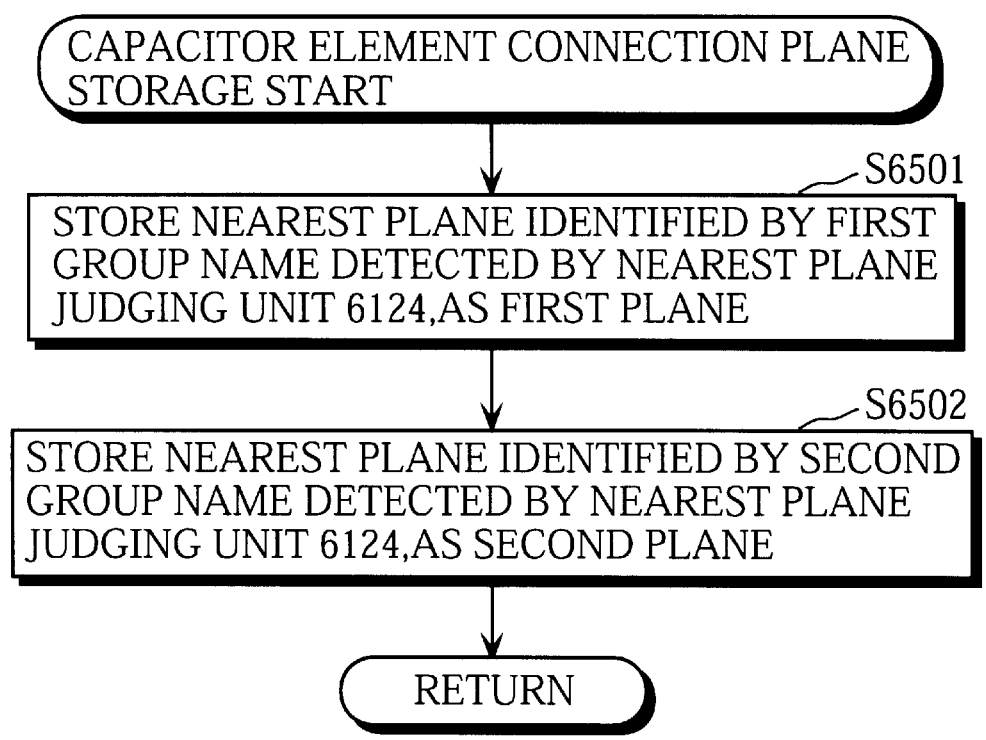
FIG. 84 is a flowchart showing the operation of a capacitor element connection plane storing unit 6125 of the CAD apparatus 6000.

The operation of the capacitor element connection plane storing unit 6125 is explained below with reference to FIG. 84.

The capacitor element connection plane storing unit 6125 stores a nearest plane identified by the first group name detected by the nearest plane judging unit 6124, as the first plane (S6501). The capacitor element connection plane storing unit 6125 similarly stores a nearest plane identified by the second group name detected by the nearest plane judging unit 6124, as the second plane (S6502).

(6.2.7) Operation of Via-vicinity Capacitor Element Placement Judging Unit 6126

Figure 85:
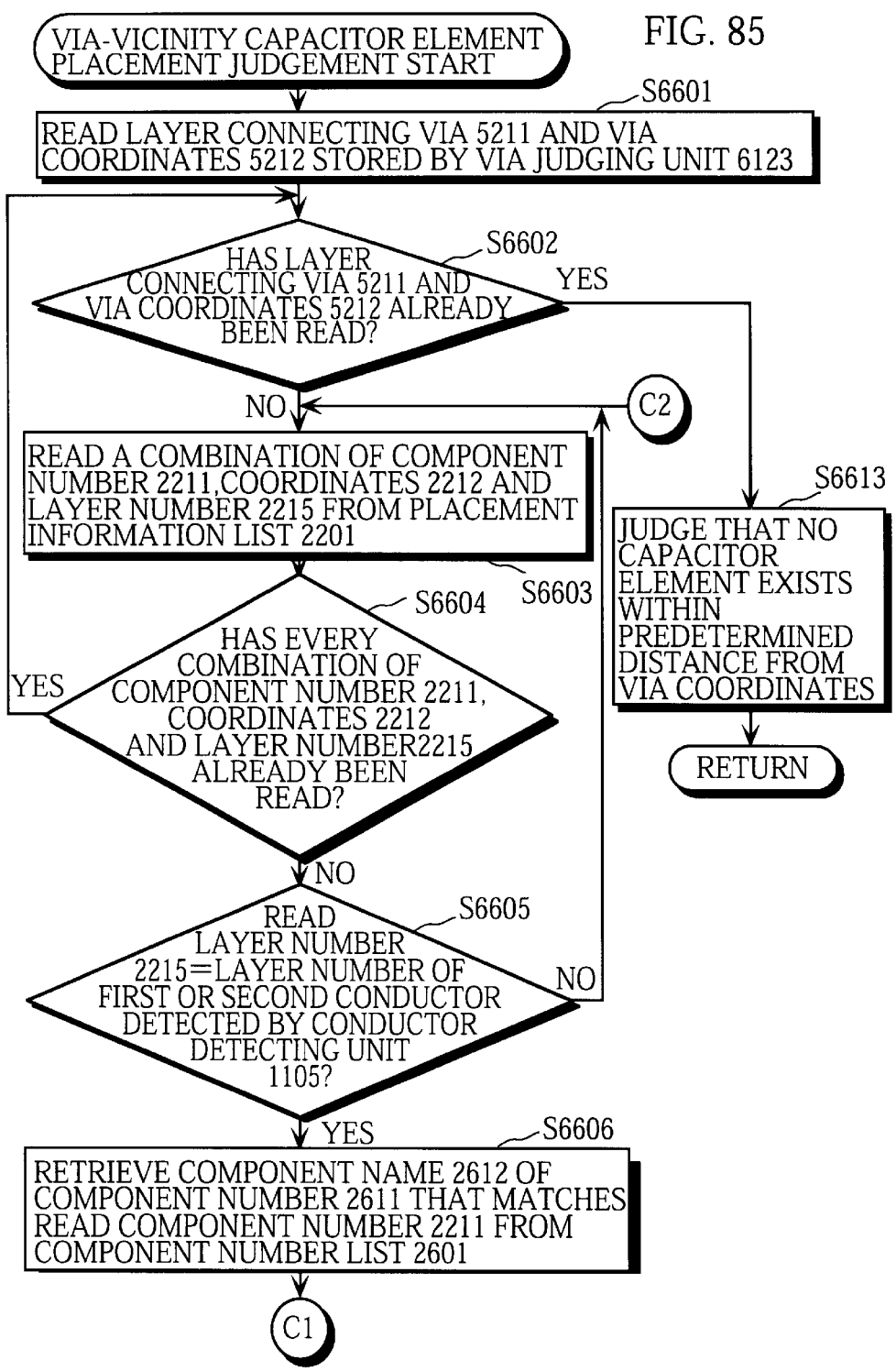
FIG. 85 is a partial flowchart showing the operation of a via-vicinity capacitor element placement judging unit 6126 of the CAD apparatus 6000.
Figure 86:
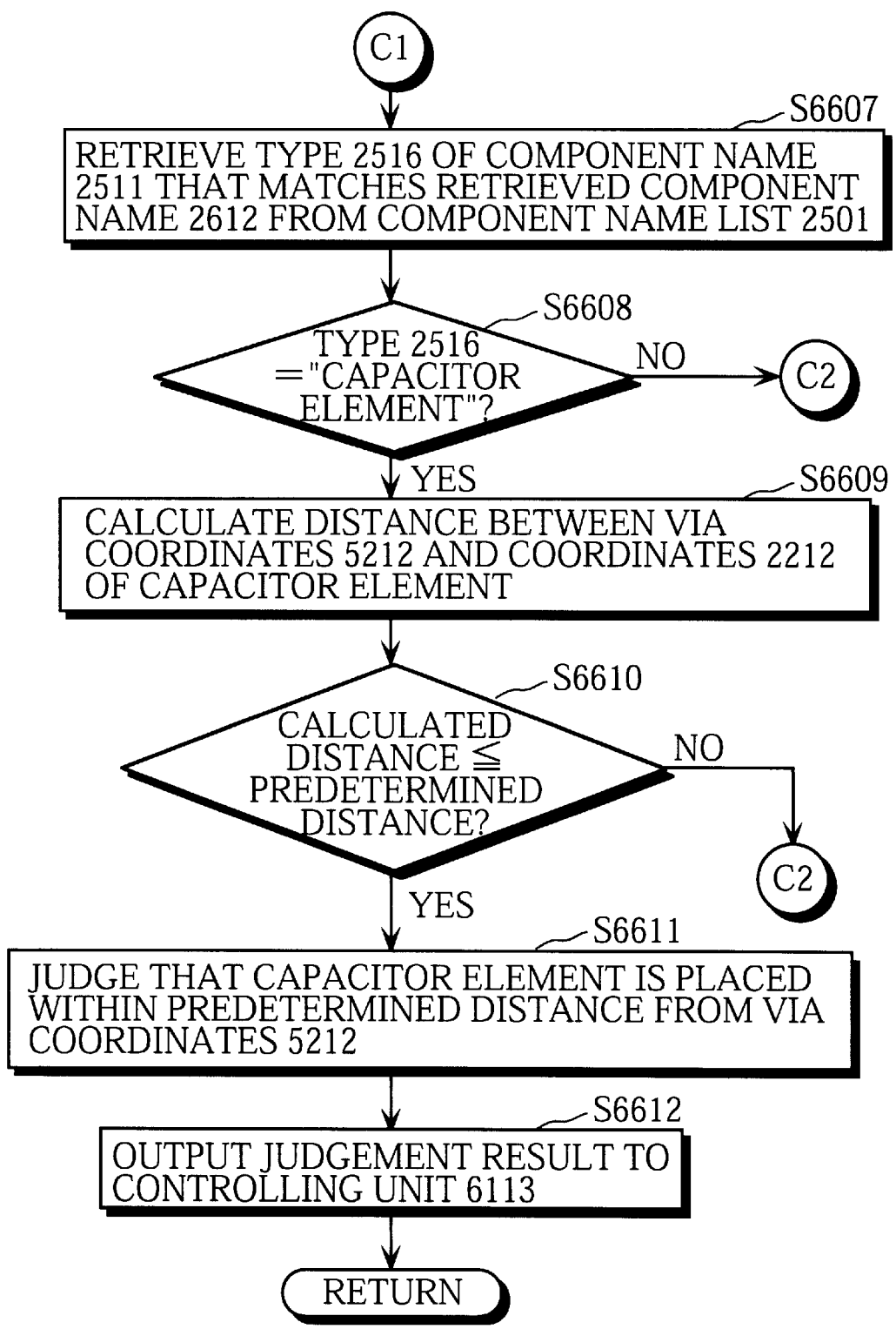
FIG. 86 is a partial flowchart showing the operation of the via-vicinity capacitor element placement judging unit 6126.

The operation of the via-vicinity capacitor element placement judging unit 6126 is explained below with reference to FIGS. 85 and 86.

The via-vicinity capacitor element placement judging unit 6126 reads the layer connecting via 5211 and via coordinates 5212 stored by the via judging unit 6123 (S6601).

If the layer connecting via 5211 and via coordinates 5212 have already been read (S6602), the via-vicinity capacitor element placement judging unit 6126 proceeds to step S6613. In step S6603, the via-vicinity capacitor element placement judging unit 6126 reads a combination of component number 2211, coordinates 2212 and layer number 2215 from the placement information list 2201.

If every combination has already been read (S6604), the via-vicinity capacitor element placement judging unit 6126 returns to step S6602. In step S6605, the via-vicinity capacitor element placement judging unit 6126 judges whether the read layer number 2215 match the layer number 1616 of either the first conductor or second conductor detected by the conductor detecting unit 1105. If they do not match, the via-vicinity capacitor element placement judging unit 6126 returns to step S6603. If they match, the via-vicinity capacitor element placement judging unit 6126 retrieves a component name 2612 of a component number 2611 same as the read component number 2211 from the component number list 2601 (S6606) and retrieves a type 2516 of a component name 2511 same as the retrieved component name 2612 from the component name list 2501 (S6607).

The via-vicinity capacitor element placement judging unit 6126 then detects layer numbers of ground/power layers to which ground and power terminals of the read component number 2211 are connected, and judges whether the detected layer numbers match the first and second planes stored by the capacitor element connection plane storing unit 6125.

If they match, the via-vicinity capacitor element placement judging unit 6126 further judges whether the retrieved type 2516 is "capacitor element (S6608). When the type 2516 is not "capacitor element", the via-vicinity capacitor element placement judging unit 6126 returns to step S6603. When the type 2516 is "capacitor element", the via-vicinity capacitor element placement judging unit 6126 calculates the distance between the via coordinates 5212 and the coordinates 2212 of the capacitor element (S6609). The via-vicinity capacitor element placement judging unit 6126 then compares the calculation result with the predetermined distance (S6610). If the calculation result is larger than the predetermined distance, the via-vicinity capacitor element placement judging unit 6126 returns to step S6603. If the calculation result is equal to or smaller than the predetermined distance, the via-vicinity capacitor element placement judging unit 6126 judges that the capacitor element is placed within the predetermined distance from the via coordinates 5212 (S6611), outputs the judgement result to the controlling unit 6113 (S6612), and completes the operation.

In step S6613, the via-vicinity capacitor element placement judging unit 6126 judges that no capacitor element is placed within the predetermined distance from the via coordinates 5212, and completes the operation.

(6.2.8) Operation of Via Moving Unit 6127

Figure 87:
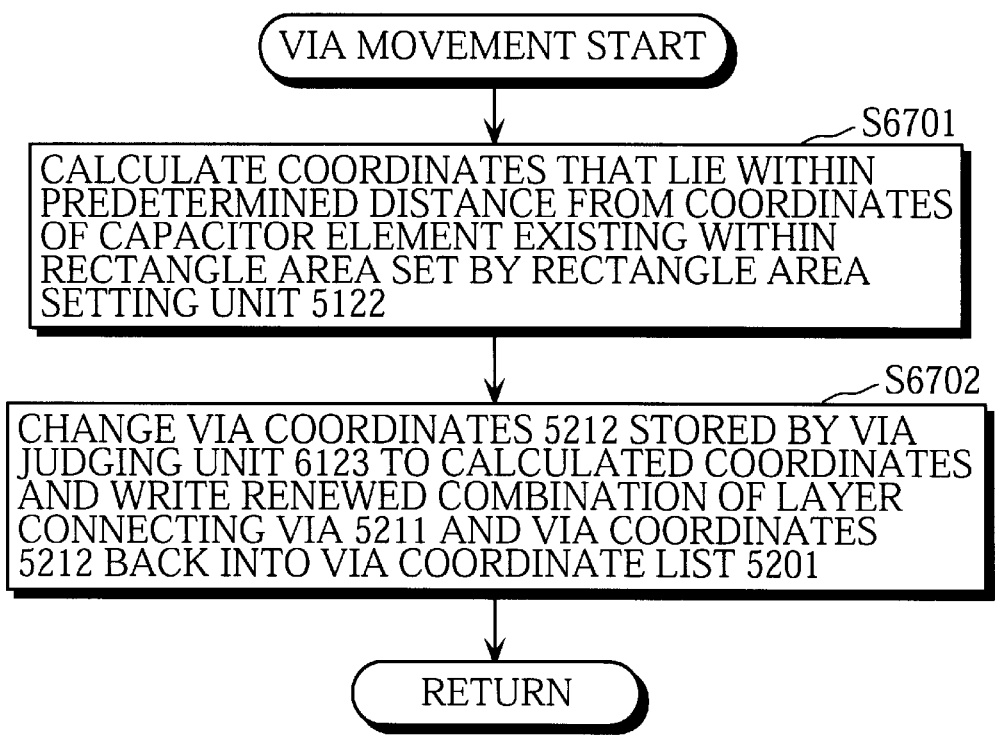
FIG. 87 is a flowchart showing the operation of a via moving unit 6127 of the CAD apparatus 6000.

The operation of the via moving unit 6127 is explained below with reference to FIG. 87.

The via moving unit 6127 calculates coordinates which lie within the predetermined distance from coordinates of a capacitor element existing in a rectangle area set by the rectangle area setting unit 5122 (S6701). The via moving unit 6127 then changes the via coordinates 5212 stored by the via judging unit 6123 to the above calculated coordinates and writes the renewed combination of layer connecting via 5211 and via coordinates 5212 back into the via coordinate list 5201 (S6702).

(6.2.9) Operation of Routing Unit 6128

Figure 88:
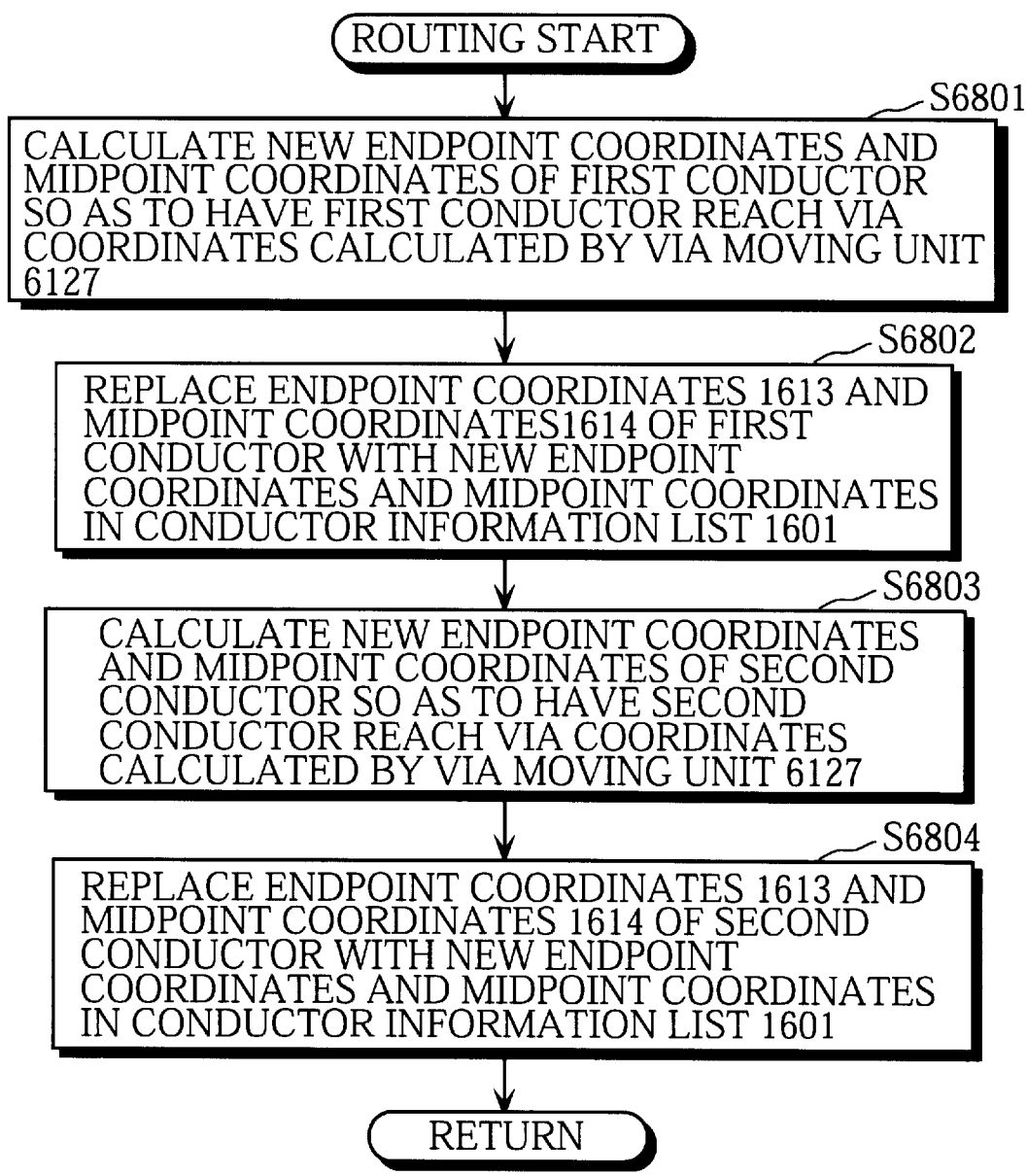
FIG. 88 is a flowchart showing the operation of a routing unit 6128 of the CAD apparatus 6000.

The operation of the routing unit 6128 is explained below with reference to FIG. 88.

The routing unit 6128 calculates new endpoint coordinates and new midpoint coordinates of the first conductor so as to have the first conductor reach the new via coordinates calculated by the via moving unit 6127 (S6801). The routing unit 6128 replaces the endpoint coordinates 1613 and midpoint coordinates 1614 of the set of conductor information 1621 for the first conductor with the new endpoint coordinates and midpoint coordinates, and writes the renewed set of conductor information 1621 back into the conductor information list 1601 (S6802). Similarly, the routing unit 6128 calculates new endpoint coordinates and new midpoint coordinates of the second conductor so as to have the second conductor reach the via coordinates calculated by the via moving unit 6127 (S6803). The routing unit 6128 then replaces the endpoint coordinates 1613 and midpoint coordinates 1614 of the set of conductor information 1621 for the second conductor with the new endpoint coordinates and midpoint coordinates, and writes the renewed set of conductor information 1621 in the conductor information list 1601 (S6804).

(6.2.10) Operation of Capacitor Element Placing Unit 6129

Figure 89:
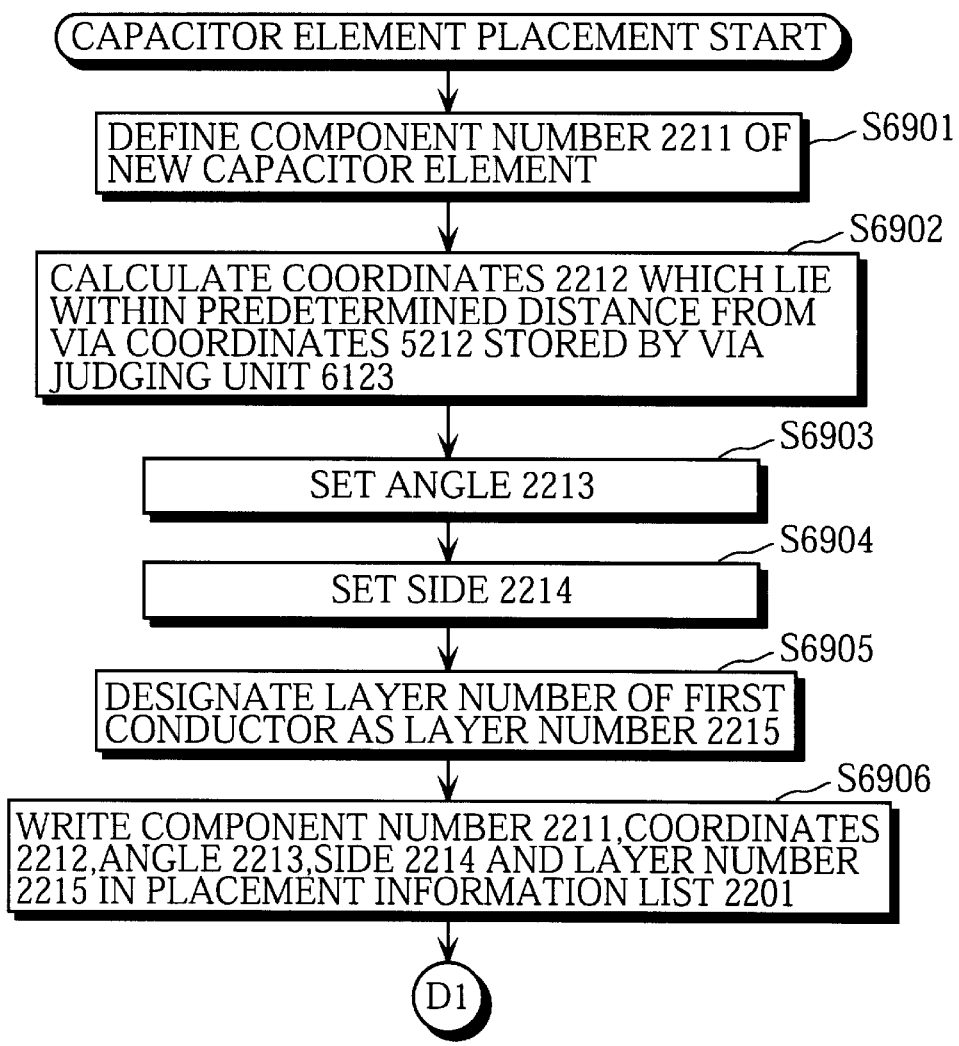
FIG. 89 is a partial flowchart showing the operation of a capacitor element placing unit 6129 of the CAD apparatus 6000.
Figure 90:
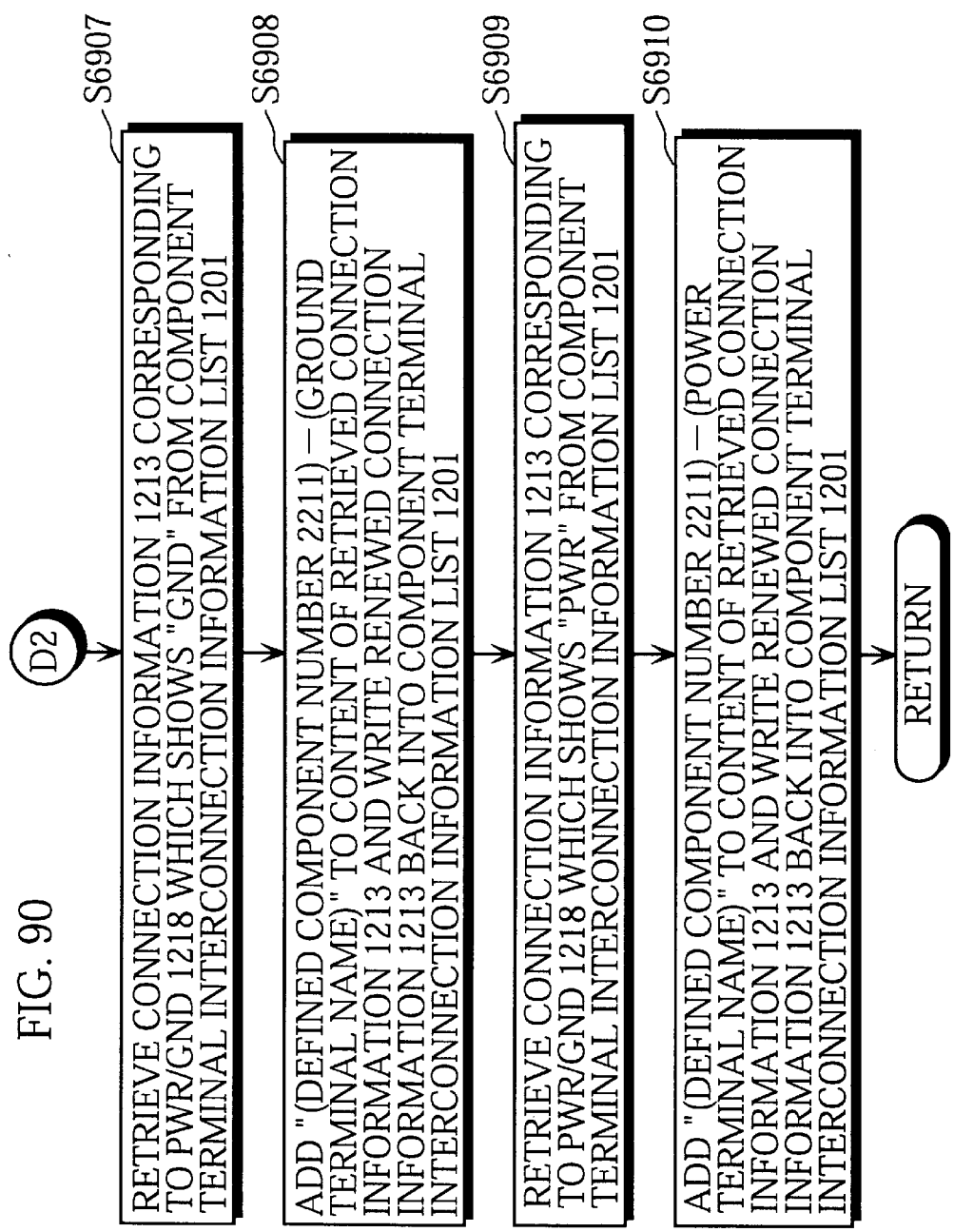
FIG. 90 is a partial flowchart showing the operation of the capacitor element placing unit 6129.

The operation of the capacitor element placing unit 6129 is explained below with reference to FIGS. 89 and 90.

The capacitor element placing unit 6129 defines a component number 2211 of a new capacitor element (S6901), calculates coordinates 2212 that lie within the predetermined distance from the via coordinates 5212 stored by the via judging unit 6123 (S6902), sets an angle 2213 (S6903), sets a side 2214 (S6904), and designates the layer number 1616 of the first conductor as a layer number 2215 (S6905). The capacitor element placing unit 6129 then writes the component number 2211, coordinates 2212, angle 2213, side 2214 and layer number 2215 in the placement information list 2201 as a new set of placement information 2210 (S6906).

Next, the capacitor element placing unit 6129 retrieves connection information 1213 corresponding to PWR/GND 1218 which shows "GND" from the component terminal interconnection information list 1201 (S6907), adds "(newly defined component number 2211)-(ground terminal name)" to the content of the retrieved connection information 1213, and writes the renewed connection information 1213 back into the component terminal interconnection information list 1201 (S6908). The capacitor element placing unit 6129 similarly retrieves connection information 1213 corresponding to PWR/GND 1218 which shows "PWR" from the component terminal interconnection information list 1201 (S6909), adds "(newly defined component number 2211)-(power terminal name)" to the content of the retrieved connection information 1213, and writes the renewed connection information 1213 back into the component terminal interconnection information list 1201 (S6910).

(6.3) Modifications

In the sixth embodiment, the via-vicinity capacitor element placement judging unit 6126 retrieves a component name 2612 of a component number 2611 same as the read component number 2211 from the component number list 2601, retrieves a type 2516 of a component name 2511 same as the retrieved component name 2612 from the component name list 2501, and, if the type 2516 is "capacitor element", calculates the distance between the via coordinates and the coordinates 2212 of the capacitor element. Here, the component name list 2501 may store a capacitance of each capacitor element beforehand, so that the via-vicinity capacitor element placement judging unit 6126 can calculate the distance on judging that the type 2516 is "capacitor element" and the capacitance of the capacitor element matches a predetermined capacitance. In such a case, the predetermined capacitance is stored in the via-vicinity capacitor element placement judging unit 6126 in advance.

Here, the data inputting unit 1102 may receive input of a predetermined capacitance from the designer and output the predetermined capacitance to the via-vicinity capacitor element placement judging unit 6126 that accordingly stores the predetermined capacitance.

7. Seventh Embodiment

The following is a description of a CAD apparatus 100 for aiding circuit board design as the seventh embodiment of the present invention, with reference to figures.

(7.1) Construction of CAD Apparatus 100

Figure 91:
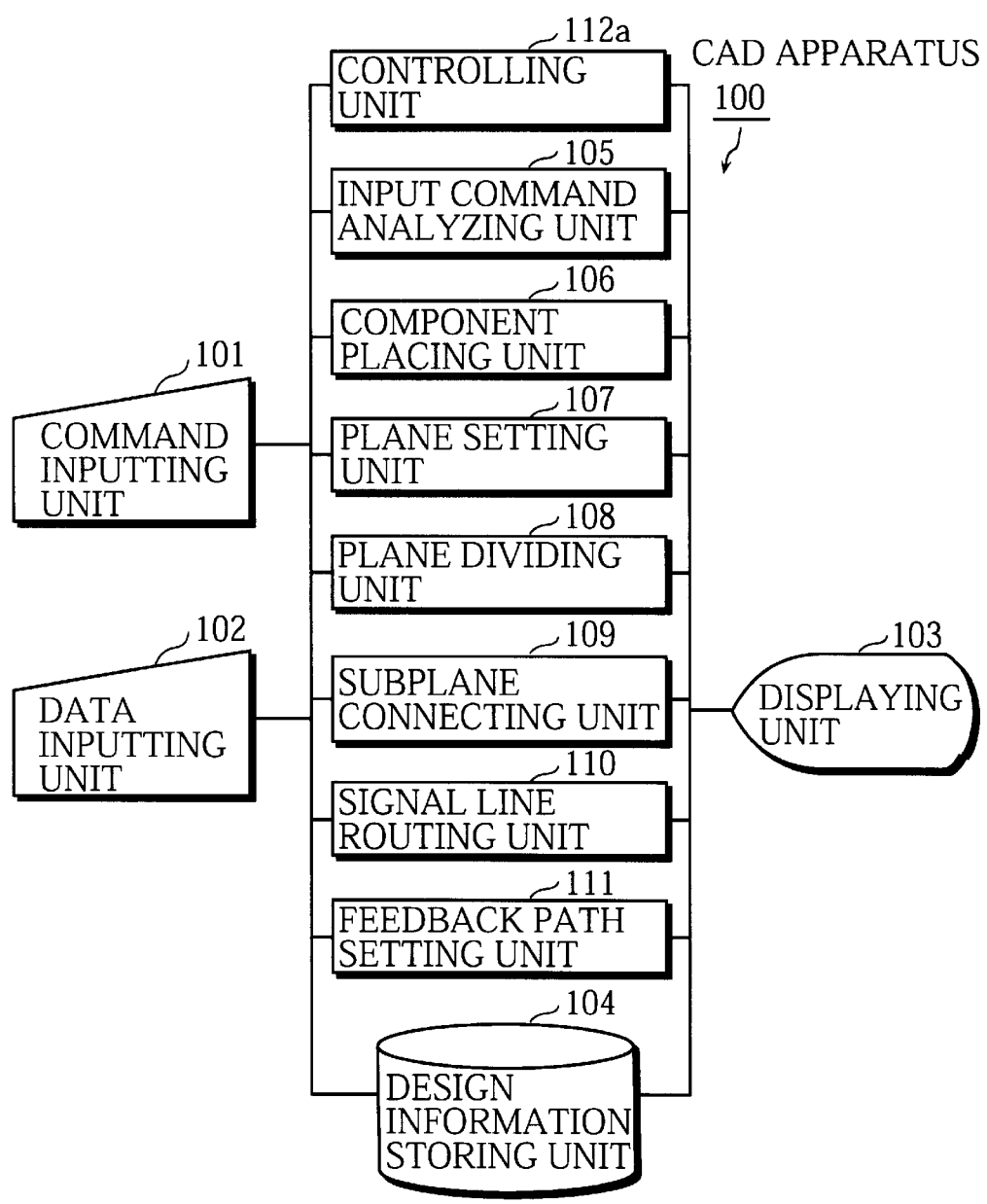
FIG. 91 is a block diagram showing the construction of a CAD apparatus 100 of the seventh embodiment of the present invention.

As shown in FIG. 91, the CAD apparatus 100 includes a command inputting unit 101, a data inputting unit 102, a displaying unit 103, a design information storing unit 104, an input command analyzing unit 105, a component placing unit 106, a plane setting unit 107, a plane dividing unit 108, a subplane connecting unit 109, a signal line routing unit 110, a feedback path setting unit 111 and a controlling unit 112a. This CAD apparatus 100 divides a power plane and a ground plane into subplanes based on the frequency characteristic of each circuit block.

This CAD apparatus 100 can be realized in the same way as the CAD apparatus 1000 of the first embodiment by executing software that implements the features shown in FIG. 91 on hardware of a computer, such as a workstation shown in FIG. 2.

(7.1.1) Command Inputting Unit 101, Data Inputting Unit 102, Displaying Unit 103

The command inputting unit 101 receives input of one of various design commands from the designer through a keyboard or a mouse and outputs the input design command to the input command analyzing unit 105.

The data inputting unit 102 receives input of information, such as circuit diagram information generated by a circuit diagram generating CAD apparatus.

The displaying unit 103 displays a circuit board on a display screen in design processes.

(7.1.2) Design Information Storing Unit 104

The design information storing unit 104 stores design information, such as the circuit diagram information received by the data inputting unit 102, that is necessary for designing a circuit board.

Such design information includes component information showing components which compose each circuit block, connection information showing connection paths between component terminals, and signal information showing a transition time of an output signal of each component terminal and a signal frequency of each signal line.

A circuit block referred to here is composed of a plurality of circuit components and is either a circuit component group whose circuit components as a whole possess a specific function or a circuit component group whose circuit components have the same power supply voltage level.

More specifically, the design information stored in the design information storing unit 104 includes a board constituent table 510 shown in FIG. 92, a component list 520 shown in FIG. 93, a terminal list 530 shown in FIG. 94, a net list 540 shown in FIG. 95, a block information table 550 shown in FIG. 96, a placement position table 560 shown in FIG. 97, and a routing path table 570 shown in FIG. 98.

The component list 520, the terminal list 530 and the block information table 550 correspond to the component information mentioned above. The net list 540 corresponds to the connection information. Frequency/potential 543 in the net list 540 and rise time 533 and fall time 534 in the terminal list 530 correspond to the signal information.

<Board Constituent Table 510>

The board constituent table 510 is made up of combinations of layer numbers 511 and layer types 512, as shown in FIG. 92. A layer number 511 identifies a layer in a circuit board. A layer type 512 shows whether the layer is a power plane, a ground plane, or a signal layer on which components are placed and signal lines are routed.

This board constituent table 510 is inputted in the data inputting unit 102 together with data showing a board size (not shown in the figure) and is stored in the design information storing unit 104.

The board constituent table 510 shown in the figure relates to a 4-layer circuit board which is made up of two signal layers (first and fourth layer), a 5-volt power plane (second layer) and a ground plane (third layer).

<Component List 520>

The component list 520 is made up of combinations of component numbers 521, component names 522, numbers of terminals 523, shapes 524, lengths 525 and widths 526, as shown in FIG. 93.

A component number 521 identifies a component in the circuit board. A component name 522 identifies a type of the component. A number of terminals 523 shows the number of terminals possessed by the component. A shape 524 shows a shape of the component. A length 525 shows a length of a predetermined side of the component, while a width 526 shows a length of another side of the component.

<Terminal List 530>

The terminal list 530 is made up of combinations of terminal numbers 531, attributes 532, rise times 533 and fall times 534, as shown in FIG. 94.

A terminal number 531 identifies a component terminal. For example, a terminal number "IC1-P1" identifies the first pin of a component "IC1". An attribute 532 shows whether the component terminal is an input (IN) terminal or an output (OUT) terminal. A rise time 533 and a fall time 534 show a transition time of a signal level outputted from the component terminal which is an output terminal.

<Net List 540>

The net list 540 is made up of combinations of connection names 541, terminal number groups 542 and frequency/potential 543, as shown in FIG. 95.

A connection name 541 identifies a net in the circuit board. A terminal number group 542 shows component terminals connected by the net. Frequency/potential 543 shows a frequency or potential of a signal that runs through the net.

For example, a net "net2" has signal lines through which a signal of 33 (MHZ) runs, a net "net100" is connected to the 0-volt ground plane, and a net "net200" is connected to the 5-volt power plane.

<Block Information Table 550>

The block information table 550 is made up of combinations of block names 551, component number groups 552, first coordinates 553, second coordinates 554 and DA types 555, as shown in FIG. 96.

A block name 551 identifies a circuit block in the circuit board. A component number group 552 shows a plurality of components that compose the circuit block. First coordinates 553 and second coordinates 554 show a placement area of the circuit block whose components have been placed by the component placing unit 106. The first coordinates 553 and the second coordinates 554 respectively represent a lower left point and upper right point of the rectangle placement area of the circuit block. A DA type 555 shows whether the circuit block is a digital circuit or an analog circuit.

Note that the placement area of the circuit block may take a form of a polygon made up of a plurality of rectangles. In such a case, the block information table 550 shows coordinates of each vertex of the polygon, instead of the first coordinates 553 and second coordinates 554.

<Placement Position Table 560>

The placement position table 560 is made up of combinations of component numbers 561, coordinates 562, angles 563 and sides 564, as shown in FIG. 97.

A component number 561 identifies a component placed in the circuit board. Coordinates 562 show a placement position of the component. An angle 563 shows an angle which a predetermined side of the component forms with the X axis of the circuit board. A side 564 shows a placement side of the circuit board for the component.

<Routing Path Table 570>

The routing path table 570 is made up of combinations of connection names 571 and coordinate string data 572, as shown in FIG. 98.

A connection name 571 identifies a net in the circuit board. Coordinate string data 572 shows a routing path of the net formed by placing conductors on a signal layer.

(7.1.3) Input Command Analyzing Unit 105

The input command analyzing unit 105 receives an input design command from the command inputting unit 101 and analyzes the design command to judge a type of the command. The input command analyzing unit 105 then outputs the command to the controlling unit 112a.

A plane dividing command is included in design commands.

(7.1.4) Component Placing Unit 106

The component placing unit 106 determines placement positions of components for each circuit block according to the component information. The operation of the component placing unit 106 is the same as conventional CAD apparatuses and is not explained here. For details of the component placement, see Akihiko Deta (1990) *Printed Circuit Board CAE*, pp.64–75, published by Heian.

(7.1.5) Plane Setting Unit 107

The plane setting unit 107 specifies power/ground planes in a multilayer circuit board.

Specifically, the plane setting unit 107 writes a voltage level of a power plane in the board constituent table 510 as a layer type 512 of a layer number 511 that corresponds to the power plane, and writes a voltage level of a ground plane in the board constituent table 510 as a layer type 512 of a layer number 511 that corresponds to the ground plane.

When a circuit board is a 4-layer circuit board whose second and third layers are respectively power and ground planes, the plane setting unit 107 writes "5V" in a layer type 512 of a layer number 511 "2" and writes "0V" in a layer type 512 of a layer number 511 "3" in the board constituent table 510 as shown in FIG. 92. If, on the other hand, a circuit board is a 6-layer circuit board whose third and fourth layers are respectively power and ground planes, the plane setting unit 107 writes "5V" in a layer type 512 of a layer number 511 "3" and writes "0V" in a layer type 512 of a layer number 511 "4" in the board constituent table 510.

(7.1.6) Plane Dividing Unit 108

The plane dividing unit 108 classifies each circuit block whose components have been placed by the component placing unit 106 into various types, such as a high-speed circuit block (high-speed block) including signal lines through which a specific signal flows. The specific signal referred to here is a signal whose amount of change in a predetermined period of time is equal to or larger than a predetermined value. Such a signal has a high frequency or a short rise/fall time.

The plane dividing unit 108 then combines circuit blocks of the same type into one placement area.

In the present embodiment, circuit blocks are classified under six types of digital high-speed block, digital medium-speed block, digital low-speed block, analog high-speed block, analog medium-speed block and analog low-speed block. By judging a type of each circuit block and combining circuit blocks of the same type into one placement area, the plane dividing unit 108 generates six placement areas at the maximum.

Note here that circuit blocks of the same type may not necessarily be combined into one placement area as above.

The plane dividing unit 108 then divides each of the power plane and ground plane set by the plane setting unit 107 into subplanes that correspond to the generated placement areas. The plane dividing unit 108 then calculates a non-conductor area called "slit" which is present between each adjacent two subplanes.

In the present embodiment, each of the power and ground planes is divided into subplanes which correspond to a maximum of six placement areas generated according to types of the circuit blocks.

The plane dividing unit 108 then stores placement areas of the generated subplanes in a temporary subplane routing path table together with connection names.

Thus, by grouping circuit blocks of different types into different placement areas and dividing the power and ground planes in accordance with the placement areas, it is possible to prevent leakage of harmonic noise from high-speed blocks to the other blocks.

(7.1.7) Subplane Connecting Unit 109

The subplane connecting unit 109 connects each adjacent two subplanes by a conductor of fixed width.

(7.1.8) Signal Line Routing Unit 110

The signal line routing unit 110 places signal line conductors between components placed on each signal layer for routing signal lines, according to the connection information stored in the design information storing unit 104.

(7.1.9) Feedback Path Setting Unit 111

The feedback path setting unit 111 judges, for each predetermined signal line conductor among the signal line conductors placed by the signal line routing unit 110, whether an area formed by projecting the predetermined signal line conductor onto each plane intersects any of slits present between subplanes.

When the area intersects a slit between two subplanes, the feedback path setting unit 111 judges whether the two subplanes have the same potential.

When the two subplanes have the same potential, the feedback path setting unit 111 places a feedback path conductor in an area formed by projecting the predetermined signal line conductor onto a plane nearest to a signal layer on which the signal line conductor has been placed. As a result, the feedback path conductor is placed within the slit and the two subplanes are connected by the feedback path conductor. The width of the feedback path conductor is roughly the same as the predetermined signal line conductor.

For instance, if a predetermined signal line conductor is placed on the first layer of a 4-layer circuit board whose second and third layers are respectively power and ground planes, a feedback path conductor is placed on the second layer. If, on the other hand, a predetermined signal line conductor is placed on the third layer of a 6-layer circuit board whose second and fourth layers are respectively power and ground planes, a feedback path conductor is placed on any of the second and fourth layers or a layer that is nearer to the third layer.

As a result, a current of the predetermined signal line conductor will return through the feedback path conductor. Thus, the feedback path for the current of the signal line can be secured on the power/ground plane.

(7.1.10) Controlling Unit 112a

The controlling unit 112a receives a plane dividing command from the input command analyzing unit 105 and activates the component placing unit 106, the plane setting unit 107, the plane dividing unit 108, the subplane connecting unit 109, the signal line routing unit 110 and the feedback path setting unit 111 in succession.

(7.2) Operation of CAD Apparatus 100

The following is a description of the operation of the CAD apparatus 100.

(7.2.1) Overall Operation of CAD Apparatus 100

The overall operation of the CAD apparatus 100 is explained below with reference to FIG. 99. This operation is performed once the board constituent table 510, the component list 520, the terminal list 530, the net list 540 and the block information table 550 (in which first and second coordinates 553 and 554 have not yet been set) outputted from the command inputting unit 101 and data inputting unit 102 have been stored in the design information storing unit 104 as design information.

Figure 100:
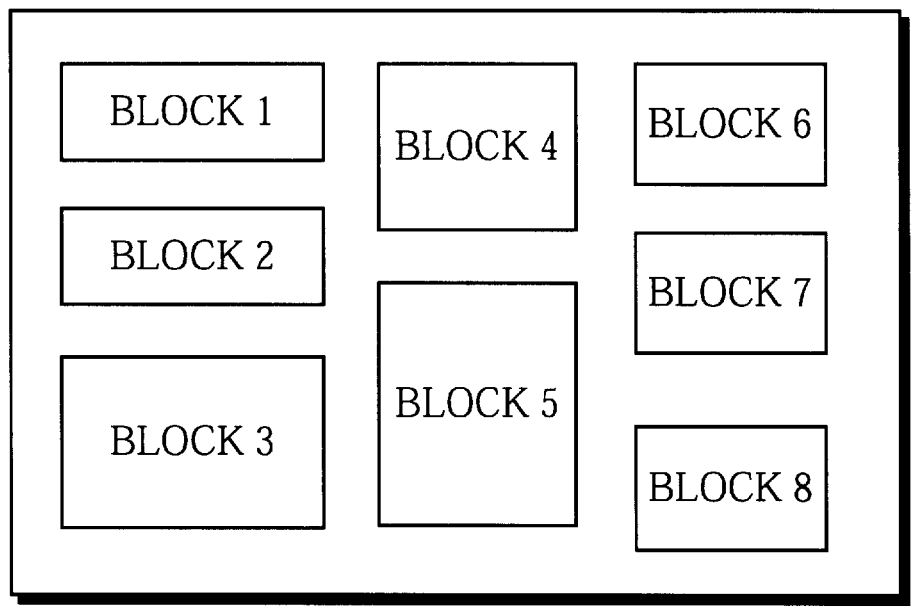
FIG. 100 shows a signal layer including circuit blocks whose components have been placed by a component placing unit 106.

First, on receiving a plane dividing command from the input command analyzing unit 105, the controlling unit 112a activates the component placing unit 106 which accordingly places components for each circuit block based on the design information in the design information storing unit 104 (S101). FIG. 100 shows blocks 1–8 whose components have been placed by the component placing unit 106. In the figure, a box that encloses blocks 1–8 represents an outer edge of a 4-layer circuit board. Blocks 1–8 correspond to the circuit blocks shown in the block information table 550. At this stage, first and second coordinates 553 and 554 for each circuit block are set.

Figure 101:
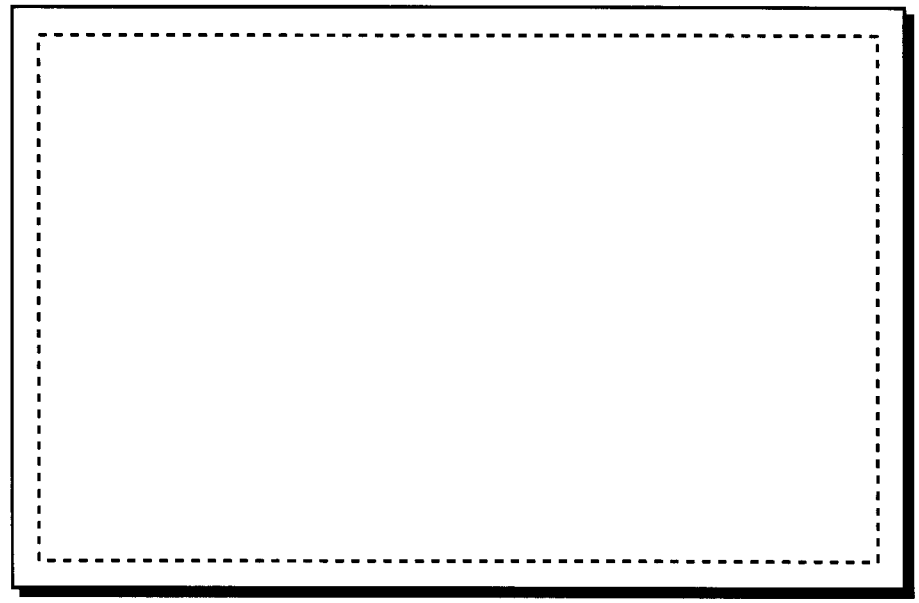
FIG. 101 shows an example of a power plane set by a plane setting unit 107.

Next, the controlling unit 112a activates the plane setting unit 107 which accordingly sets power and ground planes (S102). FIG. 101 shows a power plane set by the plane setting unit 107. In the figure, a solid line box represents the outer edge of the 4-layer circuit board, while a dashed line box represents the power plane set on the second layer of the circuit board. Though not shown in the figure, a ground plane is set on the third layer in the same way as the power plane in FIG. 101.

Figure 102:
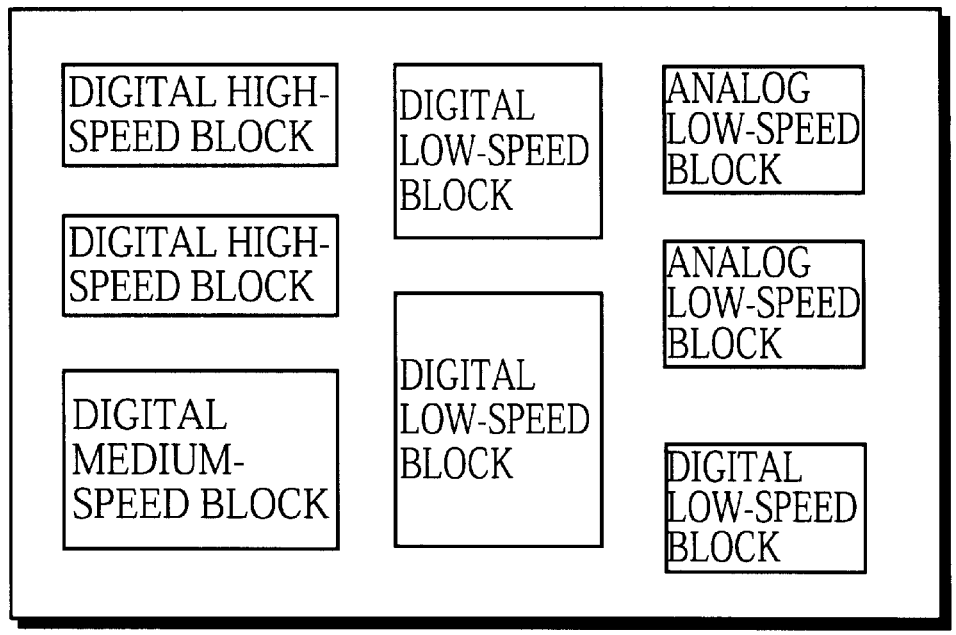
FIG. 102 shows the circuit blocks shown in FIG. 100 which have been classified by a plane dividing unit 108.

Next, the controlling unit 112a activates the plane dividing unit 108 which accordingly judges a type of each circuit block by digital/analog type and high-speed/medium-speed/low-speed type, with reference to the rise time 533 and fall time 534 in the terminal list 530 and the frequency/potential 543 in the net list 540. FIG. 102 shows a result of judging a type of each block 1–8 shown in FIG. 100. Here, blocks 1 and 2 have been classified as digital high-speed blocks, block 3 as a digital medium-speed block, blocks 4, 5 and 8 as digital low-speed blocks, and blocks 6 and 7 as analog low-speed blocks.

Figure 103:
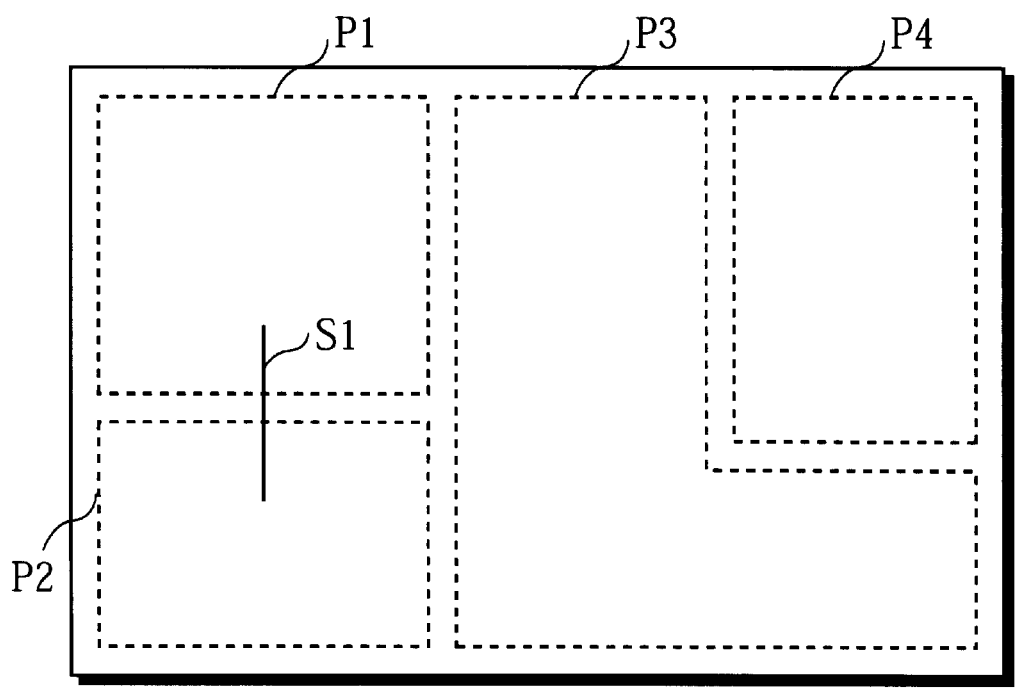
FIG. 103 shows subplanes generated from the power plane shown in FIG. 101.

The plane dividing unit 108 combines circuit blocks of the same type into one placement area and thus forms a plurality of placement areas. The plane dividing unit 108 then divides each of the power and ground planes set by the plane setting unit 107 into subplanes that correspond to the plurality of placement areas, and stores areas of the subplanes in a temporary subplane routing path table together with connection names (S103). FIG. 103 shows subplanes P1–P4 generated by dividing the power plane shown in FIG. 101. The ground plane is equally divided.

Next, the controlling unit 112a activates the subplane connecting unit 109 which accordingly connects each adjacent two subplanes (S104). The controlling unit 112a then activates the signal line routing unit 110 which accordingly places signal line conductors to connect the placed components, based on the connection information in the design information storing unit 104 (S105). The controlling unit 112a lastly activates the feedback path setting unit 111 which accordingly judges for each predetermined signal line conductor whether an area, formed by projecting the predetermined signal line conductor placed on a signal layer onto the power/ground plane, intersects a slit. If such an area intersects a slit present between two subplanes, the feedback path setting unit 111 judges whether the two subplanes have the same potential. If the two subplanes have the same potential, the feedback path setting unit 111 places a feedback path conductor in an area formed by projecting the predetermined signal line conductor onto a plane nearest to the signal layer (S106). As a result, the feedback path that connects the two subplanes is generated within the slit.

(7.2.2) Operation of Plane Dividing Unit 108

The operation of the plane dividing unit 108 (S103 in FIG. 99) is explained below with reference to FIGS. 108 and 109.

<Plane Dividing Operation>

Figure 108:
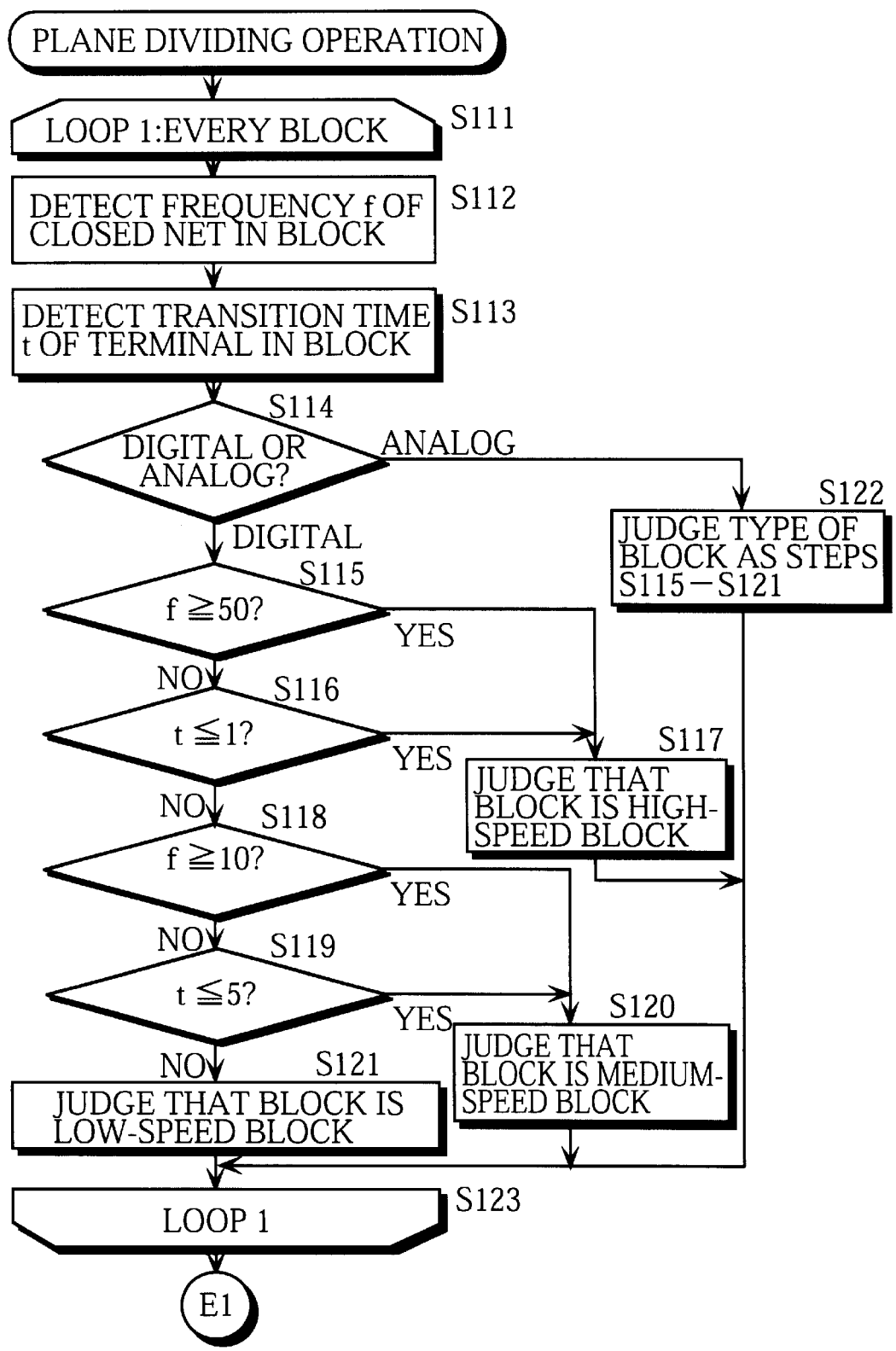
FIG. 108 is a partial flowchart showing the operation of the plane dividing unit 108.

FIG. 108 shows the procedure of classifying each circuit block under the types of digital high-speed block, digital medium-speed block, digital low-speed block, analog high-speed block, analog medium-speed block and analog low-speed block, based on the frequency characteristic of each circuit block. This procedure is explained below using block 1 shown in FIG. 100 as an example.

The plane dividing unit 108 refers to the block information table 550 and the net list 540 in the design information storing unit 104 and extracts all closed nets in a circuit block. The plane dividing unit 108 then selects a closed net whose frequency is highest among the extracted closed nets and sets the frequency of the selected net as frequency f. For block 1, a frequency "33 (MHZ)" of a connection name 541 "net2" that is the highest frequency in block 1 is retrieved from the net list 540 as frequency f (S112).

The plane dividing unit 108 also refers to the terminal list 530 and extracts transition times (rise times 533 and fall times 534) of signal levels of all component terminals included in the circuit block. The plane dividing unit 108 then sets the shortest transition time as transition time t. For block 1, a transition time "1 (ns)" of a terminal number 531 "IC1-P2" that is the shortest transition time in block 1 is retrieved from the terminal list 530 as transition time t (S113).

Next, the plane dividing unit 108 reads a DA type 555 of the circuit block from the block information table 550 and judges whether the circuit block is a digital or analog circuit. Note here that a DA type of each circuit block may instead be indicated by the designer. For block 1, the plane dividing unit 108 judges that block 1 is a digital circuit according to the block information table 550 (S114).

When the circuit block is judged to be a digital circuit in step S114, the plane dividing unit 108 judges whether the circuit block is a high-speed block, a medium-speed block or a low-speed block based on frequency f and transition time t. Here, if $f \geq 50$ (MHZ) (S115) or $t \leq 1$ (ns) (S116), the circuit block is judged to be a high-speed block (S117). If 10 (MHZ)$\leq f < 50$ (MHZ) (S118) or 1 (ns)$< t \leq 5$ (ns) (S119), the circuit block is judged to be a medium-speed block (S120). If f<10 (MHZ) and t>5 (ns), the circuit block is judged to be a low-speed block (S121).

For example, block 1 is judged to be a high-speed digital block, since frequency f is 33 (MHZ) and transition time t is 1 (ns).

When the circuit block is an analog circuit in step S114, the plane dividing unit 108 judges whether the circuit block is a high-speed, medium-speed, or low-speed block in the same way as steps S115–S121 (S122).

As a result, each circuit block is classified according to digital/analog and high-speed/medium-speed/low-speed types.

Figure 109:
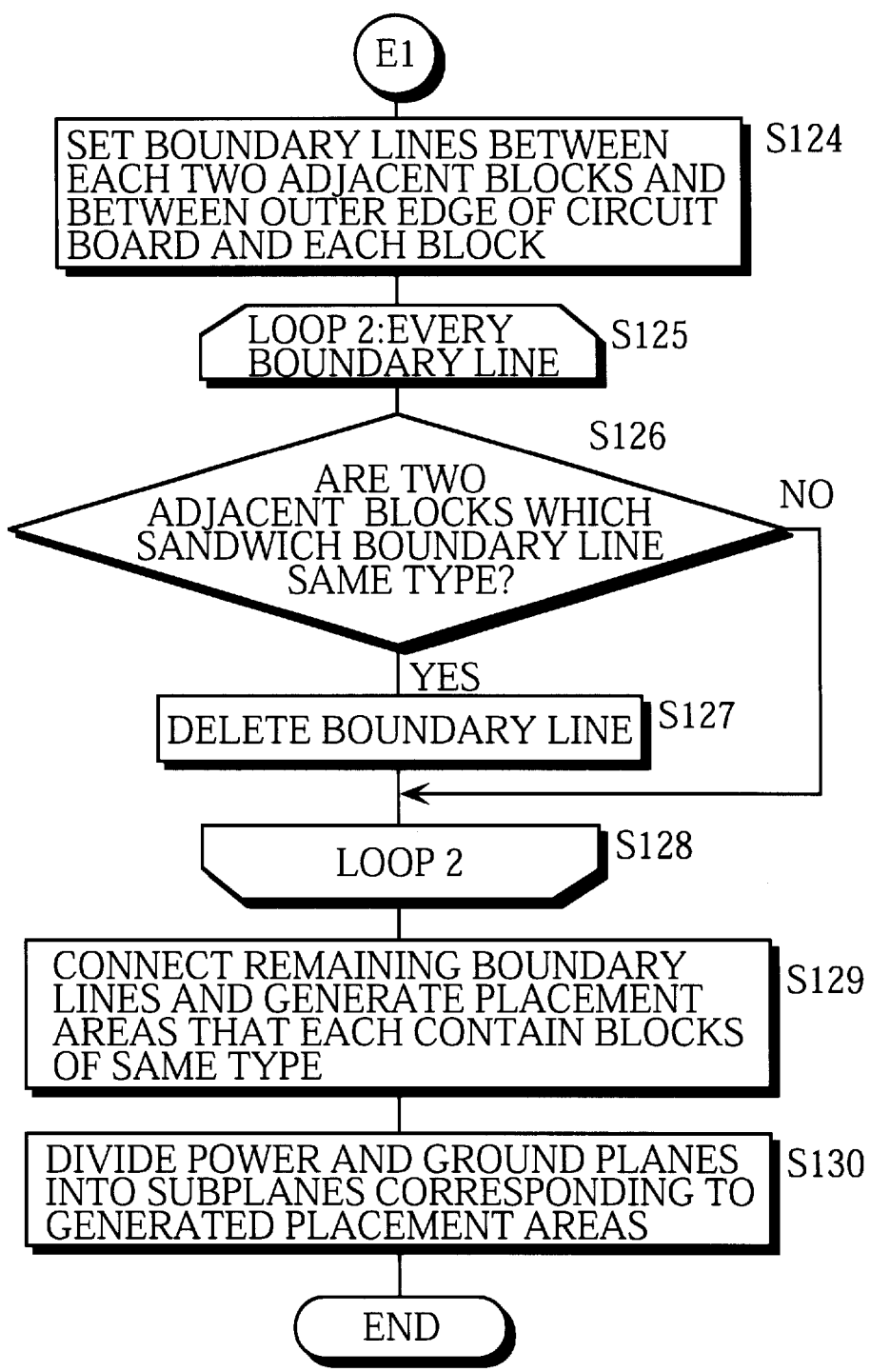
FIG. 109 is a partial flowchart showing the operation of the plane dividing unit 108.

The plane dividing unit 108 then proceeds to the procedure of dividing power/ground planes into subplanes shown in FIG. 109.

Figure 104:
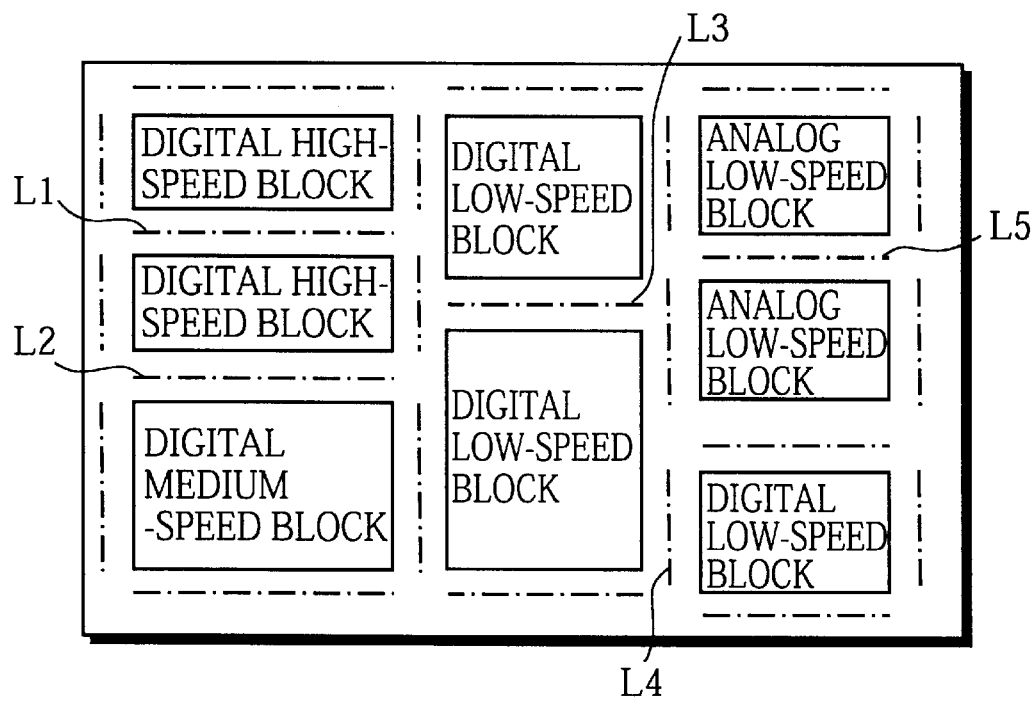
FIG. 104 shows boundary lines set along each circuit block.

The plane dividing unit 108 sets boundary lines between each two adjacent circuit blocks and between the outer edge of the board and each circuit block (S124). FIG. 104 shows an example of such boundary lines.

Figure 105:
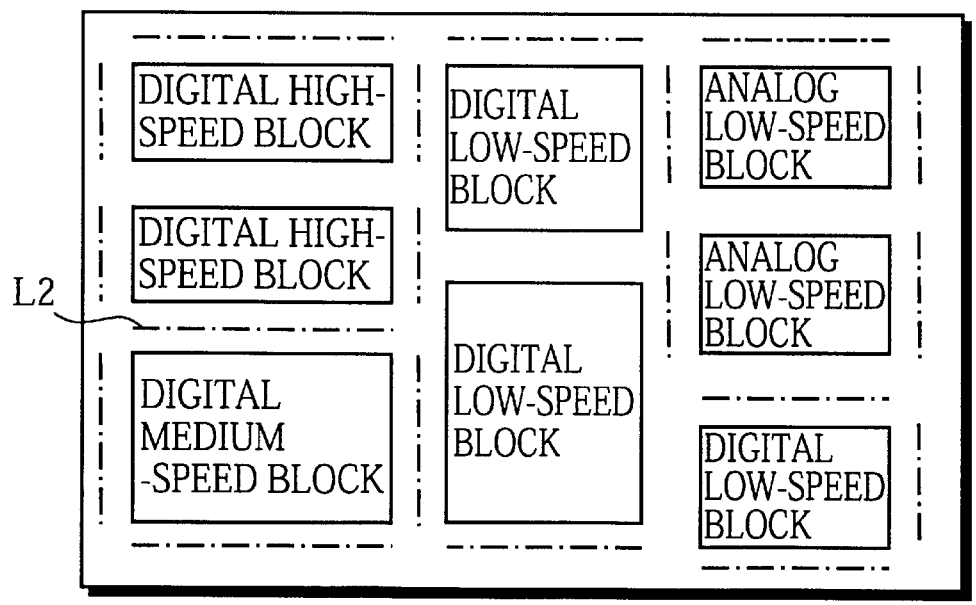
FIG. 105 shows boundary lines remaining after the plane dividing unit 108 deletes some of the boundary lines shown in FIG. 104.

The plane dividing unit 108 judges for each boundary line whether two adjacent circuit blocks which sandwich the boundary line are the same type. If the two circuit blocks are the same type, the plane dividing unit 108 deletes the boundary line (S125–S128). FIG. 105 shows boundary lines remaining after steps S125–S128. Boundary lines L1, L3, L4 and L5 in FIG. 104 have been deleted in FIG. 105.

Figure 106:
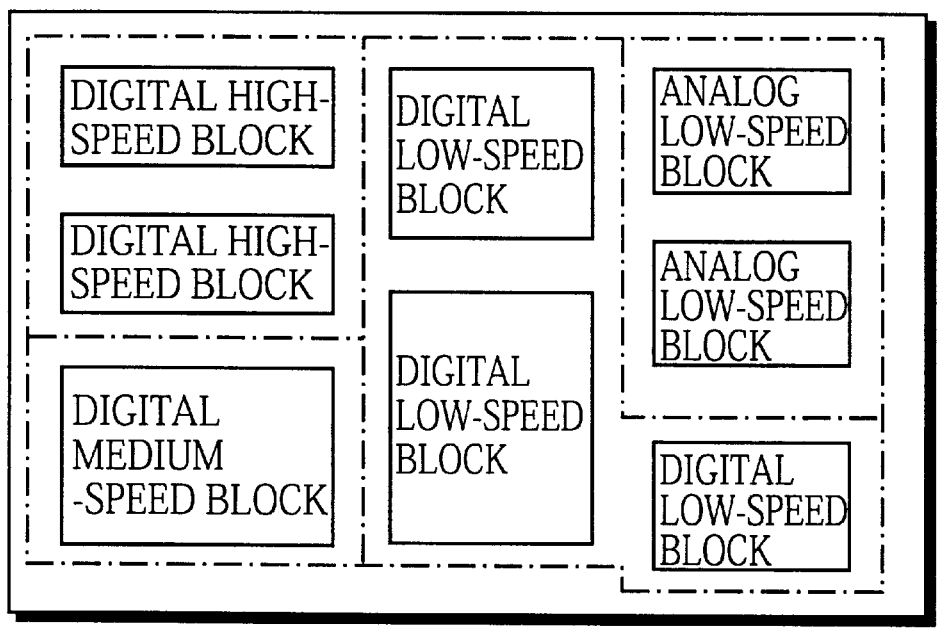
FIG. 106 shows the boundary lines shown in FIG. 105 which have been connected by the plane dividing unit 108.

Next, the plane dividing unit 108 connects the remaining boundary lines so that circuit blocks of the same type are combined into one placement area (S129). FIG. 106 shows placement areas that each contain circuit blocks of the same type. As shown in the figure, four placement areas for digital high-speed blocks, a digital medium-speed block, digital low-speed blocks and analog low-speed blocks have been generated.

Figure 107:
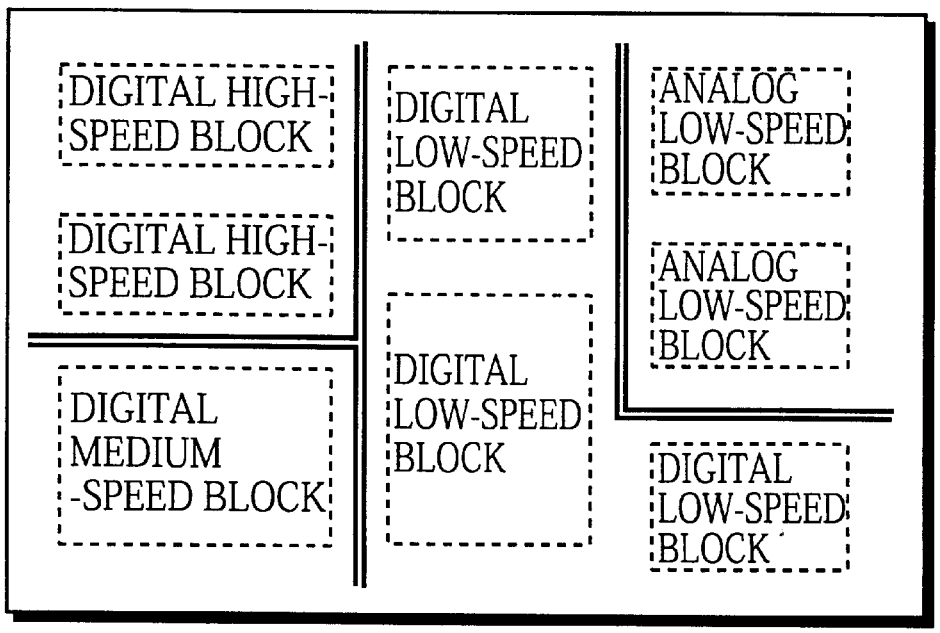
FIG. 107 shows slits generated on the power plane based on the boundary lines shown in FIG. 106.

The plane dividing unit 108 then divides the power plane set by the plane setting unit 107 into subplanes, by creating a slit along an area formed by projecting each boundary line between two placement areas onto the power plane. The plane dividing unit 108 equally divides the ground plane into subplanes (S130). In FIG. 107, double lines show slits created on the power plane from the boundary lines between the placement areas on the signal layer shown in FIG. 106. By setting such slits on the power plane, the plane dividing unit 108 divides the power plane into subplanes P1–P4 as shown in FIG. 103. The ground plane is divided in the same way as the power plane.

<Operation of Detecting Frequency f in Circuit Block>

Figure 110:
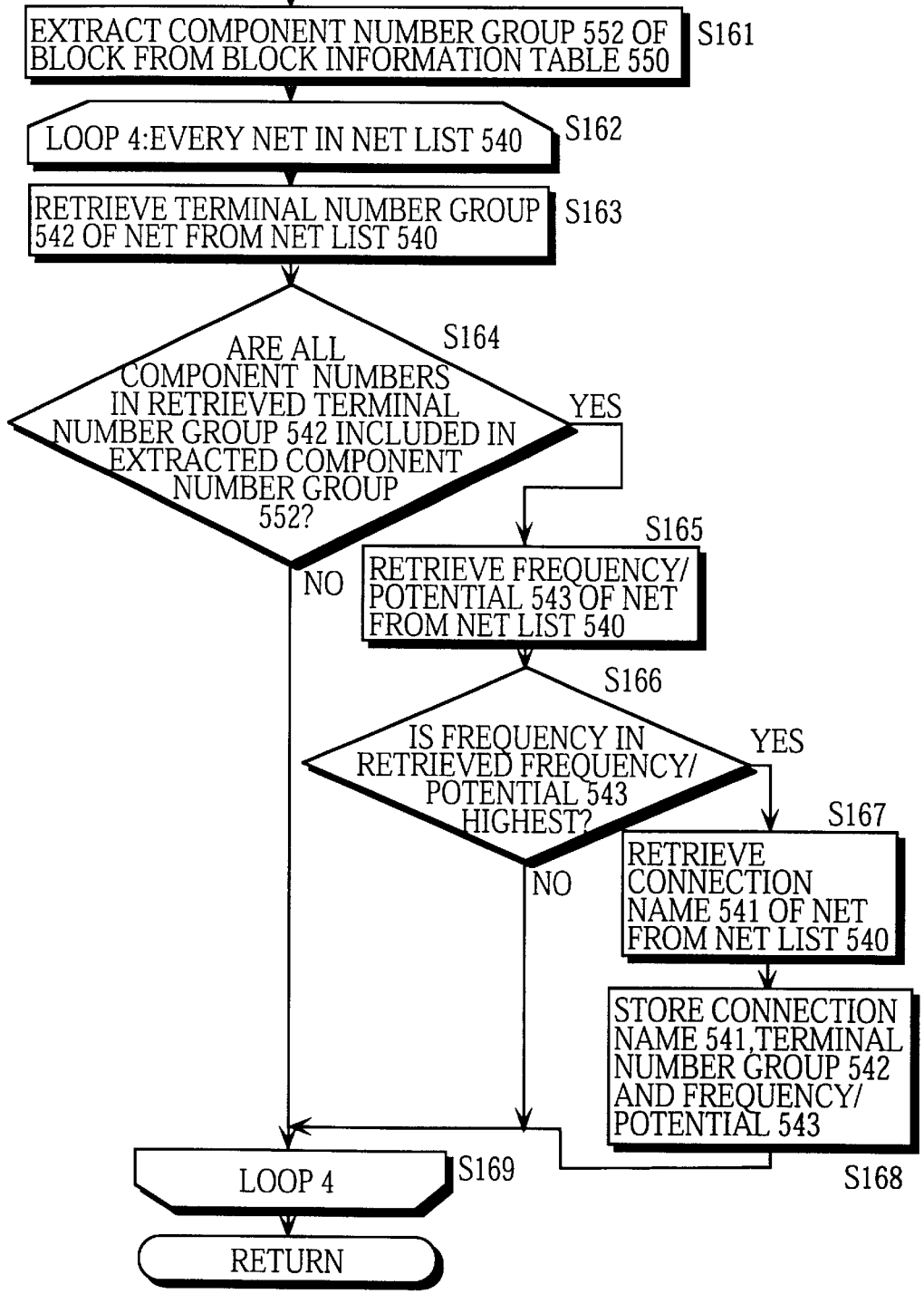
FIG. 110 is a flowchart showing the operation of detecting frequency f of a closed net in a block by the plane dividing unit 108.

The operation of detecting frequency f in the circuit block (S112 in FIG. 108) is explained in more detail below, with reference to FIG. 110.

The plane dividing unit 108 extracts a component number group 552 of the circuit block from the block information table 550 (S161).

The plane dividing unit 108 then repeats steps S163–S168 for every net shown in the net list 540 (S162).

Here, the plane dividing unit 108 retrieves a terminal number group 542 of a net from the net list 540 (S163) and judges whether all component numbers included in the retrieved terminal number group 542 are included in the extracted component number group 552 (S164). If all of the component numbers are included in the extracted component number group 552, the plane dividing unit 108 retrieves frequency/potential 543 of the net from the net list 540 (S165) and judges whether a frequency shown in the retrieved frequency/potential 543 is the highest of all frequencies previously retrieved in loop 4 (S166). If the shown frequency is the highest, the plane dividing unit 108 retrieves a connection name 541 of the net from the net list 540 (S167), sets the frequency shown in the retrieved frequency/potential 543 as frequency f, and stores the retrieved connection name 541, terminal number group 542 and frequency/potential 543 (S168).

When any of the component numbers included in the terminal number group 542 is not included in the component number group S52 in step S164, or when the frequency shown in the retrieved frequency/potential 543 is not the highest frequency in step S166, the plane dividing unit 108 returns to step S162.

(7.2.3) Operation of Subplane Connecting Unit 109

Figure 111:
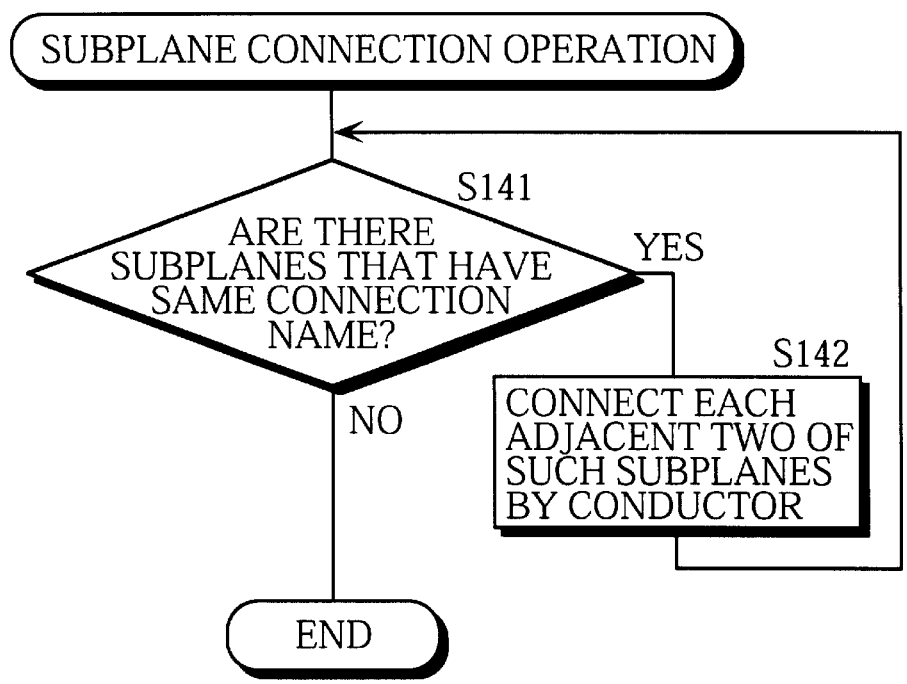
FIG. 111 is a flowchart showing the operation of the subplane connecting unit 109.

The operation of the subplane connecting unit 109 (S104 in FIG. 99) is explained below with reference to FIG. 111.

Figure 113:
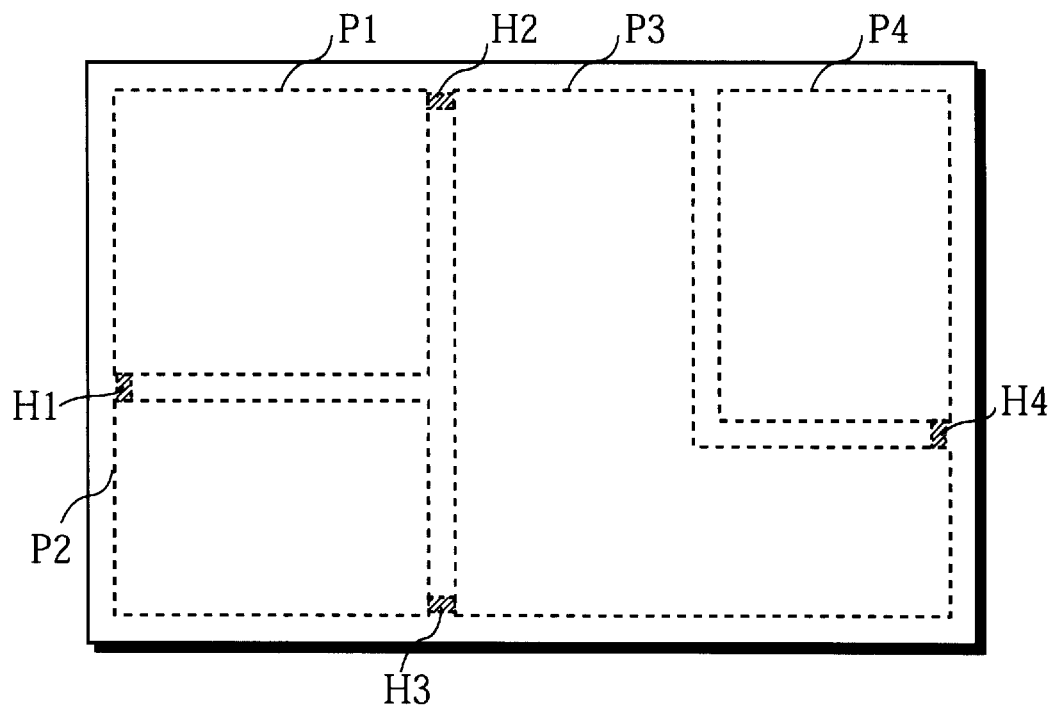
FIG. 113 shows the power plane in which the subplanes have been connected by conductors.

The subplane connecting unit 109 refers to the temporary subplane routing path table and extracts a connection name of each subplane generated by the plane dividing unit 108. In the case of the power plane in FIG. 103, a connection name "net200" is extracted for each subplane P1–P4 from the temporary subplane routing path table. If there are subplanes that have the same connection name (S141), the subplane connecting unit 109 connects each adjacent two of the subplanes by a conductor of predetermined width (S142). In the present embodiment, two adjacent subplanes are connected by placing a conductor which is, for example, twice as wide as a signal line conductor, at one end of a slit between the two subplanes. FIG. 113 shows subplanes P1–P4 in FIG. 103 which have been connected by conductors H1–H4. Conductor H1 connects subplanes P1 and P2, conductor H2 connects subplanes P1 and P3, conductor H3 connects subplanes P2 and P3, and conductor H4 connects subplanes P3 and P4, as shown in the figure.

Subplanes of the ground plane are equally connected, as connection names extracted for the subplanes are all "net100".

By the above plane dividing operation and subplane connecting operation, the CAD apparatus 100 generates non-conductor areas (slits) on each plane in accordance with boundary lines between circuit block groups of different types.

(7.2.4) Operation of Feedback Path Setting Unit 111

Figure 112:
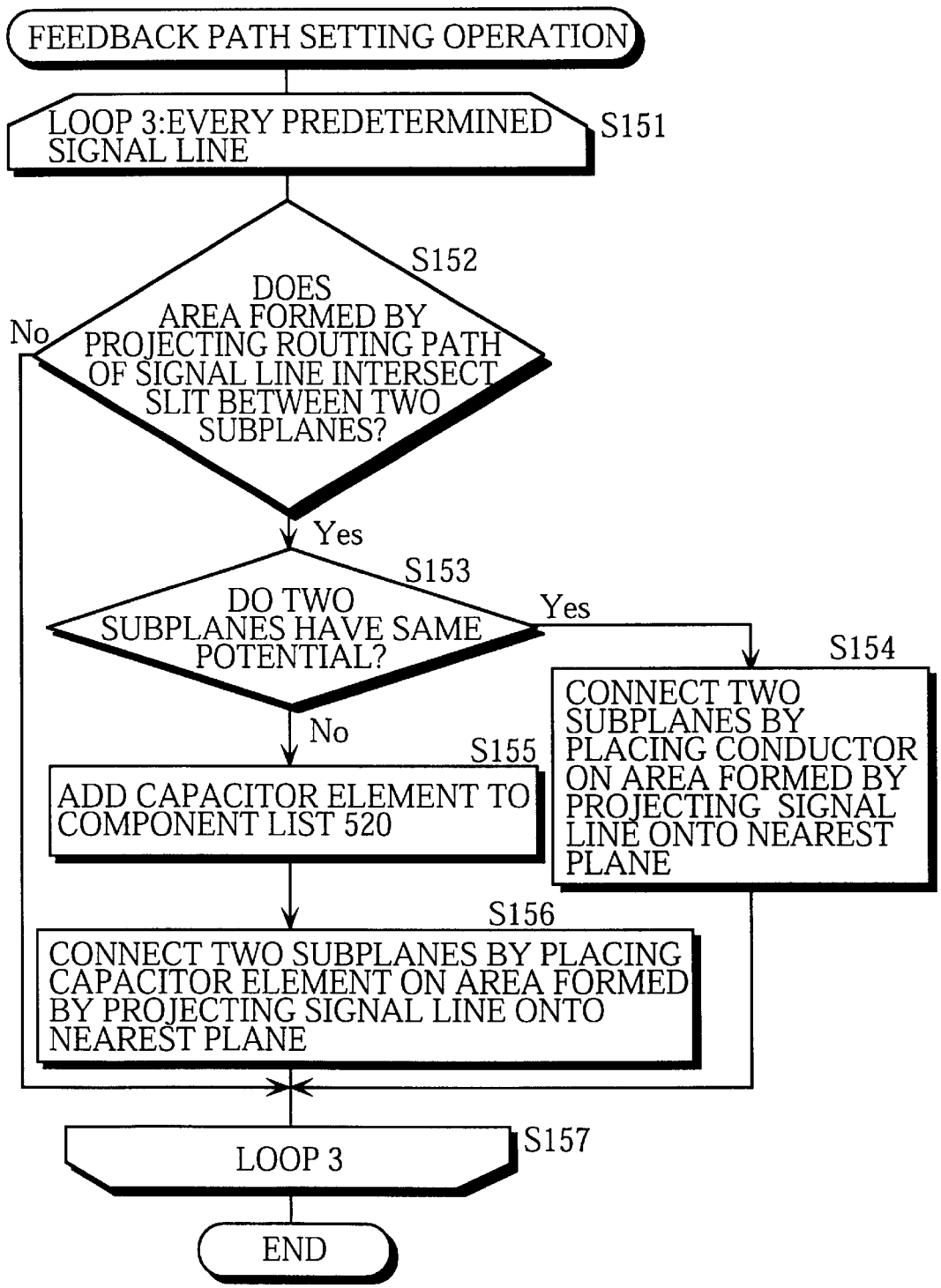
FIG. 112 is a flowchart showing the operation of the feedback path setting unit 111.

The operation of the feedback path setting unit 111 (S106 in FIG. 99) is explained below with reference to FIG. 112.

After the subplane connecting operation and signal line routing operation, the feedback path setting unit 111 sets a feedback path for each predetermined signal line. A predetermined signal line referred in the present embodiment is a signal line whose signal has a frequency no less than 10 (MHZ) or a transition time no more than 1 (ns). The feedback path setting unit 111 extracts such predetermined signal lines by referring to the net list 540 and terminal list 530 and repeats steps S152–S156 for every extracted signal line (S151).

The feedback path setting unit 111 judges whether an area formed by projecting a routing path of the predetermined signal line onto each plane intersects any of slits existing between subplanes (S152). If such an area intersects a slit between two subplanes, the feedback path setting unit 111 judges whether the two subplanes have the same potential (S153). When the two subplanes have the same potential, the feedback path setting unit 111 connects the two subplanes by placing a conductor on the area formed by projecting the signal line onto a plane which is nearest to a signal layer on which the signal line is routed (S154). For example, when an area formed by projecting predetermined signal line S1 routed on the first layer (signal layer) onto the power plane in FIG. 103 intersects a slit between subplanes P1 and P2 which have the same potential (5V), subplanes P1 and P2 are connected by placing a feedback path conductor, which is roughly as wide as a conductor of signal line S1, on an area formed by projecting signal line S1 onto the power plane. By doing so, a feedback path of a current that passes through signal line S1 can be secured.

When the two subplanes have different potentials in step S153, the feedback path setting unit 111 adds a capacitor element to the component list 520 (S155). The capacitor element used here may be a capacitor element whose capacitance (such as 0.5 ($\mu$F)) has been set by the designer or a capacitor element which is the same as a bypass capacitor listed in the component list 520. Alternatively, capacitance C of the capacitor element may be calculated using impedance z specified by the designer, according to Formula 1.

$$C = 1/2\pi f Z \qquad \text{(Formula 1)}$$

Here, "$\pi$" represents a circular constant and "f" represents a frequency of the predetermined signal line.

The feedback path setting unit 111 then connects the two subplanes by placing the capacitor element on the area formed by projecting the signal line onto the nearest plane (S156). As a result, the capacitor element is included in a feedback path of the signal line. Thus, a feedback path of a high-frequency signal that may negatively affect other circuit blocks can be secured.

As described above, the CAD apparatus 100 of the seventh embodiment classifies each circuit block according to its frequency characteristic, combines circuit blocks of the same type into one placement area, and divides each of power and ground planes into subplanes corresponding to placement areas which each contain circuit blocks of the same type. As a result, subplanes of a circuit board can be designed with efficiency. Also, when an area formed by projecting a specific high-speed signal line onto the power/ground plane intersects a slit between two subplanes, the CAD apparatus 100 sets a feedback path for the signal line, so that leakage of harmonic noise from high-speed circuit blocks to the other circuit blocks can be prevented.

(7.3) Modifications

① While two subplanes that have the same potential have been connected by a conductor in the feedback path setting operation in the above embodiment, the two subplanes which have the same potential may be further judged whether they have the same connection name. If they have the same connection name, the two subplanes are connected by a conductor. If, on the other hand, they have different connection names, the two subplanes may be connected by a jumper. Which is to say, a feedback path between two subplanes which have been generated from the same plane is formed by a conductor, while, for example in the case where a plane was originally divided, a feedback path of two subplanes which have been generated from different planes will be formed by a jumper. For instance, to route a feedback path between an analog ground and a digital ground, a jumper will be used. Accordingly, it is possible to connect two subplanes which have the same potential but form different nets without using a conductor that may cause a short in the nets, so that each individual net will be independently treated and the net list 541 will not have to be changed.

② While a signal line whose signal has a frequency no less than 10 (MHZ) or a transition time no more than 1 (ns) has been designated as a predetermined signal line in the above embodiment, the present invention is not limited to such. For example, a signal line through which a signal specified by the designer flows may be set as a predetermined signal line. Also, a signal line that has a signal whose peak current value at a frequency no less than 10 (MHZ) exceeds 0.1(A) may be set as a predetermined signal line. Such a current value can be calculated using a circuit simulator.

③ While the plane dividing unit 108 has classified each circuit block using frequency threshold values 50 (MHZ) and 10 (MHZ) and transition time threshold values 1 (ns) and 5 (ns) in the above embodiment, different threshold values may instead be used depending on a frequency band of circuitry in a circuit board.

④ The subplane connecting operation in the above embodiment can be omitted, as subplanes are connected by conductors in the feedback path setting operation.

⑤ While a placement area of each circuit block has taken a rectangle form in the above embodiment, the present invention is not limited to such. For example, by setting boundary lines along each circuit block whose form differs from a rectangle, a placement area of each circuit block can be designed in various forms.

⑥ While a conductor that connects two subplanes can be placed anywhere between the two subplanes in the subplane connecting operation, it is desirable to place the conductor on an area where the distance between the two subplanes is shortest or on an area between closely-situated vertices of the two subplanes. Also, while the width of the conductor has been set as twice as large as a signal line conductor in the above embodiment, a conductor width may instead be specified by the designer.

8. Eighth Embodiment

The following is a description of a CAD apparatus 200 for aiding circuit board design as the eighth embodiment of the present invention, with reference to figures.

(8.1) Construction of CAD Apparatus 200

Figure 114:
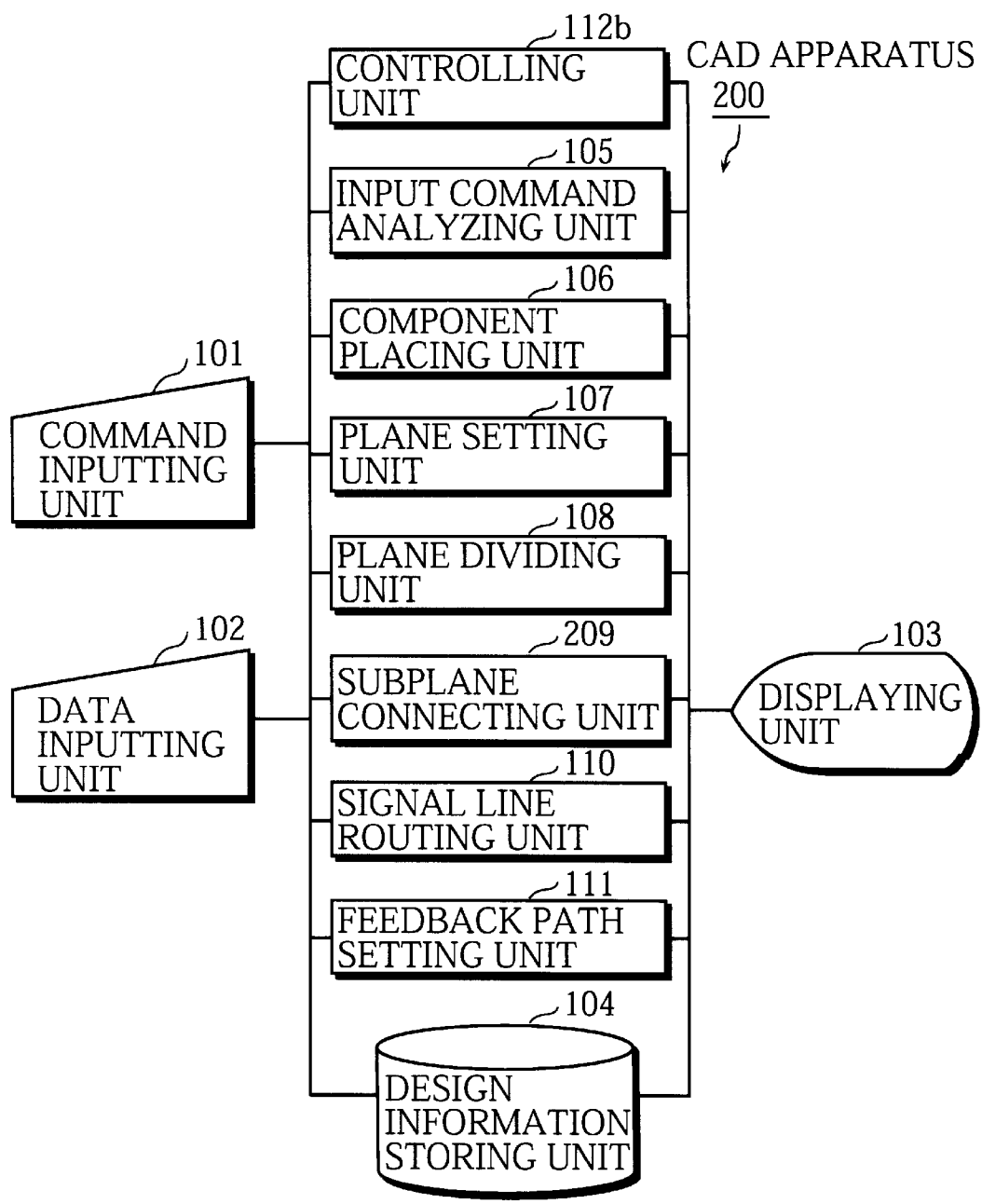
FIG. 114 is a block diagram showing the construction of a CAD apparatus 200 of the eighth embodiment.

As shown in FIG. 114, the CAD apparatus 200 includes the command inputting unit 101, the data inputting unit 102, the displaying unit 103, the design information storing unit 104, the input command analyzing unit 105, the component placing unit 106, the plane setting unit 107, the plane dividing unit 108, a subplane connecting unit 209, the signal line routing unit 110, the feedback path setting unit 111 and a controlling unit 112b.

Note here that construction elements which are same as those in the CAD apparatus 100 have been given the same reference numerals and their explanation has been omitted. The subplane connecting unit 209 and the controlling unit 112b of the CAD apparatus 200 which are different from the subplane connecting unit 109 and the controlling unit 112a of the CAD apparatus 100 will be explained below.

(8.1.1) Subplane Connecting Unit 209

The subplane connecting unit 209 uses an inductor coil of predetermined width to connect each two adjacent subplanes generated by the plane dividing unit 108, instead of using a conductor as in the seventh embodiment. By connecting two subplanes by an inductor coil, the two subplanes can be kept at the same potential and leakage of harmonic noise between the subplanes can be avoided, as in the seventh embodiment.

(8.1.2) Controlling Unit 112b

The controlling unit 112b receives a plane dividing command from the input command analyzing unit 105 and activates the component placing unit 106, the plane setting unit 107, the plane dividing unit 108, the subplane connecting unit 209, the signal line routing unit 110 and the feedback path setting unit 111 in succession.

The controlling unit 112b differs with the controlling unit 112a of the seventh embodiment only in activating the subplane connecting unit 209 instead of the subplane connecting unit 109, so that its explanation has been omitted here.

(8.2) Operation of CAD Apparatus 200

The following is a description of the operation of the CAD apparatus 200.

(8.2.1) Overall Operation of CAD Apparatus 200

Figure 99:
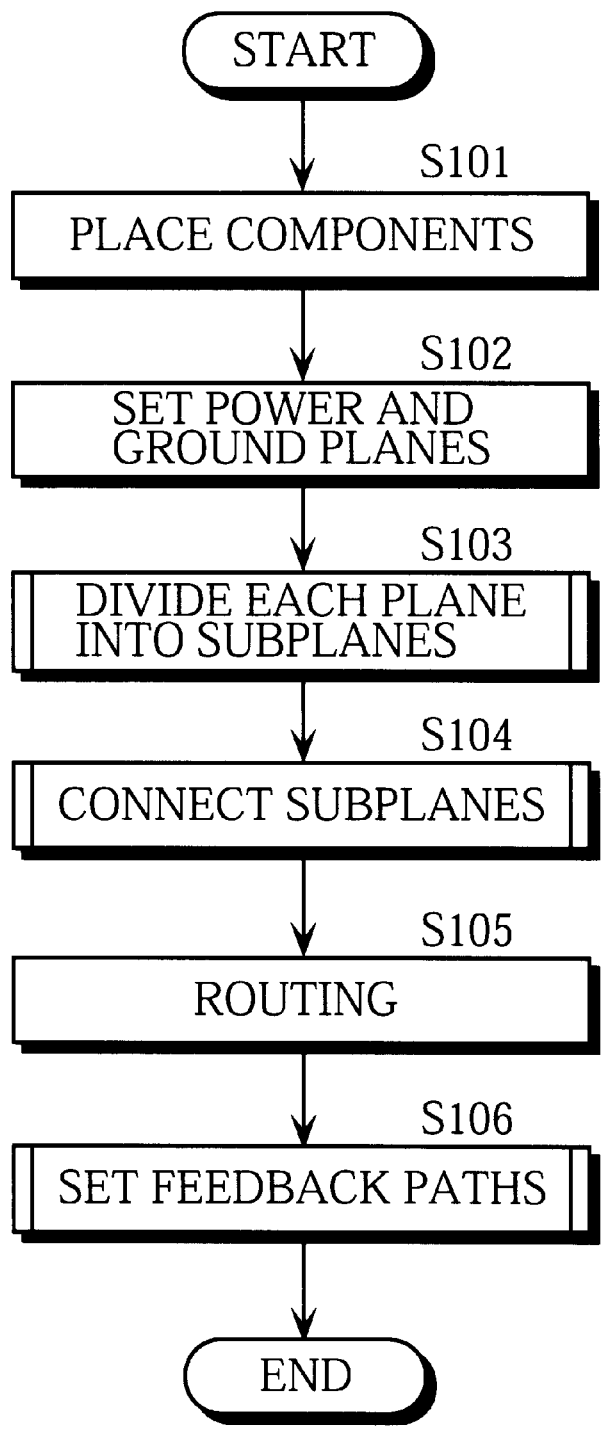
FIG. 99 is a flowchart showing the overall operation of the CAD apparatus 100.

The overall operation of the CAD apparatus 200 is different with the operation of the CAD apparatus 100 shown in FIG. 99 only in step S104 where the controlling unit 112b activates the subplane connecting unit 209 to connect each two adjacent subplanes.

(8.2.2) Operation of Subplane Connecting Unit 209

Figure 115:
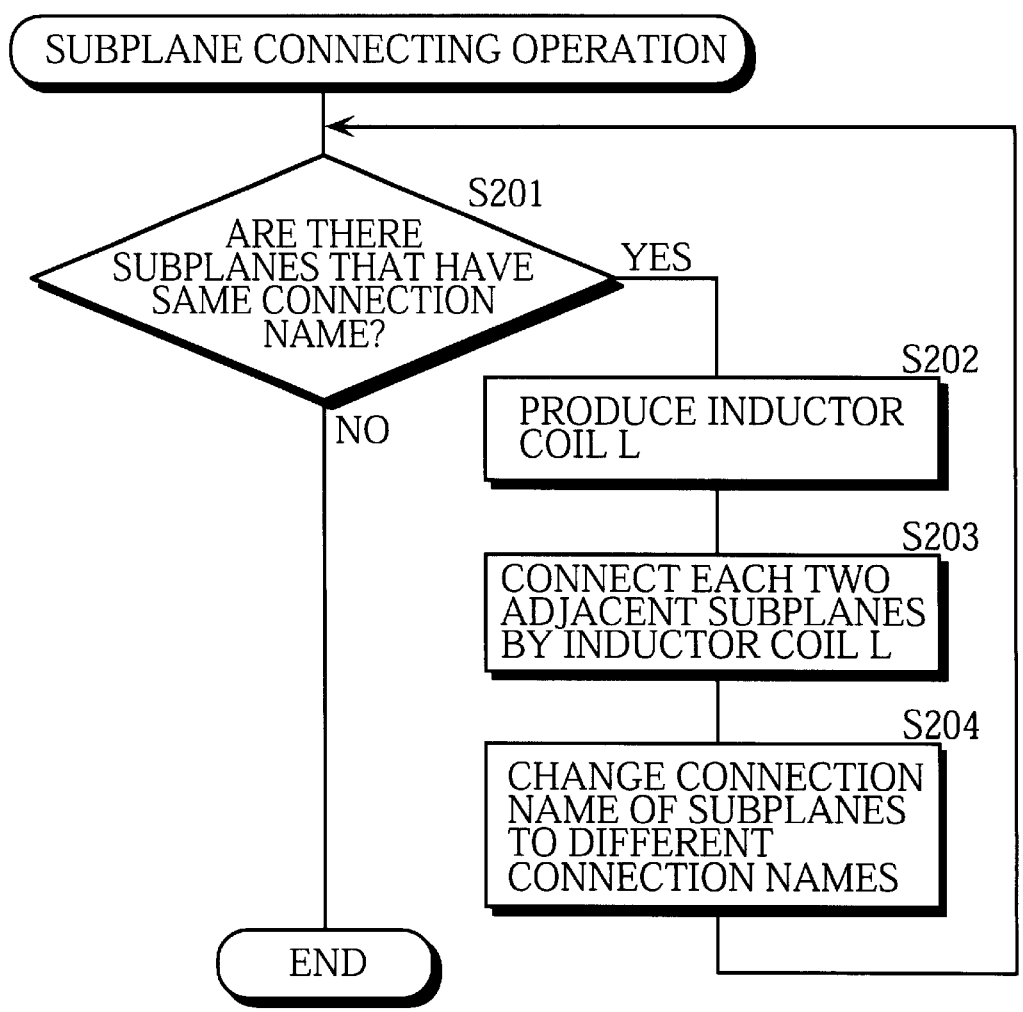
FIG. 115 is a flowchart showing the operation of a subplane connecting unit 209.

The operation of the subplane connecting unit 209 is explained below with reference to FIG. 115.

The subplane connecting unit 209 refers to the temporary subplane routing path table and extracts a connection name of each subplane created by the plane dividing unit 108. In the case of the power plane in FIG. 103, a connection name "net200" is extracted for each subplane P1–P4 from the temporary subplane routing path table. If there are subplanes which have the same connection name (S201), the subplane connecting unit 209 produces inductor coil L and adds it to the component list 520 (S202). Here, any value can be assigned to inductor coil L. For instance, the designer may be specified a value (5(nH) etc.) for inductor coil L, or another inductor coil (a common-mode choke coil etc.) listed in the component list 520 may be used as inductor coil L. Alternatively, a value of inductor coil L may be calculated using impedance Z (1(Ω) etc.) specified by the designer, according to Formula 2.

$$L = Z/2\pi f \quad \text{(Formula 2)}:$$

Here, "π" represents a circular constant and "f" represents the highest signal frequency in placement areas corresponding to two adjacent subplanes to be connected by inductor coil L.

The subplane connecting unit 209 then connects the two adjacent subplanes of the same connection name by inductor coil L (S203). In the present embodiment, inductor coil L is placed at one end of a slit between the two subplanes.

Next, the subplane connecting unit 209 changes the connection name of each subplane connected by inductor coil L to a new connection name and accordingly rewrites the connection name shown in the net list 540 to new connection names (S204). As a result, each subplane connected by inductor coil L will be treated as an independent net. Here, it is preferable to set new connection names that derive from the original net, such as by changing "net200" to "net200_1", "net200_2"....

The subplane connecting unit 209 then returns to step S201 and repeats steps S202–S204 until there are no subplanes which have the same connection name.

Figure 116:
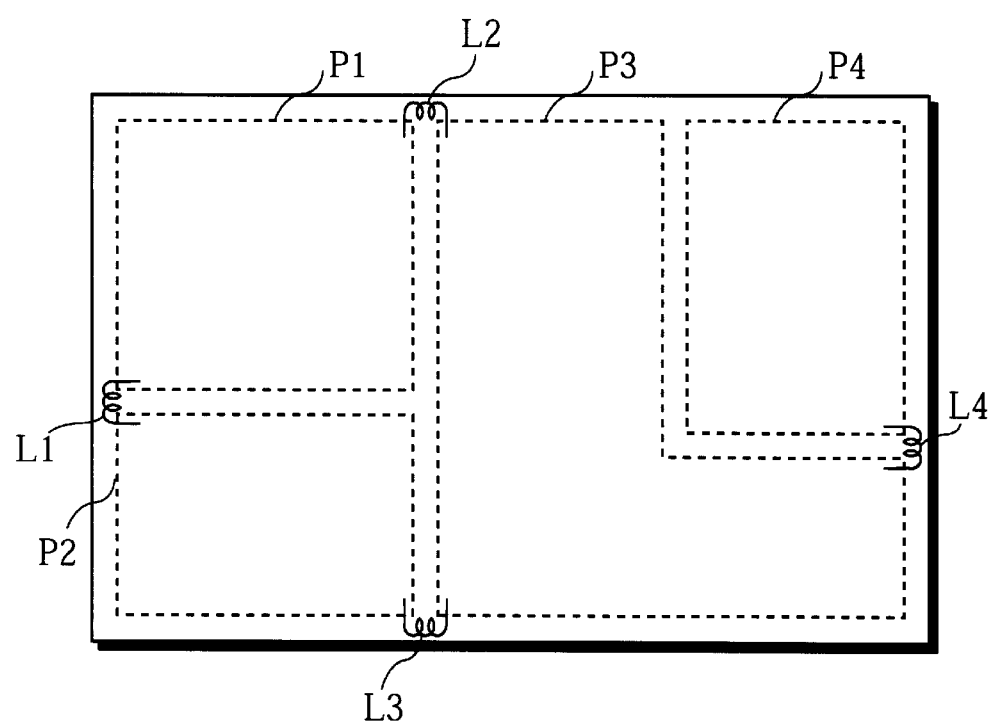
FIG. 116 shows a plane in which subplanes have been connected by inductor coils by the subplane connecting unit 209.

FIG. 116 shows subplanes P1–P4 connected by inductor coils L1–L4. Here, the connection name "net200" of subplanes P1–P4 are changed to different connection names, such as "net200_1", "net200_2", "net200_3", and "net200_4". The same applies to the ground plane, since the subplanes generated from the ground plane have the same connection name "net100".

Thus, by connecting two subplanes by an inductor coil and changing the connection name of the subplanes to different connection names, the connected subplanes can be kept at the same potential and at the same time can be treated as different nets. In comparison, two subplanes have been connected by a conductor in the seventh embodiment, so that the connected subplanes have been kept at the same potential and at the same time treated as the same net.

9. Ninth Embodiment

The following is a description of a CAD apparatus 300 for aiding circuit board design as the ninth embodiment of the present invention, with reference to figures.

(9.1) Construction of CAD Apparatus 300

Figure 117:
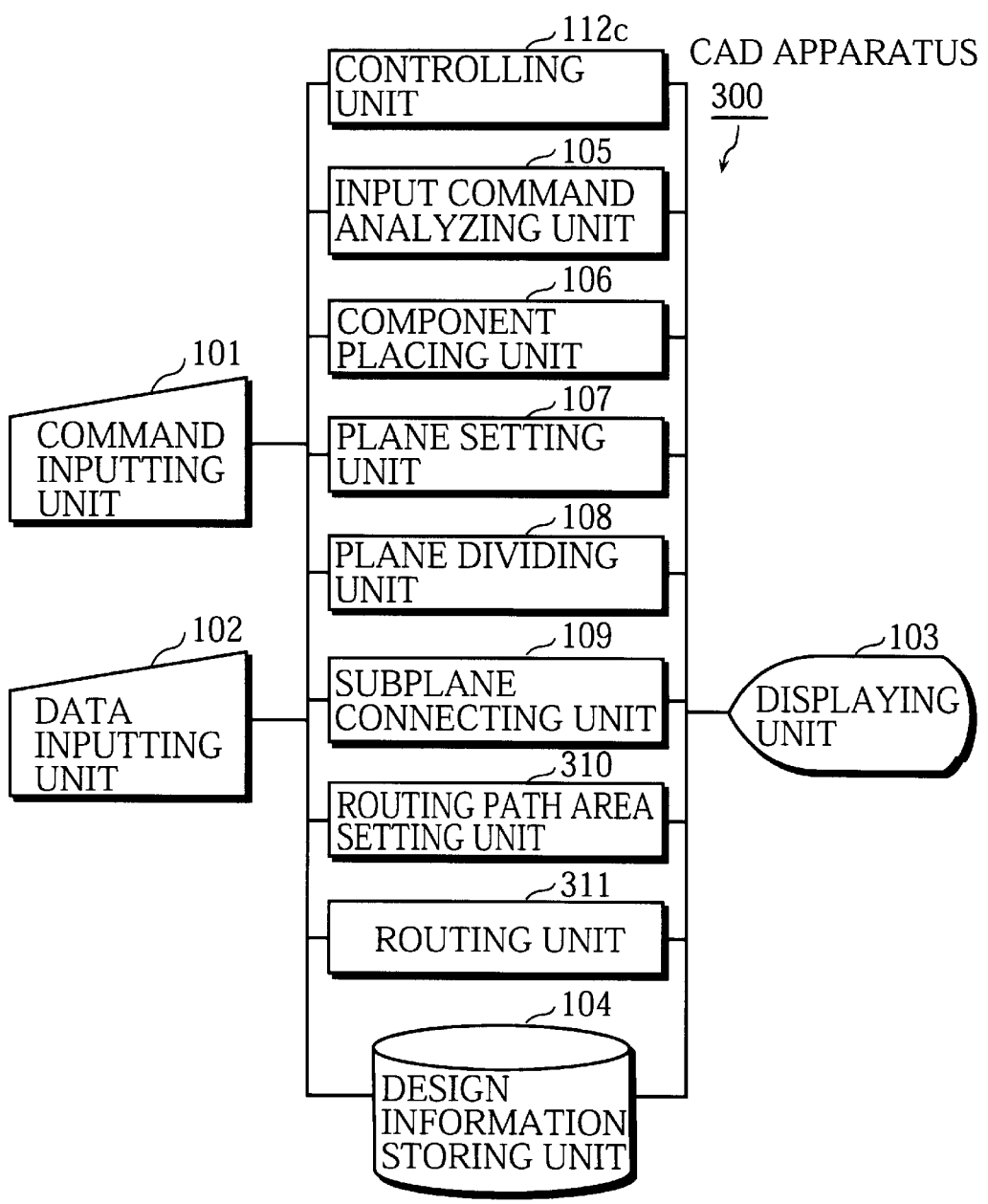

As shown in FIG. 117, The CAD apparatus 300 includes the command inputting unit 101, the data inputting unit 102, the displaying unit 103, the design information storing unit 104, the input command analyzing unit 105, the component placing unit 106, the plane setting unit 107, the plane dividing unit 108, the subplane connecting unit 109, a routing path area setting unit 310, a routing unit 311 and a controlling unit 112c.

Note here that construction elements which are same as those in the CAD apparatus 100 have been given the same reference numerals and their explanation has been omitted. The routing path area setting unit 310, the routing unit 311 and the controlling unit 112c of the CAD apparatus 300 that are different from the CAD apparatus 100 will be explained below.

(9.1.1) Routing Path Area Setting Unit 310

The routing path area setting unit 310 sets a routing path area on a signal layer to route each predetermined signal line. A predetermined signal line referred to here is a signal line which has a specific signal, such as a signal with frequency no less than 10 (MHZ) or transition time no more than 5 (ns), that may cause harmonic noise.

The routing path area setting unit 310 refers to the net list 540 and the terminal list 530 to extract each predetermined signal line to be routed on a signal layer.

The routing path area setting unit 310 detects all subplanes and conductors that have the same connection name as subplanes to which a predetermined signal line is to be connected. Note here that the subplanes to which the signal line is to be connected are included in the detected subplanes. The routing path area setting unit 310 then sets an area formed by projecting an area made up of the detected subplanes and conductors onto the signal layer, as a routing path area for the signal line.

FIG. 118 shows a signal layer on which component B1 and component B2 have respectively been placed directly above or below subplane P1 and subplane P2. To connect components B1 and B2 by a predetermined signal line, an area formed by projecting an area made up of subplanes P1–P4 and conductors H1–H4 onto the signal layer is set as a routing path area for the signal line.

(9.1.2) Routing Unit 311

The routing unit 311 places conductors for each predetermined signal line within a routing path area set by the routing path area setting unit 310.

For example, in FIG. 118, signal line conductor S2 is placed to connect component B1 and a point formed by projecting an intersection point between subplane P1 and conductor H1 onto the signal layer within the routing path area set for the predetermined signal line between components B1 and B2. Signal line conductor S3 is placed to connect component B2 and a point formed by projecting an intersection point between subplane P2 and conductor H1 onto the signal layer within the routing path area. And signal line conductor S4 is placed to connect signal line conductors S2 and S3 within the routing path area.

Thus, a signal line that may cause harmonic noise is routed within a routing path area set for the signal line, so that a feedback path of a signal that flows through the signal line can be secured within an area formed by projecting the signal line onto a plane. As a result, an area that is enclosed by a loop formed by a current which flows through the signal line and the feedback path can be reduced and leakage of noise between circuit block groups of different types can be prevented.

(9.1.3) Controlling Unit 112c

The controlling unit 112c receives a plane dividing command from the input command analyzing unit 105 and activates the component placing unit 106, the plane setting unit 107, the plane dividing unit 108, the subplane connecting unit 109, the routing path area setting unit 310 and the routing unit 311 in succession.

The controlling unit 112c differs with the controlling unit 112a of the seventh embodiment only in activating the routing path area setting unit 310 and the routing unit 311 instead of the signal line routing unit 110 and the feedback path setting unit 111, so that its explanation has been omitted here.

(9.2) Operation of CAD Apparatus 300

The overall operation of the CAD apparatus 300 differs with the CAD apparatus 100 shown in FIG. 99 in steps S105 and S106 where the CAD apparatus 300 performs the routing path area setting operation and the routing operation. The following explanation focuses on these differences.

(9.2.1) Operation of Routing Path Area Setting Unit 310 and Routing Unit 311

The operation of the routing path area setting unit 310 and the routing unit 311 for each predetermined signal line are explained below with reference to FIG. 119.

On activated by the controlling unit 112c, the routing path area setting unit 310 detects components which are to be connected by the predetermined signal line, from the net list 540 (S301). The routing path area setting unit 310 then detects positions of subplanes which have the same connection name as subplanes to which the detected components are connected and detects shapes of conductor areas of the subplanes. The routing path area setting unit 310 also detects positions of conductors which have the same connection name as the subplanes to which the detected components are connected and detects shapes of conductor areas of the conductors (S302). The routing path area setting unit 310 sets an area formed by projecting an area defined by the detected positions and shapes onto a signal layer on which the detected components are placed, as a routing path area for the predetermined signal line (S303). Next, the routing unit 311 is activated by the controlling unit 112c and accordingly places conductors for the signal line within the routing path area set by the routing path area setting unit 310 (S304).

Note here that by detecting a shape of a conductor area of each subplane in step S302, a non-conductor area present along a via hole within the subplane and a non-conductor area present along a plurality of closely-positioned via holes within the subplane are excluded from the routing path area.

In the above embodiment, the routing path area has been generated after each plane was divided into subplanes. Alternatively, when a circuit board includes a plurality of planes such as analog and digital planes, each plane may not be divided into subplanes, so that a routing path area will be generated based on a position and a shape of an entire plane to which a predetermined signal line is to be connected.

10. Modifications

While the first to ninth embodiments have been described in this specification, the present invention is not limited to such.

For example, while the present invention relates to a computer-readable storage medium storing a program for executing the design aiding method described above, it is also possible to transmit this program to another computing system via a communication line and execute the program in the system.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A design aiding apparatus for aiding placement of any of components, conductors and vias in a multilayer circuit board which includes at least one signal layer and at least one layer that is one of a power layer and a ground layer, the design aiding apparatus comprising:

routing path area generating means for generating a routing path area on at least one signal layer or at least one layer that is one of a power layer and a ground layer, the routing path area partly including one of a signal line routed on a signal layer and a feedback path of a current which flows over a signal line routed on a signal layer; and position calculating means for calculating, based on the generated routing path area, one of a position at which any of components, conductors and vias is to be placed and a position at which any of components, conductors and vias is prohibited to be placed, to minimize an area enclosed by a loop formed by a current which flows over a signal line and a feedback path corresponding to the signal line.

2. The design aiding apparatus of claim 1,
wherein at least one conductor which interconnects terminals of respective components is placed on a signal layer as a signal line,
wherein the routing path area generating means for generating the routing path area that partly includes a feedback path, includes:
  interconnection storing means for storing at least one interconnection identifier identifying an interconnection of terminals of respective components;
  conductor storing means for storing at least one combination of a conductor placement area and a layer identifier for each interconnection identifier identifying an interconnection of terminals of respective components, the conductor placement area showing an area occupied by a conductor which one of totally and partially interconnects the terminals of the respective components, and the layer identifier identifying a layer on which the conductor is placed;
  interconnection identifier selecting means for selecting an interconnection identifier;
  conductor detecting means for detecting at least one combination of a conductor placement area and a layer identifier corresponding to the selected interconnection identifier from the conductor storing means;
  power/ground layer detecting means for detecting a layer, among power layers and ground layers included in the multilayer circuit board, that is nearest to a layer identified by the detected layer identifier; and
  prohibition area generating means for generating, on the detected layer, a placement prohibition area as the routing path area within which placement of vias is prohibited, the placement prohibition area being an area formed by projecting an area, which encloses the detected conductor placement area by a predetermined gap, onto the detected layer,
wherein the position calculating means for calculating a position at which a via is to be placed, calculates a placement position of each of the vias on the detected layer, avoiding the placement prohibition area.

3. The design aiding apparatus of claim 1,
wherein the multilayer circuit board includes at least one signal layer, at least one power layer and at least one ground layer, and a plurality of layers are connected by vias whose clearances each have a predetermined radius, each clearance being a circular area centering on a via, where placement of another via is prohibited,
wherein the routing path area generating means for generating the routing path area that partly includes a feedback path, includes:
  component storing means for storing at least one component identifier identifying a component placed on a signal layer and storing at least one capacitor element identifier identifying a capacitor element placed on a signal layer;
  component selecting means for selecting a component identifier;
  capacitor element selecting means for selecting a capacitor element identifier identifying a capacitor element that is connected to a pair of power and ground layers to which a component identified by the selected component identifier is connected, that has a predetermined capacitance, and that is placed nearest to the component on a signal layer on which the component is placed; and
  rectangle area setting means for setting, as the routing path area, an area formed by projecting a rectangle area whose diagonal vertices correspond to a placement position of the capacitor element and a placement position of the component on the signal layer, onto a layer nearer to the signal layer among the pair of power and ground layers to which the component is connected, and
wherein the position calculating means for calculating a position at which a via is prohibited to be placed, includes
  clearance radius changing means for changing the predetermined radius of a clearance of each via which passes through the set routing path area, to a different value.

4. The design aiding apparatus of claim 1,
wherein at least one signal layer and at least one layer that is one of a power layer and a ground layer are arranged in the multilayer circuit board in a predetermined order,
wherein the routing path area generating means for generating the routing path area that partly includes a feedback path, includes:
  interconnection storing means for storing at least one interconnection identifier identifying an interconnection of terminals of respective components;
  layer type storing means for storing a combination of a layer identifier and a layer type for each layer in the multilayer circuit board according to the predetermined order, the layer identifier identifying a layer, and the layer type showing whether the layer identified by the layer identifier is a signal layer, a power layer, or a ground layer;
  interconnection identifier selecting means for selecting an interconnection identifier identifying an interconnection of terminals of respective two components; and
  power/ground layer detecting means for setting, as the routing path area, at least one layer to which the two components are connected among power layers and ground layers included in the multilayer circuit board, and for detecting a layer identifier that identifies the layer set as the routing path area, and
wherein the position calculating means for calculating a position at which a conductor is to be placed, includes:
  signal layer detecting means for detecting at least one signal layer on which the two components are placed and detecting a layer identifier identifying the detected signal layer;
  priority determining means for assigning priorities to the signal layers included in the multilayer circuit board, based on the combination of the layer identifier and the layer type for each layer in the layer type storing means, the layer identifier detected by the power/ground layer detecting means, and the layer identifier detected by the signal layer detecting means;
  routing layer determining means for determining at least one signal layer on which a conductor will be placed to interconnect the terminals of the respective two components, based on the priorities assigned by the priority determining means; and
  routing means for calculating a conductor placement area of the conductor on the determined signal layer.

5. The design aiding apparatus of claim 1,
wherein at least one signal layer and at least one layer that is one of a power layer and a ground layer are included in the multilayer circuit board in a predetermined order, wherein the routing path area generating means for generating the routing path area that partly includes a feedback path, includes:
  interconnection storing means for storing at least one interconnection identifier identifying an interconnection of terminals of respective components;
  conductor storing means for storing at least one combination of a conductor placement area and a layer identifier for each interconnection identifier identifying an interconnection of terminals of respective components, the conductor placement area showing an area occupied by a conductor which one of totally and partially interconnects the terminals of the respective components, and the layer identifier identifying a signal layer on which the conductor is placed;
  interconnection identifier selecting means for selecting an interconnection identifier identifying an interconnection of terminals of respective two components;
  conductor detecting means for detecting at least one combination of a conductor placement area and a layer identifier corresponding to the selected interconnection identifier from the conductor storing means, a signal layer identified by the detected layer identifier being set as a conductor placement layer;
  layer type storing means for storing a combination of a layer identifier and a layer type for each layer in the multilayer circuit board according to the predetermined order, the layer identifier identifying a layer, and the layer type showing whether the layer identified by the layer identifier is a signal layer, a power layer, or a ground layer;
  power/ground layer detecting means for setting, as the routing path area, at least one layer to which the two components are connected among power layers and ground layers included in the multilayer circuit board, and detecting a layer identifier that identifies the layer set as the routing path area, and
wherein the position calculating means for calculating a position at which a conductor is to be placed, includes:
  signal layer detecting means for detecting at least one signal layer on which the two components are placed and detecting a layer identifier identifying the detected signal layer;
  priority determining means for assigning priorities to the signal layers included in the multilayer circuit board, based on the combination of the layer identifier and the layer type for each layer in the layer type storing means, the layer identifier detected by the power/ground layer detecting means, and the layer identifier detected by the signal layer detecting means;
  priority judging means for judging whether there is a signal layer whose priority is higher than a priority assigned to the conductor placement layer, based on the priorities assigned by the priority determining means; and
  conductor moving means for deleting, when the priority judging means judges that there is the signal layer of a higher priority than the conductor placement layer, the detected combination of the conductor placement area and the layer identifier identifying the conductor placement layer from the conductor storing means, calculating a new conductor placement area on the signal layer of the higher priority to place a conductor which interconnects the terminals of the respective two components, and writing a combination of the new conductor placement area and a layer identifier identifying the signal layer of the higher priority into the conductor storing means.

6. The design aiding apparatus of claim 1,
wherein the multilayer circuit board includes at least one signal layer, at least one power layer and at least one ground layer,
wherein the routing path area generating means for generating the routing path area that partly includes a signal line, includes:
  interconnection storing means for storing at least one interconnection identifier identifying an interconnection of terminals of respective components;
  component storing means for storing a combination of a component identifier, a layer identifier, a component placement position and a component type for each component placed in the multilayer circuit board, the component identifier identifying a component, the layer identifier identifying a signal layer on which the component is placed, the component placement position showing a placement position of the component on the signal layer, and the component type showing a type of the component;
  interconnection identifier selecting means for selecting an interconnection identifier which identifies an interconnection between a terminal of a first component and a terminal of a second component;
  component detecting means for detecting a component identifier identifying the first component and a component identifier identifying the second component from the component storing means;
  component placement layer judging means for retrieving a layer identifier corresponding to the component identifier of the first component and a layer identifier corresponding to the component identifier of the second component from the component storing means, setting a signal layer identified by the layer identifier retrieved for the first component as a first signal layer and a signal layer identified by the layer identifier retrieved for the second component as a second signal layer, and judging whether the first signal layer and the second signal layer are same; and
  rectangle area generating means for generating, when the component placement layer judging means judges that the first signal layer and the second signal layer are different, a rectangle area on the first signal layer as the routing path area, wherein diagonal vertices of the rectangle area correspond to a placement position of the terminal of the first component and a point formed by projecting a placement position of the terminal of the second component onto the first signal layer, and
wherein the position calculating means for calculating a position at which any of vias and conductors is to be placed, includes:
  capacitor element judging means for searching the component storing means for a component identifier identifying a component that is connected to a pair of power and ground layers to which the first component and the second component are connected, that is a capacitor element, and that is placed within the generated routing path area;
  via placing means for calculating, when the component identifier is found by the capacitor element judging means, a via placement position that is within a predetermined distance from a component placement position corresponding to the found component identifier; and routing means for calculating a conductor placement area on the first signal layer to place a conductor which connects the terminal of the first component and the calculated via placement position, and calculating a conductor placement area on the second signal layer to place a conductor which connects the terminal of the second component and a point formed by projecting the calculated via placement position onto the second signal layer.

7. The design aiding apparatus of claim 1,
wherein at least one signal layer, at least one power layer, and at least one ground layer are arranged in the multilayer circuit board in a predetermined order,
wherein the routing path area generating means for generating the routing path area that partly includes a signal line, includes:
  interconnection storing means for storing at least one interconnection identifier identifying an interconnection of terminals of respective components;
  capacitor element storing means for storing a placement position of each capacitor element, among capacitor elements placed on one of the signal layers, that is connected to a pair of power and ground layers;
  layer type storing means for storing a combination of a layer identifier and a layer type for each layer in the multilayer circuit board according to the predetermined order, the layer identifier identifying a layer, and the layer type showing whether the layer identified by the layer identifier is a signal layer, a power layer, or a ground layer;
  conductor storing means for storing at least one combination of a conductor placement area and a layer identifier for each interconnection identifier identifying an interconnection of terminals of respective components, the conductor placement area showing an area occupied by a conductor that one of totally and partially interconnects the terminals of the respective components, and the layer identifier identifying a signal layer on which the conductor is placed;
  via storing means for storing a via placement position of each via that connects a plurality of layers;
  interconnection identifier selecting means for selecting an interconnection identifier identifying an interconnection between a terminal of a first component and a terminal of a second component;
  conductor detecting means for detecting at least one combination of a conductor placement area and a layer identifier corresponding to the selected interconnection identifier from the conductor storing means;
  via judging means for searching the via storing means for a via whose via placement position is within any of the detected conductor placement areas;
  nearest plane judging means for judging, when the via judging means finds the via and when the conductor detecting means detects two layer identifiers which respectively identify a first signal layer on which a first conductor is placed and a second signal layer on which a second conductor is placed, whether among the power layers and the ground layers included in the multilayer circuit board, a first layer that is nearest to the first signal layer is different from a second layer that is nearest to the second signal layer, based on combinations of layer identifiers and layer types stored in the layer type storing means in the predetermined order;
  capacitor placement judging means for searching, when the nearest plane judging means judges that the first layer and the second layer are different, the capacitor element storing means for a capacitor element that is connected to the first layer and the second layer and that is placed within a predetermined distance from the via placement position of the via found by the via judging means; and
  rectangle area generating means for generating a rectangle area on the first signal layer as the routing path area when no capacitor element is found by the capacitor placement judging means, wherein diagonal vertices of the rectangle area correspond to a placement position of the terminal of the first component and a point formed by projecting a placement position of the terminal of the second component onto the first signal layer, and
wherein the position calculating means for calculating a position at which any of components, conductors and vias is to be placed, includes:
  rectangle area capacitor placement judging means for searching the capacitor element storing means for a capacitor element that is connected to the first layer and the second layer and that is placed within the generated rectangle area;
  routing means for calculating, when the capacitor element is found within the rectangle area by the rectangle area capacitor placement judging means, a new via placement position of the via within the predetermined distance from a placement position of the capacitor element, calculating a new conductor placement area on the first signal layer to place the first conductor which connects the terminal of the first component and the new via placement position, and calculating a new conductor placement area on the second signal layer to place the second conductor which connects the terminal of the second component and a point formed by projecting the new via placement position onto the second signal layer; and
  capacitor element placing means for calculating, when no capacitor element is found within the rectangle area by the rectangle area capacitor placement judging means, a placement position of a new capacitor element that is connected to the first layer and the second layer, within the predetermined distance from the via placement position of the via found by the via judging means.

8. The design aiding apparatus of claim 1,
wherein the multilayer circuit board includes at least one signal layer, at least one power layer and at least one ground layer,
wherein the routing path area generating means for generating the routing path area that partly includes a signal line, includes:
  component detecting means for detecting components which are to be interconnected by a predetermined signal line on a signal layer;
  plane detecting means for detecting a position of each layer, among the power layers and the ground layers, to which the components are connected and detecting a shape of a conductor area of each layer to which the components are connected; and
  routing area setting means for setting an area formed by projecting an area defined by the detected position and the detected shape onto the signal layer, as the routing path area for the predetermined signal line, and wherein the position calculating means for calculating a position at which a conductor is to be placed, calculates a conductor placement area within the set routing path area to place each conductor to route the predetermined signal line.

9. A design aiding apparatus for aiding placement of vias in a multilayer circuit board which includes at least one layer that is one of a ground layer and a power layer and at least one signal layer on which at least one conductor that interconnects terminals of respective components is placed, the design aiding apparatus comprising:

interconnection storing means for storing at least one interconnection identifier identifying an interconnection of terminals of respective components;

conductor storing means for storing at least one combination of a conductor placement area and a layer identifier for each interconnection identifier identifying an interconnection of terminals of respective components, the conductor placement area showing an area occupied by a conductor which one of totally and partially interconnects the terminals of the respective components, and the layer identifier identifying a layer on which the conductor is placed;

interconnection identifier selecting means for selecting an interconnection identifier;

conductor detecting means for detecting at least one combination of a conductor placement area and a layer identifier corresponding to the selected interconnection identifier from the conductor storing means, a layer identified by the detected layer identifier being set as a conductor placement layer;

power/ground layer detecting means for detecting a layer, among power layers and ground layers included in the multilayer circuit board, that is nearest to the conductor placement layer; and prohibition area generating means for generating a placement prohibition area within which placement of vias is prohibited, on the detected layer, wherein the placement prohibition area is an area formed by projecting an area, which encloses the detected conductor placement area by a predetermined gap, onto the detected layer.

10. The design aiding apparatus of claim 9, wherein the interconnection identifier selecting means includes:

direction receiving means for receiving a direction from a user;

signal storing means for storing, for each interconnection, at least one of a frequency and a rise/fall time of a signal that flows in the interconnection; and interconnection specifying means for extracting an interconnection in which one of a signal with a frequency no less than a predetermined value and a signal with a rise/fall time no more than a predetermined value flows, from the signal storing means according to the direction from the user, and specifying an interconnection identifier identifying the extracted interconnection.

11. The design aiding apparatus of claim 10, wherein at least one signal layer and at least one layer that is one of a power layer and a ground layer are arranged in the multilayer circuit board in a predetermined order, and wherein the power/ground layer detecting means includes:

interconnected component storing means for storing, for each interconnection identifier identifying an interconnection of terminals of respective components, at least one combination of a component identifier identifying a component and a terminal identifier identifying a terminal;

terminal storing means for storing, for each combination of a component identifier and a terminal identifier, a terminal attribute showing an attribute of a terminal identified by the terminal identifier of a component identified by the component identifier;

layer identifier storing means for storing a layer identifier which identifies each layer in the multilayer circuit board according to the predetermined order;

component detecting means for detecting two component identifiers corresponding to the interconnection identifier selected by the interconnection identifier selecting means, from the interconnected component storing means;

terminal detecting means for detecting terminal identifiers that each correspond to one of the detected two component identifiers and that each have a terminal attribute showing one of a power terminal and a ground terminal, from the terminal storing means;

power/ground detecting means for detecting, from the interconnected component storing means, at least one interconnection identifier that corresponds to combinations which are each made up of one of the detected two component identifiers and one of the detected terminal identifiers that corresponds to the component identifier, and detecting layer identifiers that correspond to the detected interconnection identifiers from the conductor storing means; and layer identifier extracting means for referring to the layer identifier storing means and extracting a layer identifier, among the layer identifiers detected by the power/ground detecting means, that identifies a layer which is nearest to the conductor placement layer.

12. The design aiding apparatus of claim 9, wherein at least one signal layer and at least one layer that is one of a power layer and a ground layer are arranged in the multilayer circuit board in a predetermined order, and wherein the power/ground layer detecting means includes:

interconnected component storing means for storing, for each interconnection identifier identifying an interconnection of terminals of respective components, at least one combination of a component identifier identifying a component and a terminal identifier identifying a terminal;

terminal storing means for storing, for each combination of a component identifier and a terminal identifier, a terminal attribute showing an attribute of a terminal identified by the terminal identifier of a component identified by the component identifier;

layer identifier storing means for storing a layer identifier which identifies each layer in the multilayer circuit board according to the predetermined order;

component detecting means for detecting two component identifiers corresponding to the interconnection identifier selected by the interconnection identifier selecting means, from the interconnected component storing means;

terminal detecting means for detecting terminal identifiers that each correspond to one of the detected two component identifiers and that each have a terminal attribute showing one of a power terminal and a ground terminal, from the terminal storing means;

power/ground detecting means for detecting, from the interconnected component storing means, at least one interconnection identifier that corresponds to combinations which are each made up of one of the detected two component identifiers and one of the detected terminal identifiers that corresponds to the component identifier, and detecting layer identifiers that correspond to the detected interconnection identifiers from the conductor storing means; and layer identifier extracting means for referring to the layer identifier storing means and extracting a layer identifier, among the layer identifiers detected by the power/ground detecting means, that identifies a layer which is nearest to the conductor placement layer.

13. A design aiding apparatus for aiding placement of vias in a multilayer circuit board which includes at least one signal layer, at least one power layer and at least one ground layer, the design aiding apparatus comprising:

component storing means for storing at least one component identifier identifying a component placed on a signal layer and storing at least one capacitor element identifier identifying a capacitor element placed on a signal layer;

component selecting means for selecting a component identifier; and capacitor element selecting means for selecting a capacitor element identifier identifying a capacitor element that is connected to a pair of power and ground layers to which a component identified by the selected component identifier is connected, that has a predetermined capacitance, and that is placed nearest to the component on a signal layer on which the component is placed.

14. The design aiding apparatus of claim 13, further comprising rectangle area setting means for setting an area, formed by projecting a rectangle area whose diagonal vertices correspond to a placement position of the capacitor element and a placement position of the component on the signal layer onto a layer that is nearer to the signal layer among the pair of power and ground layers to which the component is connected, as a clearance radius change area.

15. The design aiding apparatus of claim 14, wherein a plurality of layers are connected by vias whose clearances each have a predetermined radius, each clearance being a circular area centering on a via, where placement of another via is prohibited, and wherein the design aiding apparatus further comprises clearance radius changing means for changing the predetermined radius of a clearance of each via which passes through the set clearance radius change area, to a different value.

16. The design aiding apparatus of claim 15, further comprising:

layer type storing means for storing a combination of a layer identifier and a layer type for each layer in the multilayer circuit board, the layer identifier identifying a layer, and the layer type showing whether the layer identified by the layer identifier is a signal layer, a power layer, or a ground layer; and interconnection storing means for storing at least one interconnection identifier identifying an interconnection of terminals of respective components, wherein the component selecting means includes:

interconnection identifier selecting means for selecting an interconnection identifier;

interconnected component storing means for storing, for each interconnection identifier, a component identifier identifying a component that is connected at each end of an interconnection identified by the interconnection identifier;

component detecting means for detecting a component identifier corresponding to the selected interconnection identifier from the interconnected component storing means;

power/ground layer detecting means for detecting, from the layer type storing means, layer identifiers that identify a pair of power and ground layers, among the power layers and the ground layers included in the multilayer circuit board, to which a component identified by the detected component identifier is connected;

component position storing means for storing a component placement position of a component identified by each component identifier; and component position detecting means for detecting a component placement position of the component identified by the detected component identifier, from the component position storing means, and wherein the capacitor element selecting means includes:

capacitor element storing means for storing a combination of a capacitor element placement position, a power terminal identifier, a ground terminal identifier and a capacitance for a capacitor element identified by each capacitor element identifier, the capacitor element placement position showing a placement position of the capacitor element, the power terminal identifier identifying a power terminal of the capacitor element, the ground terminal identifier identifying a ground terminal of the capacitor element, and the capacitance showing a capacitance of the capacitor element;

capacitor element reading means for reading one combination of a capacitor element placement position, a power terminal identifier, a ground terminal identifier and a capacitance at a time, from the capacitor element storing means;

terminal connection storing means for storing, for a capacitor element identified by each capacitor element identifier, a layer identifier identifying a power layer to which a power terminal identified by a power terminal identifier of the capacitor element is connected, and a layer identifier identifying a ground layer to which a ground terminal identified by a ground terminal identifier of the capacitor element is connected;

power/ground connection judging means for extracting, from the terminal connection storing means, layer identifiers that respectively correspond to the read power terminal identifier and the read ground terminal identifier, and judging whether the extracted layer identifiers match the layer identifiers detected by the power/ground layer detecting means;

capacitance judging means for judging whether the read capacitance matches the predetermined capacitance;

position calculating means for calculating a distance between the read capacitor element placement position and the component placement position detected by the component position detecting means; and capacitor element detecting means for detecting, from the capacitor element storing means, the capacitor element identifier identifying the capacitor element that is connected to the pair of power and ground layers to which the component identified by the detected component identifier is connected, that has the predetermined capacitance, and that is placed nearest to the component on the signal layer, based on a judgement result by the power/ground connection judging means, a judgement result by the capacitance judging means, and a calculation result by the position calculating means.

17. The design aiding apparatus of claim 14, further comprising:
layer type storing means for storing a combination of a layer identifier and a layer type for each layer in the multilayer circuit board, the layer identifier identifying a layer, and the layer type showing whether the layer identified by the layer identifier is a signal layer, a power layer, or a ground layer; and
interconnection storing means for storing at least one interconnection identifier identifying an interconnection of terminals of respective components,
wherein the component selecting means includes:
interconnection identifier selecting means for selecting an interconnection identifier;
interconnected component storing means for storing, for each interconnection identifier, a component identifier identifying a component that is connected at each end of an interconnection identified by the interconnection identifier;
component detecting means for detecting a component identifier corresponding to the selected interconnection identifier from the interconnected component storing means;
power/ground layer detecting means for detecting, from the layer type storing means, layer identifiers that identify a pair of power and ground layers, among the power layers and the ground layers included in the multilayer circuit board, to which a component identified by the detected component identifier is connected;
component position storing means for storing a component placement position of a component identified by each component identifier; and
component position detecting means for detecting a component placement position of the component identified by the detected component identifier, from the component position storing means, and
wherein the capacitor element selecting means includes:
capacitor element storing means for storing a combination of a capacitor element placement position, a power terminal identifier, a ground terminal identifier and a capacitance for a capacitor element identified by each capacitor element identifier, the capacitor element placement position showing a placement position of the capacitor element, the power terminal identifier identifying a power terminal of the capacitor element, the ground terminal identifier identifying a ground terminal of the capacitor element, and the capacitance showing a capacitance of the capacitor element;
capacitor element reading means for reading one combination of a capacitor element placement position, a power terminal identifier, a ground terminal identifier and a capacitance at a time, from the capacitor element storing means;

terminal connection storing means for storing, for a capacitor element identified by each capacitor element identifier, a layer identifier identifying a power layer to which a power terminal identified by a power terminal identifier of the capacitor element is connected, and a layer identifier identifying a ground layer to which a ground terminal identified by a ground terminal identifier of the capacitor element is connected;
power/ground connection judging means for extracting, from the terminal connection storing means, layer identifiers that respectively correspond to the read power terminal identifier and the read ground terminal identifier, and judging whether the extracted layer identifiers match the layer identifiers detected by the power/ground layer detecting means;
capacitance judging means for judging whether the read capacitance matches the predetermined capacitance;
position calculating means for calculating a distance between the read capacitor element placement position and the component placement position detected by the component position detecting means; and
capacitor element detecting means for detecting, from the capacitor element storing means, the capacitor element identifier identifying the capacitor element that is connected to the pair of power and ground layers to which the component identified by the detected component identifier is connected, that has the predetermined capacitance, and that is placed nearest to the component on the signal layer, based on a judgement result by the power/ground connection judging means, a judgement result by the capacitance judging means, and a calculation result by the position calculating means.

18. The design aiding apparatus of claim 13, further comprising
rectangle area setting means for setting an area, formed by projecting a rectangle area whose diagonal vertices correspond to a placement position of the capacitor element and a placement position of the component on the signal layer onto a layer which is nearest to the signal layer among the power layers and the ground layers included in the multilayer circuit board, as a clearance radius change area.

19. The design aiding apparatus of claim 18,
wherein a plurality of layers are connected by vias whose clearances each have a predetermined radius, and
wherein the design aiding apparatus further comprises clearance radius changing means for changing the predetermined radius of a clearance of each via which passes through the set clearance radius change area, to a different value.

20. The design aiding apparatus of claim 19, further comprising:
layer type storing means for storing a combination of a layer identifier and a layer type for each layer in the multilayer circuit board, the layer identifier identifying a layer, and the layer type showing whether the layer identified by the layer identifier is a signal layer, a power layer, or a ground layer; and
interconnection storing means for storing at least one interconnection identifier identifying an interconnection of terminals of respective components,
wherein the component selecting means includes:
interconnection identifier selecting means for selecting an interconnection identifier;

interconnected component storing means for storing, for each interconnection identifier, a component identifier identifying a component that is connected at each end of an interconnection identified by the interconnection identifier;

component detecting means for detecting a component identifier corresponding to the selected interconnection identifier from the interconnected component storing means;

power/ground layer detecting means for detecting, from the layer type storing means, layer identifiers that identify a pair of power and ground layers, among the power layers and the ground layers included in the multilayer circuit board, to which a component identified by the detected component identifier is connected;

component position storing means for storing a component placement position of a component identified by each component identifier; and component position detecting means for detecting a component placement position of the component identified by the detected component identifier, from the component position storing means, and wherein the capacitor element selecting means includes:
capacitor element storing means for storing a combination of a capacitor element placement position, a power terminal identifier, a ground terminal identifier and a capacitance for a capacitor element identified by each capacitor element identifier, the capacitor element placement position showing a placement position of the capacitor element, the power terminal identifier identifying a power terminal of the capacitor element, the ground terminal identifier identifying a ground terminal of the capacitor element, and the capacitance showing a capacitance of the capacitor element;

capacitor element reading means for reading one combination of a capacitor element placement position, a power terminal identifier, a ground terminal identifier and a capacitance at a time, from the capacitor element storing means;

terminal connection storing means for storing, for a capacitor element identified by each capacitor element identifier, a layer identifier identifying a power layer to which a power terminal identified by a power terminal identifier of the capacitor element is connected, and a layer identifier identifying a ground layer to which a ground terminal identified by a ground terminal identifier of the capacitor element is connected;

power/ground connection judging means for extracting, from the terminal connection storing means, layer identifiers that respectively correspond to the read power terminal identifier and the read ground terminal identifier, and judging whether the extracted layer identifiers match the layer identifiers detected by the power/ground layer detecting means;

capacitance judging means for judging whether the read capacitance matches the predetermined capacitance;

position calculating means for calculating a distance between the read capacitor element placement position and the component placement position detected by the component position detecting means; and capacitor element detecting means for detecting, from the capacitor element storing means, the capacitor element identifier identifying the capacitor element that is connected to the pair of power and ground layers to which the component identified by the detected component identifier is connected, that has the predetermined capacitance, and that is placed nearest to the component on the signal layer, based on a judgement result by the power/ground connection judging means, a judgement result by the capacitance judging means, and a calculation result by the position calculating means.

21. The design aiding apparatus of claim 18, further comprising:

layer type storing means for storing a combination of a layer identifier and a layer type for each layer in the multilayer circuit board, the layer identifier identifying a layer, and the layer type showing whether the layer identified by the layer identifier is a signal layer, a power layer, or a ground layer; and interconnection storing means for storing at least one interconnection identifier identifying an interconnection of terminals of respective components, wherein the component selecting means includes:
interconnection identifier selecting means for selecting an interconnection identifier;

interconnected component storing means for storing, for each interconnection identifier, a component identifier identifying a component that is connected at each end of an interconnection identified by the interconnection identifier;

component detecting means for detecting a component identifier corresponding to the selected interconnection identifier from the interconnected component storing means;

power/ground layer detecting means for detecting, from the layer type storing means, layer identifiers that identify a pair of power and ground layers, among the power layers and the ground layers included in the multilayer circuit board, to which a component identified by the detected component identifier is connected;

component position storing means for storing a component placement position of a component identified by each component identifier; and component position detecting means for detecting a component placement position of the component identified by the detected component identifier, from the component position storing means, and wherein the capacitor element selecting means includes:
capacitor element storing means for storing a combination of a capacitor element placement position, a power terminal identifier, a ground terminal identifier and a capacitance for a capacitor element identified by each capacitor element identifier, the capacitor element placement position showing a placement position of the capacitor element, the power terminal identifier identifying a power terminal of the capacitor element, the ground terminal identifier identifying a ground terminal of the capacitor element, and the capacitance showing a capacitance of the capacitor element;

capacitor element reading means for reading one combination of a capacitor element placement position, a power terminal identifier, a ground terminal identifier and a capacitance at a time, from the capacitor element storing means;

terminal connection storing means for storing, for a capacitor element identified by each capacitor element identifier, a layer identifier identifying a power layer to which a power terminal identified by a power terminal identifier of the capacitor element is connected, and a layer identifier identifying a ground layer to which a ground terminal identified by a ground terminal identifier of the capacitor element is connected;

power/ground connection judging means for extracting, from the terminal connection storing means, layer identifiers that respectively correspond to the read power terminal identifier and the read ground terminal identifier, and judging whether the extracted layer identifiers match the layer identifiers detected by the power/ground layer detecting means;

capacitance judging means for judging whether the read capacitance matches the predetermined capacitance;

position calculating means for calculating a distance between the read capacitor element placement position and the component placement position detected by the component position detecting means; and capacitor element detecting means for detecting, from the capacitor element storing means, the capacitor element identifier identifying the capacitor element that is connected to the pair of power and ground layers to which the component identified by the detected component identifier is connected, that has the predetermined capacitance, and that is placed nearest to the component on the signal layer, based on a judgement result by the power/ground connection judging means, a judgement result by the capacitance judging means, and a calculation result by the position calculating means.

22. The design aiding apparatus of claim 13, further comprising:

layer type storing means for storing a combination of a layer identifier and a layer type for each layer in the multilayer circuit board, the layer identifier identifying a layer, and the layer type showing whether the layer identified by the layer identifier is a signal layer, a power layer, or a ground layer; and interconnection storing means for storing at least one interconnection identifier identifying an interconnection of terminals of respective components, wherein the component selecting means includes: interconnection identifier selecting means for selecting an interconnection identifier;

interconnected component storing means for storing, for each interconnection identifier, a component identifier identifying a component that is connected at each end of an interconnection identified by the interconnection identifier;

component detecting means for detecting a component identifier corresponding to the selected interconnection identifier from the interconnected component storing means;

power/ground layer detecting means for detecting, from the layer type storing means, layer identifiers that identify a pair of power and ground layers, among the power layers and the ground layers included in the multilayer circuit board, to which a component identified by the detected component identifier is connected;

component position storing means for storing a component placement position of a component identified by each component identifier; and component position detecting means for detecting a component placement position of the component identified by the detected component identifier, from the component position storing means, and wherein the capacitor element selecting means includes:

capacitor element storing means for storing a combination of a capacitor element placement position, a power terminal identifier, a ground terminal identifier and a capacitance for a capacitor element identified by each capacitor element identifier, the capacitor element placement position showing a placement position of the capacitor element, the power terminal identifier identifying a power terminal of the capacitor element, the ground terminal identifier identifying a ground terminal of the capacitor element, and the capacitance showing a capacitance of the capacitor element;

capacitor element reading means for reading one combination of a capacitor element placement position, a power terminal identifier, a ground terminal identifier and a capacitance at a time, from the capacitor element storing means;

terminal connection storing means for storing, for a capacitor element identified by each capacitor element identifier, a layer identifier identifying a power layer to which a power terminal identified by a power terminal identifier of the capacitor element is connected, and a layer identifier identifying a ground layer to which a ground terminal identified by a ground terminal identifier of the capacitor element is connected;

power/ground connection judging means for extracting, from the terminal connection storing means, layer identifiers that respectively correspond to the read power terminal identifier and the read ground terminal identifier, and judging whether the extracted layer identifiers match the layer identifiers detected by the power/ground layer detecting means;

capacitance judging means for judging whether the read capacitance matches the predetermined capacitance;

position calculating means for calculating a distance between the read capacitor element placement position and the component placement position detected by the component position detecting means; and capacitor element detecting means for detecting, from the capacitor element storing means, the capacitor element identifier identifying the capacitor element that is connected to the pair of power and ground layers to which the component identified by the detected component identifier is connected, that has the predetermined capacitance, and that is placed nearest to the component on the signal layer, based on a judgement result by the power/ground connection judging means, a judgement result by the capacitance judging means, and a calculation result by the position calculating means.

23. A design aiding apparatus for aiding placement of conductors in a multilayer circuit board in which at least one signal layer and at least one layer that is one of a power layer and a ground layer are included in a predetermined order, the design aiding apparatus comprising:

interconnection storing means for storing at least one interconnection identifier identifying an interconnection of terminals of respective components;

layer type storing means for storing a combination of a layer identifier and a layer type for each layer in the multilayer circuit board in the predetermined order, the layer identifier identifying a layer, and the layer type showing whether the layer identified by the layer identifier is a signal layer, a power layer, or a ground layer;

interconnection identifier selecting means for selecting an interconnection identifier identifying an interconnection of terminals of respective two components;

power/ground layer detecting means for detecting at least one layer to which the two components are connected among power layers and ground layers included in the multilayer circuit board, and detecting a layer identifier that identifies the detected layer from the layer type storing means;

signal layer detecting means for detecting at least one signal layer on which the two components are placed and detecting a layer identifier identifying the detected signal layer;

priority determining means for assigning priorities to the signal layers included in the multilayer circuit board, based on combinations of layer identifiers and layer types stored in the layer type storing means in the predetermined order, the layer identifier detected by the power/ground layer detecting means, and the layer identifier detected by the signal layer detecting means;

routing layer determining means for determining at least one signal layer on which a conductor will be placed to interconnect the terminals of the respective two components, based on the priorities assigned by the priority determining means; and routing means for calculating a placement area of the conductor on the determined signal layer.

24. The design aiding apparatus of claim 23,
wherein the power/ground layer detecting means includes:
conductor storing means for storing at least one combination of a conductor placement area and a layer identifier for each interconnection identifier identifying an interconnection of terminals of respective components, the conductor placement area showing an area occupied by a conductor which one of totally and partially interconnects the terminals of the respective components, and the layer identifier identifying a layer on which the conductor is placed;

interconnected component storing means for storing, for each interconnection identifier identifying an interconnection of terminals of respective components, at least one combination of a component identifier identifying a component and a terminal identifier identifying a terminal;

terminal storing means for storing, for each combination of a component identifier and a terminal identifier, a terminal attribute showing an attribute of a terminal identified by the terminal identifier of a component identified by the component identifier;

component detecting means for detecting two component identifiers corresponding to the interconnection identifier selected by the interconnection identifier selecting means, from the interconnected component storing means;

terminal detecting means for detecting terminal identifiers that each correspond to one of the detected two component identifiers and that each have a terminal attribute showing one of a power terminal and a ground terminal, from the terminal storing means; and power/ground detecting means for detecting, from the interconnected component storing means, at least one interconnection identifier that corresponds to combinations which are each made up of one of the detected two component identifiers and one of the detected terminal identifiers that corresponds to the component identifier, and detecting a layer identifier that corresponds to the detected interconnection identifier from the conductor storing means, wherein the priority determining means reads the combinations of the layer identifiers and the layer types one at a time from the layer type storing means according to the predetermined order and assigns higher priorities to layer identifiers, among layer identifiers which each correspond to a layer type showing a signal layer, that are nearer to the layer identifier detected by the power/ground detecting means in the predetermined order.

25. A design aiding apparatus for aiding placement of conductors in a multilayer circuit board in which at least one signal layer and at least one layer that is one of a power layer and a ground layer are included in a predetermined order, the design aiding apparatus comprising:

interconnection storing means for storing at least one interconnection identifier identifying an interconnection of terminals of respective components;

conductor storing means for storing at least one layer identifier for each interconnection identifier identifying an interconnection of terminals of respective components, the layer identifier identifying a signal layer one which a conductor which one of totally and partially interconnects the terminals of the respective components is placed;

interconnection identifier selecting means for selecting an interconnection identifier identifying an interconnection of terminals of respective two components;

conductor detecting means for detecting at least one layer identifier corresponding to the selected interconnection identifier from the conductor storing means, a signal layer identified by the detected layer identifier being set as a conductor placement layer; and routing layer judging means for judging whether the conductor placement layer is a predetermined signal layer.

26. The design aiding apparatus of claim 25,
wherein the conductor storing means further stores, for each interconnection identifier identifying an interconnection of terminals of respective components, at least one conductor placement area showing an area occupied by a conductor which one of totally and partially interconnects the terminals of the respective components, and wherein the design aiding apparatus further comprises
conductor moving means for deleting, when the routing layer judging means judges that the conductor placement layer is not the predetermined signal layer, the detected layer identifier and a conductor placement area corresponding to the selected interconnection identifier from the conductor storing means, calculating a new conductor placement area on the predetermined signal layer to place a conductor which interconnects the terminals of the respective two components, and writing a combination of the new conductor placement area and a layer identifier identifying the predetermined signal layer into the conductor storing means.

27. The design aiding apparatus of claim 25,
wherein the routing layer judging means includes:
layer type storing means for storing a combination of a layer identifier and a layer type for each layer in the multilayer circuit board according to the predetermined order, the layer identifier identifying a layer, and the layer type showing whether the layer identified by the layer identifier is a signal layer, a power layer, or a ground layer;

power/ground layer detecting means for detecting at least one layer to which the two components are connected among the power layers and ground layers included in the multilayer circuit board and detecting a layer identifier that identifies the detected layer from the layer type storing means;

signal layer detecting means for detecting at least one signal layer on which the two components are placed and detecting a layer identifier identifying the detected signal layer from the layer type storing means;

priority determining means for assigning priorities to the signal layers included in the multilayer circuit board, based on the combination of the layer identifier and the layer type for each layer in the layer type storing means, the layer identifier detected by the power/ground layer detecting means, and the layer identifier detected by the signal layer detecting means; and priority judging means for judging whether there is a signal layer whose priority is higher than a priority assigned to the conductor placement layer, based on the priorities assigned by the priority determining means.

28. The design aiding apparatus of claim 27, wherein the conductor storing means further stores, for each interconnection identifier identifying an interconnection of terminals of respective components, at least one conductor placement area showing an area occupied by a conductor which one of totally and partially interconnects the terminals of the respective components, and wherein the design aiding apparatus further comprises
conductor moving means for deleting, when the priority judging means judges that there is the signal layer of a higher priority than the conductor placement layer, the layer identifier and a conductor placement area corresponding to the selected interconnection identifier from the conductor storing means, calculating a new conductor placement area on the signal layer of the higher priority to place a conductor which interconnects the terminals of the respective two components, and writing a combination of the new conductor placement area and a layer identifier identifying the signal layer of the higher priority into the conductor storing means.

29. A design aiding apparatus for aiding placement of any of conductors and vias in a multilayer circuit board which includes at least one signal layer, at least one power layer and at least one ground layer, the design aiding apparatus comprising:

interconnection storing means for storing at least one interconnection identifier identifying an interconnection of terminals of respective components;

component storing means for storing a combination of a component identifier, a layer identifier, a component placement position and a component type for each component placed in the multilayer circuit board, the component identifier identifying a component, the layer identifier identifying a signal layer on which the component is placed, the component placement position showing a placement position of the component on the signal layer, and the component type showing a type of the component;

interconnection identifier selecting means for selecting an interconnection identifier which identifies an interconnection between a terminal of a first component and a terminal of a second component;

component detecting means for detecting a component identifier identifying the first component and a component identifier identifying the second component from the component storing means;

component placement layer judging means for retrieving a layer identifier corresponding to the component identifier of the first component and a layer identifier corresponding to the component identifier of the second component from the component storing means, setting a signal layer identified by the layer identifier retrieved for the first component as a first signal layer and a signal layer identified by the layer identifier retrieved for the second component as a second signal layer, and judging whether the first signal layer and the second signal layer are same;

rectangle area generating means for generating a rectangle area on the first signal layer when the component placement layer judging means judges that the first signal layer and the second signal layer are different, wherein diagonal vertices of the rectangle area correspond to a placement position of the terminal of the first component and a point formed by projecting a placement position of the terminal of the second component onto the first signal layer;

capacitor element judging means for searching the component storing means for a component identifier identifying a component that is connected to a pair of power and ground layers to which the first component and the second component are connected, that is a capacitor element, and that is placed within the generated rectangle area;

via placing means for calculating a predetermined position on the first signal layer as a via placement position when the component identifier is found by the capacitor element judging means; and routing means for calculating a conductor placement area on the first signal layer to place a conductor which connects the terminal of the first component and the calculated via placement position, and calculating a conductor placement area on the second signal layer to place a conductor which connects the terminal of the second component and a point formed by projecting the calculated via placement position onto the second signal layer.

30. The design aiding apparatus of claim 29, wherein when the component identifier is found by the capacitor element judging means, the via placing means retrieves a component placement position corresponding to the found component identifier from the component storing means and calculates, as the via placement position, a position that is within a predetermined distance from the retrieved component placement position.

31. The design aiding apparatus of claim 30, wherein the via placing means further includes
via start/end layer specifying means for specifying the first signal layer and the second signal layer respectively as a via start layer and a via end layer.

32. A design aiding apparatus for aiding placement of any of components, conductors and vias in a multilayer circuit board which includes at least one signal layer, at least one power layer and at least one ground layer in a predetermined order, the design aiding apparatus comprising:

interconnection storing means for storing at least one interconnection identifier identifying an interconnection of terminals of respective components;

capacitor element storing means for storing a placement position of each capacitor element, among capacitor elements placed on any of the signal layers, that is connected to a pair of power and ground layers;

layer type storing means for storing a combination of a layer identifier and a layer type for each layer in the multilayer circuit board according to the predetermined order, the layer identifier identifying a layer, and the layer type showing whether the layer identified by the layer identifier is a signal layer, a power layer, or a ground layer;

conductor storing means for storing at least one combination of a conductor placement area and a layer identifier for each interconnection identifier identifying an interconnection of terminals of respective components, the conductor placement area showing an area occupied by a conductor that one of totally and partially interconnects the terminals of the respective components, and the layer identifier identifying a signal layer on which the conductor is placed;

via storing means for storing a via placement position of each via that connects a plurality of layers;

interconnection identifier selecting means for selecting an interconnection identifier identifying an interconnection between a terminal of a first component and a terminal of a second component;

conductor detecting means for detecting at least one combination of a conductor placement area and a layer identifier corresponding to the selected interconnection identifier from the conductor storing means;

via judging means for searching the via storing means for a via whose via placement position is within any of the detected conductor placement areas;

nearest plane judging means for judging, when the via judging means finds the via and when the conductor detecting means detects two layer identifiers which respectively identify a first signal layer on which a first conductor is placed and a second signal layer on which a second conductor is placed, whether among the power layers and the ground layers included in the multilayer circuit board, a first layer that is nearest to the first signal layer is different from a second layer that is nearest to the second signal layer, based on combinations of layer identifiers and layer types stored in the layer type storing means in the predetermined order; and capacitor placement judging means for searching, when the nearest plane judging means judges that the first layer and the second layer are different, the capacitor element storing means for a capacitor element that is connected to the first layer and the second layer and that is placed within a predetermined distance from the via placement position of the via found by the via judging means.

33. The design aiding apparatus of claim 32, wherein the via judging means includes:

grouping means for grouping signal layers to which a same layer, among the power layers and the ground layers included in the multilayer circuit board, is nearest, based on the combinations of the layer identifiers and the layer types stored in the layer type storing means in the predetermined order; and sub via judging means for reading a via placement position of each via that connects two signal layers belonging to different groups, and judging whether the read via placement position is within any of the detected conductor placement areas.

34. The design aiding apparatus of claim 33, further comprising:

rectangle area generating means for generating a rectangle area on the first signal layer when no capacitor element is found by the capacitor placement judging means, wherein diagonal vertices of the rectangle area correspond to a placement position of the terminal of the first component and a point formed by projecting a placement position of the terminal of the second component onto the first signal layer; and rectangle area capacitor placement judging means for searching the capacitor element storing means for a capacitor element that is connected to the first layer and the second layer and that is placed within the generated rectangle area.

35. The design aiding apparatus of claim 34, further comprising routing means for calculating, when the capacitor element is found within the rectangle area by the rectangle area capacitor placement judging means, a new via placement position of the via within the predetermined distance from a placement position of the capacitor element, calculating a new conductor placement area on the first signal layer to place the first conductor which connects the terminal of the first component and the new via placement position, and calculating a new conductor placement area on the second signal layer to place the second conductor which connects the terminal of the second component and a point formed by projecting the new via placement position onto the second signal layer.

36. The design aiding apparatus of claim 35, further comprising capacitor element placing means for calculating, when no capacitor element is found within the rectangle area by the rectangle area capacitor placement judging means, a placement position of a new capacitor element that is connected to the first layer and the second layer, within the predetermined distance from the via placement position of the via found by the via judging means.

37. The design aiding apparatus of claim 34, further comprising capacitor element placing means for calculating, when no capacitor element is found within the rectangle area by the rectangle area capacitor placement judging means, a placement position of a new capacitor element that is connected to the first layer and the second layer, within the predetermined distance from the via placement position of the via found by the via judging means.

38. The design aiding apparatus of claim 32, further comprising:

rectangle area generating means for generating a rectangle area on the first signal layer when no capacitor element is found by the capacitor placement judging means, wherein diagonal vertices of the rectangle area correspond to a placement position of the terminal of the first component and a point formed by projecting a placement position of the terminal of the second component onto the first signal layer; and rectangle area capacitor placement judging means for searching the capacitor element storing means for a capacitor element that is connected to the first layer and the second layer and that is placed within the generated rectangle area.

39. The design aiding apparatus of claim 38, further comprising routing means for calculating, when the capacitor element is found within the rectangle area by the rectangle area capacitor placement judging means, a new via placement position of the via within the predetermined distance from a placement position of the capacitor element, calculating a new conductor placement area on the first signal layer to place the first conductor which connects the terminal of the first component and the new via placement position, and calculating a new conductor placement area on the second signal layer to place the second conductor which connects the terminal of the second component and a point formed by projecting the new via placement position onto the second signal layer.

40. The design aiding apparatus of claim 39, further comprising capacitor element placing means for calculating, when no capacitor element is found within the rectangle area by the rectangle area capacitor placement judging means, a placement position of a new capacitor element that is connected to the first layer and the second layer, within the predetermined distance from the via placement position of the via found by the via judging means.

41. The design aiding apparatus of claim 38, further comprising capacitor element placing means for calculating, when no capacitor element is found within the rectangle area by the rectangle area capacitor placement judging means, a placement position of a new capacitor element that is connected to the first layer and the second layer, within the predetermined distance from the via placement position of the via found by the via judging means.

42. A design aiding apparatus for aiding placement of conductors in a multilayer circuit board which includes at least one signal layer, at least one power layer and at least one ground layer, the design aiding apparatus comprising:

component detecting means for detecting components which are to be interconnected by a predetermined signal line on a signal layer;

plane detecting means for detecting a position of each layer, among the power layers and the ground layers, to which the components are connected and detecting a shape of a conductor area of each layer to which the components are connected;

routing area setting means for setting an area formed by projecting an area defined by the detected position and the detected shape onto the signal layer, as a routing area for the predetermined signal line; and routing means for calculating a conductor placement area within the routing area to place each conductor to interconnect the components.

43. A design aiding apparatus for aiding division of each plane into subplanes in a multilayer circuit board which includes at least one plane that is one of a power plane and a ground plane and at least one signal layer on which a plurality of circuit blocks are placed, the design aiding apparatus comprising:

circuit block judging means for classifying each of the plurality of circuit blocks under a first type of a circuit block that contains a predetermined signal line over which a specific signal flows and a second type of a circuit block aside from the first type, the specific signal being a signal whose amount of change in a fixed period of time is no less than a predetermined value; and slit forming means for dividing each plane into at least two subplanes and calculating coordinates of a slit that is a non-conductor area present between each adjacent two of the subplanes, wherein each of the subplanes corresponds to one of an integrated placement area of circuit blocks of the first type and an integrated placement area of circuit blocks of the second type.

44. The design aiding apparatus of claim 43, wherein the slit forming means includes:

circuit block combining means for combining placement areas of circuit blocks of a same type into one integrated placement area and as a result generating at least one integrated placement area on the signal layer;

subplane generating means for dividing each plane into at least two subplanes that correspond to the integrated placement areas generated by the circuit block combining means, and calculating coordinates of the slit between each adjacent two of the subplanes; and subplane connecting means for calculating a conductor placement area of a conductor of a predetermined width to connect each adjacent two of the subplanes.

45. The design aiding apparatus of claim 44, wherein at least one conductor is placed as a signal line in each of the plurality of circuit blocks on the signal layer, and wherein the design aiding apparatus further comprises:

intersection judging means for judging whether an area, formed by projecting a conductor placement area of a conductor of each predetermined signal line onto each plane, intersects a slit present on each plane; and conductor adding means for calculating, when the intersection judging means judges that the area intersects the slit, a conductor placement area in the area to place a conductor that connects two subplanes which sandwich the slit.

46. A design aiding apparatus for aiding division of each plane into subplanes in a multilayer circuit board which includes at least one plane that is one of a power plane and a ground plane and at least one signal layer on which a plurality of circuit blocks are placed, the design aiding apparatus comprising:

circuit block judging means for classifying each of the plurality of circuit blocks under a first type of a circuit block that contains a predetermined signal line over which a specific signal flows and a second type of a circuit block aside from the first type, the specific signal being a signal whose amount of change in a fixed period of time is no less than a predetermined value;

circuit block combining means for combining placement areas of circuit blocks of a same type into one integrated placement area and as a result generating at least one integrated placement area on the signal layer; and subplane generating means for dividing each plane into at least two subplanes and calculating coordinates of a slit that is a non-conductor area present between each adjacent two of the subplanes, wherein each of the subplanes corresponds to one of the integrated placement areas generated by the circuit block combining means.

47. The design aiding apparatus of claim 46,
wherein the specific signal is a signal that has any of a frequency no less than a predetermined frequency and a transition time no more than a predetermined transition time,
wherein the design aiding apparatus further comprises
storing means for storing, for each signal line, at least one of a frequency and a transition time of a signal which flows over the signal line, and
wherein the circuit block judging means reads at least one of a frequency and a transition time of a signal which flows over each signal line from the storing means, judges whether the signal has any of the frequency no less than the predetermined frequency and the transition time no more than the predetermined transition time, and classifies a circuit block that contains the signal line into one of the first type and the second type depending on a judgement result.

48. The design aiding apparatus of claim 47,
wherein the circuit block combining means includes:
boundary line setting means for setting virtual boundary lines between adjacent circuit blocks;
judging means for judging, for each adjacent two circuit blocks that sandwich a virtual boundary line, whether the two circuit blocks belong to a same type;
boundary line deleting means for deleting the virtual boundary line when the two circuit blocks are judged to belong to the same type; and
placement area integrating means for combining placement areas of circuit blocks which are enclosed by remaining boundary lines into one integrated placement area and as a result generating at least one integrated placement area.

49. The design aiding apparatus of claim 48,
wherein at least one conductor is placed as a signal line in each of the plurality of circuit blocks on the signal layer, and
wherein the design aiding apparatus further comprises:
intersection judging means for judging whether an area, formed by projecting a conductor placement area of a conductor of each predetermined signal line onto each plane, intersects a slit present on each plane;
plane judging means for judging, when the intersection judging means judges that the area intersects the slit, whether two subplanes which sandwich the slit have been generated from a same plane; and
conductor adding means for calculating a conductor placement area in the area to place a conductor which connects the two subplanes when the plane judging means judges that the two subplanes have been generated from the same plane.

50. The design aiding apparatus of claim 48,
wherein at least one conductor is placed as a signal line in each of the plurality of circuit blocks on the signal layer, and
wherein the design aiding apparatus further comprises:
intersection judging means for judging whether an area, formed by projecting a conductor placement area of a conductor of each predetermined signal line onto each plane, intersects a slit present on each plane;
plane judging means for judging, when the intersection judging means judges that the area intersects the slit, whether two subplanes which sandwich the slit have been generated from a same plane;
potential judging means for judging, when the plane judging means judges that the two subplanes have been generated from different planes, whether the two subplanes have a same potential; and
jumper adding means for calculating a placement position in the area for a jumper which connects the two subplanes, when the potential judging means judges that the two subplanes have the same potential.

51. The design aiding apparatus of claim 48,
wherein at least one conductor is placed as a signal line in each of the plurality of circuit blocks on the signal layer, and
wherein the design aiding apparatus further comprises:
intersection judging means for judging whether an area, formed by projecting a conductor placement area of a conductor of each predetermined signal line onto each plane, intersects a slit present on each plane;
plane judging means for judging, when the intersection judging means judges that the area intersects the slit, whether two subplanes which sandwich the slit have been generated from a same plane;
potential judging means for judging, when the plane judging means judges that the two subplanes have been generated from different planes, whether the two subplanes have a same potential; and
capacitor element adding means for calculating a placement position in the area for a capacitor element which connects the two subplanes, when the potential judging means judges that the two subplanes have different potentials.

52. The design aiding apparatus of claim 48, further comprising
connecting means for connecting each adjacent two of the subplanes generated by the subplane generating means, using a conductor of a predetermined width.

53. The design aiding apparatus of claim 48, further comprising
connecting means for connecting each adjacent two of the subplanes generated by the subplane generating means, using an inductor coil.

54. The design aiding apparatus of claim 53,
wherein the storing means further stores component information showing components placed in the multilayer circuit board and connection information showing connection paths between the components, and
wherein the connecting means includes:
inductor connecting means for calculating a placement position of the inductor coil and a position to which each end of the inductor coil is to be connected;
component information renewing means for adding the inductor coil to a content of the component information in the storing means; and
connection information renewing means for changing, in the connection information in the storing means, each connection path between a terminal of a component and a pre-divided plane to a connection path between the terminal of the component and a subplane, generated from the pre-divided plane, to which the terminal of the component is connected.

55. The design aiding apparatus of claim 47,
wherein at least one conductor is placed as a signal line in each of the plurality of circuit blocks on the signal layer, and
wherein the design aiding apparatus further comprises:
intersection judging means for judging whether an area, formed by projecting a conductor placement area of a conductor of each predetermined signal line onto each plane, intersects a slit present on each plane;

plane judging means for judging, when the intersection judging means judges that the area intersects the slit, whether two subplanes which sandwich the slit have been generated from a same plane; and conductor adding means for calculating a conductor placement area in the area to place a conductor which connects the two subplanes when the plane judging means judges that the two subplanes have been generated from the same plane.

56. The design aiding apparatus of claim 47, wherein at least one conductor is placed as a signal line in each of the plurality of circuit blocks on the signal layer, and wherein the design aiding apparatus further comprises:
intersection judging means for judging whether an area, formed by projecting a conductor placement area of a conductor of each predetermined signal line onto each plane, intersects a slit present on each plane;

plane judging means for judging, when the intersection judging means judges that the area intersects the slit, whether two subplanes which sandwich the slit have been generated from a same plane;

potential judging means for judging, when the plane judging means judges that the two subplanes have been generated from different planes, whether the two subplanes have a same potential; and jumper adding means for calculating a placement position in the area for a jumper which connects the two subplanes, when the potential judging means judges that the two subplanes have the same potential.

57. The design aiding apparatus of claim 47, wherein at least one conductor is placed as a signal line in each of the plurality of circuit blocks on the signal layer, and wherein the design aiding apparatus further comprises:
intersection judging means for judging whether an area, formed by projecting a conductor placement area of a conductor of each predetermined signal line onto each plane, intersects a slit present on each plane;

plane judging means for judging, when the intersection judging means judges that the area intersects the slit, whether two subplanes which sandwich the slit have been generated from a same plane;

potential judging means for judging, when the plane judging means judges that the two subplanes have been generated from different planes, whether the two subplanes have a same potential; and capacitor element adding means for calculating a placement position in the area for a capacitor element which connects the two subplanes, when the potential judging means judges that the two subplanes have different potentials.

58. The design aiding apparatus of claim 47, further comprising connecting means for connecting each adjacent two of the subplanes generated by the subplane generating means, using a conductor of a predetermined width.

59. The design aiding apparatus of claim 47, further comprising connecting means for connecting each adjacent two of the subplanes generated by the subplane generating means, using an inductor coil.

60. The design aiding apparatus of claim 59, wherein the storing means further stores component information showing components placed in the multilayer circuit board and connection information showing connection paths between the components, and wherein the connecting means includes:
inductor connecting means for calculating a placement position of the inductor coil and a position to which each end of the inductor coil is to be connected;

component information renewing means for adding the inductor coil to a content of the component information in the storing means; and connection information renewing means for changing, in the connection information in the storing means, each connection path between a terminal of a component and a pre-divided plane to a connection path between the terminal of the component and a subplane, generated from the pre-divided plane, to which the terminal of the component is connected.

61. The design aiding apparatus of claim 46, wherein the circuit block combining means includes:
boundary line setting means for setting virtual boundary lines between adjacent circuit blocks;

judging means for judging, for each adjacent two circuit blocks that sandwich a virtual boundary line, whether the two circuit blocks belong to a same type;

boundary line deleting means for deleting the virtual boundary line when the two circuit blocks are judged to belong to the same type; and placement area integrating means for combining placement areas of circuit blocks which are enclosed by remaining boundary lines into one integrated placement area and as a result generating at least one integrated placement area.

62. The design aiding apparatus of claim 61, wherein at least one conductor is placed as a signal line in each of the plurality of circuit blocks on the signal layer, and wherein the design aiding apparatus further comprises:
intersection judging means for judging whether an area, formed by projecting a conductor placement area of a conductor of each predetermined signal line onto each plane, intersects a slit present on each plane;

plane judging means for judging, when the intersection judging means judges that the area intersects the slit, whether two subplanes which sandwich the slit have been generated from a same plane; and conductor adding means for calculating a conductor placement area in the area to place a conductor which connects the two subplanes when the plane judging means judges that the two subplanes have been generated from the same plane.

63. The design aiding apparatus of claim 61, wherein at least one conductor is placed as a signal line in each of the plurality of circuit blocks on the signal layer, and wherein the design aiding apparatus further comprises:
intersection judging means for judging whether an area, formed by projecting a conductor placement area of a conductor of each predetermined signal line onto each plane, intersects a slit present on each plane;

plane judging means for judging, when the intersection judging means judges that the area intersects the slit, whether two subplanes which sandwich the slit have been generated from a same plane;

potential judging means for judging, when the plane judging means judges that the two subplanes have been generated from different planes, whether the two subplanes have a same potential; and jumper adding means for calculating a placement position in the area for a jumper which connects the two subplanes, when the potential judging means judges that the two subplanes have the same potential.

64. The design aiding apparatus of claim 61,
wherein at least one conductor is placed as a signal line in each of the plurality of circuit blocks on the signal layer, and
wherein the design aiding apparatus further comprises:
intersection judging means for judging whether an area, formed by projecting a conductor placement area of a conductor of each predetermined signal line onto each plane, intersects a slit present on each plane;
plane judging means for judging, when the intersection judging means judges that the area intersects the slit, whether two subplanes which sandwich the slit have been generated from a same plane;
potential judging means for judging, when the plane judging means judges that the two subplanes have been generated from different planes, whether the two subplanes have a same potential; and
capacitor element adding means for calculating a placement position in the area for a capacitor element which connects the two subplanes, when the potential judging means judges that the two subplanes have different potentials.

65. The design aiding apparatus of claim 61, further comprising
connecting means for connecting each adjacent two of the subplanes generated by the subplane generating means, using a conductor of a predetermined width.

66. The design aiding apparatus of claim 61, further comprising
connecting means for connecting each adjacent two of the subplanes generated by the subplane generating means, using an inductor coil.

67. The design aiding apparatus of claim 66, further comprising
storing means for storing component information showing components placed in the multi-layer circuit board and connection information showing connection paths between the components,
wherein the connecting means includes:
inductor connecting means for calculating a placement position of the inductor coil and a position to which each end of the inductor coil is to be connected;
component information renewing means for adding the inductor coil to a content of the component information in the storing means; and
connection information renewing means for changing, in the connection information in the storing means, each connection path between a terminal of a component and a pre-divided plane to a connection path between the terminal of the component and a subplane, generated from the pre-divided plane, to which the terminal of the component is connected.

68. The design aiding apparatus of claim 46,
wherein at least one conductor is placed as a signal line in each of the plurality of circuit blocks on the signal layer, and
wherein the design aiding apparatus further comprises:
intersection judging means for judging whether an area, formed by projecting a conductor placement area of a conductor of each predetermined signal line onto each plane, intersects a slit present on each plane;
plane judging means for judging, when the intersection judging means judges that the area intersects the slit, whether two subplanes which sandwich the slit have been generated from a same plane; and
conductor adding means for calculating a conductor placement area in the area to place a conductor which connects the two subplanes when the plane judging means judges that the two subplanes have been generated from the same plane.

69. The design aiding apparatus of claim 46,
wherein at least one conductor is placed as a signal line in each of the plurality of circuit blocks on the signal layer, and
wherein the design aiding apparatus further comprises:
intersection judging means for judging whether an area, formed by projecting a conductor placement area of a conductor of each predetermined signal line onto each plane, intersects a slit present on each plane;
plane judging means for judging, when the intersection judging means judges that the area intersects the slit, whether two subplanes which sandwich the slit have been generated from a same plane;
potential judging means for judging, when the plane judging means judges that the two subplanes have been generated from different planes, whether the two subplanes have a same potential; and
jumper adding means for calculating a placement position in the area for a jumper which connects the two subplanes, when the potential judging means judges that the two subplanes have the same potential.

70. The design aiding apparatus of claim 46,
wherein at least one conductor is placed as a signal line in each of the plurality of circuit blocks on the signal layer, and
wherein the design aiding apparatus further comprises:
intersection judging means for judging whether an area, formed by projecting a conductor placement area of a conductor of each predetermined signal line onto each plane, intersects a slit present on each plane;
plane judging means for judging, when the intersection judging means judges that the area intersects the slit, whether two subplanes which sandwich the slit have been generated from a same plane;
potential judging means for judging, when the plane judging means judges that the two subplanes have been generated from different planes, whether the two subplanes have a same potential; and
capacitor element adding means for calculating a placement position in the area for a capacitor element which connects the two subplanes, when the potential judging means judges that the two subplanes have different potentials.

71. The design aiding apparatus of claim 46, further comprising:
component detecting means for detecting components which are to be interconnected by a predetermined signal line on the signal layer;
subplane detecting means for detecting a position of each subplane to which the components are connected and detecting a shape of a conductor area of each subplane to which the components are connected;
routing area setting means for setting an area formed by projecting an area defined by the detected position and the detected shape onto the signal layer, as a routing area for the predetermined signal line; and
routing means for calculating a conductor placement area within the routing area to place each conductor to interconnect the components.

72. A design aiding apparatus for aiding division of each plane into subplanes in a multilayer circuit board which includes at least one plane that is one of a power plane and a ground plane and at least one signal layer on which a plurality of circuit blocks are placed, wherein at least one conductor is placed as a signal line in each of the plurality of circuit blocks, the design aiding apparatus comprising:

storing means for storing, for each signal line, at least one of a frequency and a transition time of a signal that flows over the signal line;

circuit block judging means for reading, for each of the plurality of circuit blocks, at least one of a frequency and a transition time of a signal that flows over a signal line contained in the circuit block from the storing means, and judging whether the circuit block is a circuit block of a first type which contains a predetermined signal line over which a specific signal flows or a circuit block of a second type aside from the first type, the specific signal being a signal that has any of a frequency no less than a predetermined frequency and a transition time no more than a predetermined transition time;

circuit block combining means for combining placement areas of circuit blocks of a same type into one integrated placement area and as a result generating at least one integrated placement area on the signal layer;

subplane generating means for dividing each plane into at least two subplanes that correspond to the integrated placement areas generated by the circuit block combining means, and calculating coordinates of a slit that is a non-conductor area present between each adjacent two of the subplanes;

intersection judging means for judging whether an area, formed by projecting a conductor placement area of a conductor of each predetermined signal line onto each plane, intersects a slit present on each plane;

plane judging means for judging, when the intersection judging means judges that the area intersects the slit, whether two subplanes which sandwich the slit have been generated from a same plane; and conductor adding means for calculating a conductor placement area in the area to place a conductor which connects the two subplanes when the plane judging means judges that the two subplanes have been generated from the same plane.

73. A design aiding apparatus for aiding division of each plane into subplanes in a multilayer circuit board which includes at least one plane that is one of a power plane and a ground plane and at least one signal layer on which a plurality of circuit blocks are placed, wherein at least one conductor is placed as a signal line in each of the plurality of circuit blocks, the design aiding apparatus comprising:

storing means for storing, for each signal line, at least one of a frequency and a transition time of a signal that flows over the signal line;

circuit block judging means for reading, for each of the plurality of circuit blocks, at least one of a frequency and a transition time of a signal that flows over a signal line contained in the circuit block from the storing means, and judging whether the circuit block is a circuit block of a first type which contains a predetermined signal line over which a specific signal flows or a circuit block of a second type aside from the first type, the specific signal being a signal that has any of a frequency no less than a predetermined frequency and a transition time no more than a predetermined transition time;

circuit block combining means for combining placement areas of circuit blocks of a same type into one integrated placement area and as a result generating at least one integrated placement area on the signal layer;

subplane generating means for dividing each plane into at least two subplanes that correspond to the integrated placement areas generated by the circuit block combining means, and calculating coordinates of a slit that is a non-conductor area present between each adjacent two of the subplanes;

intersection judging means for judging whether an area, formed by projecting a conductor placement area of a conductor of each predetermined signal line onto each plane, intersects a slit present on each plane;

plane judging means for judging, when the intersection judging means judges that the area intersects the slit, whether two subplanes which sandwich the slit have been generated from a same plane;

potential judging means for judging, when the plane judging means judges that the two subplanes have been generated from different planes, whether the two subplanes have a same potential; and jumper adding means for calculating a placement position in the area for a jumper which connects the two subplanes, when the potential judging means judges that the two subplanes have the same potential.

74. A design aiding apparatus for aiding division of each plane into subplanes in a multilayer circuit board which includes at least one plane that is one of a power plane and a ground plane and at least one signal layer on which a plurality of circuit blocks are placed, wherein at least one conductor is placed as a signal line in each of the plurality of circuit blocks, the design aiding apparatus comprising:

storing means for storing, for each signal line, at least one of a frequency and a transition time of a signal that flows over the signal line;

circuit block judging means for reading, for each of the plurality of circuit blocks, at least one of a frequency and a transition time of a signal that flows over a signal line contained in the circuit block from the storing means, and judging whether the circuit block is a circuit block of a first type that contains a predetermined signal line over which a specific signal flows or a circuit block of a second type aside from the first type, the specific signal being a signal that has any of a frequency no less than a predetermined frequency and a transition time no more than a predetermined transition time;

circuit block combining means for combining placement areas of circuit blocks of a same type into one integrated placement area and as a result generating at least one integrated placement area on the signal layer;

subplane generating means for dividing each plane into at least two subplanes that correspond to the integrated placement areas generated by the circuit block combining means, and calculating coordinates of a slit that is a non-conductor area present between each adjacent two of the subplanes;

intersection judging means for judging whether an area, formed by projecting a conductor placement area of a conductor of each predetermined signal line onto each plane, intersects a slit present on each plane;

plane judging means for judging, when the intersection judging means judges that the area intersects the slit, whether two subplanes which sandwich the slit have been generated from a same plane;

potential judging means for judging, when the plane judging means judges that the two subplanes have been generated from different planes, whether the two subplanes have a same potential; and capacitor element adding means for calculating a placement position in the area for a capacitor element which connects the two subplanes, when the potential judging means judges that the two subplanes have different potentials.

* * * * *